United States Patent [19]
Calder

[11] Patent Number: 4,783,739
[45] Date of Patent: Nov. 8, 1988

[54] INPUT/OUTPUT COMMAND PROCESSOR

[75] Inventor: Powell L. Calder, Georgetown, Tex.

[73] Assignee: Geophysical Service Inc., Dallas, Tex.

[21] Appl. No.: 459,333

[22] Filed: Jan. 19, 1983

Related U.S. Application Data

[63] Continuation of Ser. No. 91,861, Nov. 5, 1979, abandoned.

[51] Int. Cl.⁴ ............................................. G06F 13/12
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,001,783 | 1/1977 | Monahan | 364/200 |
| 4,025,905 | 5/1977 | Gorgens | 364/900 |
| 4,032,899 | 6/1977 | Jenny | 364/200 |
| 4,063,221 | 12/1977 | Watson | 364/900 |
| 4,075,691 | 2/1978 | Davis | 364/200 |
| 4,104,718 | 8/1978 | Poublan | 364/200 |

Primary Examiner—David Y. Eng
Attorney, Agent, or Firm—Joseph A. Walkowski

[57] ABSTRACT

An input/output command processor provides a sophisticated communication link between a central processor and peripheral digital apparatus. The command processor receives commands from the central processor, interprets them and transmits them to the peripheral digital apparatus. The command processor is comprised of a store/fetch circuit for directly accessing the memory of the central processor; a fetch and buffer circuit for causing a fetch and for temporarily storing the results of the fetch (commands) in a buffer register file; an interpret controller for interpreting the commands and routing them to the cognizant peripheral apparatus, according to their function.

10 Claims, 125 Drawing Sheets

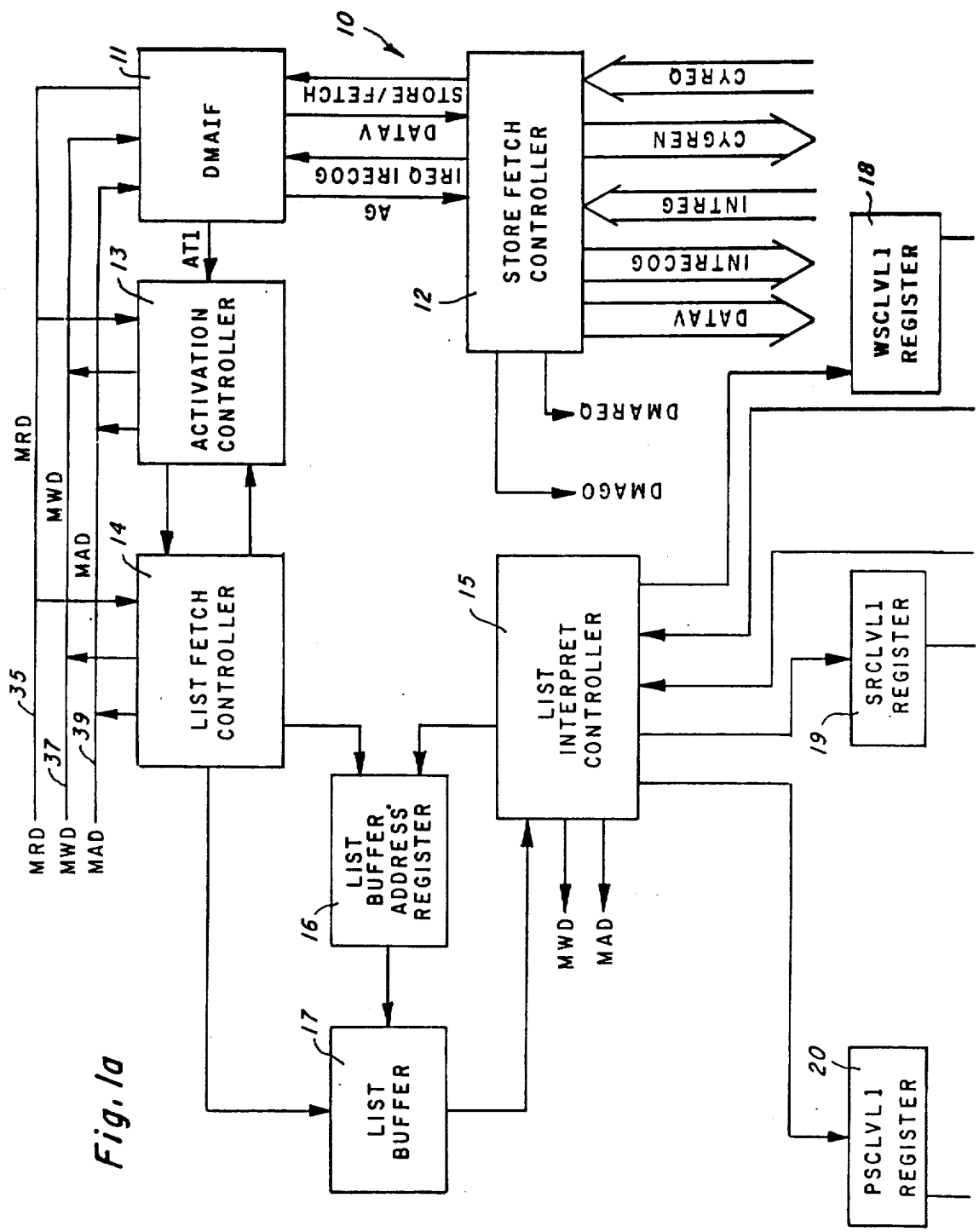

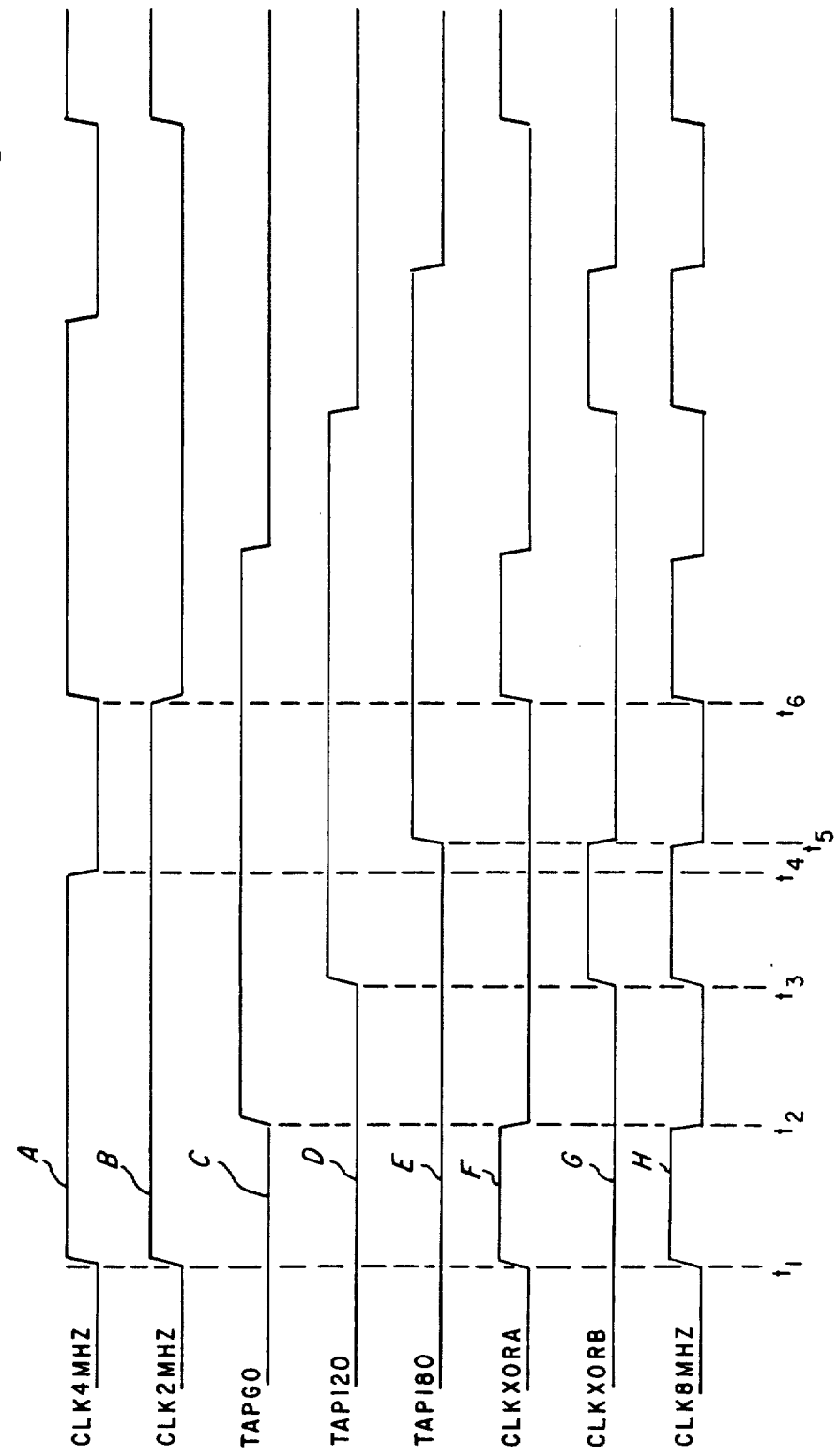

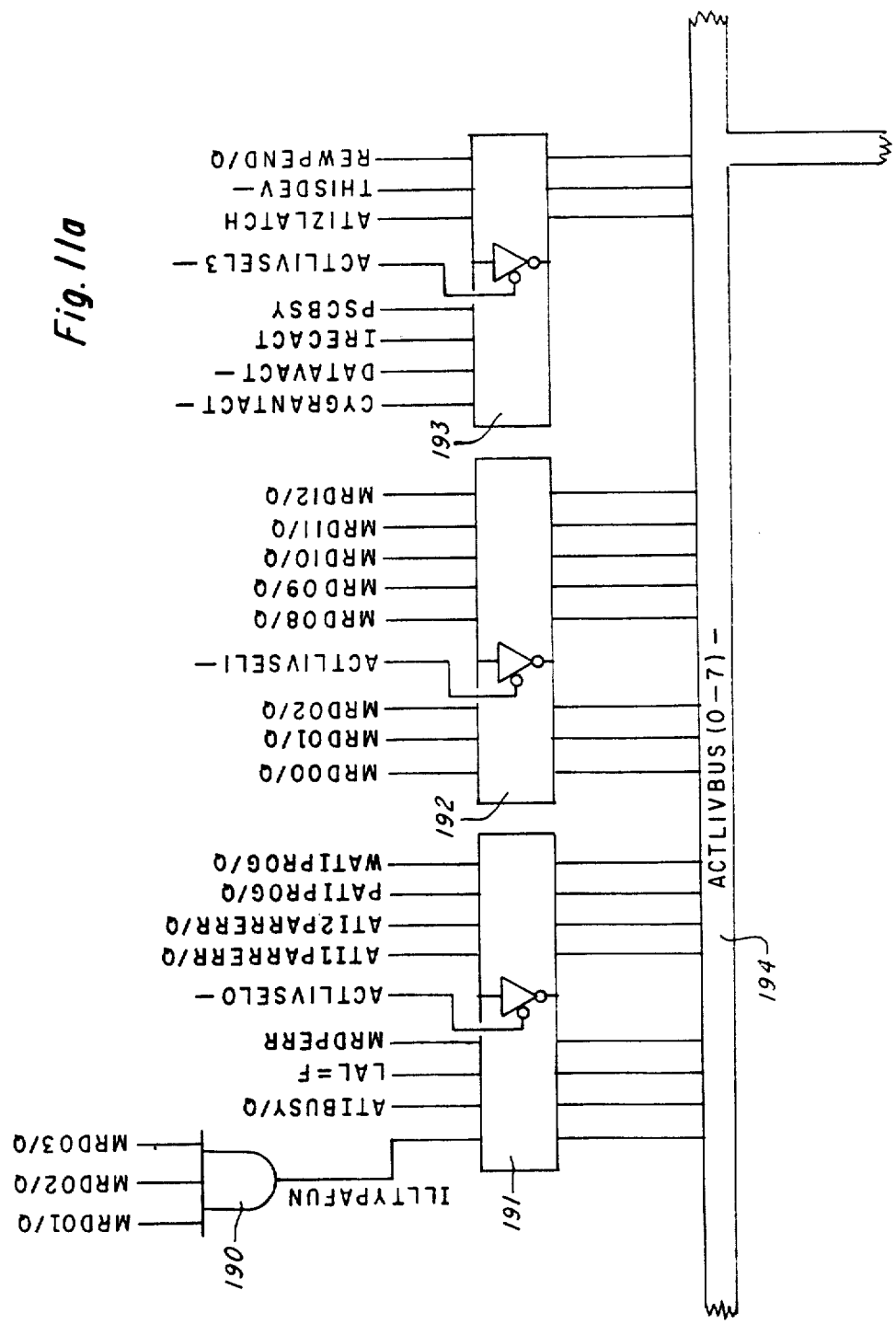

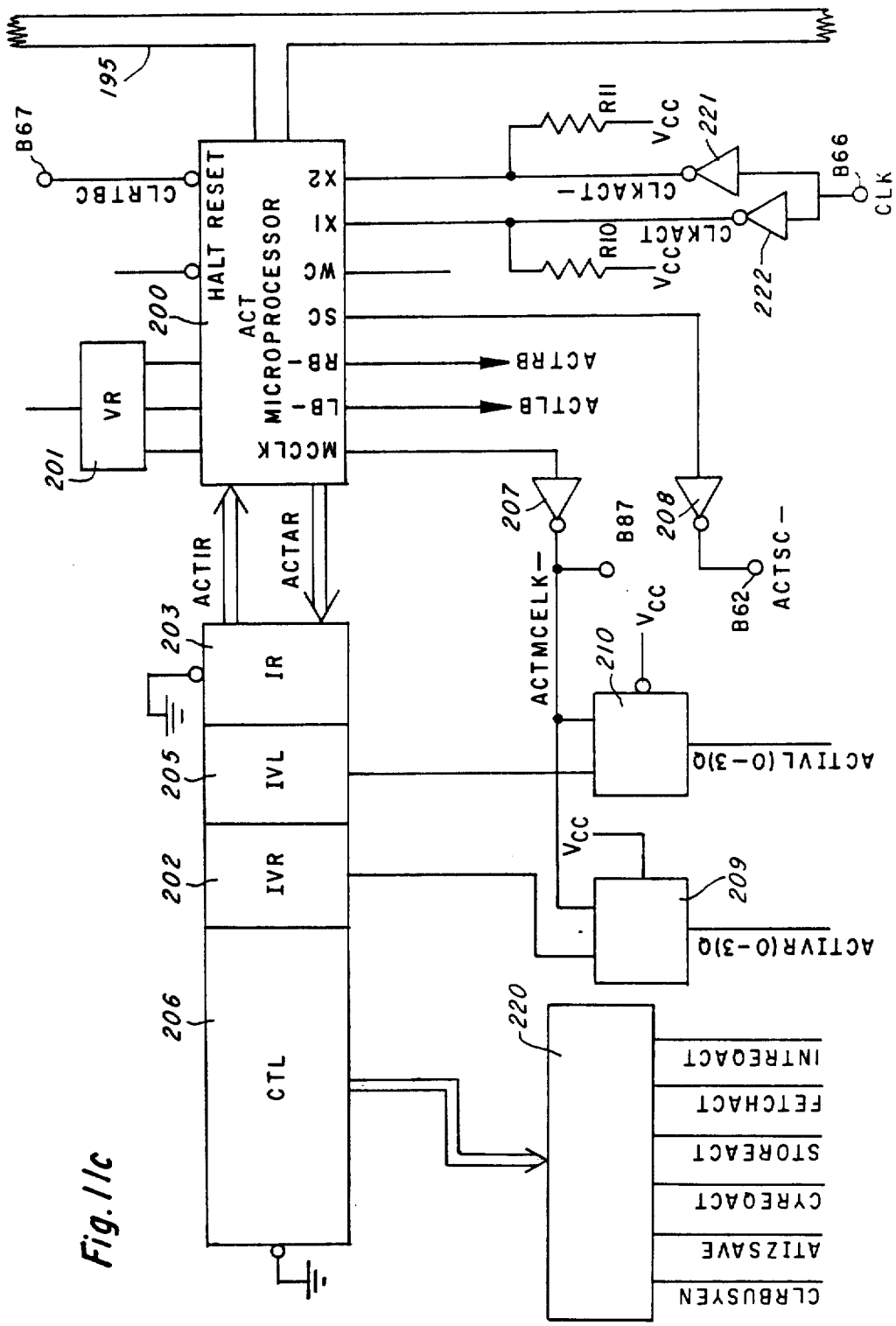

Fig. 12a

| CT ADR | WRD0 | WRD1 | | | | | | |
|---|---|---|---|---|---|---|---|---|
| 0000 | CFB0 | 0600 | 003E | 0000 | 0000 | 007D | A261 | 0000 |
| 0001 | CF00 | 0400 | 003F | 0000 | 0000 | 007E | E072 | 0000 |
| 0002 | B522 | 3040 | 0040 | B72B | 0000 | 007F | 0000 | 0000 |
| 0003 | 17A2 | 1000 | 0041 | CF04 | 0100 | 0080 | B428 | 0000 |
| 0004 | 9685 | 1000 | 0042 | C00F | 0000 | 0081 | CF00 | 0800 |
| 0005 | E020 | 0000 | 0043 | 4221 | 0000 | 0082 | 2744 | 0000 |
| 0006 | E03A | 0000 | 0044 | C001 | 0000 | 0083 | E078 | 0000 |
| 0007 | E0BE | 0000 | 0045 | 4200 | 0000 | 0084 | CF02 | 0700 |
| 0008 | E060 | 0000 | 0046 | 81E0 | 0000 | 0085 | CF42 | 0700 |
| 0009 | E020 | 0000 | 0047 | 241F | 0200 | 0086 | CF82 | 0700 |
| 000A | E060 | 0000 | 0048 | CF40 | 0100 | 0087 | CFC2 | 0700 |
| 000B | E0BE | 0000 | 0049 | CF20 | 0500 | 0088 | E078 | 0000 |
| 000C | E03A | 0000 | 004A | E074 | 0000 | 0089 | B428 | 0000 |
| 000D | E060 | 0000 | 004B | CF00 | 0800 | 008A | CF01 | 0100 |
| 000E | E03A | 0000 | 004C | CF50 | 0700 | 008B | CF20 | 0500 |
| 000F | E064 | 0000 | 004D | E078 | 0000 | 008C | E074 | 0000 |
| 0010 | E068 | 0000 | 004E | 0000 | 0000 | 008D | 0000 | 0000 |
| 0011 | E080 | 0000 | 004F | 0000 | 0000 | 008E | 0000 | 0000 |
| 0012 | E0BE | 0000 | 0050 | 0000 | 0000 | 008F | 0000 | 0000 |
| 0013 | E089 | 0000 | 0051 | 0000 | 0000 | 0090 | 0000 | 0000 |
| 0014 | E0A0 | 0000 | 0052 | 0000 | 0000 | 0091 | 0000 | 0000 |
| 0015 | 0000 | 0000 | 0053 | 0000 | 0000 | 0092 | 0000 | 0000 |
| 0016 | 0000 | 0000 | 0054 | 0000 | 0000 | 0093 | 0000 | 0000 |
| 0017 | 0000 | 0000 | 0055 | 0000 | 0000 | 0094 | 0000 | 0000 |
| 0018 | 0000 | 0000 | 0056 | 0000 | 0000 | 0095 | 0000 | 0000 |
| 0019 | 0000 | 0000 | 0057 | 0000 | 0000 | 0096 | 0000 | 0000 |
| 001A | 0000 | 0000 | 0058 | 0000 | 0000 | 0097 | 0000 | 0000 |
| 001B | 0000 | 0000 | 0059 | 0000 | 0000 | 0098 | 0000 | 0000 |
| 001C | 0000 | 0000 | 005A | 0000 | 0000 | 0099 | 0000 | 0000 |
| 001D | 0000 | 0000 | 005B | 0000 | 0000 | 009A | 0000 | 0000 |
| 001E | 0000 | 0000 | 005C | 0000 | 0000 | 009B | 0000 | 0000 |
| 001F | 0000 | 0000 | 005D | 0000 | 0000 | 009C | 0000 | 0000 |
| 0020 | B420 | 3000 | 005E | 0000 | 0000 | 009D | 0000 | 0000 |
| 0021 | B432 | 0010 | 005F | 0000 | 0000 | 009E | 0000 | 0000 |
| 0022 | B022 | 300A | 0060 | B433 | 0000 | 009F | 0000 | 0000 |
| 0023 | B123 | 3000 | 0061 | CF80 | 0800 | 00A0 | B434 | 0000 |
| 0024 | B332 | 0000 | 0062 | CF00 | 0700 | 00A1 | CF80 | 0500 |
| 0025 | B035 | 0000 | 0063 | E078 | 0000 | 00A2 | C0FF | 0000 |
| 0026 | B139 | 1000 | 0064 | B433 | 0000 | 00A3 | C181 | 0000 |
| 0027 | B636 | 0000 | 0065 | CF02 | 0100 | 00A4 | 2101 | 0000 |
| 0028 | CF08 | 0100 | 0066 | CF40 | 0500 | 00A5 | A1A4 | 0000 |
| 0029 | C00F | 0000 | 0067 | E074 | 0000 | 00A6 | B326 | 3000 |
| 002A | 4221 | 0000 | 0068 | B428 | 3000 | 00A7 | CF80 | 0700 |
| 002B | C001 | 0000 | 0069 | B433 | 0000 | 00A8 | CF00 | 0800 |
| 002C | 4200 | 0000 | 006A | 8259 | 0000 | 00A9 | B229 | 3001 |
| 002D | 81E0 | 0000 | 006B | B221 | 0000 | 00AA | B02A | 3000 |
| 002E | 241F | 0300 | 006C | CF00 | 0800 | 00AB | B02B | 3000 |
| 002F | CF80 | 0100 | 006D | 825B | 0000 | 00AC | E0AB | 0000 |
| 0030 | CF40 | 0500 | 006E | E078 | 0000 | 00AD | CFB4 | 0600 |
| 0031 | E074 | 0000 | 006F | CF10 | 0100 | 00AE | CF80 | 0700 |
| 0032 | CF00 | 0800 | 0070 | CF20 | 0100 | 00AF | B02F | 300C |
| 0033 | CF01 | 0700 | 0071 | CF48 | 0700 | 00B0 | B032 | 3000 |
| 0034 | E078 | 0000 | 0072 | CF88 | 0700 | 00B1 | E0B0 | 0000 |
| 0035 | E07B | 0000 | 0073 | E032 | 0000 | 00B2 | CFB0 | 0600 |
| 0036 | CF00 | 0800 | 0074 | B136 | 0000 | 00B3 | E074 | 0000 |
| 0037 | CF90 | 0700 | 0075 | E002 | 0000 | 00B4 | E078 | 0000 |
| 0038 | E078 | 0000 | 0076 | CF00 | 0800 | 00B5 | 0000 | 0000 |
| 0039 | E040 | 0000 | 0077 | CF10 | 0700 | 00B6 | 0000 | 0000 |
| 003A | B43A | 3000 | 0078 | B238 | 3001 | 00B7 | 0000 | 0000 |
| 003B | B432 | 0010 | 0079 | B039 | 300C | 00B8 | 0000 | 0000 |
| 003C | E027 | 0000 | 007A | E074 | 0000 | 00B9 | 0000 | 0000 |
| 003D | 0000 | 0000 | 007B | C008 | 0000 | 00BA | 0000 | 0000 |
| | | | 007C | 4202 | 0000 | 00BB | 0000 | 0000 |

Fig. 12b

| | | | | | |
|---|---|---|---|---|---|
| 00BC | 0000 | 0000 | 00FB | 0000 | 0000 |
| 00BD | 0000 | 0000 | 00FC | 0000 | 0000 |
| 00BE | B43E | 3000 | 00FD | 0000 | 0000 |
| 00BF | 1265 | 1000 | 00FE | 0000 | 0000 |
| 00C0 | B43E | 0000 | 00FF | 0000 | 0000 |
| 00C1 | 85F0 | 0000 | | | |
| 00C2 | B72C | 3000 | | | |
| 00C3 | C00F | 0000 | | | |
| 00C4 | 4221 | 0000 | | | |
| 00C5 | C008 | 0000 | | | |
| 00C6 | 42A0 | 0000 | | | |
| 00C7 | 81E0 | 0000 | | | |
| 00C8 | 2400 | 0000 | | | |
| 00C9 | 2500 | 0000 | | | |
| 00CA | 001F | 0400 | | | |
| 00CB | E074 | 0000 | | | |
| 00CC | CF20 | 0700 | | | |
| 00CD | CF00 | 0800 | | | |
| 00CE | C002 | 0000 | | | |
| 00CF | 6102 | 0000 | | | |
| 00D0 | A2DC | 0000 | | | |
| 00D1 | B031 | 3000 | | | |
| 00D2 | B034 | 3000 | | | |
| 00D3 | E0D2 | 0000 | | | |
| 00D4 | CF40 | 0800 | | | |
| 00D5 | CF00 | 0700 | | | |
| 00D6 | CFB2 | 0600 | | | |
| 00D7 | B037 | 3000 | | | |
| 00D8 | B03A | 3000 | | | |
| 00D9 | E0D8 | 0000 | | | |
| 00DA | CFB0 | 0600 | | | |
| 00DB | E074 | 0000 | | | |
| 00DC | B23C | 3001 | | | |
| 00DD | E0D1 | 0000 | | | |
| 00DE | E032 | 0000 | | | |
| 00DF | 0000 | 0000 | | | |
| 00E0 | C402 | 0000 | | | |
| 00E1 | C404 | 0000 | | | |
| 00E2 | C430 | 0000 | | | |
| 00E3 | 0000 | 0000 | | | |
| 00E4 | C400 | 0000 | | | |
| 00E5 | 0000 | 0000 | | | |
| 00E6 | C4A0 | 0000 | | | |
| 00E7 | C408 | 0000 | | | |
| 00E8 | 0000 | 0000 | | | |
| 00E9 | C406 | 0000 | | | |
| 00EA | 0000 | 0000 | | | |
| 00EB | 0000 | 0000 | | | |
| 00EC | 0000 | 0000 | | | |
| 00ED | C4B0 | 0000 | | | |
| 00EE | 0000 | 0000 | | | |
| 00EF | 0000 | 0000 | | | |
| 00F0 | C507 | 0000 | | | |
| 00F1 | C503 | 0000 | | | |
| 00F2 | C500 | 0000 | | | |
| 00F3 | C504 | 0000 | | | |
| 00F4 | C501 | 0000 | | | |
| 00F5 | C505 | 0000 | | | |
| 00F6 | C502 | 0000 | | | |
| 00F7 | C506 | 0000 | | | |
| 00F8 | 0000 | 0000 | | | |
| 00F9 | 0000 | 0000 | | | |
| 00FA | 0000 | 0000 | | | |

STATE ADDRESSES 0100 – 01FF CONTAIN 0000 0000

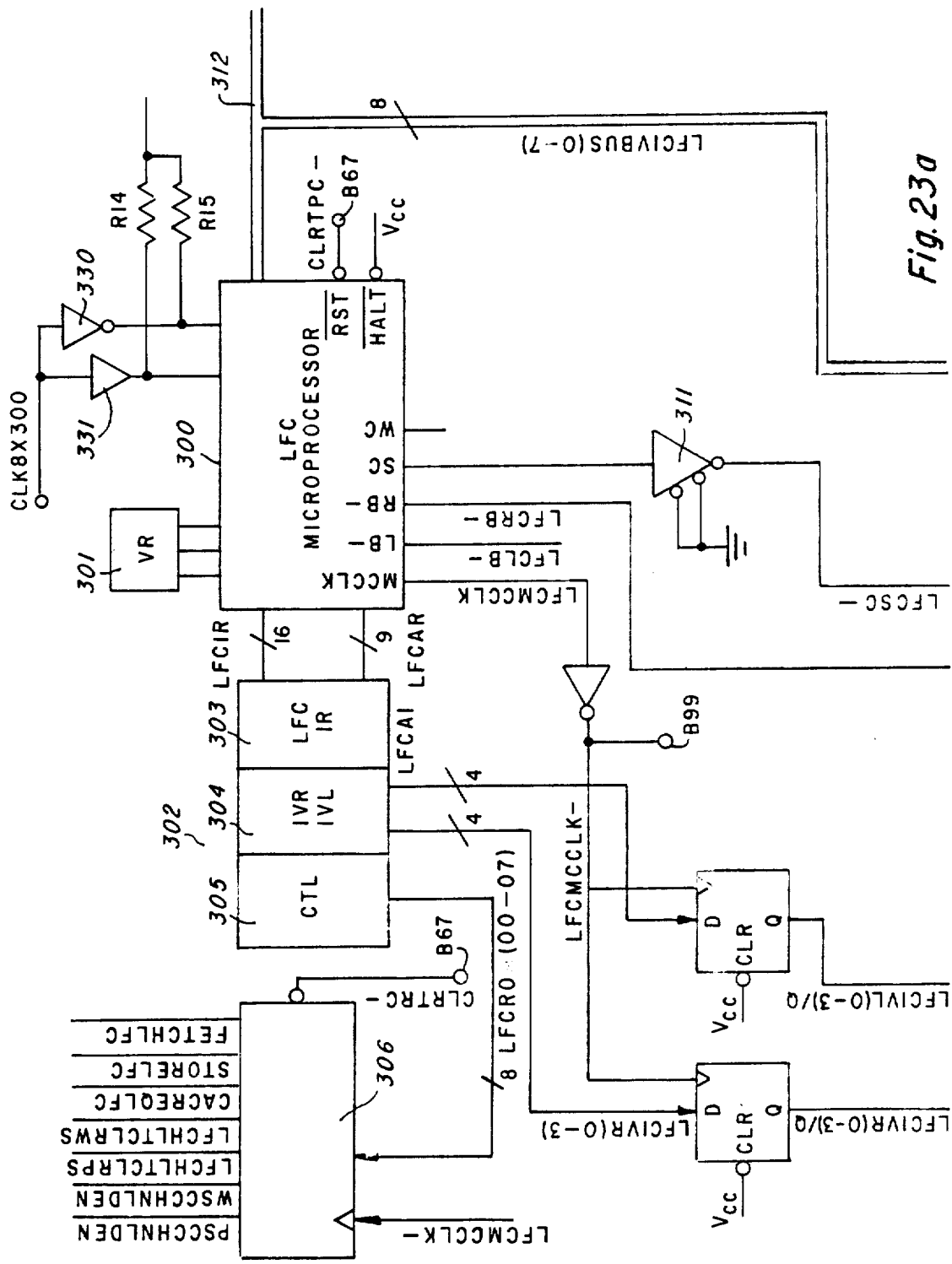

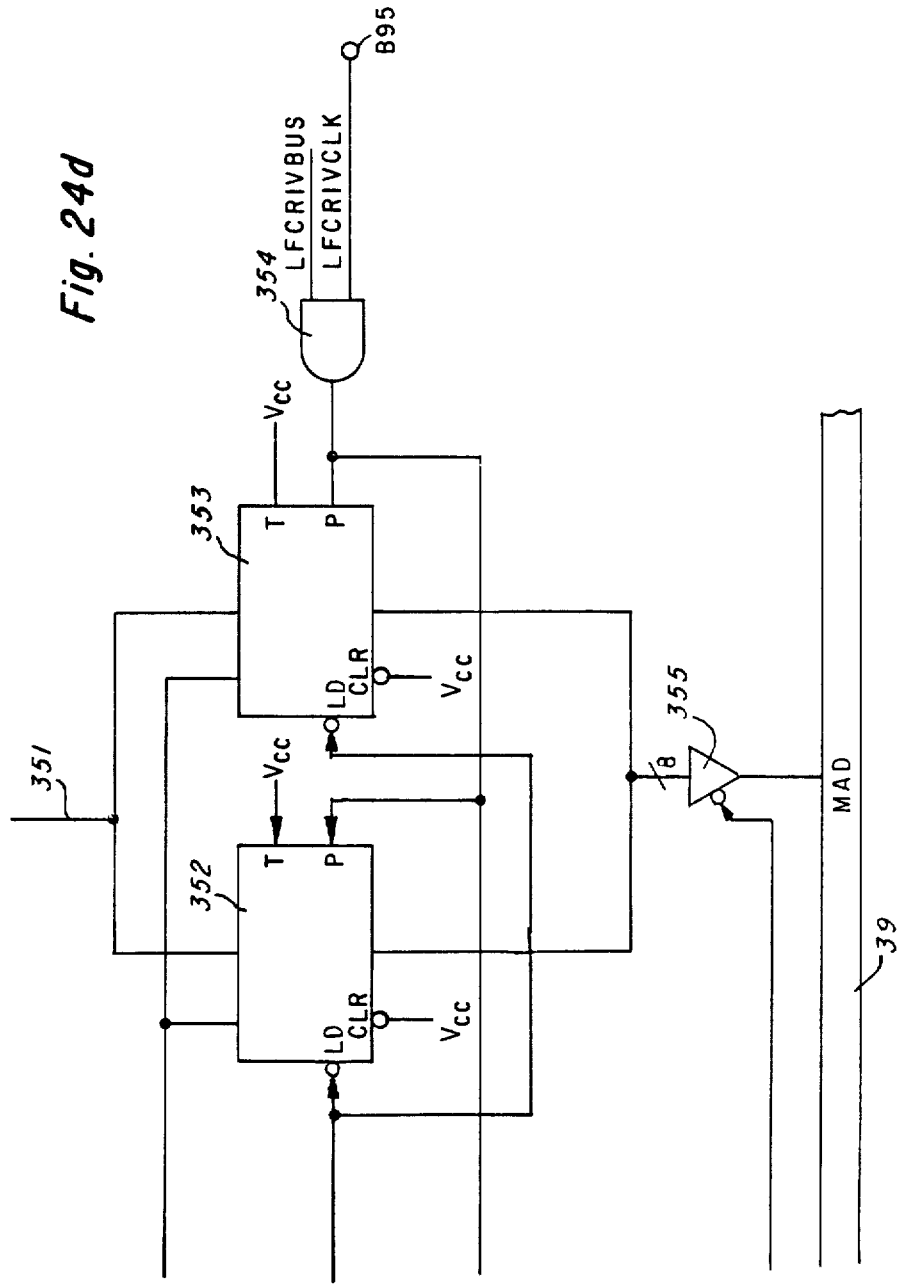

Fig. 29a

| ST ADR | WRD0 | WRD1 | | | | | | |
|--------|------|------|------|------|------|------|------|------|
| 0000 | C580 | 0000 | 003E | B03E | 300A | 007D | CF02 | 0200 |
| 0001 | C680 | 0000 | 003F | D13F | 3000 | 007E | D03E | 300A |
| 0002 | CF00 | 0300 | 0040 | 1724 | 0000 | 007F | D13F | 3000 |
| 0003 | CF3F | 0300 | 0041 | A462 | 0000 | 0080 | 1724 | 0000 |
| 0004 | B437 | 2000 | 0042 | 051F | 0100 | 0081 | A401 | 0000 |
| 0005 | D558 | 0000 | 0043 | C010 | 0000 | 0082 | CFC0 | 0400 |
| 0006 | B12D | 1000 | 0044 | 25E5 | 0000 | 0083 | B020 | 0000 |
| 0007 | B539 | 2000 | 0045 | C0F2 | 0000 | 0084 | D026 | 3000 |
| 0008 | B558 | 0000 | 0046 | 4525 | 0000 | 0085 | C004 | 0000 |
| 0009 | D23A | 1000 | 0047 | CF80 | 0200 | 0086 | CF3F | 0300 |
| 000A | E004 | 0000 | 0048 | E007 | 0000 | 0087 | 041F | 0100 |
| 000B | B025 | 2000 | 0049 | CFFD | 0300 | 0088 | C100 | 0000 |
| 000C | 1320 | 1000 | 004A | CFFF | 0300 | 0089 | C0D6 | 0000 |
| 000D | A05E | 0000 | 004B | CF80 | 0200 | 008A | 1229 | 2000 |
| 000E | CFBF | 0400 | 004C | E007 | 0000 | 008B | C101 | 0000 |
| 000F | CF02 | 0200 | 004D | CF01 | 0200 | 008C | C0D6 | 0000 |
| 0010 | B030 | 300A | 004E | C001 | 0000 | 008D | CF01 | 0200 |
| 0011 | B131 | 3000 | 004F | 2505 | 0000 | 008E | C001 | 0000 |
| 0012 | B73B | 0000 | 0050 | A954 | 0000 | 008F | 2606 | 0000 |
| 0013 | CFFF | 0300 | 0051 | C107 | 0000 | 0090 | A22E | 0000 |
| 0014 | 051F | 0100 | 0052 | E0A4 | 0000 | 0091 | C010 | 0000 |
| 0015 | B77C | 1000 | 0053 | E049 | 0000 | 0092 | 26C6 | 0000 |
| 0016 | E01D | 0000 | 0054 | B034 | 300A | 0093 | C0F0 | 0000 |
| 0017 | E0C3 | 0000 | 0055 | B135 | 3000 | 0094 | 4626 | 0000 |
| 0018 | E064 | 0000 | 0056 | 1724 | 0080 | 0095 | CF40 | 0200 |
| 0019 | E0C9 | 0000 | 0057 | A462 | 0000 | 0096 | A904 | 0000 |
| 001A | E078 | 0000 | 0058 | 051F | 0100 | 0097 | CF3E | 0200 |
| 001B | E062 | 0000 | 0059 | C103 | 0000 | 0098 | CF3F | 0200 |
| 001C | E021 | 0000 | 005A | E0A4 | 0000 | 0099 | E004 | 0000 |
| 001D | C2FF | 0000 | 005B | E043 | 0000 | 009A | CF3D | 0300 |
| 001E | CFEF | 0400 | 005C | 1229 | 2000 | 009B | CF3F | 0300 |
| 001F | D03F | 300C | 005D | E02E | 0000 | 009C | CF7F | 0400 |
| 0020 | E127 | 0000 | 005E | CFF7 | 0300 | 009D | C07D | 0000 |
| 0021 | C001 | 0000 | 005F | CFFF | 0300 | 009E | B03E | 300A |
| 0022 | 7761 | 1000 | 0060 | CF7F | 0400 | 009F | D13F | 3000 |
| 0023 | A127 | 0000 | 0061 | E00F | 0000 | 00A0 | 1724 | 0040 |
| 0024 | E01D | 0000 | 0062 | CF20 | 0200 | 00A1 | A401 | 0000 |
| 0025 | C200 | 0000 | 0063 | E0C5 | 0000 | 00A2 | 041F | 0100 |
| 0026 | 1329 | 2000 | 0064 | 1520 | 0000 | 00A3 | E021 | 0000 |
| 0027 | C100 | 0000 | 0065 | 5423 | 0000 | 00A4 | CF01 | 0200 |
| 0028 | E0A4 | 0000 | 0066 | A36A | 0000 | 00A5 | C001 | 0000 |
| 0029 | C003 | 0000 | 0067 | 1423 | 0000 | 00A6 | 2505 | 0000 |
| 002A | 7761 | 1000 | 0068 | A374 | 0000 | 00A7 | B027 | 300A |
| 002B | A12D | 0000 | 0069 | E06D | 0000 | 00A8 | D129 | 3000 |
| 002C | E049 | 0000 | 006A | B431 | 0030 | 00A9 | 1724 | 0000 |
| 002D | A25C | 0000 | 006B | C580 | 0000 | 00AA | A462 | 0000 |
| 002E | C101 | 0000 | 006C | CF80 | 0100 | 00AB | 051F | 0100 |
| 002F | E034 | 0000 | 006D | D52D | 0010 | 00AC | 31AD | 0000 |
| 0030 | A24D | 0000 | 006E | C680 | 0000 | 00AD | E029 | 0000 |
| 0031 | C102 | 0000 | 006F | CF40 | 0100 | 00AE | E030 | 0000 |
| 0032 | E0A4 | 0000 | 0070 | E004 | 0000 | 00AF | E033 | 0000 |
| 0033 | C103 | 0000 | 0071 | B52A | 0030 | 00B0 | C035 | 0000 |
| 0034 | E0A4 | 0000 | 0072 | C680 | 0000 | 00B1 | E037 | 0000 |
| 0035 | C104 | 0000 | 0073 | CF40 | 0100 | 00B2 | E039 | 0000 |
| 0036 | E0A4 | 0000 | 0074 | B434 | 0020 | 00B3 | E000 | 0000 |
| 0037 | C105 | 0000 | 0075 | C580 | 0000 | 00B4 | E053 | 0000 |
| 0038 | E0A4 | 0000 | 0076 | CF80 | 0100 | 00B5 | E05B | 0000 |
| 0039 | A949 | 0000 | 0077 | E007 | 0000 | 00B6 | CF01 | 0200 |
| 003A | CF01 | 0200 | 0078 | 1123 | 2000 | 00B7 | C001 | 0000 |
| 003B | C120 | 0000 | 0079 | A302 | 0000 | 00B8 | 2606 | 0000 |
| 003C | 2565 | 0000 | 007A | 1423 | 1000 | 00B9 | B039 | 300A |
| 003D | 05A5 | 0000 | 007B | A32A | 0000 | 00BA | B13A | 3000 |
| | | | 007C | CFDF | 0400 | 00BB | 1724 | 0000 |

Fig. 29b

| | | | | | |
|---|---|---|---|---|---|
| 00BC | A4C1 | 0000 | 00FB | 0000 | 0000 |
| 00BD | 061F | 0100 | 00FC | 0000 | 0000 |
| 00BE | 81DF | 0000 | 00FD | 0000 | 0000 |
| 00BF | E08A | 0000 | 00FE | 0000 | 0000 |
| 00C0 | E08D | 0000 | 00FF | 0000 | 0000 |
| 00C1 | CF10 | 0200 | | | |
| 00C2 | E0CD | 0000 | | | |
| 00C3 | CFDF | 0300 | | | |
| 00C4 | CFFF | 0300 | | | |
| 00C5 | C580 | 0000 | | | |
| 00C6 | CF35 | 0300 | | | |
| 00C7 | CF3F | 0300 | | | |
| 00C8 | E007 | 0000 | | | |
| 00C9 | CF2F | 0300 | | | |
| 00CA | CF3F | 0300 | | | |
| 00CB | C680 | 0000 | | | |
| 00CC | CF3A | 0300 | | | |
| 00CD | CF3F | 0300 | | | |
| 00CE | E004 | 0000 | | | |
| 00CF | 0000 | 0000 | | | |
| 00D0 | 0000 | 0000 | | | |
| 00D1 | 0000 | 0000 | | | |
| 00D2 | 0000 | 0000 | | | |
| 00D3 | 0000 | 0000 | | | |
| 00D4 | 0000 | 0000 | | | |
| 00D5 | 0000 | 0000 | | | |
| 00D6 | 0000 | 0000 | | | |
| 00D7 | 0000 | 0000 | | | |
| 00D8 | 0000 | 0000 | | | |
| 00D9 | 0000 | 0000 | | | |
| 00DA | 0000 | 0000 | | | |
| 00DB | 0000 | 0000 | | | |
| 00DC | 0000 | 0000 | | | |
| 00DD | 0000 | 0000 | | | |
| 00DE | 0000 | 0000 | | | |
| 00DF | 0000 | 0000 | | | |
| 00E0 | 0000 | 0000 | | | |
| 00E1 | 0000 | 0000 | | | |
| 00E2 | 0000 | 0000 | | | |
| 00E3 | 0000 | 0000 | | | |
| 00E4 | 0000 | 0000 | | | |
| 00E5 | 0000 | 0000 | | | |
| 00E6 | 0000 | 0000 | | | |
| 00E7 | 0000 | 0000 | | | |
| 00E8 | 0000 | 0000 | | | |
| 00E9 | 0000 | 0000 | | | |
| 00EA | 0000 | 0000 | | | |
| 00EB | 0000 | 0000 | | | |
| 00EC | 0000 | 0000 | | | |
| 00ED | 0000 | 0000 | | | |
| 00EE | 0000 | 0000 | | | |
| 00EF | 0000 | 0000 | | | |
| 00F0 | 0000 | 0000 | | | |
| 00F1 | 0000 | 0000 | | | |
| 00F2 | 0000 | 0000 | | | |
| 00F3 | 0000 | 0000 | | | |
| 00F4 | 0000 | 0000 | | | |
| 00F5 | 0000 | 0000 | | | |
| 00F6 | 0000 | 0000 | | | |
| 00F7 | 0000 | 0000 | | | |
| 00F8 | 0000 | 0000 | | | |
| 00F9 | 0000 | 0000 | | | |
| 00FA | 0000 | 0000 | | | |

STATE ADDRESSES 0100 – 01FF
CONTAIN 0000 0000

Fig. 34a

| ST ADR | WRD0 | WRD1 | | | | | | |
|--------|------|------|------|------|------|------|------|------|
| 0000 | C520 | 0000 | 003E | CF01 | 0100 | 007D | E00D | 0000 |
| 0001 | C480 | 0000 | 003F | E007 | 0000 | 007E | C141 | 0000 |
| 0002 | CF02 | 0100 | 0040 | 2320 | 1000 | 007F | C200 | 0000 |
| 0003 | CF00 | 0200 | 0041 | E012 | 0000 | 0080 | C401 | 0000 |
| 0004 | CF01 | 0100 | 0042 | C181 | 0000 | 0081 | C20F | 0000 |
| 0005 | 1020 | 7000 | 0043 | C100 | 0000 | 0082 | E100 | 0000 |
| 0006 | A012 | 0000 | 0044 | C401 | 0000 | 0083 | C072 | 0000 |
| 0007 | 1740 | 1000 | 0045 | C206 | 0000 | 0084 | C200 | 0000 |
| 0008 | A084 | 0000 | 0046 | E100 | 0000 | 0085 | C401 | 0000 |
| 0009 | 1380 | 6000 | 0047 | E03C | 0000 | 0086 | 1740 | 1000 |
| 000A | A0A4 | 0000 | 0048 | 1704 | 5000 | 0087 | 00A0 | 0000 |
| 000B | 1120 | 7000 | 0049 | C010 | 0000 | 0088 | 1420 | 1030 |
| 000C | A048 | 0000 | 004A | 4400 | 0000 | 0089 | A024 | 0030 |
| 000D | 1740 | 1000 | 004B | A07E | 0000 | 008A | C104 | 0000 |
| 000E | A084 | 0000 | 004C | C301 | 0000 | 008B | C210 | 0000 |
| 000F | 1780 | 6000 | 004D | C002 | 0000 | 008C | E100 | 0000 |
| 0010 | A0CA | 0000 | 004E | 4400 | 0000 | 008D | C500 | 0000 |
| 0011 | E005 | 0000 | 004F | A075 | 0000 | 008E | B72E | 1010 |
| 0012 | 1704 | 4000 | 0050 | C140 | 0000 | 008F | C144 | 0000 |
| 0013 | C010 | 0000 | 0051 | C200 | 0000 | 0090 | C211 | 0000 |
| 0014 | 4400 | 0000 | 0052 | C2C7 | 0000 | 0091 | E100 | 0000 |
| 0015 | A042 | 0000 | 0053 | E100 | 0000 | 0092 | C400 | 0000 |
| 0016 | C020 | 0000 | 0054 | C2A0 | 0000 | 0093 | E005 | 0000 |
| 0017 | 4400 | 0000 | 0055 | C004 | 0000 | 0094 | 1720 | 1000 |
| 0018 | A040 | 0000 | 0056 | 4400 | 0000 | 0095 | A020 | 0030 |
| 0019 | C180 | 0000 | 0057 | A05C | 0000 | 0096 | C144 | 0000 |
| 001A | C200 | 0000 | 0058 | C102 | 0000 | 0097 | C212 | 0000 |
| 001B | C900 | 0000 | 0059 | C208 | 0000 | 0098 | E100 | 0000 |
| 001C | E100 | 0000 | 005A | E10A | 0000 | 0099 | C400 | 0000 |
| 001D | C300 | 0000 | 005B | E00D | 0000 | 009A | B43A | 1020 |
| 001E | C2D4 | 0000 | 005C | C008 | 0000 | 009B | C104 | 0000 |
| 001F | C004 | 0000 | 005D | 4400 | 0000 | 009C | C213 | 0000 |
| 0020 | 4400 | 0000 | 005E | A06F | 0000 | 009D | E100 | 0000 |
| 0021 | A026 | 0000 | 005F | C101 | 0000 | 009E | C580 | 0000 |
| 0022 | C102 | 0000 | 0060 | C202 | 0000 | 009F | E00D | 0000 |
| 0023 | C901 | 0000 | 0061 | E10A | 0000 | 00A0 | E00D | 0000 |
| 0024 | E10A | 0000 | 0062 | 170F | 5C00 | 00A1 | E08E | 0000 |
| 0025 | E007 | 0000 | 0063 | 170F | 5C00 | 00A2 | E02A | 0000 |
| 0026 | C008 | 0000 | 0064 | B726 | 7000 | 00A3 | E088 | 0000 |
| 0027 | 4400 | 0000 | 0065 | E044 | 0000 | 00A4 | 1140 | 1000 |
| 0028 | A022 | 0000 | 0066 | CF04 | 0100 | 00A5 | A00B | 0000 |
| 0029 | C101 | 0000 | 0067 | C101 | 0000 | 00A6 | CF20 | 0100 |
| 002A | C902 | 0000 | 0068 | C90A | 0000 | 00A7 | C23E | 0000 |
| 002B | F10A | 0000 | 0069 | E10E | 0000 | 00A8 | CF3F | 0400 |
| 002C | 120F | 4C00 | 006A | CF02 | 0100 | 00A9 | 050F | 0200 |
| 002D | 120F | 4C00 | 006B | C102 | 0000 | 00AA | B52A | 7000 |
| 002E | B730 | 7000 | 006C | C90B | 0000 | 00AB | 1380 | 0000 |
| 002F | E02E | 0000 | 006D | E10A | 0000 | 00AC | 1703 | 2000 |
| 0030 | CF00 | 0100 | 006E | E072 | 0000 | 00AD | 1704 | 3000 |
| 0031 | C1C1 | 0000 | 006F | C104 | 0000 | 00AE | CF00 | 0200 |
| 0032 | C903 | 0000 | 0070 | C20C | 0000 | 00AF | 000F | 0500 |
| 0033 | E10E | 0000 | 0071 | E10A | 0000 | 00B0 | CF02 | 0200 |
| 0034 | CF02 | 0100 | 0072 | C480 | 0000 | 00B1 | C108 | 0000 |
| 0035 | C104 | 0000 | 0073 | CF4C | 0900 | 00B2 | C002 | 0000 |
| 0036 | C904 | 0000 | 0074 | E00D | 0000 | 00B3 | 25E5 | 0000 |
| 0037 | E10A | 0000 | 0075 | C12C | 0000 | 00B4 | 052F | 0000 |
| 0038 | E03C | 0000 | 0076 | C200 | 0000 | 00B5 | 020F | 0400 |
| 0039 | C106 | 0000 | 0077 | C20D | 0000 | 00B6 | 030F | 0500 |
| 003A | C205 | 0000 | 0078 | E100 | 0000 | 00B7 | CF02 | 0200 |
| 003B | E10A | 0000 | 0079 | C2B2 | 0000 | 00B8 | C0FF | 0000 |
| 003C | C580 | 0000 | 007A | C101 | 0000 | 00B9 | 2202 | 0000 |
| 003D | CFA0 | 0900 | 007B | C20E | 0000 | 00BA | 020F | 0400 |
| | | | 007C | E10A | 0000 | 00BB | 040F | 0500 |

Fig. 34b

| | | | | | | | | |
|---|---|---|---|---|---|---|---|---|
| 00DC | CF02 | 0900 | 00FB | 0000 | 0000 | 013A | 0000 | 0000 |
| 00DD | C0FF | 0000 | 00FC | 0000 | 0000 | 013B | 0000 | 0000 |
| 00BE | 2202 | 0000 | 00FD | 0000 | 0000 | 013C | 0000 | 0000 |
| 00DF | 2101 | 0000 | 00FE | 0000 | 0000 | 013D | 0000 | 0000 |
| 00C0 | A1C2 | 0000 | 00FF | 0000 | 0000 | 013E | 0000 | 0000 |
| 00C1 | E0C8 | 0000 | 0100 | C001 | 0000 | 013F | 0000 | 0000 |
| 00C2 | 050F | 0200 | 0101 | 4400 | 0000 | 0140 | 0000 | 0000 |
| 00C3 | B528 | 7000 | 0102 | A004 | 0000 | 0141 | 0000 | 0000 |
| 00C4 | 1703 | 2000 | 0103 | E105 | 0000 | 0142 | 0000 | 0000 |
| 00C5 | 1704 | 3000 | 0104 | B424 | 7001 | 0143 | 0000 | 0000 |
| 00C6 | CF00 | 0200 | 0105 | CFB0 | 0300 | 0144 | 0000 | 0000 |
| 00C7 | E0B2 | 0000 | 0106 | 010F | 0700 | 0145 | 0000 | 0000 |
| 00C8 | CF80 | 0100 | 0107 | 020F | 0800 | 0146 | 0000 | 0000 |
| 00C9 | E00B | 0080 | 0108 | B728 | 7008 | 0147 | 0000 | 0000 |
| 00CA | 1220 | 1000 | 0109 | E11A | 0000 | 0148 | 0000 | 0000 |
| 00CB | A005 | 0000 | 010A | B72C | 7000 | 0149 | 0000 | 0000 |
| 00CC | CF00 | 0100 | 010D | E10A | 0000 | 014A | 0000 | 0000 |
| 00CD | C23E | 0000 | 010C | 8316 | 0000 | 014B | 0000 | 0000 |
| 00CE | CF3F | 0400 | 010D | 8318 | 0000 | 014C | 0000 | 0000 |
| 00CF | 060F | 0200 | 010E | 020F | 0800 | 014D | 0000 | 0000 |
| 00D0 | B530 | 7000 | 010F | B72F | 7008 | 014E | 0000 | 0000 |
| 00D1 | 1380 | 0000 | 0110 | C001 | 0000 | 014F | 0000 | 0000 |
| 00D2 | 1703 | 2000 | 0111 | 2202 | 0000 | 0150 | 0000 | 0000 |
| 00D3 | 1704 | 3000 | 0112 | C0FF | 0000 | 0151 | 0000 | 0000 |
| 00D4 | CF00 | 0200 | 0113 | 2101 | 0000 | 0152 | 0000 | 0000 |
| 00D5 | 000F | 0500 | 0114 | A10A | 0000 | 0153 | 0000 | 0000 |
| 00D6 | CF01 | 0900 | 0115 | E11A | 0000 | 0154 | 0000 | 0000 |
| 00D7 | C108 | 0000 | 0116 | 170F | 4700 | 0155 | 0000 | 0000 |
| 00D8 | C002 | 0000 | 0117 | 170F | 5700 | 0156 | 0000 | 0000 |
| 00D9 | 26E6 | 0000 | 0118 | 170F | 4800 | 0157 | 0000 | 0000 |
| 00DA | 0626 | 0000 | 0119 | 170F | 5800 | 0158 | 0000 | 0000 |
| 00DB | 020F | 0400 | 011A | 871B | 0000 | 0159 | 0000 | 0000 |
| 00DC | 030F | 0500 | 011B | E01D | 0000 | 015A | 0000 | 0000 |
| 00DD | CF01 | 0900 | 011C | E025 | 0000 | 015B | 0000 | 0000 |
| 00DE | C0FF | 0000 | 011D | E02C | 0000 | 015C | 0000 | 0000 |
| 00DF | 2202 | 0000 | 011E | E034 | 0000 | 015D | 0000 | 0000 |
| 00E0 | 020F | 0400 | 011F | E038 | 0000 | 015E | 0000 | 0000 |
| 00E1 | 040F | 0500 | 0120 | E03C | 0000 | 015F | 0000 | 0000 |
| 00E2 | CF01 | 0900 | 0121 | E047 | 0000 | 0160 | 0000 | 0000 |
| 00E3 | C0FF | 0000 | 0122 | E054 | 0000 | 0161 | 0000 | 0000 |
| 00E4 | 2202 | 0000 | 0123 | E05B | 0000 | 0162 | 0000 | 0000 |
| 00E5 | 2101 | 0000 | 0124 | E062 | 0000 | 0163 | 0000 | 0000 |
| 00E6 | A1E8 | 0000 | 0125 | E06A | 0000 | 0164 | 0000 | 0000 |
| 00E7 | E0EE | 0000 | 0126 | E06E | 0000 | 0165 | 0000 | 0000 |
| 00E8 | 060F | 0200 | 0127 | E072 | 0000 | 0166 | 0000 | 0000 |
| 00E9 | B529 | 7000 | 0128 | E079 | 0000 | 0167 | 0000 | 0000 |
| 00EA | 1703 | 2000 | 0129 | E07D | 0000 | 0168 | 0000 | 0000 |
| 00EB | 1704 | 3000 | 012A | E083 | 0000 | 0169 | 0000 | 0000 |
| 00EC | CF00 | 0200 | 012B | E08D | 0000 | 016A | 0000 | 0000 |
| 00ED | E0D8 | 0000 | 012C | E092 | 0000 | 016B | 0000 | 0000 |
| 00EE | CF40 | 0100 | 012D | E099 | 0000 | 016C | 0000 | 0000 |
| 00EF | E005 | 0040 | 012E | E09E | 0000 | 016D | 0000 | 0000 |
| 00F0 | E100 | 0000 | 012F | 0000 | 0000 | 016E | 0000 | 0000 |
| 00F1 | 0000 | 0000 | 0130 | 0000 | 0000 | 016F | 0000 | 0000 |
| 00F2 | 0000 | 0000 | 0131 | 0000 | 0000 | 0170 | 0000 | 0000 |
| 00F3 | 0000 | 0000 | 0132 | 0000 | 0000 | 0171 | 0000 | 0000 |
| 00F4 | 0000 | 0000 | 0133 | 0000 | 0000 | 0172 | 0000 | 0000 |
| 00F5 | 0000 | 0000 | 0134 | 0000 | 0000 | 0173 | 0000 | 0000 |
| 00F6 | 0000 | 0000 | 0135 | 0000 | 0000 | 0174 | 0000 | 0000 |
| 00F7 | 0000 | 0000 | 0136 | 0000 | 0000 | 0175 | 0000 | 0000 |
| 00F8 | 0000 | 0000 | 0137 | 0000 | 0000 | 0176 | 0000 | 0000 |
| 00F9 | 0000 | 0000 | 0138 | 0000 | 0000 | 0177 | 0000 | 0000 |
| 00FA | 0000 | 0000 | 0139 | 0000 | 0000 | 0178 | 0000 | 0000 |

Fig. 34c

| | | | | | | | | |
|---|---|---|---|---|---|---|---|---|
| 0179 | 0000 | 0000 | 01B8 | 0000 | 0000 | 01F7 | 0000 | 0000 |
| 017A | 0000 | 0000 | 01B9 | 0000 | 0000 | 01F8 | 0000 | 0000 |
| 017B | 0000 | 0000 | 01BA | 0000 | 0000 | 01F9 | 0000 | 0000 |
| 017C | 0000 | 0000 | 01BB | 0000 | 0000 | 01FA | 0000 | 0000 |
| 017D | 0000 | 0000 | 01BC | 0000 | 0000 | 01FB | 0000 | 0000 |
| 017E | 0000 | 0000 | 01BD | 0000 | 0000 | 01FC | 0000 | 0000 |
| 017F | 0000 | 0000 | 01BE | 0000 | 0000 | 01FD | 0000 | 0000 |
| 0180 | 0000 | 0000 | 01BF | 0000 | 0000 | 01FE | 0000 | 0000 |
| 0181 | 0000 | 0000 | 01C0 | 0000 | 0000 | 01FF | 0000 | 0000 |
| 0182 | 0000 | 0000 | 01C1 | 0000 | 0000 | | | |
| 0183 | 0000 | 0000 | 01C2 | 0000 | 0000 | | | |
| 0184 | 0000 | 0000 | 01C3 | 0000 | 0000 | | | |
| 0185 | 0000 | 0000 | 01C4 | 0000 | 0000 | | | |
| 0186 | 0000 | 0000 | 01C5 | 0000 | 0000 | | | |
| 0187 | 0000 | 0000 | 01C6 | 0000 | 0000 | | | |
| 0188 | 0000 | 0000 | 01C7 | 0000 | 0000 | | | |
| 0189 | 0000 | 0000 | 01C8 | 0000 | 0000 | | | |
| 018A | 0000 | 0000 | 01C9 | 0000 | 0000 | | | |
| 018B | 0000 | 0000 | 01CA | 0000 | 0000 | | | |
| 018C | 0000 | 0000 | 01CB | 0000 | 0000 | | | |
| 018D | 0000 | 0000 | 01CC | 0000 | 0000 | | | |
| 018E | 0000 | 0000 | 01CD | 0000 | 0000 | | | |
| 018F | 0000 | 0000 | 01CE | 0000 | 0000 | | | |
| 0190 | 0000 | 0000 | 01CF | 0000 | 0000 | | | |
| 0191 | 0000 | 0000 | 01D0 | 0000 | 0000 | | | |
| 0192 | 0000 | 0000 | 01D1 | 0000 | 0000 | | | |
| 0193 | 0000 | 0000 | 01D2 | 0000 | 0000 | | | |
| 0194 | 0000 | 0000 | 01D3 | 0000 | 0000 | | | |
| 0195 | 0000 | 0000 | 01D4 | 0000 | 0000 | | | |
| 0196 | 0000 | 0000 | 01D5 | 0000 | 0000 | | | |
| 0197 | 0000 | 0000 | 01D6 | 0000 | 0000 | | | |
| 0198 | 0000 | 0000 | 01D7 | 0000 | 0000 | | | |
| 0199 | 0000 | 0000 | 01D8 | 0000 | 0000 | | | |
| 019A | 0000 | 0000 | 01D9 | 0000 | 0000 | | | |
| 019B | 0000 | 0000 | 01DA | 0000 | 0000 | | | |
| 019C | 0000 | 0000 | 01DB | 0000 | 0000 | | | |
| 019D | 0000 | 0000 | 01DC | 0000 | 0000 | | | |
| 019E | 0000 | 0000 | 01DD | 0000 | 0000 | | | |
| 019F | 0000 | 0000 | 01DE | 0000 | 0000 | | | |
| 01A0 | 0000 | 0000 | 01DF | 0000 | 0000 | | | |
| 01A1 | 0000 | 0000 | 01E0 | 0000 | 0000 | | | |
| 01A2 | 0000 | 0000 | 01E1 | 0000 | 0000 | | | |
| 01A3 | 0000 | 0000 | 01E2 | 0000 | 0000 | | | |
| 01A4 | 0000 | 0000 | 01E3 | 0000 | 0000 | | | |
| 01A5 | 0000 | 0000 | 01E4 | 0000 | 0000 | | | |
| 01A6 | 0000 | 0000 | 01E5 | 0000 | 0000 | | | |
| 01A7 | 0000 | 0000 | 01E6 | 0000 | 0000 | | | |
| 01A8 | 0000 | 0000 | 01E7 | 0000 | 0000 | | | |
| 01A9 | 0000 | 0000 | 01E8 | 0000 | 0000 | | | |
| 01AA | 0000 | 0000 | 01E9 | 0000 | 0000 | | | |
| 01AB | 0000 | 0000 | 01EA | 0000 | 0000 | | | |
| 01AC | 0000 | 0000 | 01EB | 0000 | 0000 | | | |
| 01AD | 0000 | 0000 | 01EC | 0000 | 0000 | | | |
| 01AE | 0000 | 0000 | 01ED | 0000 | 0000 | | | |
| 01AF | 0000 | 0000 | 01EE | 0000 | 0000 | | | |
| 01B0 | 0000 | 0000 | 01EF | 0000 | 0000 | | | |
| 01B1 | 0000 | 0000 | 01F0 | 0000 | 0000 | | | |
| 01B2 | 0000 | 0000 | 01F1 | 0000 | 0000 | | | |
| 01B3 | 0000 | 0000 | 01F2 | 0000 | 0000 | | | |
| 01B4 | 0000 | 0000 | 01F3 | 0000 | 0000 | | | |
| 01B5 | 0000 | 0000 | 01F4 | 0000 | 0000 | | | |
| 01B6 | 0000 | 0000 | 01F5 | 0000 | 0000 | | | |
| 01B7 | 0000 | 0000 | 01F6 | 0000 | 0000 | | | |

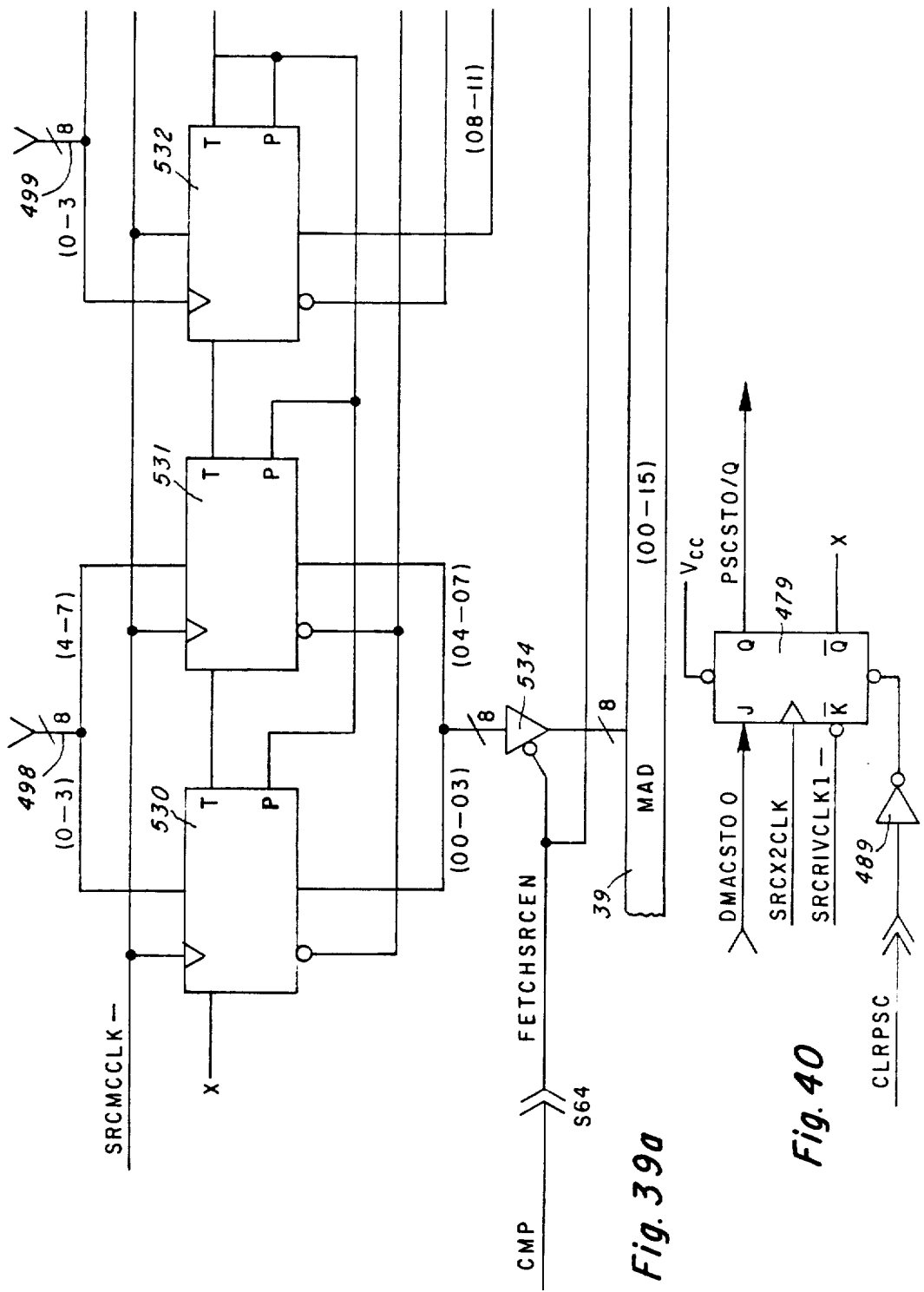

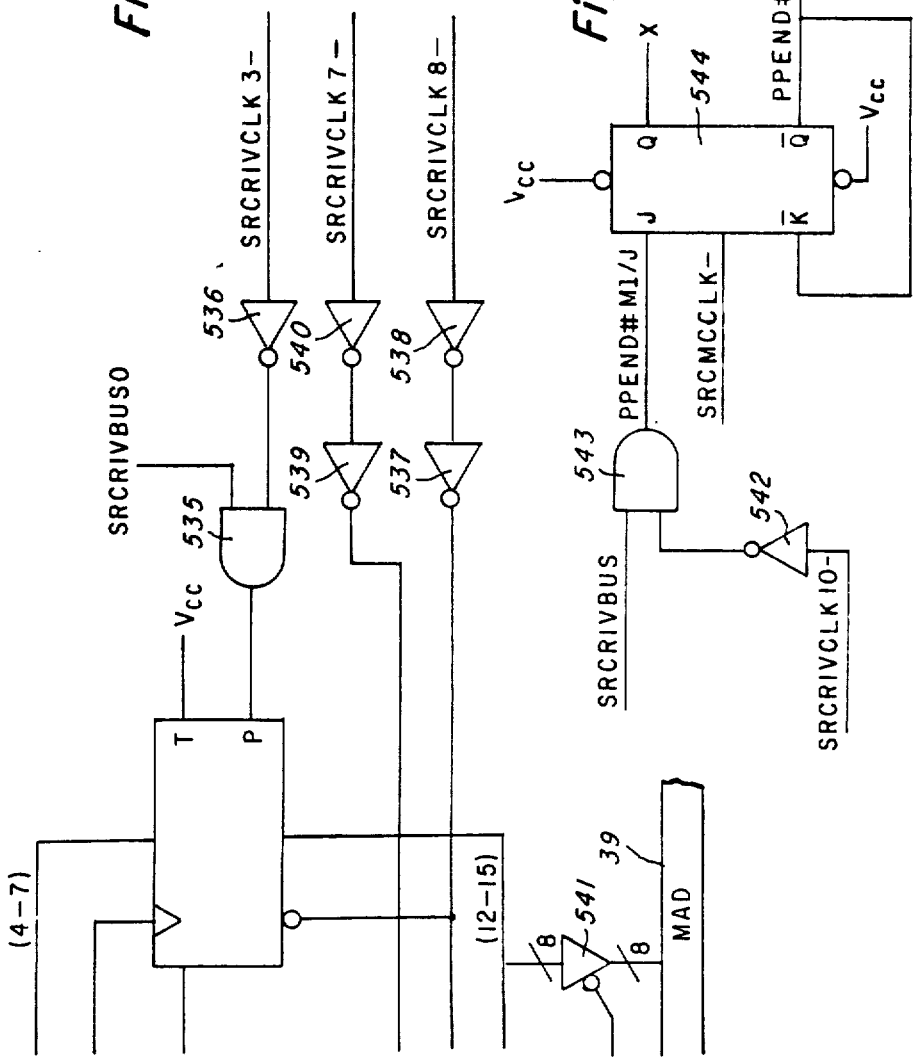

Fig. 47a

| ST ADR | WRD0 | WRD1 |  |  |  |  |  |  |
|--------|------|------|------|------|------|------|------|------|
| 0000 | CF00 | 09C0 | 003E | E13C | 0000 | 007D | E104 | 0000 |
| 0001 | CF00 | 0A00 | 003F | CF0C | 0500 | 007E | B028 | 2000 |
| 0002 | CF00 | 0A80 | 0040 | C902 | 0000 | 007F | B23E | 0000 |
| 0003 | CF00 | 0D00 | 0041 | E186 | 0000 | 0080 | 1781 | 0000 |
| 0004 | CF08 | 0280 | 0042 | C903 | 0000 | 0081 | C004 | 0000 |
| 0005 | B029 | 2000 | 0043 | E18E | 0000 | 0082 | 0101 | 0000 |
| 0006 | B22A | 9000 | 0044 | 1781 | 0000 | 0083 | 210F | 0980 |
| 0007 | B12D | 2000 | 0045 | C004 | 0000 | 0084 | 010F | 0980 |
| 0008 | E005 | 0000 | 0046 | 0181 | 0000 | 0085 | B027 | E000 |
| 0009 | E13C | 0000 | 0047 | 210F | 0980 | 0086 | C009 | 0000 |
| 000A | E13F | 0000 | 0048 | 010F | 09C0 | 0087 | C90C | 0000 |
| 000B | CF3F | 0300 | 0049 | C904 | 0000 | 0088 | E1C7 | 0000 |
| 000C | 966D | 1000 | 004A | E1D4 | 0000 | 0089 | CF00 | 0A00 |
| 000D | E015 | 0000 | 004B | C905 | 0000 | 008A | C90D | 0000 |
| 000E | E016 | 0000 | 004C | E19D | 0000 | 008B | E13C | 0000 |
| 000F | E141 | 0000 | 004D | CF80 | 0500 | 008C | E04B | 0040 |
| 0010 | E141 | 0000 | 004E | B730 | D000 | 008D | E13C | 0000 |
| 0011 | E141 | 0000 | 004F | E110 | 0000 | 008E | E141 | 0000 |
| 0012 | E141 | 0000 | 0050 | E068 | 0000 | 008F | B42E | 1000 |
| 0013 | E141 | 0000 | 0051 | E141 | 0000 | 0090 | C90E | 0000 |
| 0014 | E141 | 0000 | 0052 | CF10 | 0980 | 0091 | E163 | 0000 |
| 0015 | CF80 | 0B00 | 0053 | CF02 | 0500 | 0092 | B02D | 2000 |
| 0016 | C900 | 0000 | 0054 | C906 | 0000 | 0093 | B232 | 0000 |
| 0017 | E143 | 0000 | 0055 | E163 | 0000 | 0094 | 1781 | 0000 |
| 0018 | CF3D | 0300 | 0056 | C907 | 0000 | 0095 | C004 | 0000 |
| 0019 | 1221 | 1000 | 0057 | E18E | 0000 | 0096 | 0101 | 0000 |
| 001A | A121 | 0000 | 0058 | 1781 | 0000 | 0097 | 210F | 0980 |
| 001B | CF3E | 0300 | 0059 | C004 | 0000 | 0098 | 010F | 0980 |
| 001C | B63F | 1000 | 005A | 0181 | 0000 | 0099 | B02D | E000 |
| 001D | C408 | 0000 | 005B | 210F | 0980 | 009A | C09D | 0000 |
| 001E | E022 | 0000 | 005C | 010F | 09C0 | 009B | C90F | 0000 |
| 001F | C400 | 0000 | 005D | C908 | 0000 | 009C | E1C7 | 0000 |
| 0020 | E022 | 0000 | 005E | E1D4 | 0000 | 009D | C910 | 0000 |
| 0021 | C410 | 0000 | 005F | C909 | 0000 | 009E | E18C | 0000 |
| 0022 | CF3D | 0300 | 0060 | E19B | 0000 | 009F | CF00 | 0A00 |
| 0023 | 1561 | 1000 | 0061 | C90A | 0000 | 00A0 | E05F | 0000 |
| 0024 | C0FF | 0000 | 0062 | E15A | 0000 | 00A1 | C911 | 0000 |
| 0025 | 2101 | 0000 | 0063 | CF80 | 0500 | 00A2 | E18C | 0000 |
| 0026 | C007 | 0000 | 0064 | 1721 | D000 | 00A3 | C004 | 0040 |
| 0027 | 4101 | 0000 | 0065 | A150 | 0000 | 00A4 | 3521 | 0000 |
| 0028 | 0160 | 0000 | 0066 | E110 | 0000 | 00A5 | 010F | 0500 |
| 0029 | 240F | 0480 | 0067 | E13C | 0000 | 00A6 | C912 | 0000 |
| 002A | 0000 | 0000 | 0068 | B12E | 2000 | 00A7 | E1D4 | 0000 |
| 002B | 0000 | 0000 | 0069 | B02C | 2000 | 00A8 | B038 | 2000 |
| 002C | B12E | 8000 | 006A | B32D | 9000 | 00A9 | B032 | 9000 |
| 002D | E13A | 0000 | 006B | E068 | 0000 | 00AA | B028 | 8000 |
| 002E | CF3E | 0300 | 006C | E13C | 0000 | 00AB | CF80 | 0500 |
| 002F | 1421 | 1000 | 006D | E13F | 0000 | 00AC | B43A | 0000 |
| 0030 | 0141 | 0000 | 006E | CF3E | 0300 | 00AD | CF80 | 0A00 |
| 0031 | 010F | 0980 | 006F | 9370 | 1000 | 00AE | 1421 | 8000 |
| 0032 | CF13 | 0500 | 0070 | E079 | 0000 | 00AF | 0180 | 0000 |
| 0033 | C901 | 0000 | 0071 | E03F | 0000 | 00B0 | 1221 | 8000 |
| 0034 | E1D4 | 0000 | 0072 | E141 | 0000 | 00B1 | 21C0 | 0000 |
| 0035 | B035 | 8000 | 0073 | E141 | 0000 | 00B2 | 1521 | 8000 |
| 0036 | 9357 | 1000 | 0074 | E141 | 0000 | 00B3 | 2140 | 0000 |
| 0037 | E03B | 0000 | 0075 | E141 | 0000 | 00B4 | 1621 | 0000 |
| 0038 | E052 | 0000 | 0076 | E141 | 0000 | 00B5 | 2121 | 8000 |
| 0039 | E0A1 | 0000 | 0077 | E141 | 0000 | 00B6 | 010F | 0A00 |
| 003A | E0DB | 0000 | 0078 | E13C | 0000 | 00B7 | E110 | 0000 |
| 003B | B53F | 0000 | 0079 | 1520 | 0000 | 00B8 | E13C | 0000 |
| 003C | CF02 | 0500 | 007A | 7421 | 1000 | 00B9 | E13F | 0000 |
| 003D | E040 | 0000 | 007B | A177 | 0000 | 00BA | 1621 | 8000 |
|  |  |  | 007C | C90B | 0000 | 00BB | A1D5 | 0000 |

Fig. 47b

| | | | | | | | | |
|---|---|---|---|---|---|---|---|---|
| 00BC | 1521 | 8000 | 00FB | B034 | E000 | 013A | CF40 | 0A00 |
| 00BD | A1D7 | 0000 | 00FC | E101 | 0000 | 013B | E122 | 0000 |
| 00BE | 1421 | 8000 | 00FD | CF00 | 0A80 | 013C | B030 | 2010 |
| 00BF | A1D9 | 0000 | 00FE | CF01 | 0A80 | 013D | B02B | 2000 |
| 00C0 | B022 | E000 | 00FF | C915 | 0000 | 013E | E000 | 0000 |
| 00C1 | E0C6 | 0000 | 0100 | E1C7 | 0000 | 013F | CF10 | 0300 |
| 00C2 | CF00 | 0A00 | 0101 | B125 | 2000 | 0140 | E1DD | 0000 |
| 00C3 | CF01 | 0A80 | 0102 | B02F | 2000 | 0141 | CF20 | 0A00 |
| 00C4 | C913 | 0000 | 0103 | B32E | 9000 | 0142 | E110 | 0000 |
| 00C5 | E1C7 | 0000 | 0104 | E101 | 0000 | 0143 | CF3F | 0200 |
| 00C6 | B12C | 2000 | 0105 | CF3E | 0300 | 0144 | D72D | 1000 |
| 00C7 | B02A | 2000 | 0106 | C003 | 0000 | 0145 | B034 | 2000 |
| 00C8 | B32B | 9000 | 0107 | 7361 | 1000 | 0146 | CF05 | 0200 |
| 00C9 | E0C6 | 0000 | 0108 | A10D | 0000 | 0147 | B025 | 2000 |
| 00CA | E13C | 0000 | 0109 | 1520 | 0000 | 0148 | E150 | 0000 |
| 00CB | E13F | 0000 | 010A | 7421 | 1000 | 0149 | B222 | 2000 |
| 00CC | CF3E | 0300 | 010B | A10D | 0000 | 014A | E14F | 0000 |
| 00CD | C002 | 0000 | 010C | E0DB | 0000 | 014B | B22D | 2000 |
| 00CE | 7361 | 1000 | 010D | E141 | 0000 | 014C | E146 | 0000 |
| 00CF | A1D4 | 0000 | 010E | E13F | 0000 | 014D | B234 | 2000 |
| 00D0 | 1520 | 0000 | 010F | E13C | 0000 | 014E | CF06 | 0200 |
| 00D1 | 7421 | 1000 | 0110 | C917 | 0000 | 014F | B234 | 2000 |
| 00D2 | A1D4 | 0000 | 0111 | E1C7 | 0000 | 0150 | B032 | 0000 |
| 00D3 | E0A1 | 0000 | 0112 | C0FF | 0000 | 0151 | E1DD | 0000 |
| 00D4 | E141 | 0000 | 0113 | 7701 | 4000 | 0152 | CF02 | 0A00 |
| 00D5 | CF80 | 0A80 | 0114 | 7702 | 5000 | 0153 | E122 | 0000 |
| 00D6 | E110 | 0000 | 0115 | C001 | 0000 | 0154 | D422 | 2000 |
| 00D7 | CF40 | 0A80 | 0116 | 2202 | 0000 | 0155 | E150 | 0000 |
| 00D8 | E110 | 0000 | 0117 | 0800 | 0000 | 0156 | D42D | 2000 |
| 00D9 | CF10 | 0A80 | 0118 | 210F | 0080 | 0157 | E150 | 0000 |
| 00DA | E110 | 0000 | 0119 | 020F | 0080 | 0158 | CF04 | 0A00 |
| 00DB | C914 | 0000 | 011A | CF00 | 0080 | 0159 | E122 | 0000 |
| 00DC | E18E | 0000 | 011B | 170F | 3080 | 015A | 1221 | 0000 |
| 00DD | 1521 | 0040 | 011C | CF08 | 0280 | 015B | A15F | 0000 |
| 00DE | A1E1 | 0000 | 011D | CF00 | 0500 | 015C | 1221 | D000 |
| 00DF | CF03 | 0500 | 011E | 170F | B080 | 015D | A15F | 0000 |
| 00E0 | E0E2 | 0000 | 011F | CF40 | 0500 | 015E | E1DD | 0000 |
| 00E1 | CF06 | 0500 | 0120 | 0000 | 0000 | 015F | B73E | C000 |
| 00E2 | C915 | 0000 | 0121 | 170F | B080 | 0160 | C001 | 0000 |
| 00E3 | E1D4 | 0000 | 0122 | CF20 | 0500 | 0161 | 270F | CA00 |
| 00E4 | B037 | 2000 | 0123 | 0000 | 0000 | 0162 | E1DD | 0000 |
| 00E5 | B338 | 9000 | 0124 | 170F | B080 | 0163 | CF36 | 0200 |
| 00E6 | 1021 | 8000 | 0125 | CF60 | 0500 | 0164 | 1701 | 1000 |
| 00E7 | A1E4 | 0000 | 0126 | 0000 | 0000 | 0165 | CF35 | 0200 |
| 00E8 | CF80 | 0500 | 0127 | 170F | B080 | 0166 | A169 | 0000 |
| 00E9 | 1421 | 0000 | 0128 | EC00 | 0000 | 0167 | B5C9 | 1000 |
| 00EA | A1F9 | 0000 | 0129 | CC04 | 0000 | 0168 | E141 | 0000 |
| 00EB | CF8C | 0A00 | 012A | 1421 | 0000 | 0169 | B72B | 1000 |
| 00EC | 1521 | 8000 | 012B | 21A0 | 0000 | 016A | C0FD | 0000 |
| 00ED | 2140 | 0000 | 012C | 302F | E080 | 016B | 3702 | 1000 |
| 00EE | 1221 | 8000 | 012D | 170F | C080 | 016C | C0FF | 0000 |
| 00EF | 21CC | 0000 | 012E | 170F | D080 | 016D | A84F | 0000 |
| 00F0 | 1621 | 8000 | 012F | 050F | 0080 | 016E | 2101 | 0000 |
| 00F1 | 2121 | 0000 | 0130 | 060F | 0080 | 016F | 410F | 0700 |
| 00F2 | 010F | 0A80 | 0131 | CF00 | 0080 | 0170 | 620F | 0800 |
| 00F3 | E110 | 0000 | 0132 | CF00 | 0080 | 0171 | CFFF | 0200 |
| 00F4 | E0D5 | 0000 | 0133 | CF00 | 0080 | 0172 | CFB0 | 0200 |
| 00F5 | E0D7 | 0000 | 0134 | CF00 | 0080 | 0173 | C020 | 0000 |
| 00F6 | C0FD | 0000 | 0135 | CF00 | 0080 | 0174 | CF3C | 0300 |
| 00F7 | E13C | 0000 | 0136 | CF00 | 0080 | 0175 | 1021 | 1000 |
| 00F8 | E13F | 0000 | 0137 | CF00 | 0080 | 0176 | 21E0 | 0000 |
| 00F9 | B634 | 8000 | 0138 | CF00 | 0080 | 0177 | CF3D | 0200 |
| 00FA | B535 | 8000 | 0139 | E000 | 0000 | 0178 | 1021 | 1000 |

| ST ADR | WRD0 | WRD1 |   | 003E | 0000 | 0000 |   | 007D | 0000 | 0000 |
|--------|------|------|---|------|------|------|---|------|------|------|
| 0000   |      | 0100 |   | 003F | 0000 | 0000 |   | 007E | 0000 | 0000 |
| 0001   | CF00 | 0200 |   | 0040 | 0000 | 0000 |   | 007F | 0000 | 0000 |
| 0002   | 0000 | 0000 |   | 0041 | 2241 | 2000 |   | 0080 | 0000 | 0000 |
| 0003   | 0000 | 0000 |   | 0042 | E000 | 0000 |   | 0081 | 2241 | 2000 |
| 0004   | 0000 | 0000 |   | 0043 | E045 | 0000 |   | 0082 | E02F | 0000 |
| 0005   | D025 | 2000 |   | 0044 | E045 | 0000 |   | 0083 | E005 | 0020 |
| 0006   | CF01 | 0100 |   | 0045 | D707 | 4000 |   | 0084 | E005 | 0020 |
| 0007   | 1626 | 0000 |   | 0046 | E040 | 0000 |   | 0085 | D527 | 2010 |
| 0008   | 0000 | 0000 |   | 0047 | E024 | 0040 |   | 0086 | E047 | 0002 |
| 0009   | 0000 | 0000 |   | 0048 | 0000 | 0000 |   | 0087 | 0000 | 0002 |
| 000A   | 1260 | 0000 |   | 0049 | 1320 | 0002 |   | 0088 | D02D | 2000 |
| 000B   | 0026 | 0000 |   | 004A | A000 | 0000 |   | 0089 | D02D | 2000 |
| 000C   | 0000 | 0000 |   | 004B | CF04 | 0100 |   | 008A | E047 | 0000 |
| 000D   | CF00 | 0200 |   | 004C | 0000 | 0000 |   | 008B | 0000 | 0000 |
| 000E   | 0000 | 0000 |   | 004D | 0000 | 0000 |   | 008C | D72E | 2000 |
| 000F   | CF00 | 0210 |   | 004E | 234E | 2000 |   | 008D | E047 | 0000 |
| 0010   | A615 | 0000 |   | 004F | E052 | 0000 |   | 008E | E000 | 0100 |
| 0011   | 2051 | 2000 |   | 0050 | E052 | 0000 |   | 008F | 0000 | 0000 |
| 0012   | E000 | 0000 |   | 0051 | E052 | 0000 |   | 0090 | CF04 | 0000 |
| 0013   | E011 | 0080 |   | 0052 | D524 | 2000 |   | 0091 | E0ED | 0000 |
| 0014   | E011 | 0080 |   | 0053 | E04D | 0002 |   | 0092 | E000 | 0000 |
| 0015   | 0000 | 0000 |   | 0054 | 0000 | 0001 |   | 0093 | 0000 | 0000 |
| 0016   | CF00 | 0100 |   | 0055 | 0000 | 0000 |   | 0094 | 0000 | 0000 |
| 0017   | B020 | 2000 |   | 0056 | 1320 | 2000 |   | 0095 | 0000 | 0000 |
| 0018   | B037 | 2000 |   | 0057 | A060 | 0000 |   | 0096 | 0000 | 0000 |
| 0019   | E007 | 0000 |   | 0058 | E04D | 0000 |   | 0097 | 0000 | 0000 |
| 001A   | 0000 | 0000 |   | 0059 | 0000 | 0000 |   | 0098 | 0000 | 0000 |
| 001B   | 0000 | 0000 |   | 005A | D52C | 0000 |   | 0099 | 0000 | 0000 |
| 001C   | 0000 | 0000 |   | 005B | E000 | 0000 |   | 009A | 0000 | 0000 |
| 001D   | 1320 | 0000 |   | 005C | C202 | 0000 |   | 009B | 0000 | 0000 |
| 001E   | A040 | 0000 |   | 005D | E0F2 | 0000 |   | 009C | 0000 | 0000 |
| 001F   | 0000 | 0000 |   | 005E | E000 | 0000 |   | 009D | 0000 | 0000 |
| 0020   | 2340 | 2000 |   | 005F | 0000 | 0000 |   | 009E | 0000 | 0000 |
| 0021   | E000 | 0000 |   | 0060 | 0000 | 0000 |   | 009F | 0000 | 0000 |
| 0022   | E024 | 0040 |   | 0061 | 1520 | 0000 |   | 00A0 | 0000 | 0000 |
| 0023   | E024 | 0040 |   | 0062 | A02D | 0000 |   | 00A1 | 2241 | 2000 |
| 0024   | D726 | 2000 |   | 0063 | 0000 | 0002 |   | 00A2 | E0A6 | 0000 |
| 0025   | E02A | 0000 |   | 0064 | 0000 | 0060 |   | 00A3 | E0A5 | 0020 |
| 0026   | C200 | 0000 |   | 0065 | 0000 | 0010 |   | 00A4 | E0A5 | 0020 |
| 0027   | E0ED | 0000 |   | 0066 | E000 | 0000 |   | 00A5 | D427 | 0010 |
| 0028   | E00C | 0000 |   | 0067 | 0000 | 0000 |   | 00A6 | D52C | 2000 |
| 0029   | 0000 | 0000 |   | 0068 | 2340 | 2000 |   | 00A7 | D52C | 2002 |
| 002A   | 0000 | 0000 |   | 0069 | E00C | 0000 |   | 00A8 | E0C0 | 0000 |
| 002B   | 234D | 2000 |   | 006A | E06C | 0040 |   | 00A9 | 0000 | 0000 |
| 002C   | E002 | 0000 |   | 006B | E06C | 0040 |   | 00AA | 0000 | 0001 |
| 002D   | E02F | 0020 |   | 006C | D52C | 2000 |   | 00AB | D331 | 2000 |
| 002E   | E02F | 0020 |   | 006D | E000 | 0002 |   | 00AC | D52C | 2000 |
| 002F   | 0000 | 0000 |   | 006E | 0000 | 0000 |   | 00AD | E000 | 0000 |
| 0030   | D728 | 2020 |   | 006F | 0000 | 0001 |   | 00AE | E0D4 | 0000 |
| 0031   | E01F | 0000 |   | 0070 | 0000 | 0000 |   | 00AF | C205 | 0000 |
| 0032   | 0000 | 0000 |   | 0071 | D333 | 2000 |   | 00B0 | E0ED | 0000 |
| 0033   | C201 | 0000 |   | 0072 | E000 | 0000 |   | 00B1 | C206 | 0000 |
| 0034   | E0ED | 0000 |   | 0073 | 0000 | 0000 |   | 00B2 | E0F2 | 0000 |
| 0035   | E00C | 0000 |   | 0074 | B726 | 2000 |   | 00B3 | D725 | 2002 |
| 0036   | E01C | 0000 |   | 0075 | E000 | 0000 |   | 00B4 | E02D | 0000 |
| 0037   | E048 | 0000 |   | 0076 | C202 | 0000 |   | 00B5 | E00C | 0000 |
| 0038   | E000 | 0000 |   | 0077 | E0ED | 0000 |   | 00B6 | C207 | 0000 |
| 0039   | E000 | 0000 |   | 0078 | E00C | 0000 |   | 00B7 | E0ED | 0000 |
| 003A   | E000 | 0000 |   | 0079 | 0000 | 0000 |   | 00B8 | C200 | 0000 |
| 003B   | E000 | 0000 |   | 007A | 0000 | 0000 |   | 00B9 | E0F2 | 0000 |
| 003C   | E000 | 0000 |   | 007B | 0000 | 0000 |   | 00BA | E000 | 0000 |
| 003D   | E000 | 0000 |   | 007C | 0000 | 0000 |   | 00BB | 0000 | 0000 |

Fig. 53b

| | | | | | | | | |
|---|---|---|---|---|---|---|---|---|
| 00BC | 0000 | 0000 | 00FB | E100 | 0000 | 013A | 0000 | 0000 |
| 00BD | 0000 | 0000 | 00FC | 0000 | 0000 | 013B | 0000 | 0000 |
| 00BE | 0000 | 0000 | 00FD | 0000 | 0000 | 013C | 0000 | 0000 |
| 00BF | 0000 | 0000 | 00FE | 0000 | 0000 | 013D | 0000 | 0000 |
| 00C0 | 0000 | 0000 | 00FF | 0000 | 0000 | 013E | 0000 | 0000 |
| 00C1 | 2241 | 2000 | 0100 | 0001 | 0000 | 013F | 0000 | 0000 |
| 00C2 | E0B8 | 0000 | 0101 | E020 | 0000 | 0140 | 0000 | 0000 |
| 00C3 | E0C5 | 0040 | 0102 | E025 | 0000 | 0141 | 0000 | 0000 |
| 00C4 | E0C5 | 0040 | 0103 | E05E | 0000 | 0142 | 0000 | 0000 |
| 00C5 | D427 | 0000 | 0104 | E079 | 0000 | 0143 | 0000 | 0000 |
| 00C6 | D522 | 2000 | 0105 | E092 | 0000 | 0144 | 0000 | 0000 |
| 00C7 | D530 | 2002 | 0106 | E0B1 | 0000 | 0145 | 0000 | 0000 |
| 00C8 | E0A0 | 0000 | 0107 | E0B3 | 0000 | 0146 | 0000 | 0000 |
| 00C9 | 0000 | 0000 | 0108 | E0D0 | 0000 | 0147 | 0000 | 0000 |
| 00CA | 0000 | 0001 | 0109 | E0BA | 0000 | 0148 | 0000 | 0000 |
| 00CB | 0000 | 0000 | 010A | E0B4 | 0000 | 0149 | 0000 | 0000 |
| 00CC | 1320 | 0000 | 010B | E0E3 | 0000 | 014A | 0000 | 0000 |
| 00CD | A0AF | 0000 | 010C | E0CC | 0000 | 014B | 0000 | 0000 |
| 00CE | D530 | 2000 | 010D | 0000 | 0000 | 014C | 0000 | 0000 |
| 00CF | E0A0 | 0000 | 010E | 0000 | 0000 | 014D | 0000 | 0000 |
| 00D0 | E0B2 | 0000 | 010F | 0000 | 0000 | 014E | 0000 | 0000 |
| 00D1 | E00C | 0000 | 0110 | 0000 | 0000 | 014F | 0000 | 0000 |
| 00D2 | E202 | 0000 | 0111 | 0000 | 0000 | 0150 | 0000 | 0000 |
| 00D3 | E0ED | 0000 | 0112 | 0000 | 0000 | 0151 | 0000 | 0000 |
| 00D4 | D701 | 2000 | 0113 | 0000 | 0000 | 0152 | 0000 | 0000 |
| 00D5 | 0000 | 0000 | 0114 | 0000 | 0000 | 0153 | 0000 | 0000 |
| 00D6 | 0000 | 0002 | 0115 | 0000 | 0000 | 0154 | 0000 | 0000 |
| 00D7 | 0000 | 0000 | 0116 | 0000 | 0000 | 0155 | 0000 | 0000 |
| 00D8 | 2250 | 2000 | 0117 | 0000 | 0000 | 0156 | 0000 | 0000 |
| 00D9 | E0B8 | 0000 | 0118 | 0000 | 0000 | 0157 | 0000 | 0000 |
| 00DA | E0E0 | 0000 | 0119 | 0000 | 0000 | 0158 | 0000 | 0000 |
| 00DB | E0E0 | 0000 | 011A | 0000 | 0000 | 0159 | 0000 | 0000 |
| 00DC | 0000 | 0000 | 011B | 0000 | 0000 | 015A | 0000 | 0000 |
| 00DD | 0000 | 0000 | 011C | 0000 | 0000 | 015B | 0000 | 0000 |
| 00DE | 0000 | 0000 | 011D | 0000 | 0000 | 015C | 0000 | 0000 |
| 00DF | 0000 | 0000 | 011E | 0000 | 0000 | 015D | 0000 | 0000 |
| 00E0 | D524 | 0000 | 011F | 0000 | 0000 | 015E | 0000 | 0000 |
| 00E1 | E20A | 0000 | 0120 | 0000 | 0000 | 015F | 0000 | 0000 |
| 00E2 | E0F2 | 0000 | 0121 | 0000 | 0000 | 0160 | 0000 | 0000 |
| 00E3 | E04D | 0000 | 0122 | 0000 | 0000 | 0161 | 0000 | 0000 |
| 00E4 | 0000 | 0000 | 0123 | 0000 | 0000 | 0162 | 0000 | 0000 |
| 00E5 | 0000 | 0001 | 0124 | 0000 | 0000 | 0163 | 0000 | 0000 |
| 00E6 | 0000 | 0000 | 0125 | 0000 | 0000 | 0164 | 0000 | 0000 |
| 00E7 | D522 | 0000 | 0126 | 0000 | 0000 | 0165 | 0000 | 0000 |
| 00E8 | E0B7 | 0000 | 0127 | 0000 | 0000 | 0166 | 0000 | 0000 |
| 00E9 | 0000 | 0000 | 0128 | 0000 | 0000 | 0167 | 0000 | 0000 |
| 00EA | E20B | 0000 | 0129 | 0000 | 0000 | 0168 | 0000 | 0000 |
| 00EB | E0F7 | 0000 | 012A | 0000 | 0000 | 0169 | 0000 | 0000 |
| 00EC | E060 | 0000 | 012B | 0000 | 0000 | 016A | 0000 | 0000 |
| 00ED | 0000 | 0000 | 012C | 0000 | 0000 | 016B | 0000 | 0000 |
| 00EE | 0000 | 0000 | 012D | 0000 | 0000 | 016C | 0000 | 0000 |
| 00EF | 0000 | 0020 | 012E | 0000 | 0000 | 016D | 0000 | 0000 |
| 00F0 | 0000 | 0010 | 012F | 0000 | 0000 | 016E | 0000 | 0000 |
| 00F1 | E100 | 0000 | 0130 | 0000 | 0000 | 016F | 0000 | 0000 |
| 00F2 | 0000 | 0000 | 0131 | 0000 | 0000 | 0170 | 0000 | 0000 |
| 00F3 | CF40 | 0200 | 0132 | 0000 | 0000 | 0171 | 0000 | 0000 |
| 00F4 | 0000 | 0000 | 0133 | 0000 | 0000 | 0172 | 0000 | 0000 |
| 00F5 | CF00 | 0210 | 0134 | 0000 | 0000 | 0173 | 0000 | 0000 |
| 00F6 | E100 | 0000 | 0135 | 0000 | 0000 | 0174 | 0000 | 0000 |
| 00F7 | 0000 | 0000 | 0136 | 0000 | 0000 | 0175 | 0000 | 0000 |
| 00F8 | CF20 | 0200 | 0137 | 0000 | 0000 | 0176 | 0000 | 0000 |
| 00F9 | 0000 | 0000 | 0138 | 0000 | 0000 | 0177 | 0000 | 0000 |
| 00FA | CF00 | 0210 | 0139 | 0000 | 0000 | 0178 | 0000 | 0000 |

Fig. 53c

| | | | | | | | | |
|---|---|---|---|---|---|---|---|---|
| 0179 | 0000 | 0000 | 01D9 | 0000 | 0000 | 01F7 | 0000 | 0000 |
| 017A | 0000 | 0000 | 01D9 | 0000 | 0000 | 01F8 | 0000 | 0000 |
| 017B | 0000 | 0000 | 01DA | 0000 | 0000 | 01F9 | 0000 | 0000 |
| 017C | 0000 | 0000 | 01DB | 0000 | 0000 | 01FA | 0000 | 0000 |
| 017D | 0000 | 0000 | 01DC | 0000 | 0000 | 01FB | 0000 | 0000 |
| 017E | 0000 | 0000 | 01DD | 0000 | 0000 | 01FC | 0000 | 0000 |
| 017F | 0000 | 0000 | 01DE | 0000 | 0000 | 01FD | 0000 | 0000 |
| 0180 | 0000 | 0000 | 01DF | 0000 | 0000 | 01FE | 0000 | 0000 |
| 0181 | 0000 | 0000 | 01E0 | 0000 | 0000 | 01FF | 0000 | 0000 |
| 0182 | 0000 | 0000 | 01E1 | 0000 | 0000 | | | |
| 0183 | 0000 | 0000 | 01E2 | 0000 | 0000 | | | |
| 0184 | 0000 | 0000 | 01E3 | 0000 | 0000 | | | |
| 0185 | 0000 | 0000 | 01E4 | 0000 | 0000 | | | |
| 0186 | 0000 | 0000 | 01E5 | 0000 | 0000 | | | |
| 0187 | 0000 | 0000 | 01E6 | 0000 | 0000 | | | |
| 0188 | 0000 | 0000 | 01E7 | 0000 | 0000 | | | |
| 0189 | 0000 | 0000 | 01E8 | 0000 | 0000 | | | |
| 018A | 0000 | 0000 | 01E9 | 0000 | 0000 | | | |
| 018B | 0000 | 0000 | 01EA | 0000 | 0000 | | | |
| 018C | 0000 | 0000 | 01EB | 0000 | 0000 | | | |
| 018D | 0000 | 0000 | 01EC | 0000 | 0000 | | | |
| 018E | 0000 | 0000 | 01ED | 0000 | 0000 | | | |
| 018F | 0000 | 0000 | 01EE | 0000 | 0000 | | | |
| 0190 | 0000 | 0000 | 01EF | 0000 | 0000 | | | |
| 0191 | 0000 | 0000 | 01D0 | 0000 | 0000 | | | |
| 0192 | 0000 | 0000 | 01D1 | 0000 | 0000 | | | |
| 0193 | 0000 | 0000 | 01D2 | 0000 | 0000 | | | |
| 0194 | 0000 | 0000 | 01D3 | 0000 | 0000 | | | |
| 0195 | 0000 | 0000 | 01D4 | 0000 | 0000 | | | |
| 0196 | 0000 | 0000 | 01D5 | 0000 | 0000 | | | |
| 0197 | 0000 | 0000 | 01D6 | 0000 | 0000 | | | |
| 0198 | 0000 | 0000 | 01D7 | 0000 | 0000 | | | |
| 0199 | 0000 | 0000 | 01D8 | 0000 | 0000 | | | |
| 019A | 0000 | 0000 | 01D9 | 0000 | 0000 | | | |
| 019B | 0000 | 0000 | 01DA | 0000 | 0000 | | | |
| 019C | 0000 | 0000 | 01DB | 0000 | 0000 | | | |
| 019D | 0000 | 0000 | 01DC | 0000 | 0000 | | | |
| 019E | 0000 | 0000 | 01DD | 0000 | 0000 | | | |
| 019F | 0000 | 0000 | 01DE | 0000 | 0000 | | | |
| 01A0 | 0000 | 0000 | 01DF | 0000 | 0000 | | | |
| 01A1 | 0000 | 0000 | 01E0 | 0000 | 0000 | | | |
| 01A2 | 0000 | 0000 | 01E1 | 0000 | 0000 | | | |
| 01A3 | 0000 | 0000 | 01E2 | 0000 | 0000 | | | |
| 01A4 | 0000 | 0000 | 01E3 | 0000 | 0000 | | | |
| 01A5 | 0000 | 0000 | 01E4 | 0000 | 0000 | | | |
| 01A6 | 0000 | 0000 | 01E5 | 0000 | 0000 | | | |
| 01A7 | 0000 | 0000 | 01E6 | 0000 | 0000 | | | |
| 01A8 | 0000 | 0000 | 01E7 | 0000 | 0000 | | | |
| 01A9 | 0000 | 0000 | 01E8 | 0000 | 0000 | | | |
| 01AA | 0000 | 0000 | 01E9 | 0000 | 0000 | | | |
| 01AB | 0000 | 0000 | 01EA | 0000 | 0000 | | | |
| 01AC | 0000 | 0000 | 01EB | 0000 | 0000 | | | |
| 01AD | 0000 | 0000 | 01EC | 0000 | 0000 | | | |
| 01AE | 0000 | 0000 | 01ED | 0000 | 0000 | | | |
| 01AF | 0000 | 0000 | 01EE | 0000 | 0000 | | | |
| 01D0 | 0000 | 0000 | 01EF | 0000 | 0000 | | | |
| 01D1 | 0000 | 0000 | 01F0 | 0000 | 0000 | | | |
| 01D2 | 0000 | 0000 | 01F1 | 0000 | 0000 | | | |
| 01D3 | 0000 | 0000 | 01F2 | 0000 | 0000 | | | |
| 01D4 | 0000 | 0000 | 01F3 | 0000 | 0000 | | | |
| 01D5 | 0000 | 0000 | 01F4 | 0000 | 0000 | | | |
| 01D6 | 0000 | 0000 | 01F5 | 0000 | 0000 | | | |
| 01D7 | 0000 | 0000 | 01F6 | 0000 | 0000 | | | |

Fig. 53d

| CT ADR | LAST BYTE* | | | | | | | |
|---|---|---|---|---|---|---|---|---|
| 0000 | 00 | 003E | 00 | 007D | 00 | 00DC | 00 | 00FB | 00 |
| 0001 | 00 | 003F | 00 | 007E | 00 | 00DD | 00 | 00FC | 00 |
| 0002 | 00 | 0040 | 00 | 007F | 00 | 00DE | 00 | 00FD | 00 |
| 0003 | 00 | 0041 | 00 | 0080 | 00 | 00DF | 00 | 00FE | 00 |
| 0004 | 00 | 0042 | 00 | 0081 | 00 | 00E0 | 00 | 00FF | 00 |
| 0005 | 00 | 0043 | 00 | 0082 | 00 | 00C1 | 00 | | |
| 0006 | 00 | 0044 | 00 | 0083 | 00 | 00C2 | 00 | STATES 100₁₆ TO 1FF₁₆ |
| 0007 | 00 | 0045 | 00 | 0084 | 00 | 00C3 | 10 | CONTAIN ZERO'S |
| 0008 | 00 | 0046 | 00 | 0085 | 00 | 00C4 | 10 | *MICROCODE IS |
| 0009 | 00 | 0047 | 00 | 0086 | 00 | 00C5 | 00 | 40 BITS/STATE |
| 000A | 00 | 0048 | 00 | 0087 | 00 | 00C6 | 00 | | |
| 000B | 00 | 0049 | 00 | 0088 | 00 | 00C7 | 00 | | |
| 000C | 00 | 004A | 00 | 0089 | 00 | 00C8 | 00 | | |
| 000D | 00 | 004B | 00 | 008A | 00 | 00C9 | 00 | | |
| 000E | 00 | 004C | 00 | 008B | 00 | 00CA | 00 | | |
| 000F | 00 | 004D | 00 | 008C | 00 | 00CB | 00 | | |
| 0010 | 00 | 004E | 00 | 008D | 00 | 00CC | 00 | | |
| 0011 | 00 | 004F | 00 | 008E | 00 | 00CD | 00 | | |
| 0012 | 00 | 0050 | 00 | 008F | 00 | 00CE | 00 | | |
| 0013 | 00 | 0051 | 00 | 0090 | 00 | 00CF | 00 | | |
| 0014 | 00 | 0052 | 00 | 0091 | 00 | 00D0 | 00 | | |
| 0015 | 00 | 0053 | 00 | 0092 | 00 | 00D1 | 00 | | |
| 0016 | 00 | 0054 | 00 | 0093 | 00 | 00D2 | 00 | | |
| 0017 | 00 | 0055 | 00 | 0094 | 00 | 00D3 | 00 | | |
| 0018 | 00 | 0056 | 00 | 0095 | 00 | 00D4 | 00 | | |
| 0019 | 00 | 0057 | 00 | 0096 | 00 | 00D5 | 00 | | |
| 001A | 00 | 0058 | 00 | 0097 | 00 | 00D6 | 00 | | |
| 001B | 00 | 0059 | 00 | 0098 | 00 | 00D7 | 00 | | |
| 001C | 00 | 005A | 00 | 0099 | 00 | 00D8 | 00 | | |
| 001D | 00 | 005B | 00 | 009A | 00 | 00D9 | 00 | | |
| 001E | 00 | 005C | 00 | 009B | 00 | 00DA | 00 | | |
| 001F | 00 | 005D | 00 | 009C | 00 | 00DB | 00 | | |
| 0020 | 00 | 005E | 00 | 009D | 00 | 00DC | 00 | | |
| 0021 | 00 | 005F | 00 | 009E | 20 | 00DD | 00 | | |
| 0022 | 00 | 0060 | 00 | 009F | 20 | 00DE | 00 | | |
| 0023 | 00 | 0061 | 00 | 00A0 | 00 | 00DF | 00 | | |
| 0024 | 00 | 0062 | 00 | 00A1 | 00 | 00E0 | 00 | | |
| 0025 | 00 | 0063 | 00 | 00A2 | 00 | 00E1 | 00 | | |
| 0026 | 00 | 0064 | 00 | 00A3 | 10 | 00E2 | 00 | | |
| 0027 | 00 | 0065 | 00 | 00A4 | 10 | 00E3 | 00 | | |
| 0028 | 00 | 0066 | 00 | 00A5 | 00 | 00E4 | 00 | | |
| 0029 | 00 | 0067 | 00 | 00A6 | 00 | 00E5 | 00 | | |
| 002A | 00 | 0068 | 00 | 00A7 | 00 | 00E6 | 00 | | |
| 002B | 00 | 0069 | 00 | 00A8 | 00 | 00E7 | 00 | | |
| 002C | 00 | 006A | 00 | 00A9 | 00 | 00E8 | 00 | | |
| 002D | 00 | 006B | 00 | 00AA | 00 | 00E9 | 00 | | |
| 002E | 00 | 006C | 00 | 00AB | 00 | 00EA | 00 | | |
| 002F | 00 | 006D | 00 | 00AC | 00 | 00EB | 00 | | |
| 0030 | 00 | 006E | 00 | 00AD | 00 | 00EC | 00 | | |
| 0031 | 00 | 006F | 00 | 00AE | 00 | 00ED | 00 | | |
| 0032 | 00 | 0070 | 00 | 00AF | 00 | 00EE | 00 | | |
| 0033 | 00 | 0071 | 00 | 00B0 | 00 | 00EF | 00 | | |
| 0034 | 00 | 0072 | 00 | 00D1 | 00 | 00F0 | 00 | | |
| 0035 | 00 | 0073 | 00 | 00D2 | 00 | 00F1 | 00 | | |
| 0036 | 00 | 0074 | 00 | 00D3 | 00 | 00F2 | 00 | | |
| 0037 | 00 | 0075 | 00 | 00D4 | 00 | 00F3 | 00 | | |
| 0038 | 00 | 0076 | 00 | 00D5 | 00 | 00F4 | 00 | | |
| 0039 | 00 | 0077 | 00 | 00D6 | 00 | 00F5 | 00 | | |
| 003A | 00 | 0078 | 00 | 00D7 | 00 | 00F6 | 00 | | |
| 003B | 00 | 0079 | 00 | 00D8 | 00 | 00F7 | 00 | | |
| 003C | 00 | 007A | 00 | 00D9 | 00 | 00F8 | 00 | | |
| 003D | 00 | 007B | 00 | 00DA | 00 | 00F9 | 00 | | |
| | | 007C | 00 | 00DB | 00 | 00FA | 00 | | |

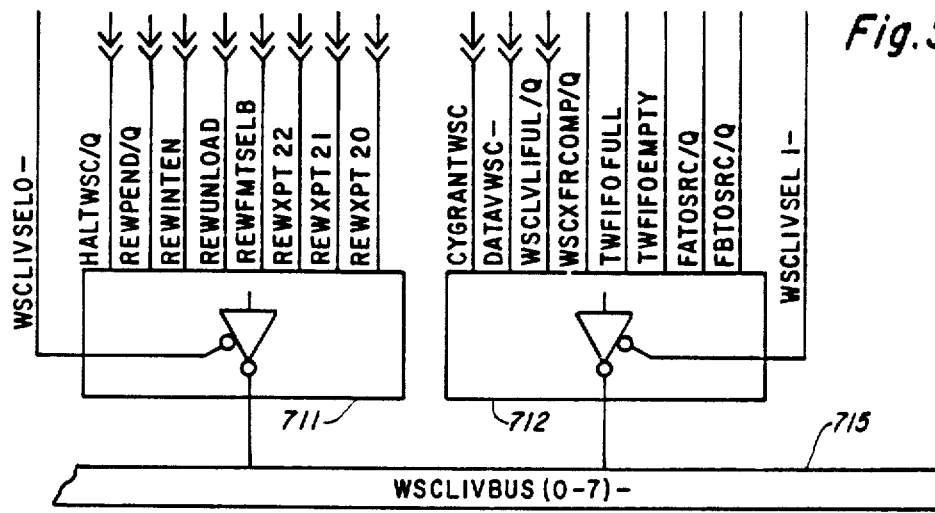
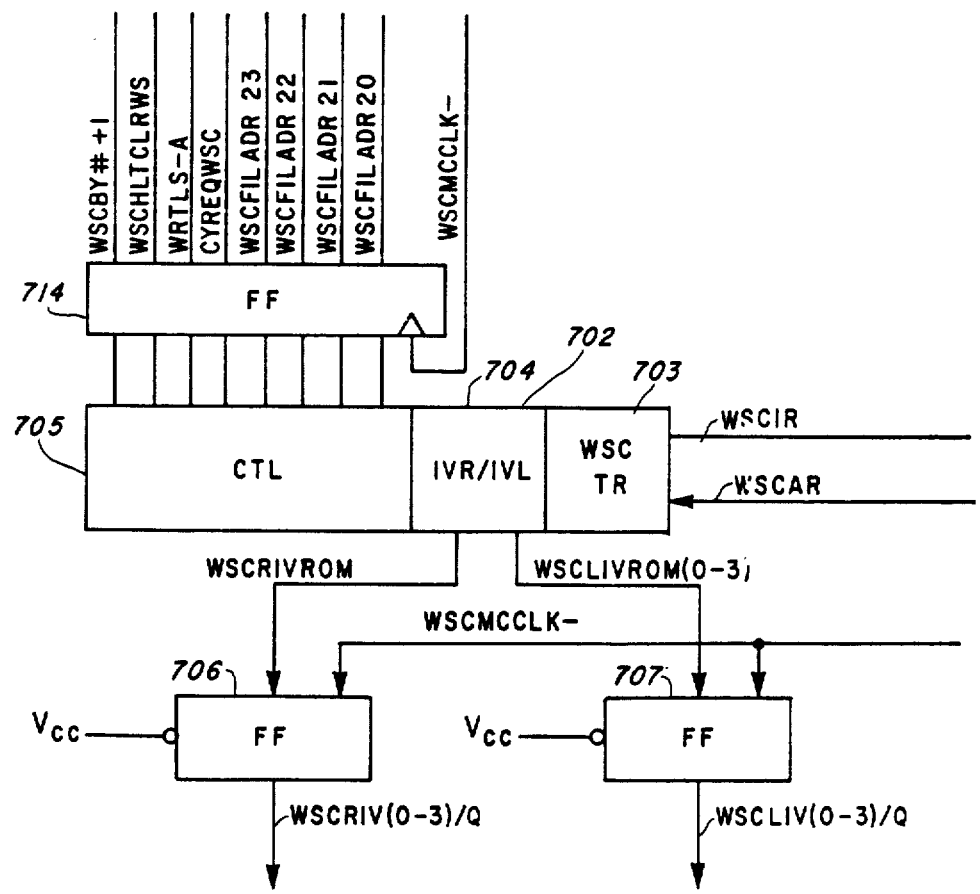
Fig. 54a

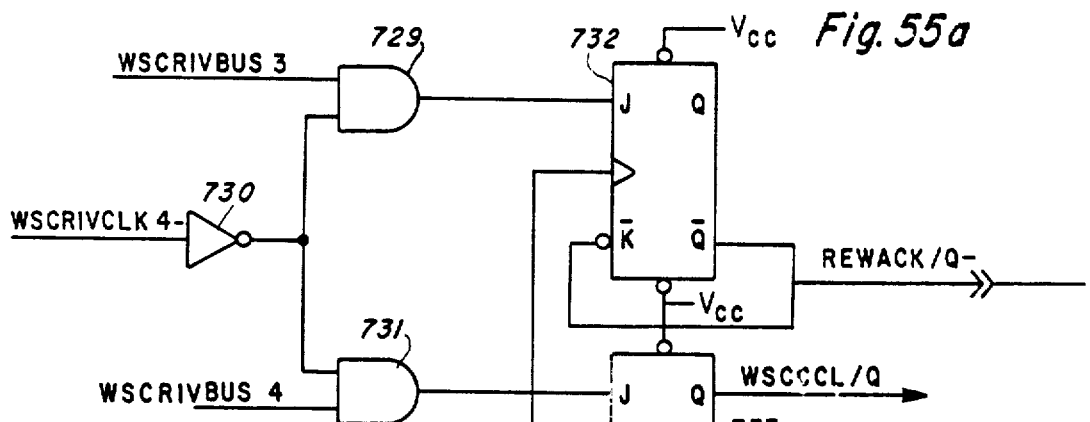
Fig. 55a
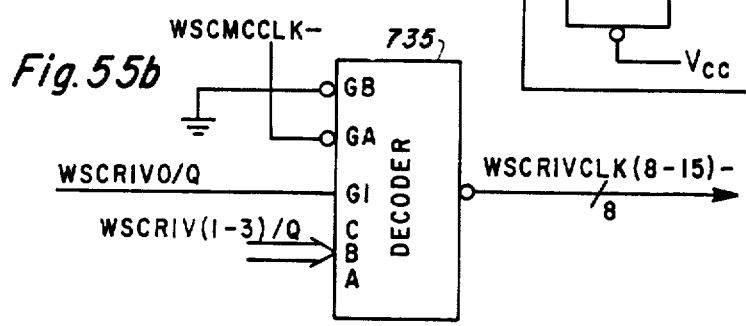
Fig. 55b
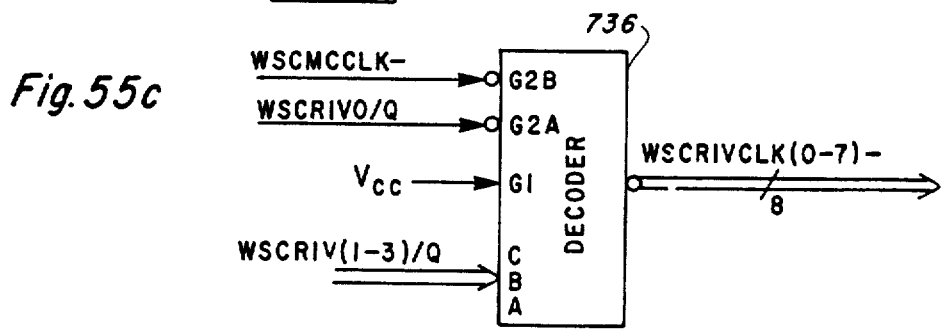
Fig. 55c
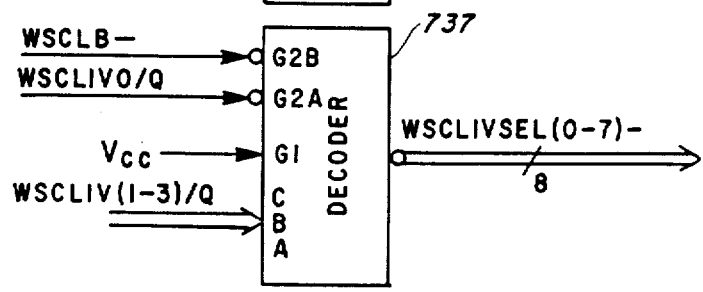

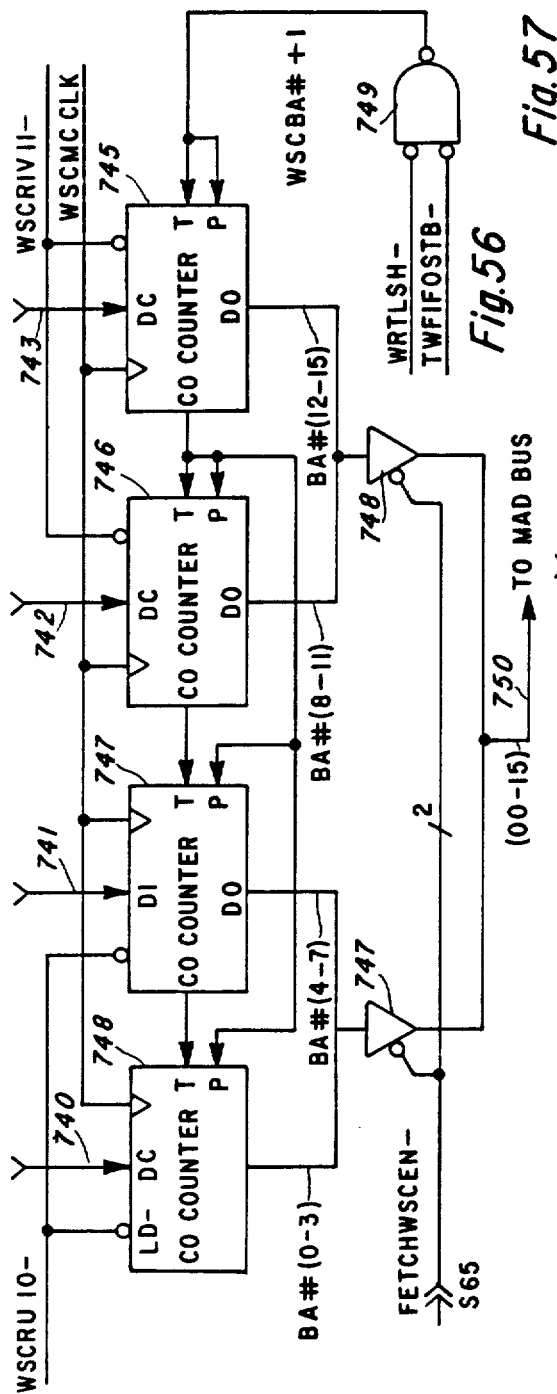
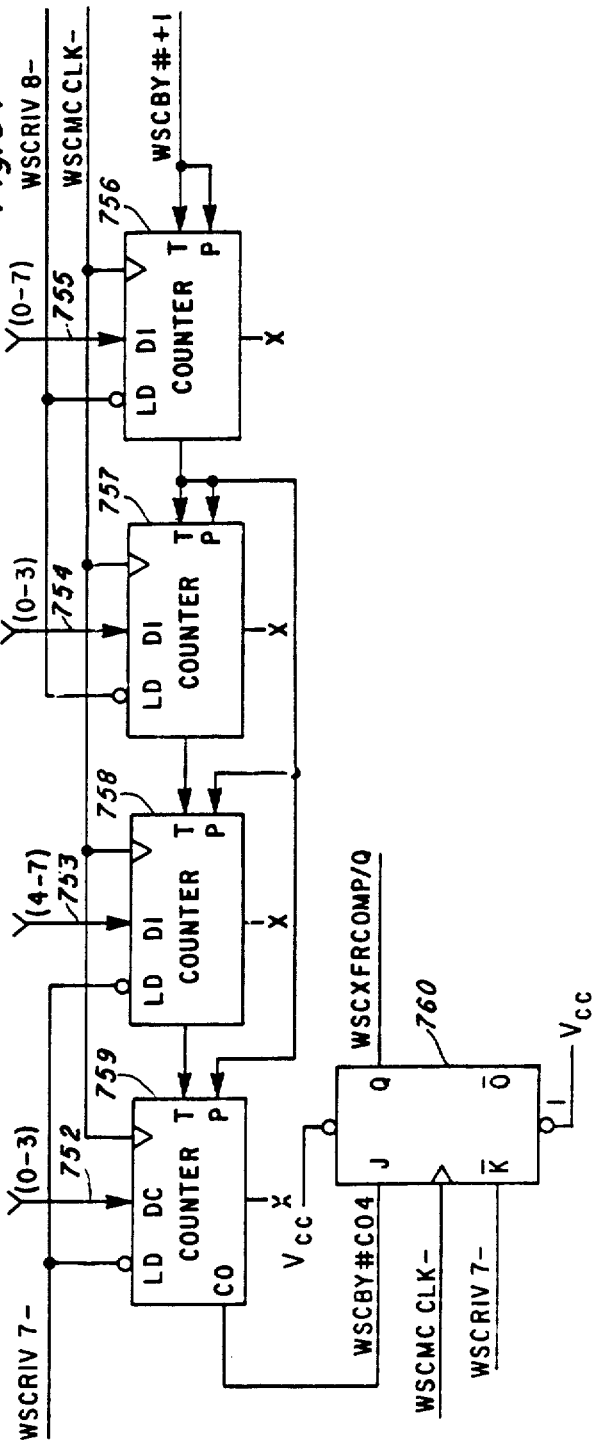
Fig.56
Fig.57

Fig. 6Ia

| CT ADR | WRD0 | WRD1 | | | | | | |
|--------|------|------|------|------|------|------|------|------|
| 0000 | E1E5 | 0000 | 003E | 37A3 | 5003 | 007D | 0222 | 0000 |
| 0001 | CF01 | 0400 | 003F | C007 | 0000 | 007E | 022E | 0000 |
| 0002 | CF10 | 0200 | 0040 | 4300 | 0000 | 007F | E027 | 0000 |
| 0003 | CF00 | 020D | 0041 | 1703 | 5008 | 0080 | 0141 | 0000 |
| 0004 | CF00 | 020E | 0042 | 23A3 | 0000 | 0081 | 0242 | 0000 |
| 0005 | CF00 | 020F | 0043 | C010 | 0000 | 0082 | 0343 | 0000 |
| 0006 | D703 | 5000 | 0044 | 230F | 0500 | 0083 | E027 | 0000 |
| 0007 | E020 | 0000 | 0045 | C0FF | 0000 | 0084 | 0141 | 0000 |
| 0008 | CF02 | 0200 | 0046 | 6100 | 0000 | 0085 | 0242 | 0000 |
| 0009 | CF00 | 0203 | 0047 | 4404 | 0000 | 0086 | 0343 | 0000 |
| 000A | C130 | 0000 | 0048 | 4505 | 0000 | 0087 | E027 | 0000 |
| 000B | 1704 | 5000 | 0049 | 4606 | 0000 | 0088 | 0101 | 0000 |
| 000C | 1705 | 5001 | 004A | E013 | 0000 | 0089 | 0202 | 0000 |
| 000D | 1706 | 5002 | 004B | CF11 | 0300 | 008A | 0303 | 0000 |
| 000E | CF00 | 0203 | 004C | 040F | 0205 | 008B | E027 | 0000 |
| 000F | D43D | 5003 | 004D | 050F | 0206 | 008C | 01A1 | 0000 |
| 0010 | 0400 | 0000 | 004E | 060F | 0207 | 008D | 02A2 | 0000 |
| 0011 | 4102 | 0000 | 004F | E053 | 0000 | 008E | 03A3 | 0000 |
| 0012 | A21A | 0000 | 0050 | CF0F | 0200 | 008F | E027 | 0000 |
| 0013 | 0121 | 0000 | 0051 | C205 | 0000 | 0090 | 01C1 | 0000 |
| 0014 | C001 | 0000 | 0052 | E1D3 | 0000 | 0091 | 02C2 | 0000 |
| 0015 | 37A2 | 5003 | 0053 | B135 | 7000 | 0092 | 03C3 | 0000 |
| 0016 | 020F | 0203 | 0054 | E0C0 | 0000 | 0093 | E027 | 0000 |
| 0017 | 2718 | 5000 | 0055 | 170F | 7904 | 0094 | 01E1 | 0000 |
| 0018 | E00F | 0000 | 0056 | CF13 | 0400 | 0095 | 02E2 | 0000 |
| 0019 | E026 | 0000 | 0057 | B43D | 5004 | 0096 | 03E3 | 0000 |
| 001A | D733 | 1000 | 0058 | D73B | 1000 | 0097 | D43F | 5004 |
| 001B | CF20 | 0200 | 0059 | CF20 | 0300 | 0098 | 1700 | 5000 |
| 001C | E02F | 0000 | 005A | E05F | 0000 | 0099 | 210F | 0200 |
| 001D | 040F | 0200 | 005B | C140 | 0000 | 009A | 1700 | 5001 |
| 001E | 050F | 0201 | 005C | E0A6 | 0000 | 009B | 220F | 0201 |
| 001F | 060F | 0202 | 005D | B63D | 1000 | 009C | 1700 | 5002 |
| 0020 | D702 | 5005 | 005E | CF40 | 0300 | 009D | 230F | 0202 |
| 0021 | E053 | 0000 | 005F | 1761 | 5004 | 009E | E0A5 | 0000 |
| 0022 | 1704 | 5005 | 0060 | 010F | 0100 | 009F | 1700 | 5005 |
| 0023 | 1705 | 5006 | 0061 | B03A | 7000 | 00A0 | 210F | 0205 |
| 0024 | 1706 | 5007 | 0062 | B132 | 2000 | 00A1 | 1700 | 5006 |
| 0025 | CF01 | 0908 | 0063 | CF14 | 0200 | 00A2 | 220F | 0206 |
| 0026 | B32D | 5003 | 0064 | C207 | 0000 | 00A3 | 1700 | 5007 |
| 0027 | 0100 | 0000 | 0065 | E1D3 | 0000 | 00A4 | 230F | 0207 |
| 0028 | 4402 | 0000 | 0066 | D523 | 2000 | 00A5 | C120 | 0000 |
| 0029 | A22D | 0000 | 0067 | E066 | 0000 | 00A6 | 1222 | 5004 |
| 002A | E013 | 0000 | 0068 | CF07 | 0200 | 00A7 | C002 | 0000 |
| 002B | E04B | 0000 | 0069 | B03B | 3000 | 00A8 | 220F | 0500 |
| 002C | E13B | 0000 | 006A | C200 | 0000 | 00A9 | CF00 | 0500 |
| 002D | B62A | 1000 | 006B | E1D3 | 0000 | 00AA | 1762 | 5004 |
| 002E | CF40 | 0300 | 006C | C101 | 0000 | 00AB | C001 | 0000 |
| 002F | 1763 | 5003 | 006D | 1322 | 5004 | 00AC | 2202 | 0000 |
| 0030 | 030F | 0100 | 006E | 1223 | 5004 | 00AD | C007 | 0000 |
| 0031 | B02C | 7000 | 006F | 1764 | 5004 | 00AE | 4200 | 0000 |
| 0032 | B12A | 2000 | 0070 | 3471 | 0000 | 00AF | 1422 | 5004 |
| 0033 | 0100 | 0000 | 0071 | E07C | 0000 | 00B0 | 22A0 | 0000 |
| 0034 | 4502 | 0000 | 0072 | E080 | 0000 | 00B1 | 210F | 0500 |
| 0035 | A250 | 0000 | 0073 | E084 | 0000 | 00B2 | D524 | 2000 |
| 0036 | 0100 | 0000 | 0074 | E088 | 0000 | 00B3 | E0B2 | 0000 |
| 0037 | 4602 | 0000 | 0075 | E08C | 0000 | 00B4 | CF10 | 0200 |
| 0038 | A23B | 0000 | 0076 | E090 | 0000 | 00B5 | E0C0 | 0000 |
| 0039 | CF02 | 0500 | 0077 | E094 | 0000 | 00B6 | C110 | 0000 |
| 003A | E02C | 0000 | 0078 | E097 | 0000 | 00B7 | B322 | 5004 |
| 003B | CF03 | 0500 | 0079 | E05B | 0000 | 00B8 | E0A4 | 0000 |
| 003C | CF00 | 0500 | 007A | E18B | 0000 | 00B9 | CF0F | 0200 |
| 003D | C001 | 0000 | 007B | E0D6 | 0000 | 00BA | C201 | 0000 |
| | | | 007C | 0121 | 0000 | 00BB | E1D3 | 0000 |

Fig. 6lb

| Addr | Val1 | Val2 | Addr | Val1 | Val2 | Addr | Val1 | Val2 |
|------|------|------|------|------|------|------|------|------|
| 00BC | 0000 | 0000 | 00FB | 170F | 490C | 013A | 170F | 4A00 |
| 00BD | 0000 | 0000 | 00FC | CF3C | 0600 | 013B | CF32 | 0600 |
| 00BE | 0000 | 0000 | 00FD | 1025 | 4000 | 013C | 170F | 4E00 |
| 00BF | 0000 | 0000 | 00FE | C0FF | 0000 | 013D | A43F | 0000 |
| 00C0 | B226 | 1000 | 00FF | 17E2 | 4000 | 013E | E16B | 0000 |
| 00C1 | B024 | 2000 | 0100 | 620F | 0700 | 013F | CF04 | 0300 |
| 00C2 | B025 | 7000 | 0101 | CF3D | 0600 | 0140 | CF20 | 0200 |
| 00C3 | E006 | 0000 | 0102 | 770F | 4800 | 0141 | CF01 | 0200 |
| 00C4 | E192 | 0000 | 0103 | A208 | 0080 | 0142 | C001 | 0000 |
| 00C5 | E18B | 0000 | 0104 | B708 | 4000 | 0143 | CFB0 | 0000 |
| 00C6 | CF3F | 0600 | 0105 | C006 | 0000 | 0144 | B024 | 1010 |
| 00C7 | 1622 | 4000 | 0106 | 6602 | 0000 | 0145 | B700 | 7000 |
| 00C8 | C001 | 0000 | 0107 | A202 | 0000 | 0146 | CF80 | 0300 |
| 00C9 | 620F | 090F | 0108 | E10B | 0000 | 0147 | E16D | 0000 |
| 00CA | C401 | 0000 | 0109 | E19A | 0000 | 0148 | 0703 | 5000 |
| 00CB | 1722 | 4000 | 010A | E19D | 0000 | 0149 | 030F | 0000 |
| 00CC | A2D1 | 0000 | 010B | B42A | 3000 | 014A | D12A | 1000 |
| 00CD | 1722 | 1000 | 010C | 860D | 0000 | 014B | CF02 | 0100 |
| 00CE | A2D4 | 0000 | 010D | E19A | 0000 | 014C | B033 | 7000 |
| 00CF | CF20 | 0300 | 010E | E19A | 0000 | 014D | D45C | 1000 |
| 00D0 | E0D7 | 0000 | 010F | E19A | 0000 | 014E | CF02 | 0400 |
| 00D1 | B604 | 1000 | 0110 | E19A | 0000 | 014F | 0000 | 0020 |
| 00D2 | CF40 | 0300 | 0111 | E132 | 0000 | 0150 | D45C | 1000 |
| 00D3 | E0D7 | 0000 | 0112 | E11F | 0000 | 0151 | B031 | 1010 |
| 00D4 | CF00 | 090E | 0113 | E116 | 0000 | 0152 | E145 | 0000 |
| 00D5 | CF04 | 090D | 0114 | E19A | 0000 | 0153 | CF80 | 0200 |
| 00D6 | E1B1 | 0000 | 0115 | E19D | 0000 | 0154 | E18D | 0000 |
| 00D7 | B53B | 2000 | 0116 | CF20 | 0200 | 0155 | E17D | 0000 |
| 00D8 | CF00 | 090D | 0117 | CF1F | 0200 | 0156 | A463 | 0000 |
| 00D9 | CF02 | 090E | 0118 | C902 | 0000 | 0157 | 1322 | 1000 |
| 00DA | E1B1 | 0000 | 0119 | E1D3 | 0000 | 0158 | A269 | 0000 |
| 00DB | CF3D | 0600 | 011A | B03E | 7000 | 0159 | D5B5 | 2000 |
| 00DC | 1222 | 4000 | 011B | B53D | 2000 | 015A | D432 | 1000 |
| 00DD | A2E5 | 0000 | 011C | E11A | 0000 | 015B | E14C | 0000 |
| 00DE | CF3E | 0600 | 011D | E1C6 | 0000 | 015C | A463 | 0000 |
| 00DF | 1622 | 4000 | 011E | E18B | 0000 | 015D | 1322 | 1000 |
| 00E0 | A2E3 | 0000 | 011F | A421 | 0000 | 015E | A269 | 0000 |
| 00E1 | C340 | 0000 | 0120 | E131 | 0000 | 015F | D5B5 | 2000 |
| 00E2 | E0E6 | 0000 | 0121 | C400 | 0000 | 0160 | 1422 | 1000 |
| 00E3 | C300 | 0000 | 0122 | CF20 | 0200 | 0161 | A25F | 0000 |
| 00E4 | E0E6 | 0000 | 0123 | CF16 | 0200 | 0162 | E144 | 0000 |
| 00E5 | C380 | 0000 | 0124 | CF04 | 0300 | 0163 | C400 | 0000 |
| 00E6 | CF3D | 0600 | 0125 | CF02 | 0480 | 0164 | C204 | 0000 |
| 00E7 | C0FF | 0000 | 0126 | B038 | 7000 | 0165 | E1D3 | 0000 |
| 00E8 | 3562 | 4000 | 0127 | B44A | 1000 | 0166 | CF07 | 0400 |
| 00E9 | C007 | 0000 | 0128 | E125 | 0000 | 0167 | B022 | 1000 |
| 00EA | 4200 | 0000 | 0129 | E1C6 | 0000 | 0168 | E15F | 0000 |
| 00EB | 230F | 0100 | 012A | C903 | 0000 | 0169 | CF80 | 0200 |
| 00EC | CF3E | 0600 | 012B | E1D3 | 0000 | 016A | E1C6 | 0000 |
| 00ED | 1366 | 4000 | 012C | CF07 | 0400 | 016B | B02B | 1010 |
| 00EE | 0000 | 0000 | 012D | CF80 | 0200 | 016C | B5B7 | 2000 |
| 00EF | B135 | 2000 | 012E | B337 | 1000 | 016D | D12D | 1000 |
| 00F0 | CF13 | 0200 | 012F | E133 | 0000 | 016E | B432 | 1000 |
| 00F1 | C906 | 0000 | 0130 | E1E0 | 0000 | 016F | CF02 | 0400 |
| 00F2 | E1D3 | 0000 | 0131 | CF02 | 0480 | 0170 | B023 | 7000 |
| 00F3 | B528 | 2000 | 0132 | B337 | 1000 | 0171 | D45D | 1000 |
| 00F4 | E0F3 | 0000 | 0133 | B038 | 0700 | 0172 | CF02 | 04B0 |
| 00F5 | CF40 | 090D | 0134 | B5D0 | 2000 | 0173 | B033 | 1030 |
| 00F6 | CF00 | 090E | 0135 | B433 | 1000 | 0174 | B036 | 1000 |
| 00F7 | E1B1 | 0000 | 0136 | E131 | 0000 | 0175 | E16C | 0000 |
| 00F8 | CF3B | 0600 | 0137 | E1C6 | 0000 | 0176 | E1C6 | 0000 |
| 00F9 | 170F | 490B | 0138 | E18B | 0000 | 0177 | E1E0 | 0000 |
| 00FA | CF37 | 0600 | 0139 | CF3A | 0600 | 0178 | E18B | 0000 |

Fig. 6Ic

| Addr | Val1 | Val2 | Addr | Val1 | Val2 | Addr | Val1 | Val2 |
|---|---|---|---|---|---|---|---|---|
| 0179 | B5B7 | 2000 | 01B8 | 170F | 550B | 01F7 | 0000 | 0000 |
| 017A | B038 | 7000 | 01B9 | 170F | 550C | 01F8 | 0000 | 0000 |
| 017B | B432 | 1000 | 01BA | CF00 | 0200 | 01F9 | 0000 | 0000 |
| 017C | E16F | 0000 | 01BB | 170F | 6500 | 01FA | 0000 | 0000 |
| 017D | D336 | 1000 | 01BC | CF80 | 0200 | 01FB | 0000 | 0000 |
| 017E | B5B7 | 2000 | 01BD | CFA0 | 0200 | 01FC | 0000 | 0000 |
| 017F | B43E | 1000 | 01BE | 170F | 6500 | 01FD | 0000 | 0000 |
| 0180 | E172 | 0000 | 01BF | CF40 | 0200 | 01FE | 0000 | 0000 |
| 0181 | E192 | 0000 | 01C0 | 0000 | 0000 | 01FF | 0000 | 0000 |
| 0182 | B02B | 7000 | 01C1 | 170F | 6500 | | | |
| 0183 | B032 | 2000 | 01C2 | CFC0 | 0200 | | | |
| 0184 | D226 | 1000 | 01C3 | 0000 | 0000 | | | |
| 0185 | E182 | 0000 | 01C4 | 170F | 6500 | | | |
| 0186 | CF3E | 0600 | 01C5 | E001 | 0000 | | | |
| 0187 | 1360 | 4000 | 01C6 | CF23 | 0400 | | | |
| 0188 | 6601 | 0000 | 01C7 | A5CB | 0000 | | | |
| 0189 | A19A | 0000 | 01C8 | CF80 | 020D | | | |
| 018A | E0F8 | 0000 | 01C9 | CF00 | 020E | | | |
| 018B | B02D | 7040 | 01CA | E19D | 0000 | | | |
| 018C | B52E | 2000 | 01CB | B70D | 500F | | | |
| 018D | E18C | 0000 | 01CC | E182 | 0000 | | | |
| 018E | CF10 | 0300 | 01CD | CF02 | 0500 | | | |
| 018F | CF20 | 0200 | 01CE | CF00 | 0500 | | | |
| 0190 | CF00 | 0200 | 01CF | CF01 | 0500 | | | |
| 0191 | E001 | 0000 | 01D0 | 170F | 550B | | | |
| 0192 | CF10 | 0500 | 01D1 | 170F | 550C | | | |
| 0193 | CF43 | 0400 | 01D2 | E182 | 0000 | | | |
| 0194 | B536 | 2000 | 01D3 | CF0D | 0400 | | | |
| 0195 | E124 | 0000 | 01D4 | B534 | 2000 | | | |
| 0196 | CF10 | 0300 | 01D5 | CF83 | 0400 | | | |
| 0197 | CF20 | 0200 | 01D6 | 89D7 | 0000 | | | |
| 0198 | CF00 | 0200 | 01D7 | E06C | 0000 | | | |
| 0199 | E001 | 0000 | 01D8 | E0A6 | 0000 | | | |
| 019A | CF20 | 020D | 01D9 | E11A | 0000 | | | |
| 019B | CF00 | 020E | 01DA | E12C | 0000 | | | |
| 019C | E1B1 | 0000 | 01DB | E166 | 0000 | | | |
| 019D | B53F | 2000 | 01DC | E036 | 0000 | | | |
| 019E | E19D | 0000 | 01DD | E0F8 | 0000 | | | |
| 019F | C040 | 0000 | 01DE | E06C | 0000 | | | |
| 01A0 | 55A0 | 2000 | 01DF | 0000 | 0000 | | | |
| 01A1 | 1321 | 3000 | 01E0 | B322 | 2000 | | | |
| 01A2 | 21E0 | 0000 | 01E1 | E19D | 0000 | | | |
| 01A3 | 1721 | 3000 | 01E2 | CF10 | 020D | | | |
| 01A4 | 2180 | 0000 | 01E3 | CF00 | 020E | | | |
| 01A5 | 3701 | 500D | 01E4 | E19D | 0000 | | | |
| 01A6 | 010F | 020D | 01E5 | CF00 | 0900 | | | |
| 01A7 | 1421 | 3000 | 01E6 | CF00 | 0901 | | | |
| 01A8 | 01A0 | 0000 | 01E7 | CF00 | 0902 | | | |
| 01A9 | 1621 | 2000 | 01E8 | CF00 | 0905 | | | |
| 01AA | 21E0 | 0000 | 01E9 | CF00 | 0906 | | | |
| 01AB | 1121 | 3000 | 01EA | CF00 | 0907 | | | |
| 01AC | 2140 | 0000 | 01EB | CF20 | 0200 | | | |
| 01AD | 1221 | 2000 | 01EC | CF00 | 0200 | | | |
| 01AE | 21C0 | 0000 | 01ED | E001 | 0000 | | | |
| 01AF | 3701 | 500E | 01EE | 0000 | 0000 | | | |
| 01B0 | 010F | 020E | 01EF | 0000 | 0000 | | | |
| 01B1 | A5D4 | 0000 | 01F0 | 0000 | 0000 | | | |
| 01B2 | C004 | 0000 | 01F1 | 0000 | 0000 | | | |
| 01B3 | E1B5 | 0000 | 01F2 | 0000 | 0000 | | | |
| 01B4 | C00C | 0000 | 01F3 | 0000 | 0000 | | | |
| 01B5 | 370F | 550F | 01F4 | 0000 | 0000 | | | |
| 01B6 | 170F | 550D | 01F5 | 0000 | 0000 | | | |
| 01B7 | 170F | 550E | 01F6 | 0000 | 0000 | | | |

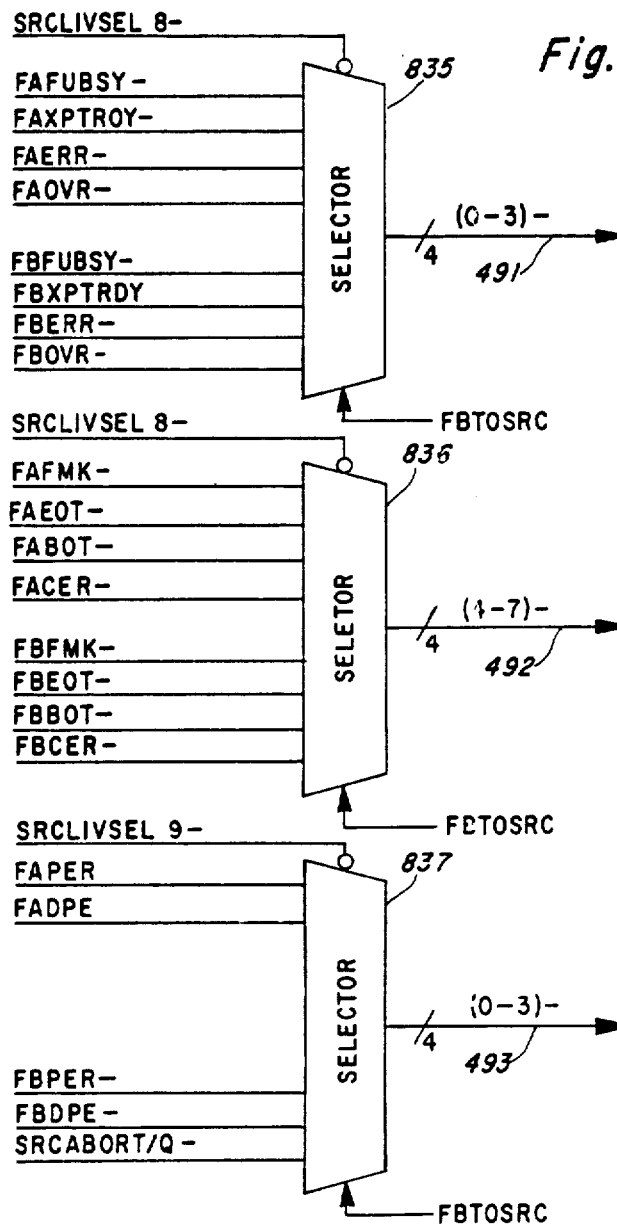

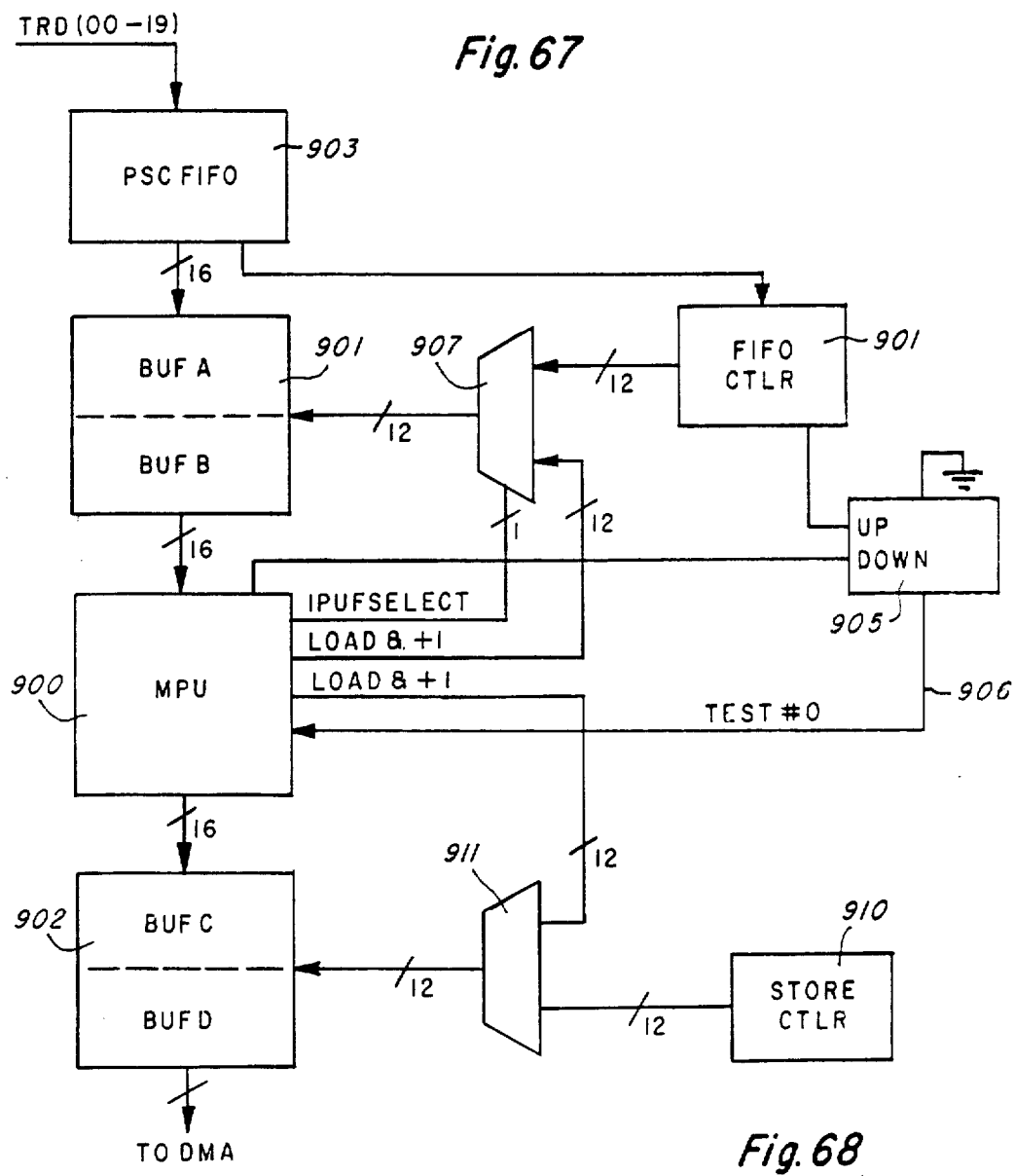

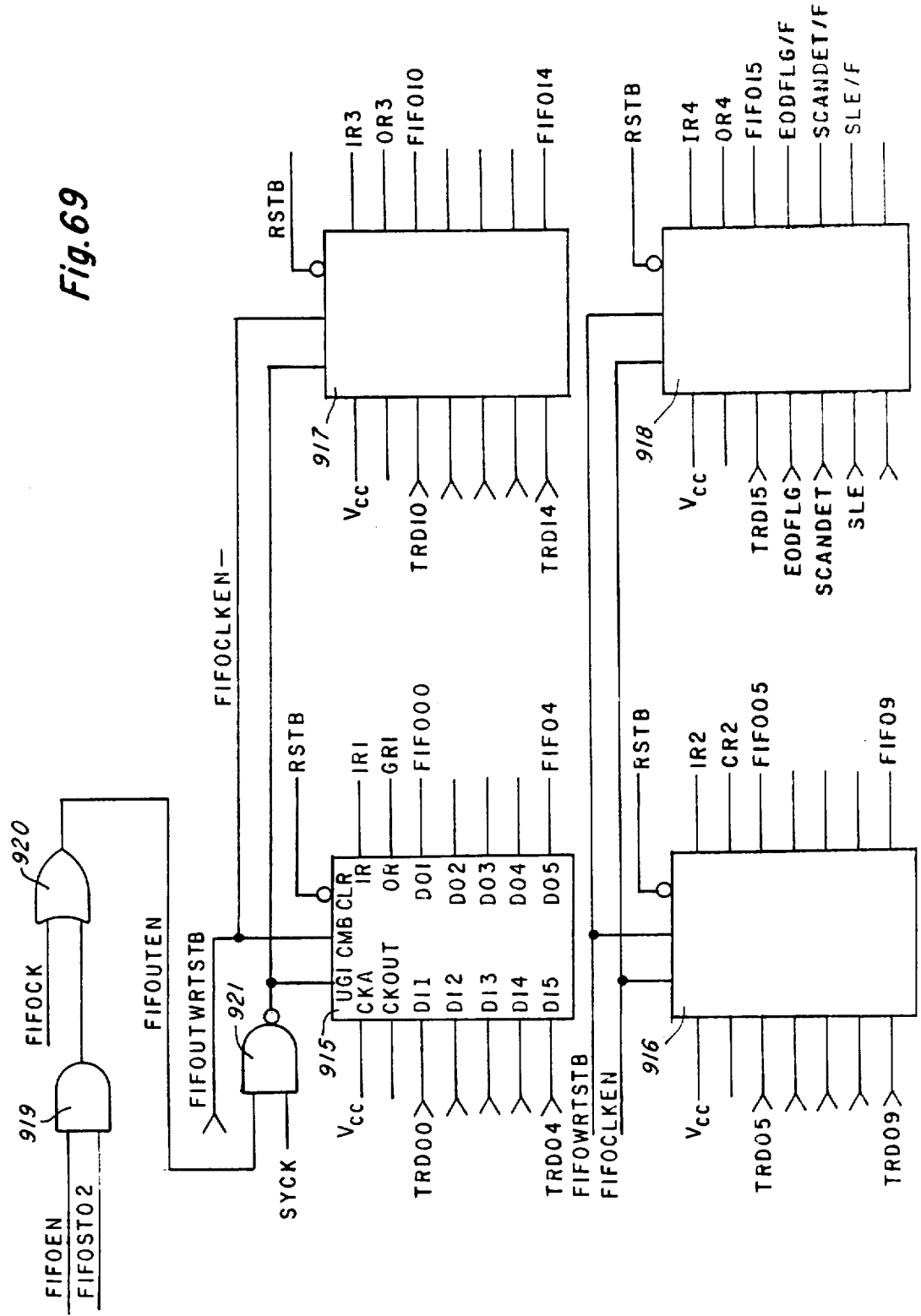

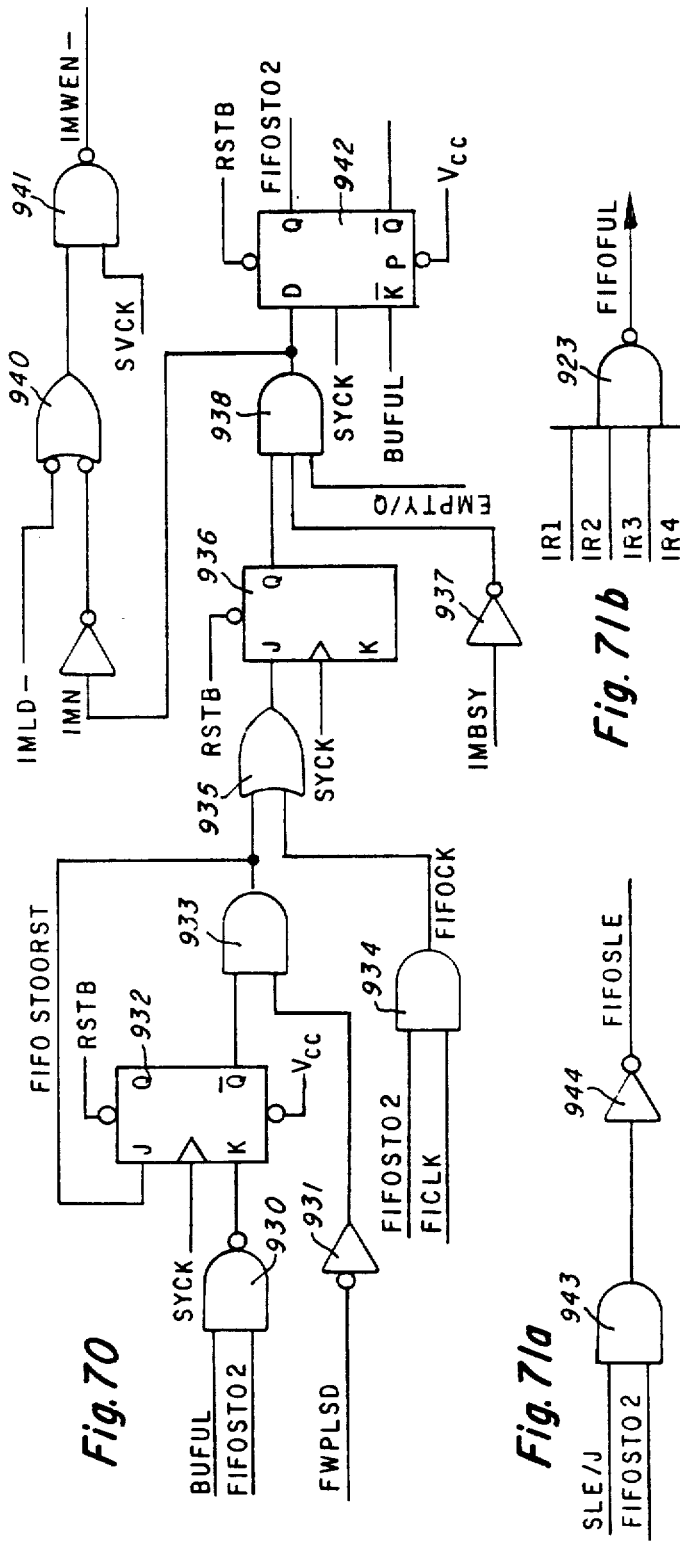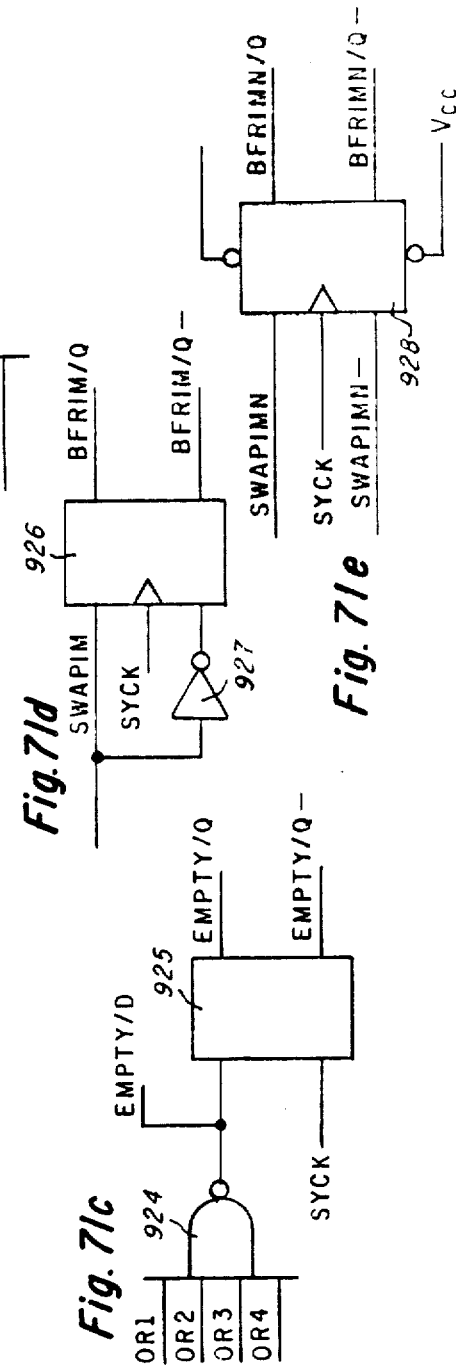
Fig. 70
Fig. 71a
Fig. 71b
Fig. 71c
Fig. 71d
Fig. 71e

Fig. 74

| ·MPUDSEL1 | ·MPUDSEL2 | ·MPUDSEL3 | DATA SEL.(00-15) |
|---|---|---|---|
| 0 | 0 | 0 | MRD |
| 0 | 0 | 1 | IMDO |
| 0 | 1 | 0 | FIFO |
| 0 | 1 | 1 | NORMDAT |
| 1 | 0 | 0 | CMAD |
| 1 | 0 | 1 | IMAD |
| 1 | 1 | 0 | LICWORD |
| 1 | 1 | 1 | INTEGER |

Fig. 76a

```
004861200000003F0004
00C080024200017F0004
000000024200043F0004
000000000200047F0004
000000000200053F0004
000030044FFE003F8004
000000003800013F0004
00FF02003800E07F0004
000402003800E0BF0004
000000000000003F1004
0183B0300000003F0004
0120800000000018004
010480000000000310004
00000000000000003F8004
800080000000003F0004
003F02003800E0FF0004
000000000001002F0005
000000043301C02F0005
000000000001002F0004
000000043803C02F0005
000000000001002F0004
000000043805C02F0005
000000000001002F0004
000000043807C02F0005
000000000001002F0004
000000043809C02F0005
000000000001002F0004
00000004380BC02F0005
000000000001002F0004
00000004380DC02F0005
000000000001002F0004
00000004380FC02F0005
000000000E0101EF0004
00000004381CC03F0000
04A9801000000003F0004
054901000000003F0004
00000800000000002F8000
050901000000003F0004
053801100E2001FF0004
00000800000000003F8000
```

```
060880100E2001FF0004
000008000000000003F800C
060880100E2001FF0004
000008000000000003F800C
05D00010000000003F0004
000008000000000003F800C
134F80100000003F0004
000008000000000003F800C
8FFF02015C20E03F0004
06A10000FE001FF0004
9FFF02015C20E03F0004
092100000E2001FF0004
000008000000000003F800C
001002043800E33F0006
090E8000000000003F0004
00000004F76003F0004
00000004F54003F0004
000202043DFEE03F0004
07E670200FE001FF0004
23C084001E00007F0004
228084000000003F0004
22E084000000003F0004
074080000000003F0004
234084043800A07F0004
228084000000037F0004
22E084000000003F0004
000000000E4001FF0004
03A8800000000003F0004
000008000000000003F8004
222084000000003F0004
073680000E2001FF0004
098080000000003F0004
000000800000000003F0004
12EC80100FE001FF0004
00000080EA0033F0004
12CE80000E2001FF0004
000402043980CE03F0004
000702043800EE03F0004
000102043801AE03F0004
0E4B00100000003F0004
25C084000000003F0004
000202043DFEE1FF0004
0D7771201E00007F0004
0B2600000000003F0004
23C084000000003F0004
228084000000003F0004
25C08404BFB6003F0004
22E084040FB4003F0004
0A408000000003F0004
0CE68000000003F0004
234084000000003F0004
228084040FB6003F0004
22E084044F54003F0004
000000000E4001FF0004
0C088000000003F0004
0000080000000003F8004
222084000000003F0004
06F680000000003F0004
25C084000000003F0004
0A208000000000027E0004
234084000E4001FF0004
0CE8800000000003F0004
```

```
00000800000000003F8004
2220840000000003F0004
06FA8000000000003F0004
7FFF02003800E03F0004
0A208000000000027E0004
7FFF02003800E03F0004
000000044E0002F0004
000000040FB6003F0004
22E084044F5400F0004
00003823E0EA0003F0004
0000000000008113F0004
0A4030000FA00F0004
2620840000000003F0004
000202043DFEE1FF0004
11B771201E00007F0004
0F6600000000003F0004
23C08000000003F0004
24A08404EF60003F0004
2620840F1E00003F0004
22E084040FED403F0004
0E80200030EA003F0004
10C680000000003F0004
234084040FD6003F0004
24A0840F1E00003F0004
22E084040FH4003F0004
000000000F4001FF0004
10488000000003F0004
00000800000000003F8004
2220840000000003F0004
06FA800000000003F0004
2620840000000003F0004
0E6080000000003F0004
234084000F4001FF0004
112880000000003F0004
00000800000000003F8004
2220840000000003F0004
06FA800000000003F0004
210084000000003F0004
0E6080000000003F0004
240084041EU6003F0004
22E08404 4E00003F0004
000000030EA003F0004
000000011F0003F0004
00000004BE0003F0004
00007820000003F0004
00000000F0023F0004
000000000F60003F0004
0E80800080E A003F0004
00000080000000003F0004
001002043800EF03F0004
12CF80000000003F0004
06F0800000000003F0004
FE1F02015F20E03F0004
1301000044F5400F0004
00003000000000003F8000
000000044F76002F0004
000000000FA001FF0004
000202043DFEE1FF0004
000502043810E03F0004
011002043831AE03F0004
00000080FB0032F0004
000302043804F03F0004
```

Fig. 76b

```
0FFF02044CAAE03F0004      000000004C400FF0004      2FFF02003800E01FF0004
186E80000E2001FF0004      1F11800C381824854104      000000024200027E2004
16F771200000003F0004      000000024200003F0004      00000000720000 3F0004
15660000A410007F0004      0000400E0F98002F0004      000000000720002 7E2004
23C084000E2001FF0004      000000000F8003FF0004      000000080000027E2004
21008400000000 3F0004      000000000200037F0004      000000003800 20 2F4104
14C080000000003F0004      000000024200003F0004      0000000000000002 7E2004
164680000000003F0004      0000000E0F32003F0004      00000002420002 F0004
234084000E2001FF0004      0000000E0F32003F0004      000000038412200 041 04
21008400000000 3F0004      0000000E0F32003F0004      0000000COF3200 3F0004
1609800000000 03F0004      0000000E0F32003F0004      000000000F 20003F0004
000080000000003F8004      1E8A00000FE001FF0004      000000000020002 7E2004
222084000000003F0004      1E4480103800603F0204      24E4800000000227A2004
14C080000000003F0004      1E23801038006 27E2004      000000030000003F0004
234084000F2001FF0004      1C208000000027E2004       000000024200003F0004
1AA980000000003F0004      1B608000000027E2004       000000007 20003F0004
000080000000003F8004      0000000038006 27E2004      00000008000002 7E2004
222084000000003F0004      00000080000027E2004       000000024200003F0004
14C080000000003F0004      1EE480103800603F0204      0000000072 000 3F 0004
17CA00000FE001FF0004      1B638010000027E2004       00000000720002 7E2004
000000000F40003F0004      1C208000000027E2004       00000000720002 7E 2004
000000000F40027E2004      00000008000027E2004       000000030000027 4L004
000000000000027E2004      1C808004 2F98003F0004      REFORMATTING DONE
000000001EB2003F0004      200A00000FE001FF0004
206084000000003F0004      00000000C0EA0003F0004
14C080001E4002FF0004      0000282C0EF2003F0004
000000000F40003F0004      238084041F32003F0004
000000000000027E2004      0000000001F2001BF0004
00000041EB2003F0004       218084000000003F0004
206084000000003F0004      000000830E80003F0004
14C080008F4002FF0004      000028240EA0003F0004
000000080000003F0004      238084000000003F0004
0000001F0000BF0004        1FC080001EE001BF0004
000000024200017F0004      2380AC2000000 03F0004
000040203DFEE03F0004      20CF800000000 03F0004
0000000E381220 3D4104     000000080D2081 3F0004
0000000E0F32003F0004      0000000004720 13F0004
0000000F2003FF0004        FFFD02844DFEE03F0004
000000000FA003BF0004      1B608400000000 3F0004
000000000200037F0004      188084000000003F0004
1B5180 0C38122 4 9D4104   1F2084000F2001FF0004
000000024200003F0004      0000080 0E2001FF0004
000000000000003F0004      21CF800000000 03F0004
000000000000003F0004      0000008054002FF0004
000000000E2001FF0004      000000000E60013F0004
1ACA00000FE001FF0004      0000000056002FF0004
000000003800602F0204      FFFD02844DFEE1FF0004
1AA38010380062 7E2004     000802043DFEE03F0004
192080000000027E2004      01E0840000000 03F0004
FFFB02844DFEE27E2004      FFF702844DFEE03F0004
000000003800603F0204      00000000380020 3D4104
1B23801000000 27E2004     228480000000027 62004
192080000000003F0004      000000080000003F0004
FFFB02844DFEE03F0004      2380AC200000003F0004
19A08042F32003F0004       218084000000003F0004
000000000F000BF0004       000000080000003F0004
000000024200003F0004      000000024200043F0404
0000000E3312201 54104     000000080200017F0004
0000000E0F32003F0004      000000024200047F0044
0000000E0F32003F0004      00000030200 01BF0004
0000000E0F32003F0004      234084000000003F0004
00000004A7AC03BF0004      00000008000E000 3 3F0004
```

ATI 1 AND ATI 2 COMMAND FORMAT

S = 0 = LIMIT$_2$ TO WSC LIMIT REGISTER
S = 1 = LIMIT$_2$ TO PSC LIMIT REGISTER
$1 \leq LIMIT_2 \leq 15$

|   0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | IE | CHAIN | / | DIR | DNS0 | DNS1 | $F_0$ | $F_1$ | $F_2$ | $F_3$ | XPORT $2^2$ | $2^1$ | $2^0$ | 0 | 1 | LW1

| BYTE COUNT | LW2 |

| BUFFER ADDRESS | LW3 |

| 0 | 1 | 2 | 3 | 4 | 5 | ... | 12 | 13 | ... | 15 |
|---|---|---|---|---|---|---|---|---|---|---|
| REC SEARCH LMT $16^5$ $16^4$ $16^3$ $16^2$ $16^1$ | BYTES TO SKIP A | N $2^2$ | B $2^1$ | A $2^0$ | LW4

| 0 | ... | 4 | 5 | ... | 12 | 13 | ... | 15 |
| / | BYTES TO SKIP B | N | B | B | LW5

| ADDRESS OF COMPARE A | LW6 |

| ADDRESS OF COMPARE B | LW7 |

| NEXT LIST ADDRESS | LW8 |

TYPE C LIST

*Fig. 79c*

TYPE D LIST

| | | | | |
|---|---|---|---|---|
| LW1 | SOS MASK | GS | GAIN | NB |

| |
|---|
| LW2 ADDRESS OF COMPARE DATA |

*Fig. 79f*

| INDICATOR STATUS WORD |
|---|

ADDRESS

| Address | |
|---|---|
| A | STATUS REG |
| A+1 | LIST ADDRESS |
| A+2 | REM BYTE SCAN COUNT |
| A+3 | PARITY ERROR CNT |
| A+4 | ERROR STATUS ONE |
| A+5 | ERROR STATUS TWO |

READ-OP STATUS BLOCK

| Address | |
|---|---|
| B | STATUS REG |
| B+1 | REWIND COMP (N) LIST ADDRESS |
| B+2 | REM BYTE SCAN COUNT |
| B+3 | PARITY ERROR COUNT |
| B+4 | ERROR STATUS ONE |
| B+5 | ERROR STATUS TWO |

WRITE-OP STATUS BLOCK

*Fig. 80*

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 |
| 2 | 1 | 1 | 1 | 1 | 1 | 1 | 1 | 1 | 1 | 1 | 1 | 1 | 1 | 1 | 1 | 1 |
| 3 | 1 | 1 | 1 | 1 | 1 | 1 | 1 | 1 | 1 | 1 | 1 | 1 | 1 | 1 | 1 | 1 |
| 4 | 1 | 1 | 1 | 1 | 1 | 1 | 1 | 1 | SUB MULTIPLEX GAIN WORD ||||||||
| 5 | DATA CHANNEL 1 BYTE 1 |||||||| DATA CHANNEL 1 BYTE 2 ||||||| 0 |
| 6 | G | 0 | 0 | 0 | 0 | 0 | 0 | 0 | 0 | 0 | 0 | 0 | 0 | 0 | 0 | 0 |
| 7 | DATA CHANNEL 2 BYTE 1 |||||||| DATA CHANNEL 2 BYTE 2 ||||||| 0 |
| 8 | G | 0 | 0 | 0 | 0 | 0 | 0 | 0 | 0 | 0 | 0 | 0 | 0 | 0 | 0 | 0 |
| 0 | | | | | | | | 0 | | | | | | | | |
| 0 | | | | | | | | 0 | | | | | | | | |
| 0 | | | | | | | | 0 | | | | | | | | |
| 0 | | | | | | | | 0 | | | | | | | | |
| 0 | | | | | | | | 0 | | | | | | | | |
| 0 | | | | | | | | 0 | | | | | | | | |
| 0 | | | | | | | | 0 | | | | | | | | |
| (N-1) | DATA CHANNEL (N-4)/2 BYTE 1 |||||||| DATA CHANNEL (N-4)/2 BYTE 2 ||||||| 0 |
| N | G | 0 | 0 | 0 | 0 | 0 | 0 | 0 | 0 | 0 | 0 | 0 | 0 | 0 | 0 | 0 |

TYPE A MEMORY DATA SCAN FORMAT LW1 BIT 5 = 0, 2 BYTES PER SAMPLE (UNPACKED SEG A)

*Fig. 81*

|   |   |   |
|---|---|---|
| 1 | 1 1 1 1 1 1 1 1 | 1 1 1 1 1 1 1 1 |
| 2 | 1 1 1 1 1 1 1 1 | BYTE 4 SYNC GROUP |
| 3 | DATA BYTE 1 | DATA BYTE 2 |
| 4 | DATA BYTE 3 | DATA BYTE 4 |
| 5 | DATA BYTE 1 | DATA BYTE 2 |
| 6 | DATA BYTE 3 | DATA BYTE 4 |
| 7 | DATA BYTE 1 | DATA BYTE 2 |
| 8 | DATA BYTE 3 | DATA BYTE 4 |
| 0 | o | o |
| 0 | o | o |
| 0 | o | o |
| N/2−1 | DATA BYTE 1 | DATA BYTE 2 |
| N/2 | DATA BYTE 3 | DATA BYTE 4 |

Fig. 82

INPUT/OUTPUT COMMAND PROCESSOR

This a continuation, of application Ser. No. 091,861, filed Nov. 5, 1979 now abandoned.

BACKGROUND OF THE INVENTION

1. Field of the Invention

This invention relates to digital peripheral equipment controllers and more specifically to command processors for relieving the central processor with which the peripheral equipment communicates, of certain housekeeping functions.

2. Description of the Prior Art

Most present date peripheral controllers are designed to control I/O data transfers. No data manipulation is performed on the data stream as it is transferred between the central processor and the peripheral digital device. The preferred embodiment of this invention is a major component of an intelligent controller, the subject of copending U.S. application Ser. No. 514,357, July 15, 1983, now abandoned, a continuation of Ser. No. 095,807 filed Nov. 19, 1979, now abandoned which involves seismic data processing. In prior art seismic data processors, data moving between the central processor and, for example, its tape sub-system, are transferred in a memory image form, in the same format as they were recorded in the field. Unfortunately, field recorded data is not optimized for manipulation by the typical office processing system. In the present state of the art, it is estimated that there are approximately 200 seismic field formats and with the present date peripheral controllers, the central processor is required to transform any of those field formats to a blocked demultiplexed format of a relatively short record and with numerical representations that are either 16 to 32-bit six point integers, or 32 to 40-bit floating point values.

A state of the art solution has been to increase the power of the central processor and the speed and size of its central memory. However, this solution tends to be expensive, requiring an extensive hardware and software effort. Also, in view of the fact that seismic data collection is increasing at an exponential rate, this solution is not long term.

This invention provides a viable alternative, reducing the burden placed on the central processor by shifting some of the processing burdens to a command processor. This relieves the central processor of the need to execute common housekeeping tasks.

BRIEF SUMMARY OF THE INVENTION

The command processor of this preferred embodiment comunicates with a Central Processing Unit (CPU) and, in this preferred embodiment, a maximum of 16 magnetic tape transports. The transport densities may be of the 800-bit per inch (BPI) variety, 1600 BPI or 6250 BPI in non-return to zero, phase encoding and group encoding, respectively. In the preferred embodiment, seismic data in any one of over 200 field formats is recorded on the magnetic tapes.

The intelligent processor is comprised of three sections: this command processor, the device interface controller, and the process sequence controller. The command processor interfaces with the CPU, receiving commands which are decoded and sent to the device interface controller and to the process sequence controller.

The command processor has an activation controller which monitors information from the CPU to determine whether a command has been issued. The activation controller, upon detecting a command, determines whether that command requires fetching a command list block (typically eight words) from the central memory of the CPU or whether it is a single command word that can be directly sent to the appropriate component of the intelligent controller. If a command list block is required, the activation controller causes the list fetch controller, another component of the command processor, to fetch the command list block which is then stored in the list buffer, in either the output or input section as determined by the list fetch controller. A list interpret controller takes a command list block from the list buffer, interprets it and sends it to the device interface section in the process sequence controller.

The device interface has a system read controller which accepts commands from the list interpret controller and controls a data read controller which in turn, through a formatter selector switch, controls a tape formatter. Also included in the device interface is a write sequence controller which responds to controls from the list interpret controller and a tape write controller which in turn, through the formatter selector switch, controls the writing on the tape through a formatter.

The process sequence controller responds to commands from the list interpret controller, and takes incoming data from the data read controller for processing and transmission to the central memory. Its function is to process data as commanded. For example, raw data coming from the data read controller may be changed to an IBM floating point block format and then sent to the central memory.

The device interface section is seen to have an input and output section which are capable of operating independently. That is, while information is being read in from tape, information can be written onto another tape.

The primary object of this invention is to process seismic data on the fly prior to storing in central memory of a CPU.

Another object of this invention is to provide an intelligent controller that can read and write simultaneously.

These and other objects will be made obvious in the detailed description that follows:

BRIEF DESCRIPTION OF THE DRAWINGS

FIGS. 1a–1b is a block diagram of the intelligent controller;

FIG. 3 is a timing diagram illustrating the clock signals.

FIGS. 6a and 6b, together, are a block diagram of the DMA interface 11 of FIG. 1a.

FIGS. 11a–11c, together form a block diagram of ACT13 of FIG 1a.

FIGS. 12a–12b together are a map of ROM 202 of FIG. 11c.

FIGS. 23a–23d schematically illustrate the LFC14.

FIGS. 24a–24d, together, are the address circuity for LFC STORE/FETCH.

FIGS. 29a–29b together are a map of the contents of ROM 302.

FIGS. 30a–30c are a schematic of LIC 15 of FIG. 1a.

FIGS. 34a–34c together form a map of ROM 402.

FIGS. 35a–35c illustrate the circuitry for the list buffer address register 16 of FIG. 1a.

FIGS. 39a and 39b illustrate the SRC memory address counter circuitry.

FIG. 40 illustrates the generation of PSC control signals.

FIG. 41 also illustrates the generation of a PSC control signal.

FIGS. 47a–47c together form a map of the contents of ROM 502.

FIGS. 53a–53d together form a map of the contents of ROM 602.

FIGS. 54a–54c schematically illustrate the write sequence controller 26 of FIG. 1b.

FIGS. 55a–55c are schematics of circuitry for development of control signals for the WSC.

FIG. 56 is the central memory addressing circuitry of WSC.

FIG. 57 is the byte counter of WSC.

FIGS. 61a–61c together form a map of the contents of ROM 702.

FIGS. 64a and 64b form a schematic of the generation of formatter status.

FIG. 67 is a functional block diagram of the process sequence controller 28 of FIG. 1b.

FIG. 68 is a functional timing diagram of the PSC.

FIG. 69 is a schematic of the FIFO of the PSC

FIG. 70 is a schematic diagram of the FIFO controller of the PSC.

FIGS. 71a–71e are schematics illustrating the generation of various control signals for the PSC.

FIG. 74 is a signal selection table.

FIGS. 76a–76b together form a map of the contents of the PSC ROM.

FIGS. 79a-79f illustrate types A-F command lists.

FIG. 80 illustrates indicator status words for read and write.

FIG. 81 illustrates the loading of memory for unpacked SEG A.

FIG. 82 illustrates memory of a packed SEG A.

DETAILED DESCRIPTION OF THE INVENTION

Figure 1B:
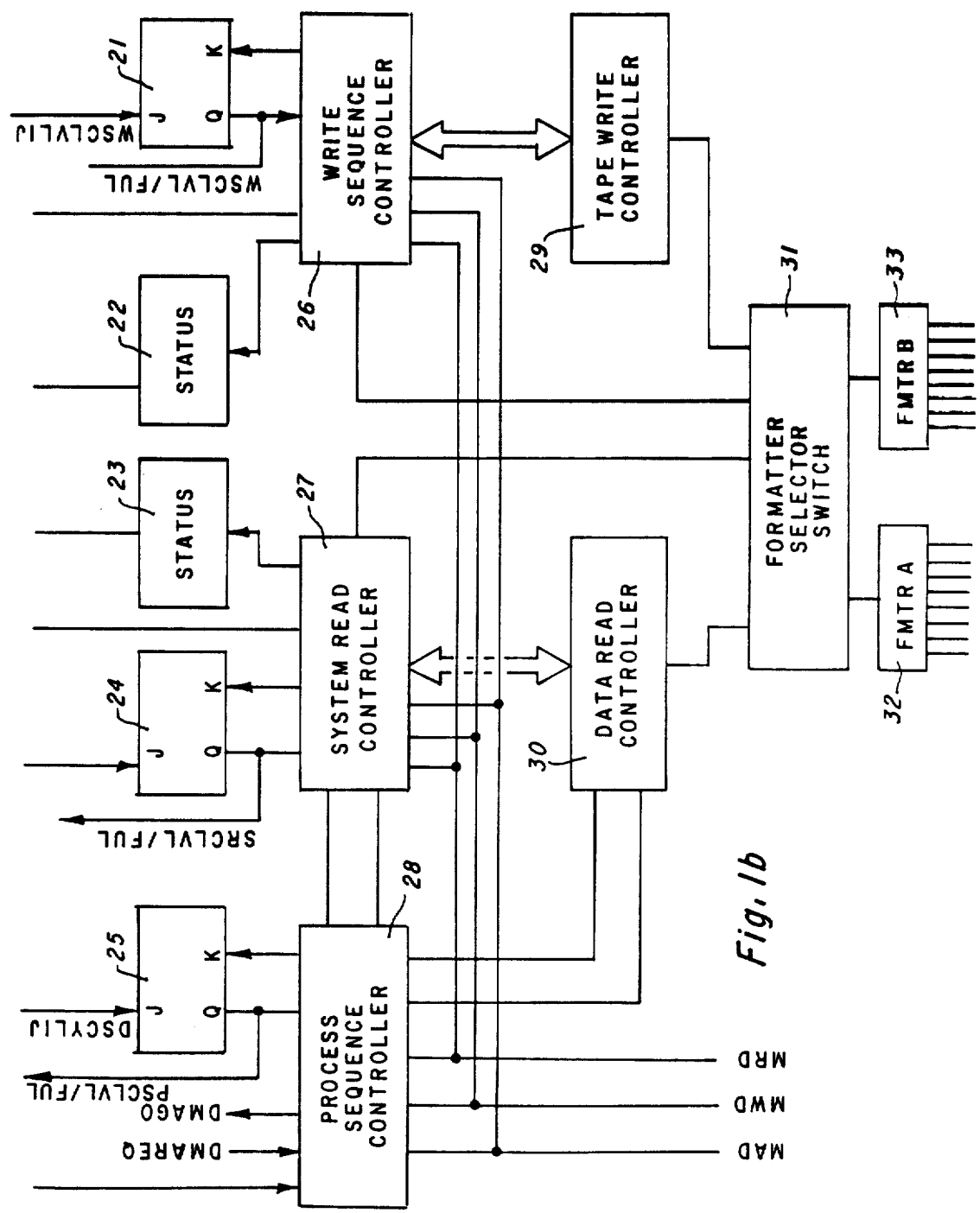

FIGS. 1a and 1b depict, in block form, the entire intelligent processor system 10. The system 10 communicates with the central memory of a computer such as the TI980B, in this preferred embodiment, by way of a direct memory access interface (DMAIF) 11 and Store/Fetch Controller 12. It will be evident that there are six users of the central memory requiring inputs "Cycle Requests" (CYREQ) and "Interrupt Requests" (INTREQ). The Process Sequence Controller (PSC) 28 has one input "Data Memory Access Go" (DMAGO) to and receives one output "Data Memory Access Requested" (DMAREQ) from Store Fetch Controller 12, the memory accessing for PSC 28 being different from the other memory users. The Store/Fetch Controller 12 provides outputs "Cycle Granted" (CYGRAN), "Interrupt Recognized" (INTRECOG) and "Data Available" (DATAV) to the memory users. Store/Fetch Controller 12 provides a Store/Fetch signal and an IREQ signal to DMAIF 11, receiving from the DMAIF 11 the DATAV signal, the IRECOG signal and an "Acknowledgment Granted" (AG) signal. Memory Read Data Bus (MRB) 35, Memory Write Data Bus (MWD) 37, and Memory Address Bus (MAD) 39 are connected to DMAIF 11.

Activation Controller (ACT) 13 is connected to receive ATI strobes (to be described later) from DMAIF11 and is also connected to receive words from the memory via MRD and to write words into memory via MWD at the proper address by selection through MAD. ACT 13 is connected bilaterally to List Fetch Controller (LFC) 14 which is connected to read and write into the central memory. ACT 13, depending upon instructions it receives, will cause LFC 14 to fetch a list of commands from the central memory or will directly communicate with the device interface section (described later) of the intelligent controller 10.

List Buffer Address Register 16 is addressed by LFC 14 and by List Interpret Controller (LIC 15). LFC 14 loads list Buffer 17 at the addresses specified in List Buffer Address Register 16 with command lists for use by the device interface section or by PSC 28 (described later). LFC 14 determines whether a particular command list is for use by the Device Interface Section or by PSC 28 and places such lists in List Buffer 17 in a section designated for use by the Device Interface or in a section designated for use by PSC 28.

LIC 15 continuously monitors the device interface section and PSC 28 to determine whether those sections are demanding action. LIC 15 also continuously monitors the contents of list buffer 17 to determine whether there are any command lists therein for either PSC 28 or the device interface section. LIC 15 is a user of central memory for purposes of reporting status as is described below.

ACT 13, LFC 14, LIC 15, List Buffer Address Register 16 and List Buffer 17 make up the command processor section of the intelligent controller 10. DMAIF 11 and Store/Fetch Controller 12 are, in this preferred embodiment, incorporated on the command processor circuit board.

The Write Sequence Controller (WSC) 26, the Tape Write Controller (TWC) 29, the System Read Controller (SRC) 27, the Data Read Controller (DRC) 30 and the Formatter Selector Switch 31 are the major, components of the data interface section and are all mounted on a common circuit board. System Read Controller Level 1 (SRC LVL 1) register 19 is connected to LIC 15 and to SRC 27 and functions as a very fast access storage register for command lists transferred from List Buffer 17 by LIC 15. Register 19, in this preferred embodiment, is a random access memory manufactured by Texas Instruments Incorporated, Type SN74S208 controlled as a first-in, first-out (FIFO) register. This random access memory could, of course, be accessed in any random fashion desired-other than as a FIFO.

In a similar manner, WSC LVL 1 register 18 is conncted between LIC 15 and WSC 26 and is identical to and performs the same function as register 19. Status FIFO's 22 and 23 are connected between LIC 15 and WSC 26 and SRC 27, respectively. Status is sent to LIC 15 so that there is no unnecessary interruption of the data flow either to or from the device interface section. Flip flop 21 is connected between LIC 15 and WSC 26 and indicates that register 18 is full or not full. Likewise, flip-flop 24, connected between LIC 15 and SRC 27 indicates whether register 19 is full or empty. If register 18 is full, then WSC 26 is able to have its contents transferred. In the same manner, if flip-flop 24 indicates that register 19 is full, then the SRC can accept the information from register 19. WSC 26 and SRC 27, as memory users, have connections to the MRD, MWD and MAD buses.

The Tape Write Controller (TWC) 29 is bilaterally connected to WSC 26 and is further connected to Formatter Selector Switch 31. The Data Read Controller (DRC) 30 is bilaterally connected to SRC 27 and is bilaterally connected to the Formatter Selector Switch 31. DRC 30 also is connected to PSC 28 to transmit data passing through Formatter Selector Switch 31 and through DRC 30. Formatter Selector Switch 31 has formatter A 32 and Formatter B 33 connected to it. These formatters are not part of the intelligent controller and in this preferred embodiment, as accessories, are supplied by the Telex Corporation and are series 6800. Each is capable of handling eight tape transports. The tape transports are not shown, but could be connected to each of the eight lines shown from Formatter A 32 and Formatter B 33.

WSC 26 communicates through Formatter Selector Switch 31 with Formatter A32 and Formatter B33 as determined by the command word from WSC LVL 1 register 18. When a particular write instruction is received, WSC 26 fetches data from the central memory, transfers it to TWC 29 which in turn transfers the data through Formatter Selector Switch 31 to the selected Formatter 32 or 33 for writing on tape. WSC 26, while such writing of data is occurring, continuously monitors the formatters for any status signals which are transmitted to status FIFO 22 which in turn transmits the status to LIC 15 which sends such status to the central memory. If necessary, the CPU can then take action.

SRC 27 operates in much the same fashion as WSC 26. That is, a command is taken in from register 19, SRC 27 through Formatter Selector Switch 31 selects a tape on Formatter 32 or Formatter 33 from which to read as determined by the instruction sent from register 19. Data is read from the tapes into DRC 30 (which can recognize scan codes) and then to PSC 28. While such reading operation is going on, SRC 27 monitors Formatter 32 and Formatter 33 for status, sending any such status to status FIFO 23, which then sends the status to LIC 15 which in turn transmits it to the central memory. If action is warranted, the CPU will take action.

PSC 28 is the third section of intelligent controller 10. Similar to SRC 27 and WSC 26, PSC 28 has a level 1 register known as "Process Sequence Controller Level 1" (PSCLVL 1) register 20 connected between itself and LIC 15 Register 20 receives commands from LIC 15 for action by PSC 28. Flip flop 25 operates in the same fashion as flip flops 21 and 24. Flip flop 25 is connected to LIC 15 and indicates whether register 20 is empty or full. If it is full, then the commands therein may be transferred to PSC 28. PSC 28 has connection to the central memory through buses MRD, MWD and MAD. Also, PSC 28 has a connection from the Store/Fetch Controller on the line DMAREQ and has a connection to controller 12 through line DMA GO.

Figure 2:
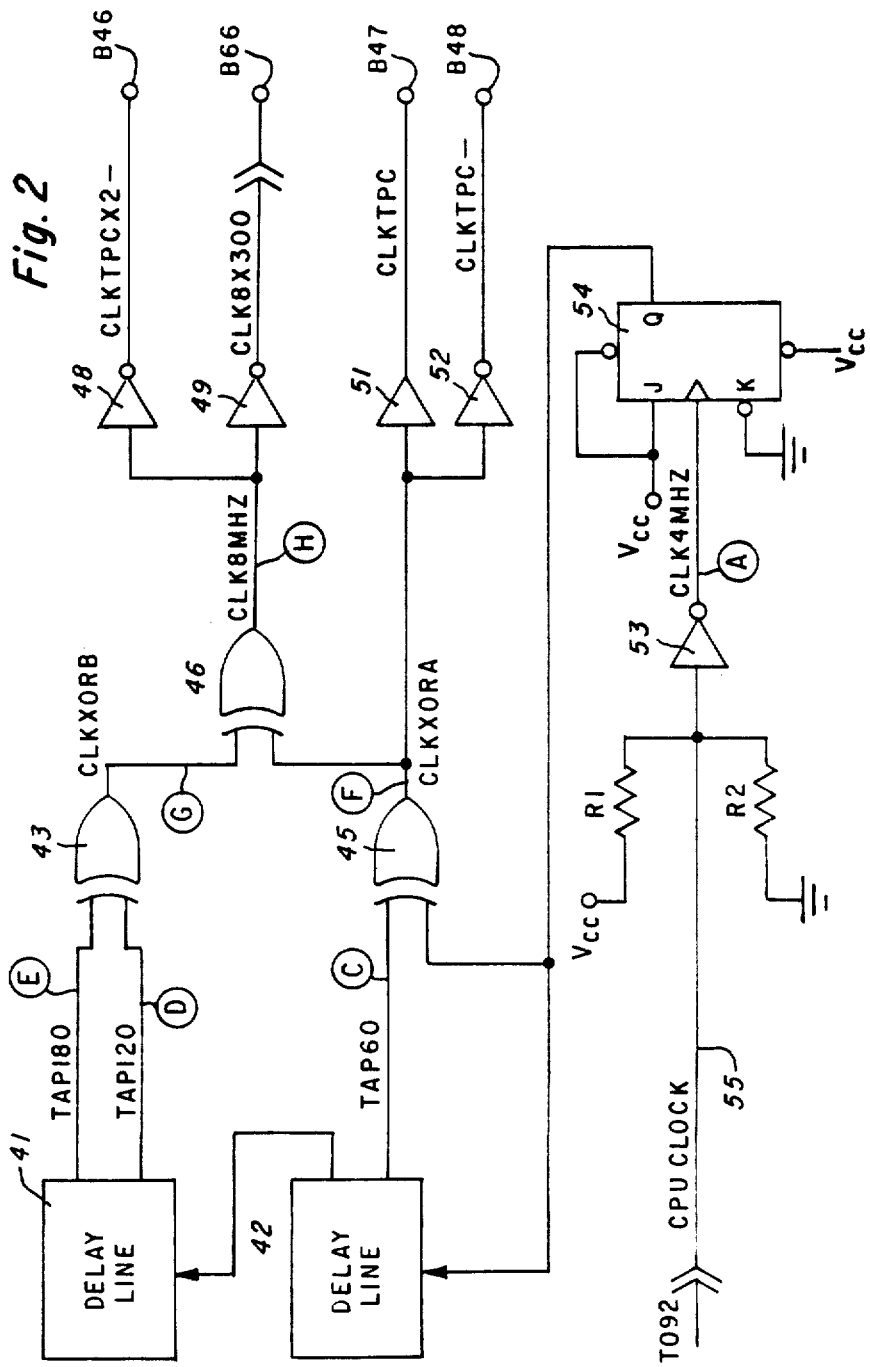
FIG. 2 is a schematic diagram of the circuitry for providing various clock signals.

Refer now to FIGS. 2 and 3. Circuitry for development of clock pulses and the developed pulses, respectively, are depicted. It should be noted that "inverse" or "not" functions are designated by a dash (-) following the identifier. Also, "Q" following the identifier generally indicates a flip flop output.

The input clock from the TI 980B computer is applied on terminal TO92, carried on line 55 and inverted through inverter 53, being applied as the clock input to flip flop 54. Voltage VCC is applied, through resistor R1, to line 55 which is connected through resistor R2 to ground. The voltage waveform A applied to the clock input of flip flop 54 is shown as waveform A (CLK4MHZ), with time t1–t4 being 167 nanoseconds and time t4–t6 being 83 nanoseconds in the preferred embodiment, providing a total period of 250 nanoseconds and therefore a frequency of 4 MHz. As connected, flip flop 54 triggers each time that waveform A goes positive. Therefore, the Q output of flip flop 54 is one half the frequency of waveform A and is shown in FIG. 3 as waveform B (CLK2MHZ). Waveform B is applied as one input to exclusive OR circuit 45 and also as an input to delay line 42. Delay line 42 provides an output waveform C (TAP60) which is waveform B delayed 62.5 nanoseconds. Waveform C serves as the otherinput to exclusive OR circuit 45 whose output is waveform F (CLKXORA). Note that waveform F results from the condition that waveform B equals "1" while waveform C equals "0" or that waveform B equals "0" while waveform C equals "1".

The last tap on delay line 42 is connected as an input to delay line 41 which has an output waveform D (TAP120) which is waveform B delayed approximately 125 nanoseconds, applied as an input to exclusive OR circuit 43. Delay line 41 has a second, later output waveform E (TAP180) which is waveform B delayed approximately 187.5 nanoseconds, applied as the other input to exclusive OR circuit 43 whose output is waveform G (CLKXORB). Note that waveform G is identical to waveform F, simply delayed. Also note that waveform G results from the condition that waveform D equals "1", while waveform E equals "0" or that waveform D equals "0" while waveform E equals "1". Waveforms F and G are applied as inputs to exclusive OR circuit 46 whose output is waveform H (CLK8MHZ). Waveform H is a result of the condition that waveform F equals "1" while waveform G equals "0" or that waveform F equals "0" while waveform G equals "1". Waveform H is inverted through inverter 48 whose output is CLKTPCX2 and applied to terminal B45. Waveform H is also inverted through inverter 49 whose output is identified as CLK8X300 applied to output S11. Waveform F is amplified through amplifier 51 providing output signal CLKTPC applied to terminal B47. Waveform F is also inverted through inverter 52 providing signal CLKTPC- applied to terminal B48. These clocks are used as clock inputs for the various circuits to be described.

Store/Fetch Controller and DMAIF

Figure 4A:
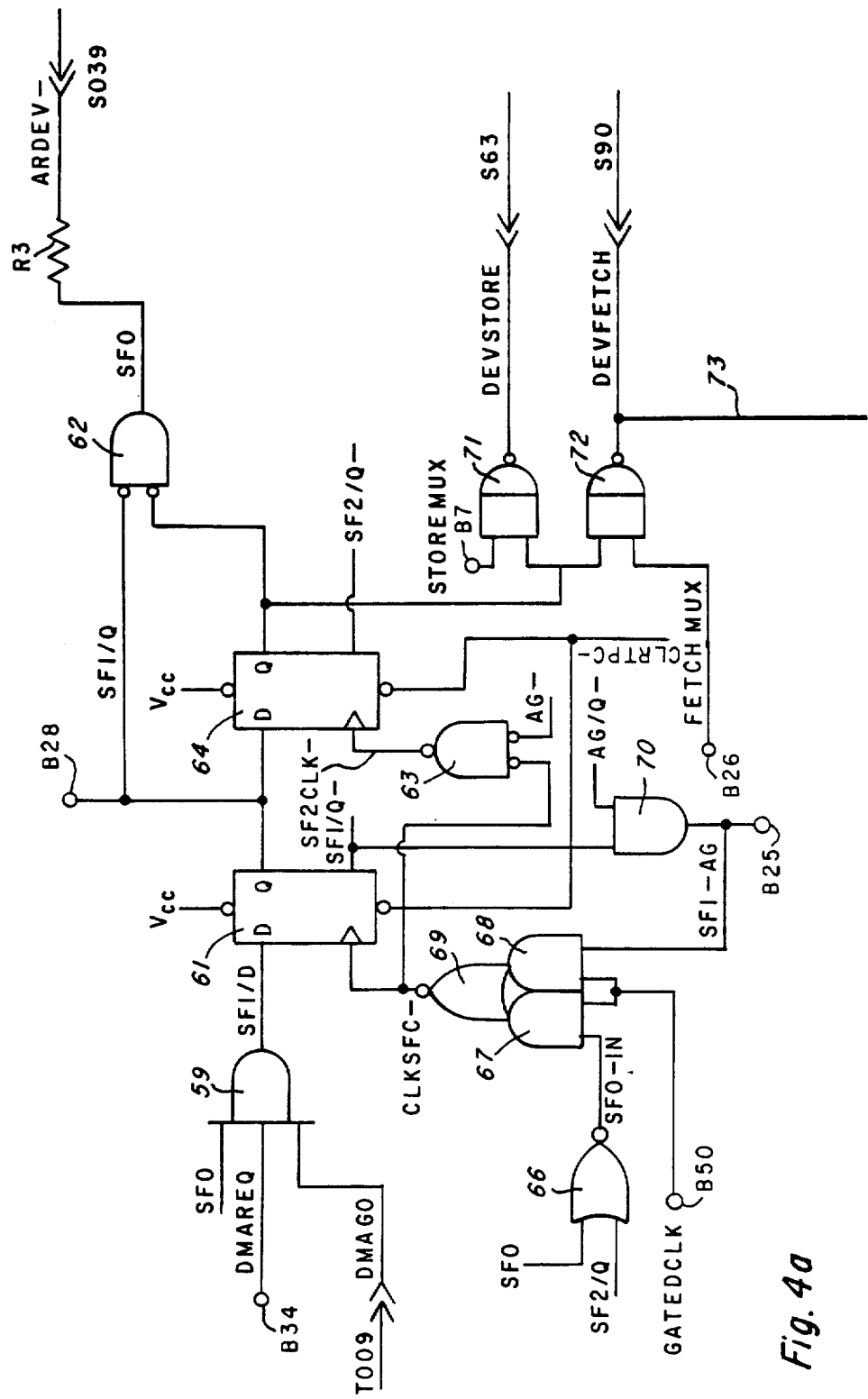
FIGS. 4a and 4b are, together, a schematic of the store/fetch controller 12.
Figure 4B:
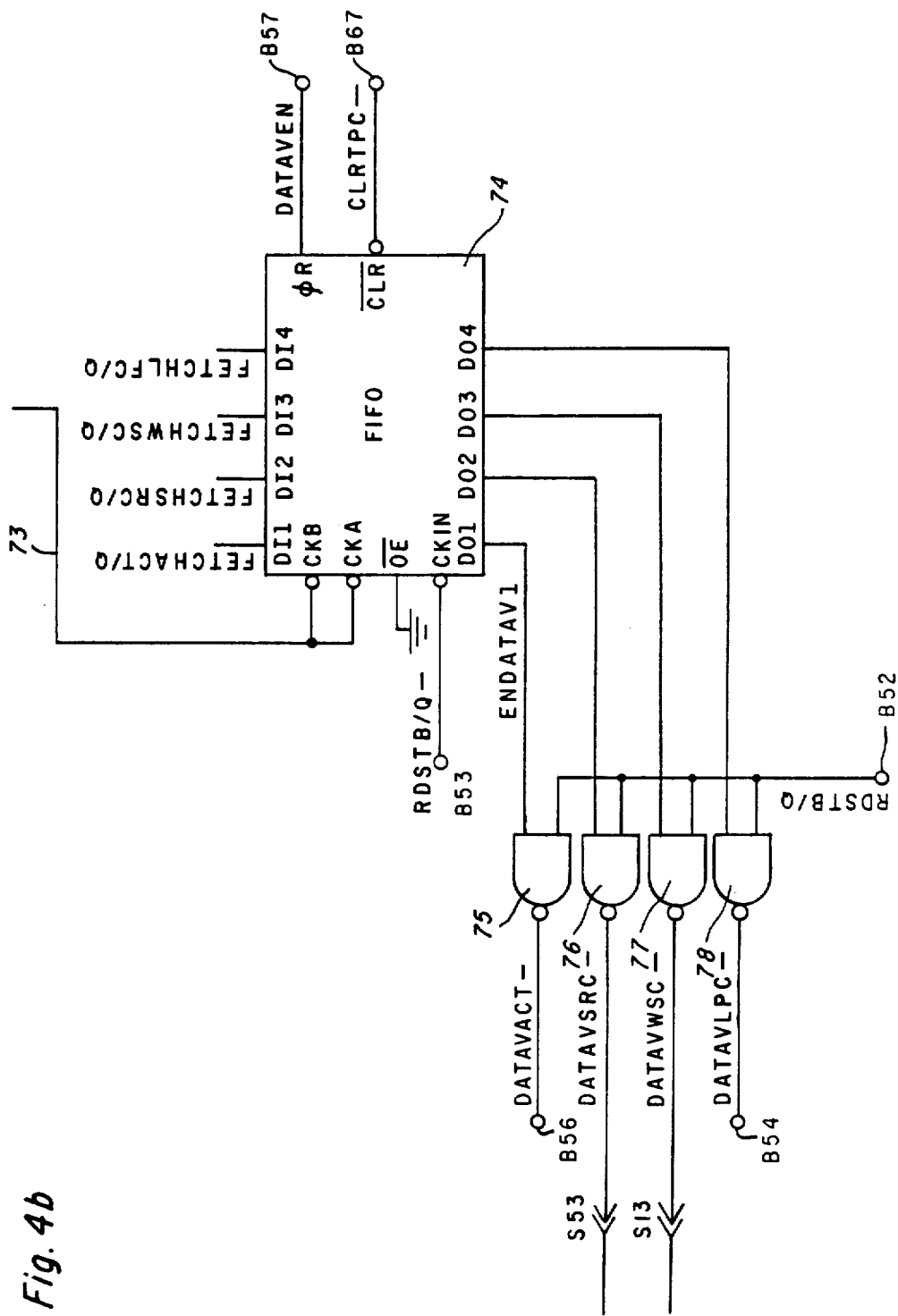

FIGS. 4a and 4b schematically illustrate the store/fetch controller 12 which functions as a memory expander for the central memory. That is, it permits direct access to the central memory by components of this intelligent controller 10 as well as by the CPU.

In FIG. 4a, signal SFO, developed in this circuit, signal DMAREQ from DMA terminal B34, and signal DMAGO from the PSC 28 are inputs to AND circuit 59 whose output is the D input to flip flop 61. The Q output of flip flop 61 is connected to the D input of flip flop 64 which provides inputs to each of open collector NAND gates 71 and 72. The Q outputs of each of flip flops 61 and 64 provide inputs to NOR circuit 62 whose output is the SFO signal mentioned above. The SFO signal is passed through registor R3 where it becomes the ARDEV- signal (access request for the device). Signals SFO and SF2/Q are inputs to OR circuit 66 whose output, SFO-IN, is an input to AND circuit 67. GATEDCLK clock signal on terminal B50 (described later) is an input to AND circuit 67 and also to AND circuit 68. The Q- output of flip flop 61, signal SF1/Q-, is one input of NOR circuit 70 whose other input is the signal AG/Q- (access granted). The output of NOR circuit 70 provides the other input, signal SF1-AG, for AND circuit 68. AND circuits 67 and 68 are the inputs to NOR circuit 69 whose output is signal CLKSFC-, providing the clock input to flip flop 61 and one input to OR circuit 63. The other input to OR circuit 63 is the AG- (access granted-) signal. The output of OR circuit 63, signal SF2CLK- is the clock signal to flip flop 64. The Q- output of flip flop 64 is signal SF2/Q-. Open collector NAND gate 71 has its other input supplied by the signal STORE MUX and open collector NAND gate 72 has its other input provided by the FETCH MUX signal. The output of gate 71 is signal DEVSTORE- and is applied to terminal S63. The output of circuit 72 is signal DEVFETCH- and is applied to terminal S90. Gate 72 also provides its output on line 73 to the CKA and CKB inputs of first-in, first-out memory (FIFO) 74. FIFO 74 is a Texas Instruments Type SN74S 225, fully described in the Texas Instruments Publication "Bipolar Microcomputer Components Data Book" LCC 4270A, dated December 1977. The CK IN input to FIFO 74 is provided by signal RDSTB/Q- on terminal B53, the CLR-input is provided by signal CLRTPC- and the OR output is signal DATAVEN. Inputs supplied to the FIFO are signals FETCHACT/Q, FETCHSTC/Q, FETCHWSC/Q and FETCHLFC/Q. These inputs are output to NAND gates 75, 76, 77 and 78, respectively, whose other input, in each case is provided by signal RDSTB/Q on terminal B53. The output of NAND gate 75 is signal DATAVACT- provided on terminal B56, the output of NAND gate 76 is signal DATAVSRC- provided on terminal S53, the output from NAND gate 77 is signal DATAVWSC- provided on terminal S13 and the output of NAND gate 78 is signal DATAVLFC- provided on terminal B54.

Figure 5:
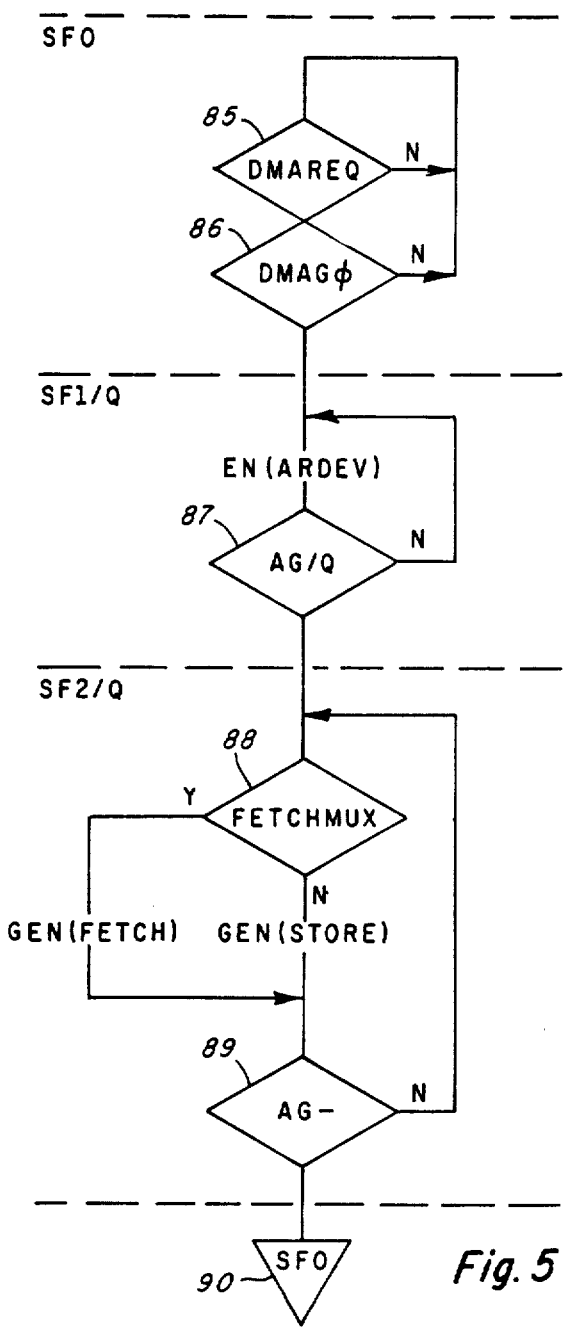
FIG. 5 is a flowchart illustrating the operation of store/fetch controller 12.

FIG. 5 is a flowchart illustrating the operation of store/fetch controller 12 in conjunction with DMAIF 11. At state SF0, block 85 asks the question "Is there a direct memory access request?" If the answer is no, nothing happens. If the answer is yes, then the next question at block 86 is whether there is a signal from PSC28 that it has released memory by signal DMAGO. If the answer is no, nothing happens. If the answer is yes, then controller 12 moves into the SF1/Q state and at block 87, it is determined whether there has been access granted. If the answer is no, the controller waits, and if the answer is yes, it moves into state SF2/Q. At block 88, it is determined whether the FETCH MUX signal is present. If the answer is yes, a fetch cycle is started and if the answer is no, a store cycle is started. In either event, at block 89, it is determined whether there has been an access grant- signal. If the answer is no, the controller waits and if the answer is yes, it goes back to SF0 as indicated at block 90.

The outputs of AND circuits 75–78 indicate data active or not active for the various controllers that have the facility for reading. These outputs tell those controllers that the reading is completed.

Figure 6A:
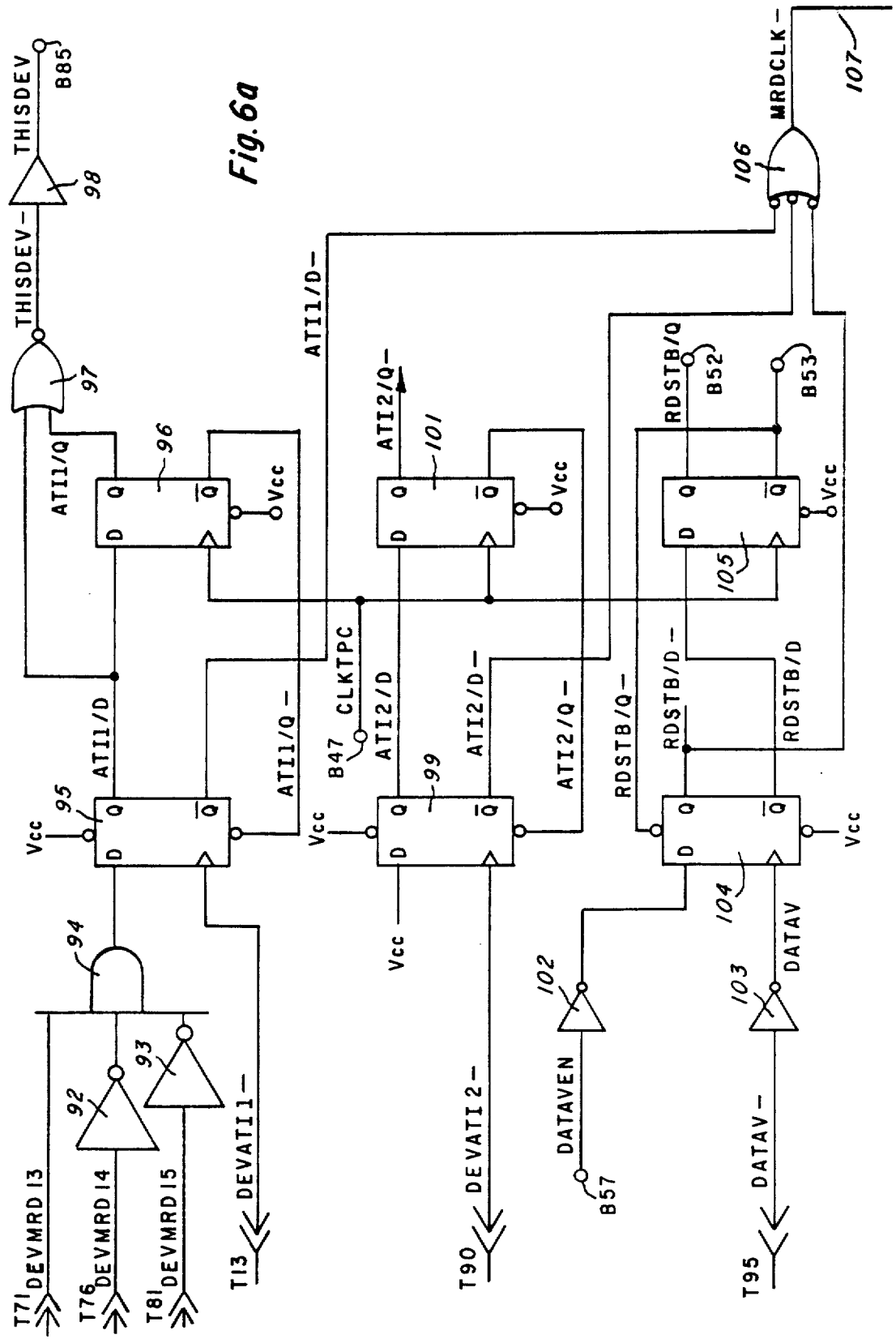

Referring now to FIG. 6A, input signals DEVMRD (device memory read data) 13, 14 and 15 are applied on terminals T71, T76 and T81, respectively. These three signals represent the three highest order bits in the ATI1 (automatic transfer instruction-) word from the CPU and select the intelligent controller. Signal DEVMED 13 is applied directly as an input to AND gate 94, while signals DEVMRD 14 and 15 are inverted through inverters 92 and 93, respectively, and then applied as inputs to AND gate 94. The output of AND gate 94 is applied to the D input of flip flop 95, whose Q output is applied as the D input to flip flop 96 whose Q- output is connected to the clear input of flip flop 95. Along with the three bits from word ATI 1 is sent a strobe signal on terminal T13 identified as DEVATI 1- providing a clock input to flip flop 95. The clock input to flip flop 96 is the signal CLKTPC- developed as shown in FIG. 3. The combination then of flip flops 95 and 96 is simply to synchronize the incoming information with the intelligent controller clock.

The Q output of flip flop 95 is applied as one input to NOR circuit 97 whose other input is supplied by the Q output of flip flop 96 and whose output is inverted through inverter 98 providing the signal THIS DEV (this device selected).

A synchronizer combination is also formed by the combination of flip flops 99 and 101 with the Q output of flip flop 99 being connected to the D input of flip flop 101 and the Q- output of flip flop 101 being connected to the clear input of flip flop 99. The clock input to flip flop 99 is a strobed pulse from the instruction word ATI2 that follows ATI1. The strobe pulse DEVATI2- is applied to terminal TO90 and then to the clock input of flip flop 99. The Q- output of flip flop 99 is applied as an input to NAND circuit 106 which has another input applied from the Q- output of flip flop 95.

Still another synchronizer is provided by the combination of flip flops 104 and 105. A signal DATAVEN on terminal B57 from FIFO 74 of FIG. 4B is inverted through inverter 102 and applied as the D input to flip flop 104. A strobe pulse DATAV- indicating that data is stable is applied from the CPU on terminal TO95, inverted through inverter 103 and applied as a clock input to flip flop 104. The Q- output of flip flop 104 is applied as the D input to flip flop 105 whose Q output provides the signal RDSTB/Q. The Q- output of flip flop 105 is applied as the preset input of flip flop 104. The Q output of flip flop 104 is applied as a third input to NAND circuit 106 whose output, on line 107, is identified as signal MRDCLK-.

Figure 6B:
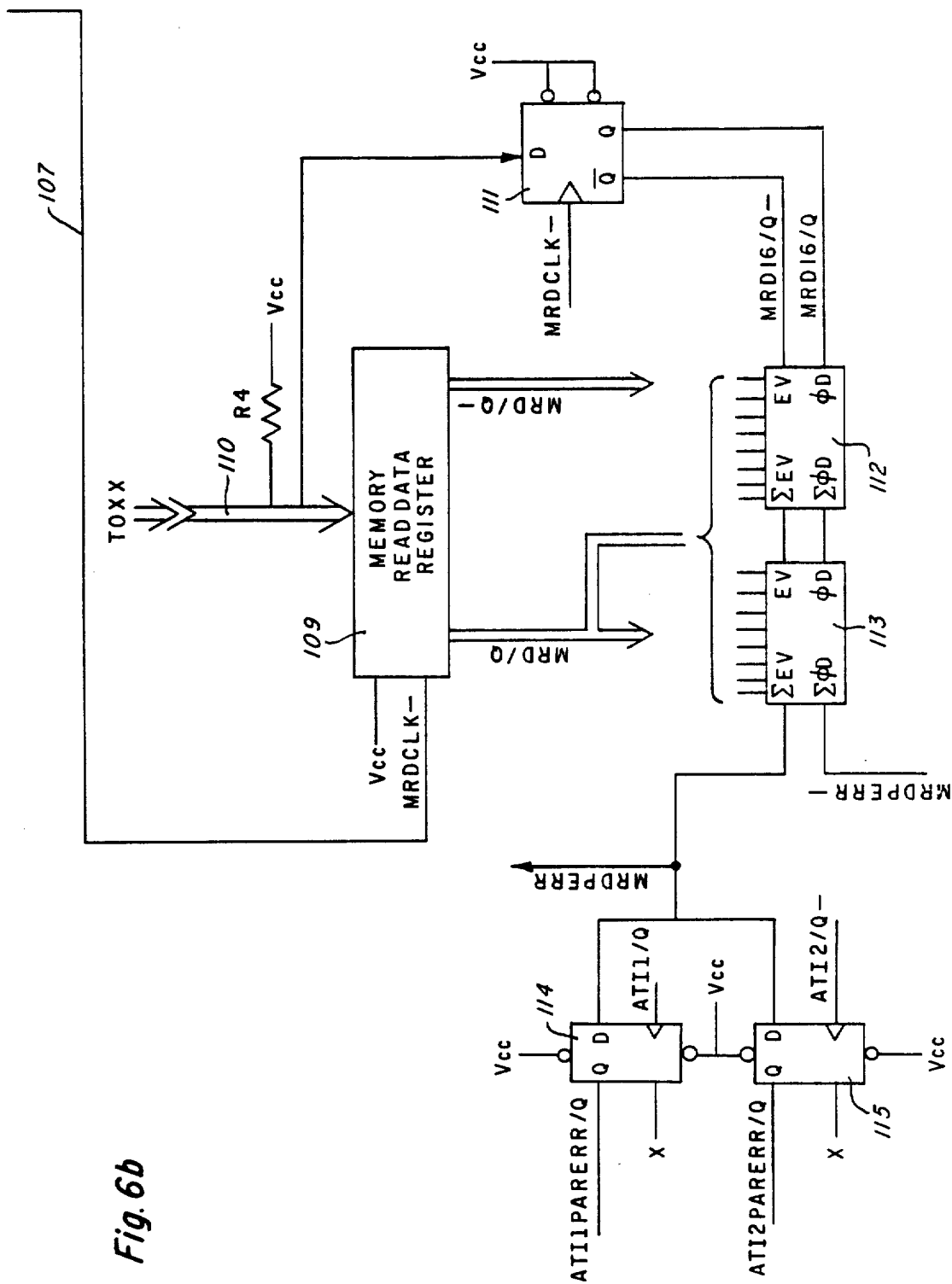

Signal MRDCLK- on line 107 as seen in FIG. 6B is the clock input to memory read data register 109. Bus 110 from connector TOXX from the central memory supplies a 16 bit word to register 109 and provides a parity check bit to flip flop 111. The bus 110 is biased through resistor R4 by voltage VCC. Register 109 provides a 16 bit bus labeled MRD/Q and a bus containing the inverse bits labeled MRD/Q-. Signal MRDCLK- is applied as a clock input to flip flop 111 which has a Q output signal MRD16/Q applied to the odd input of parity generator 112 and a Q- output signal MRD16/Q- applied to the even input terminal of parity generator 112. The summation of even inputs of parity generator 112 is applied to the even input of parity generator 113 and the summation of odd inputs of parity generator 112 is applied as an input to the odd input of parity generator 113. Parity generators 112 and 113 are Texas Instruments types SN74180 9-bit odd/even parity generators described beginning at Page 7-269 of the TTL Data Book #LCC4112, Copyright 1976. The 16 bits carried by bus MRD/Q are connected to the inputs of parity generators 112 and 113. The summation of even inputs of parity generator 113 is signal MRD PERR (memory read data parity error) and is applied to the D inputs of flip flops 114 and 115. The summation of odd inputs of parity generator 113 is the signal MRDPERR-. Flip flop 114 is clocked by signal ATI1/Q- and flip flop 115 is clocked by signal AT12/Q- with the Q outputs providing signals AT11PARERR/Q and AT12PARERR/Q, respectively.

The CPU- supplied instruction words AT11 and AT12 have been mentioned above. Also mentioned were the words from the central memory read into memory read data register 109. These words will be dealt with in detail in the description of the operation of the intelligent controller that follows.

Figure 7A:
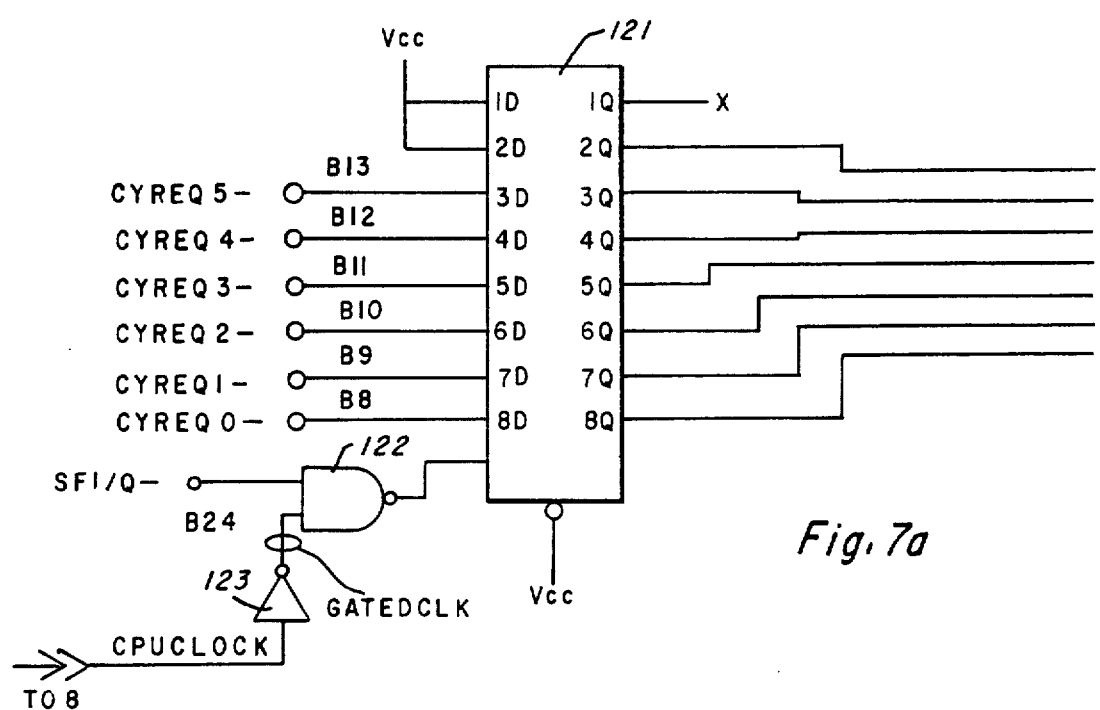
FIGS. 7a, 7b and 7c schematically represent the cycle request/grant logic circuitry of the intelligent controller.
Figure 7B:
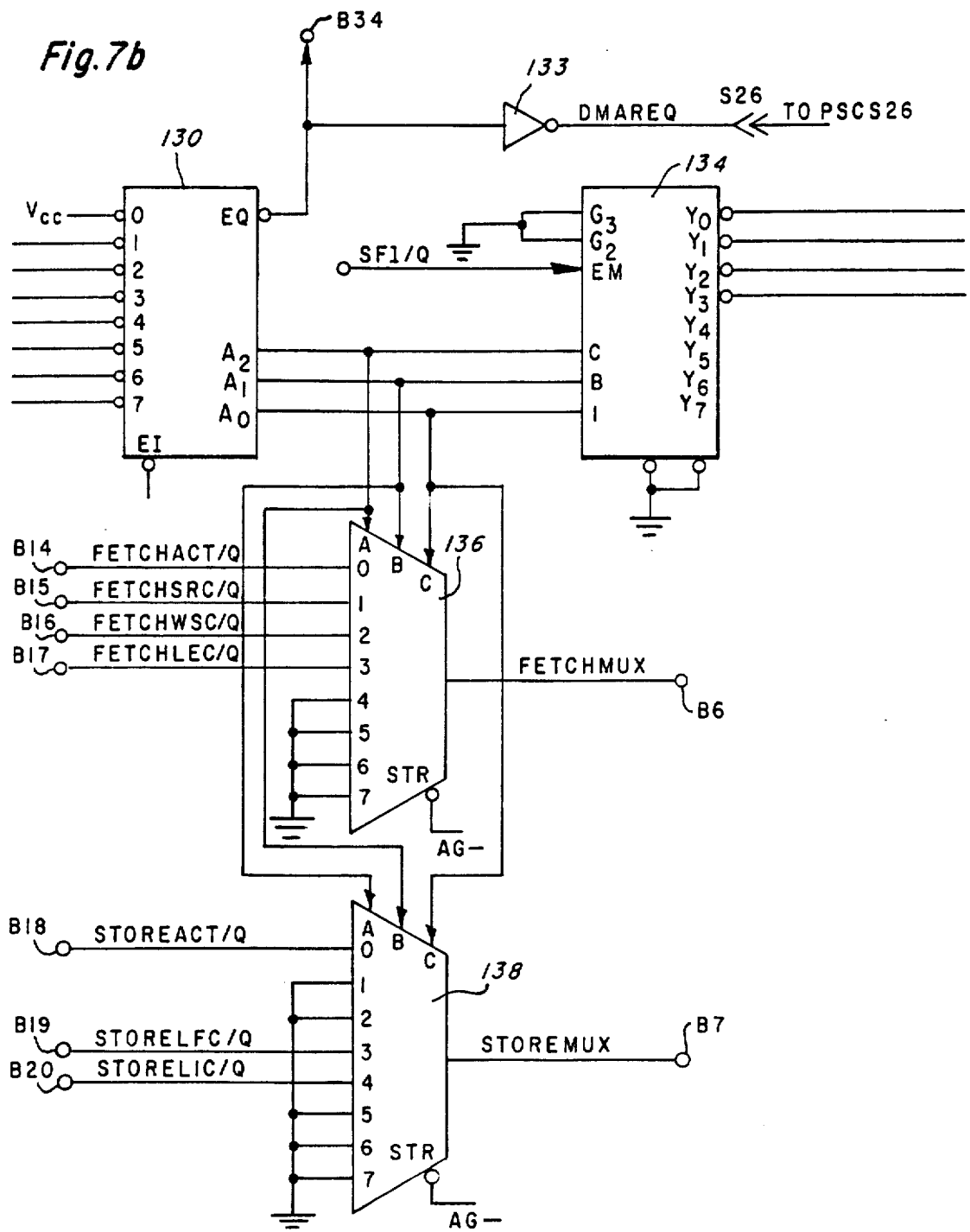
Figure 7C:
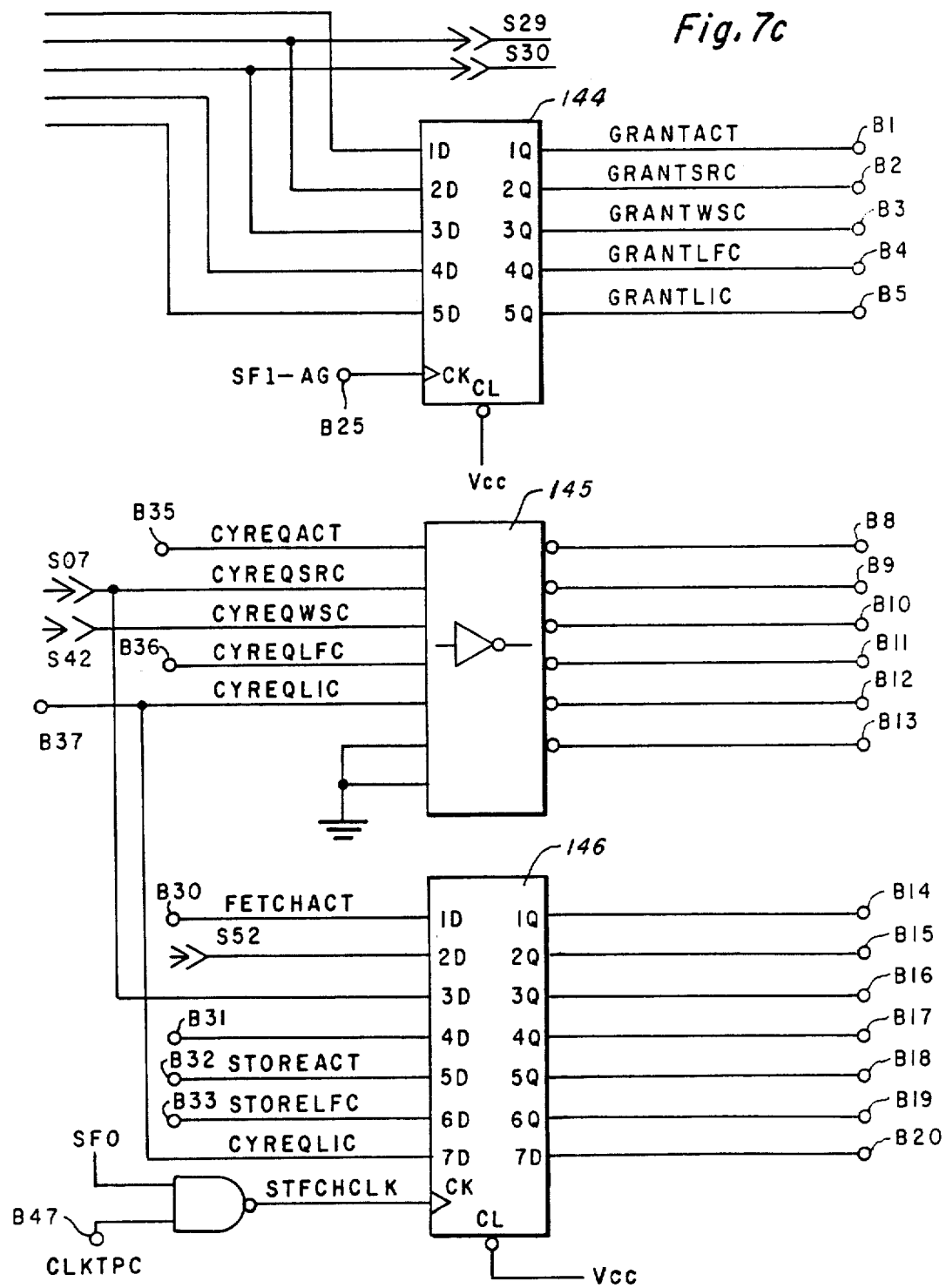

Please refer to FIG. 7C where inverter array 145 is shown having input signals CYREQACT, CYREQSRC, CYREQWSC, CYREQLFC and CYREQLIC applied to input terminals B35, SO7, S42, B36 and B37, respectively. These input signals all come from read-only memories (ROMs) from the various controllers in the intelligent controller. Each of the signals is inverted by an individual inverter of the assembly 145 and is applied inverted on terminals B8–B12. The signal on B13 is high because of its input being grounded.

Referring now to FIG. 7A, the inverted signals from the ROMs are shown applied to flip flop array 121 in reverse order, that is, signal CYREQ0- is applied to terminal D of flip flop 8 of array 121 while signal CYREQ5- is applied to the D terminal of flip flop 3 of array 121. Flip flop array 121 is clocked by the output from NAND circuit 122 which has one input signal SF1/Q- applied to terminal B24 and a second input signal, CPU clock, foom the central processor applied to terminal TO8 and inverted through inverter 123. The output of inverter 123 carries signal GATLDCLK which is available at terminal B26.

FIG. 7B indicates outputs 2Q-8Q of flip flop array 121 being applied to inputs 1-7 of 8-line-to-3-line priority encoder 130 which is a Texas Instruments Type SN74LS148 described beginning at Page 7-151 of the TTL Data Book. The EO output of encoder 130 provides signal DMAREQ which is applied to terminal B34 and inverted through inverter 133 being pplied to terminal S26 as signal DMAREQ-. Outputs A0, A1 and A2 provide signals CYGRANT20, CYGRANT21 and CYGRANT22 applied to input selects A, B and C of decoder 134 which is a Texas Instruments Type SN74LS138 described beginning at Page 134 of the TTL Data Book. The decoder is enabled by signal SF1/Q applied to terminal B28 and then to the enable input of decoder 134. Outputs Y0-Y4 of decoder 134 are applied to the inputs 1D-5D of flip flop array 144 of FIG. 7C. Flip flop outputs 1Q-5Q of flip flop array 144 provide output signals GRANTACT-, GRANTSRC-, GRANTWSC-, GRANTLFC- and GRANTLIC- provided on terminals B1-B5, respectively. The flip flop array 144 is clocked by signal SF1-AG applied to terminal B25 from FIG. 4A and then to the clock input.

Flip flop array 146 of FIG. 7c has inputs applied on terminals 1D-7D by signals FETCHACT applied to terminal B330, FETCHSRC applied to terminal S52, CYREQWSC applied to terminal S42, FETCHLFC applied to terminal B31, STOREACT applied to terminal B32, STORELFC applied to terminal B33 and CYREQIIC applied to terminal B37, respectively. Outputs 1Q-7Q of flip flop array 146 are applied to terminals B14-B20, respectively.

On FIG. 7B, terminals B14-B17 are shown connected to inputs 0-3 of data multiplexer 136, Texas Instruments Type SN74LS151 described beginning at Page 7157-157 of the TTL Data Book. The other inputs of multiplexer 136 are grounded and data select signals A, B and C are provided by outputs A2, A1 and A0 of encoder 130, respectively. A strobe input is supplied by the ACCESS GRANTED signal from the CPU, AG-. The output signal, FETCH MUX is supplied to terminal B6.

Multiplexer 138 is identical to multiplexer 136, having identical select inputs and strobe input. Data inputs are supplied by the signals on terminals B18, B19 and B20 which are applied to inputs 0, 3, and 4, with all other inputs grounded. The output signals STORE MUX is applied to terminal B7.

The operation of the apparatus described in FIGS. 7a-7c is straightforward. That is, a signal from the appropriate ROM provides, for example, the input CYREQACT on terminal B35 which is inverted through inverter 145, applied to terminal B8 and then to input 8D of flip flop 121. This signal is eventually applied to input 7 of decoder 130, providing an output signal on A0 which is applied to the C data select of multiplexers 136 and 138.

If it had been desired to read from memory, then a FETCHACT signal would also be applied to terminal B30 connected to flip flop array 146, providing an output on terminal B14. Terminal B14 is connected to the 0 input of multilexer 136 and with data select C active, the FETCH MUX signal on terminal B6 will then be high. Also, one of inputs Y0-Y4 of decoder 134 is activated, resulting in the signal from the 1Q output of flip flop array 144, GRANTACT- being high. Any other requests would be done in like manner. It should be pointed out that in the case of WSC26 and LIC15, only a FETCH cycle and a STORE cycle, respectively, is possible in this preferred embodiment and therefore each requires a simple cycle request.

Figure 8:
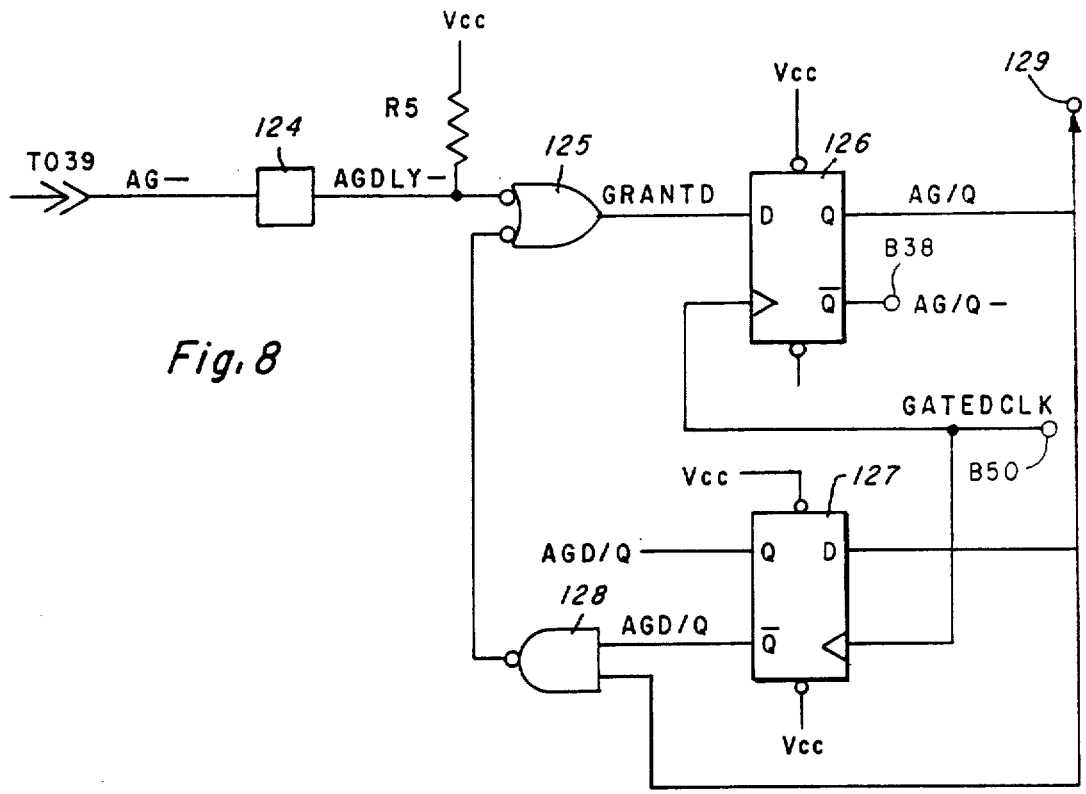
FIG. 8 is a synchronizing circuit for synchronizing the signal access granted, with the system clock.

FIG. 8 is a synchronizing circuit for synchronizing the signal AG- which is provided on terminal TO39 with the intelligent controller clock. Incombing signal AG- is delayed through delay circuit 124 and is applied as one input of NAND circuit 124. Supply voltage VCC is applied through resistor R5 to the output of delay circuit 124. The output of NAND circuit 125 sets flip flop 126 which is clocked by the signal GATEDCLK described above. the Q output of flip flop 126 is signal AG/Q which is the D input to flip flop 127 and also the output supplied on terminal 129. further, the Q output of flip flop 126 is one input to NAND circuit 128 whose other input, signal AGD/Q- is supplied from the Q- output of flip flop 127. The clock input to flip flop 127 is also supplied by the signal GATEDCLK. The output of NAND circuit 128 serves as the other input to NAND circuit 125.

Figure 9:
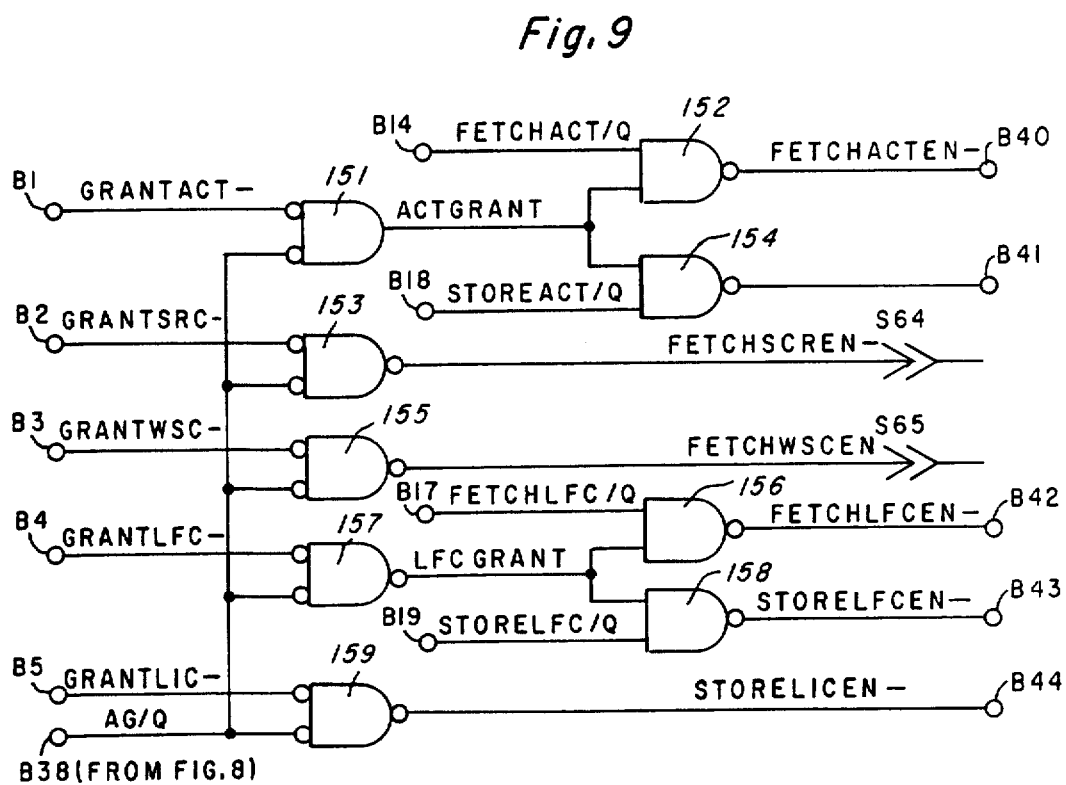
FIG. 9 is a schematic diagram of the interrupt request/recognize circuitry.

FIG. 9 is a schematic diagram of the interrupt request/recognize circuitry for enabling the central memory to act. GRANTACT-, from terminal B1 of FIG. 7C, is applied to one input of NOR circuit 151. Signal GRANTSRC- from terminal B2, is applied to one input of OR circuit 153 and GRANTWSC- signal from terminal B3 is applied as one input to OR circuit 155. Grant LFC- signal from terminal B4 is applied as one input of NOR circuit 157. Signal GRANTLIC-, from terminal B5, is one input to OR circuit 159. Signal AG/Q- from terminal B38 of FIG. 8 is applied as the other input to NOR circuits 151 and 157, and OR circuits 153, 155 and 159.

The output of NOR circuit 151 is connected as one input of NAND circuits 152 and 154, with the other input to NAND circuit 152 being the FETCHACT/Q output from terminal B14 of FIG. 7C, and the other input to NAND circuit 154 being the STOREACT/Q signal from terminal B18. The outputs of NAND circuits 152 and 154 are signals FETCHACTEN- applied to terminal B40 and STOREACTEN-, applied to terminal B41, respectively. The output of OR circuit 153 is signal FETCHSRGEN-, applied to terminal S64. The output from OR circuit 155 is signal FETCHWSCEN- applied to terminal S65. The output from NOR circuit 157 is applied to the input of each of NAND circuits 156 and 158. the other input to NAND circuit 156 is the FETCHLFC/Q signal from terminal B17 and the other input to NAND circuit 158 is the STORELFC/Q signal from terminal B19. The output of NAND circuit 156 is the FETCHLFCEN- signal applied to terminal B42 and the output of NAND circuit 158 is the STORELFCEN- signal applied to terminal B43. The output of OR circuit 159 is signal STORELICEN-, applied to terminal B44.

Figure 10A:
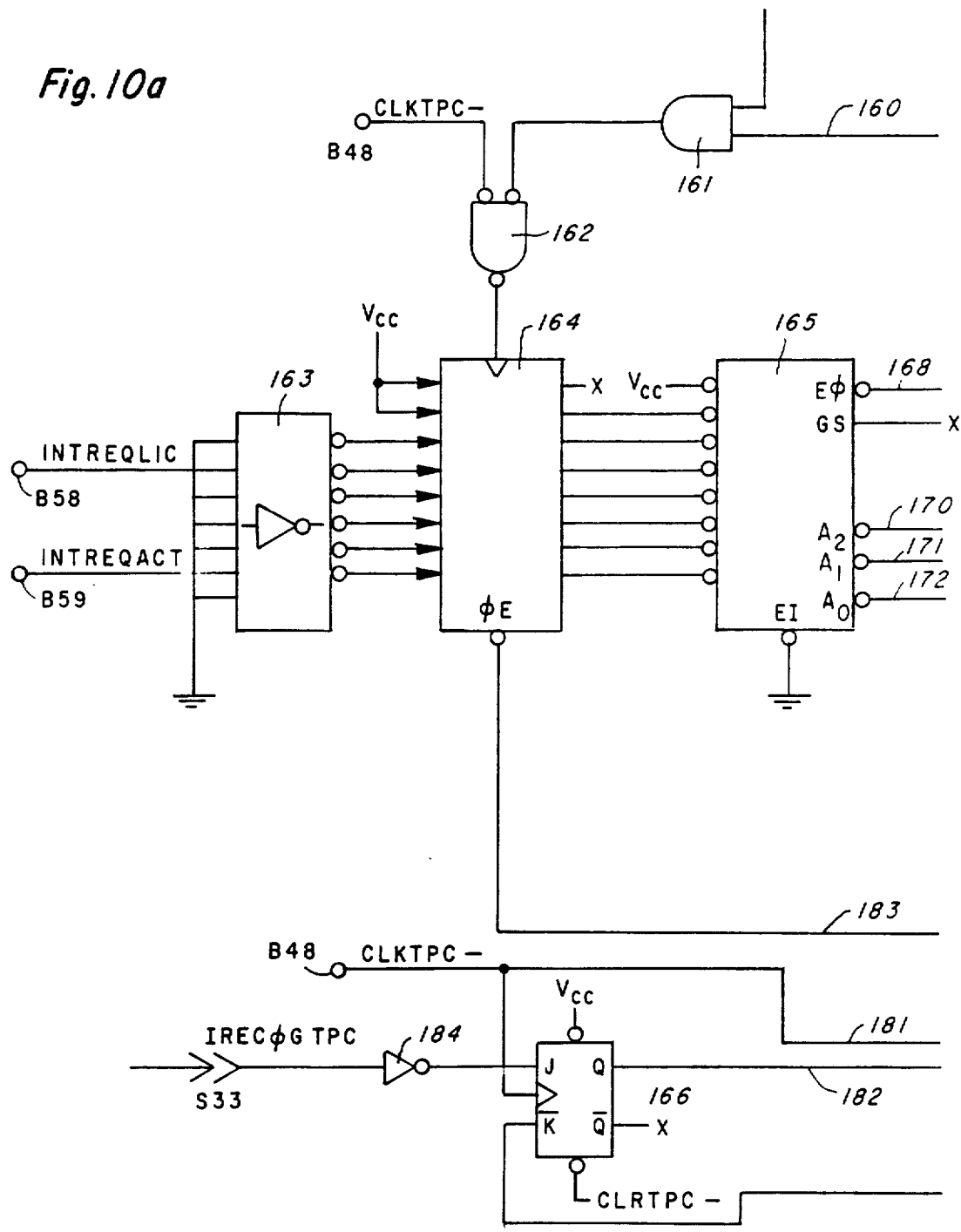
FIGS. 10a and 10b illustrate the prioritizing circuit for the interrupt request.
Figure 10B:
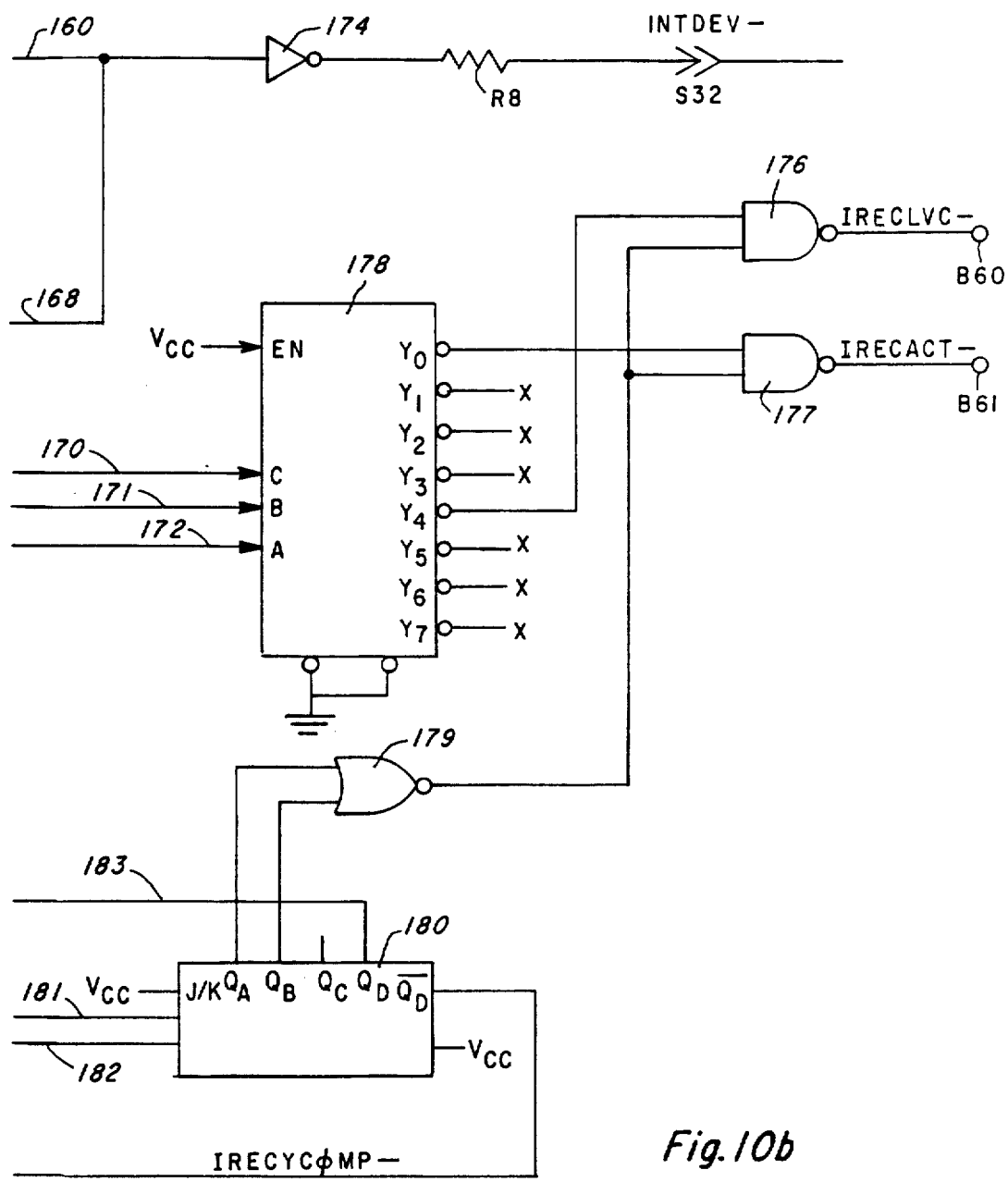

In operation then, this circuit simply provides memory enable signals in response to certain combination of input request signals and grant signals. FIGS. 10a and 10b illustrate, in block form, the circuit for prioritizing the interrupt request from the separate controllers. While provision is made for a total of seven interrupts to be serviced, only two controllers in this preferred embodiment require interrupts. They are the list interrupt controller 15 having signal INTREQLIC from its ROM impressed on terminal B58, and the activation controller 13 having signal INTREQACT from its ROM impressed on terminal B59, each of which is inverted through inverter array 163. The other inputs to inverter array 163 are grounded. The inverted outputs are connected to the inputs of flip flop array 164 whose outputs are connected to the inputs of priority encoder 165. Output EO of encoder 165 is connected to line 168 and inverted through inverter 174, passed through resistor R8 to terminal S32 as the signal INTDEV-. Line 168 is also connected to line 160 which provides the EO output as an input to AND circuit 161 whose other input is the clear controller signal CLRTPC from terminal B67. The output of AND circuit 161 provides one input to OR circuit 162 whose other input is the signal CLKTPC- impressed on terminal B48. The output of OR circuit 162 provides the clock input signal for encoder 164.

The inputs to decoder 165 is provided from encoder 164. Decoder 165 is identical to decoder 134 of FIG. 7b. Decoder 178, capable of providing eight outputs from the three inputs provided on lines 170–172 from encoder 165, provides two outputs, one on its terminal Y0 which provides one input to OR circuit 177 and another on its terminal Y4, which provides one input to OR circuit 176. Signal IRECOGTPC-, which is an interrupt recognize from the CPU, is impressed on terminal S33 and inverted through inverter 184 whose output is applied to the J input of flip flop 166. The clock input to flip flop 166 is provided from terminal B48 and is the signal CLKTPC-. The Q output from flip flop 166 is impressed on line 182 which provides an input on terminal S/L of 4-bit parallel-access shift register, TI Type SN74LS195A, which is described in the TTL Data Book beginning on Page 7-324. The $Q_D$- output is connected to the K input of flip flop 166. The clear input to flip flop 166 is provided by the signal CLRTPC-. The $Q_D$ output of shift register 180 is impressed on line 183 which provides the output control input to flip flop array 164. Outputs $Q_A$ and $Q_B$ are the inputs to NOR circuit 179 whose output serves as the other input to each of OR circuits 176 and 177 which provide, respectively, output signals IRECLIC- on terminal B60 and IRECACT- on terminal B61.

This circuit, described in FIGS. 10a and 10b then simply selects one of two possible interrupts and provides an output signal for causing the desired interrupt.

Activation Controller

Figure 11B:
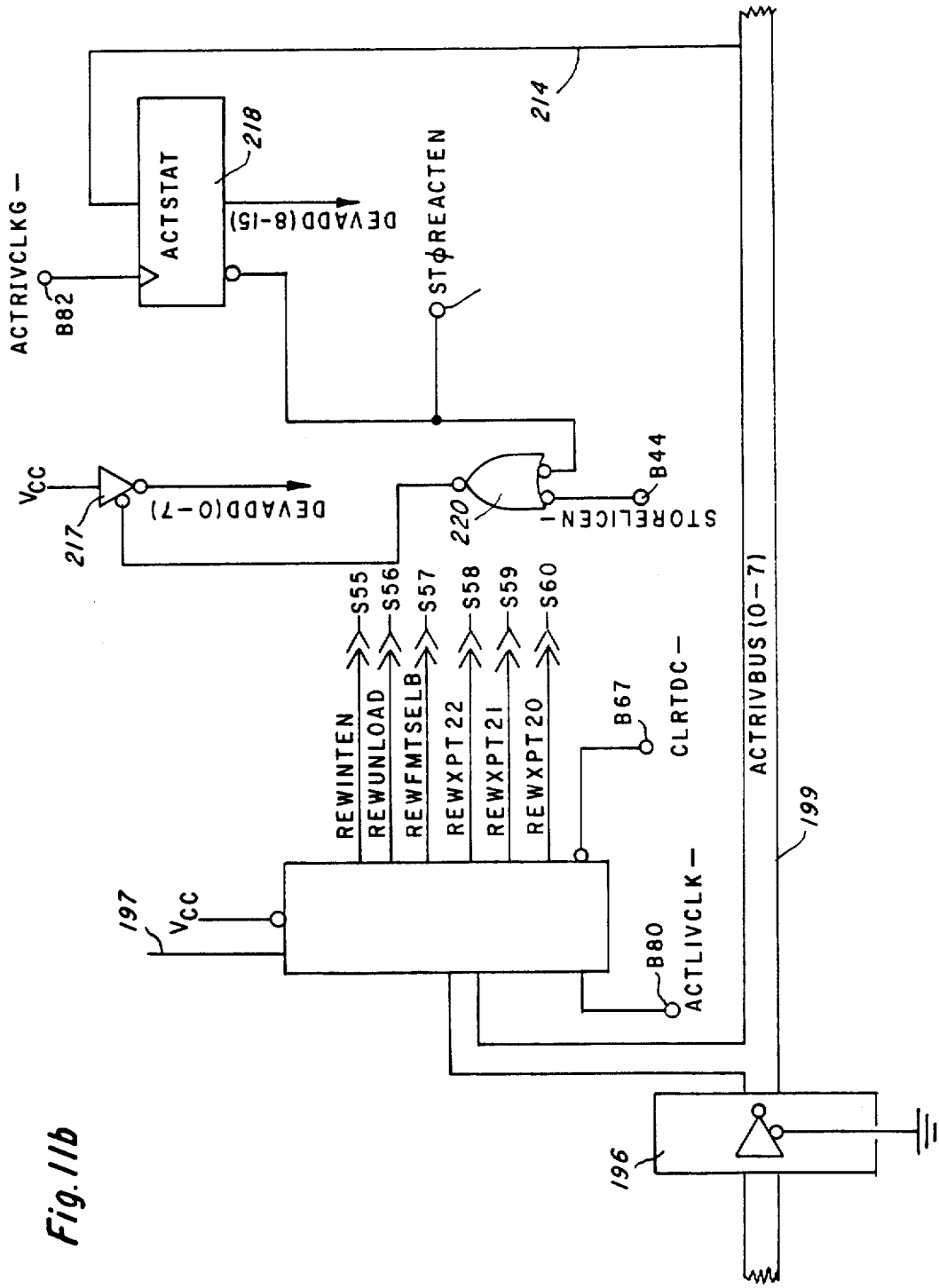

FIGS. 11a–c depict, in block form, ACT 13 of FIG. 1a.

The heart of the activation controller 13 is microprocessor 200 which, in this preferred embodiment, is a Signetics Type 8X300. It is a sequence controller as well as a process controller. Operatively connected to microprocessor 200 is read-only memory array 202, having instruction register (IR) section 203, interface vector left (IVL) section 204, interface vector right (IVR) section 205 and control (CTL) section 206. In this preferred embodiment, memory array 202 has 512 words, each word being 32 bits in length. The addressing is done on the 12 bit ACTAR bus connecting microprocessor 200 with ROM 202. Sixteen bits of the 32 bit word addressed in ROM 202 is the instruction register portion and is utilized by microcprocessor 200 which receives the 16 bit words over bus ACTIR connecting ROM 202 with microprocessor 200. In this preferred embodiment, the memory 202 is made up of TI Type 74S472 Programmable Read-only Memory with a three output. Four bits of each word is sent from section 204 to flip flop array 210 which provides the signals ACTIVL (03) Q. Four bits from section 205 are sent to flip flop array 209 which provides the signals at its output ACTIVR (03) Q. Eight bits from the section 206 are used for control functions and are described in FIG. 13. The contents of the ROM 202 is shown in accompanying FIG. 12.

The control section 206 provides output signals CLRBUSYEN, ATI2SAVE, CYREQACT, STOREACT, FETCHACT and INTREQACT.

Signal MCCLK from microprocessor 200 is inverted through inverter 207 and applied as the clock inputs to each of flip flop arrays 209 and 210. Signal CLKACT is applied to terminal B66, amplified through amplifier 222 and applied to terminal X1 of microprocessor 200, such terminal also being connected through resistor R10 to voltage VCC. Signal CLKACT is also inverted through inverter 221 and applied to terminal X2 of microprocessor 200, such terminal being connected through resistor R11 to voltage VCC. Output terminal SC of microprocessor 200 is inverted through inverter 208 and applied to terminal B62 as signal ACTSC-. Voltage regulator 201 is connected to the microprocessor 200 to supply voltages in accordance with the manufacturer's specifications. Signal CLRTPC- is applied to terminal B67 and also to the reset terminal of microprocessor 200.

In FIG. 11A, signals MRD01/Q, MRD02/Q and MRD03/Q are inputs to AND circuit 190 whose output is signal ILLTYPAFUN which indicates an illegal instruction. Buffer line drivers and arrays 191, 192 and 193, in this preferred embodiment, are Texas Instruments Type SN74LS240, having inverted three-state outputs. Array 191 is selectively activated by signal ACTLIVSEL0-, which is one of the outputs from flip flop array 210. Array 191 has eight inputs for inversion, those inputs being the output from ANDcircuit 190, signal ATIBUSY/Q, signal LAL=F, signal MRDPERR, ATI1PARERR/Q, ATI2PARERR/Q, PATIPROG/Q and WATIPROG/Q.

Array 192 is selectively activated by signal ACTLIVSEL 1 which also is one of the outputs from flip flop array 210. The inputs to array 192 are signals MRD00/Q, MRD01/Q, MRD02/Q, MRD08/Q, MRD09/Q, MRD10/Q, MRD11/Q and MRD12/Q. These signals are all data from memory signals, while the signals applied to array 191 are test condition signals.

Array 193 is activated by signal ACTLIVSEL3-, also an-output from flip flop array 210. The input signals to array 193 are CYGRANTACT-, DATAVACT-, IRECACT-, PSCYBSY-, ATI2LATCH-, THISDEV- and REWPEND/Q. The inverted outputs from arrays 191–193 are all connected to ACTLIV bus 194. Bus 194 is connected to bus 195 which in turn is connected to microprocessor 200. Bus 194 is inverted through inverter array 196 which is identical to arrays 191–193. The output bus from inverter 196 is ACTRIV bus 199. Connected to bus 199 is bus 198 which is an input to flip flop array 197 whose output signals are REWINTEN, REWUNLOAD, REWFMTSELB, REWXPT22, REWXPT21, and REWXPT20, impressed on output terminals S55–S60, respectively. Flip flop array 197 is clocked by signal ACTLIVCLK4- impressed on terminal D80. The clear input is from signal CLRTPC-, impressed on terminal B67.

Bus 219 is connected to bus 199 and also to ACT status address register 218, which is clocked by signal ACTREVCLK6-, impressed on terminal B82. Register 218 is cleared by the signal STOREACTEN- impressed on terminal B41.

Signal STOREACTN-, impressed on terminal B41, is also connected to one input of AND circuit 220 whose other input is the signal STORELICEN- from terminal B44. The output of AND circuit 220 is used as the gating input for inverter array 217 which is identical to arrays 191 and 193, but shown as a single inverter. Eight inputs from voltage VCC are inverted by selective inverter 217 having eight output signals DEVADD0 through DEVADD7. The eight outputs from register 218 are signals DEVADD8 through DEVADD15.

Figures 13, 14:
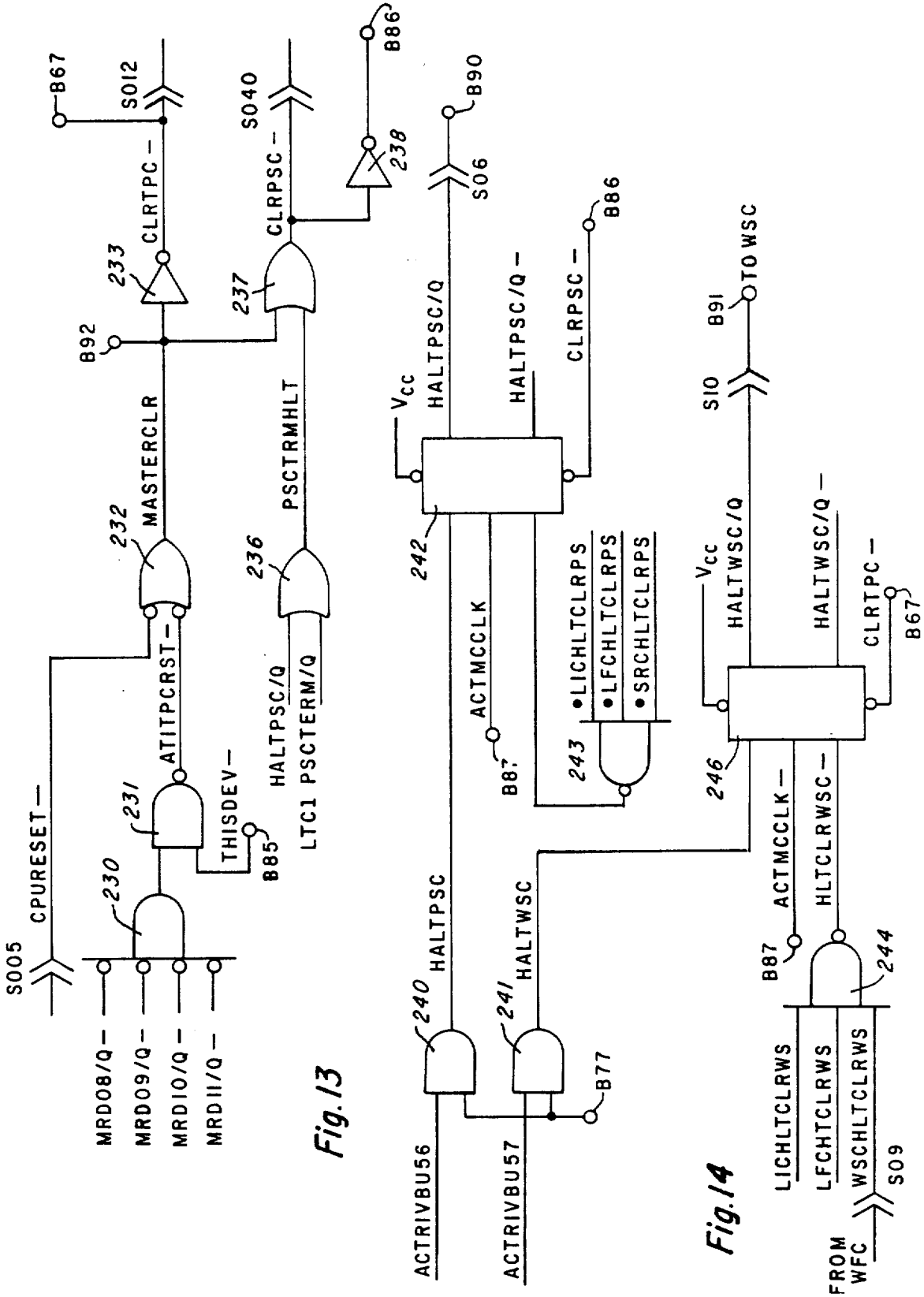
FIG. 13 illustrates reset logic for the entire intelligent controller.
FIG. 14 is a schematic of the HALT logic.

FIG. 13 illustrates reset logic which is developed in the activation controller 13 section. Memory data signals MRD08/Q- through MRD11/Q- are applied as inputs to NOR circuit 230 whose output provides one input to NAND circuit 231. The other input to NAND circuit 231 is the signal THISDEV impressed on terminal B85. The output of NAND circuit 231 provides one input to NAND circuit 232 whose other input is signal CPURESET- from terminal S005 from the CPU. The output of NAND circuit 232 is inverted through inverter 233 and provides signal CLRTPC- which is impressed on terminals S012 and B67. The output from NAND circuit 232 is also connected as one input to OR circuit 237. The other input to OR circuit 237 is provided by OR circuit 236, whose two inputs are signals HALTPSC/Q and PSCTERM/Q, both from the list interpret controller 15. The output of OR circuit 237 is impressed on terminal S040 and is inverted through inverter 238, providing output signal CLRSPC-, impressed on terminal B86.

FIG. 14 is a schematic of the HALT logic which is developed in the activation controller 13. From the ACT controller right interface vector bus (ACTRIV-BUS), lines 6 and 7 are provided as inputs to AND circuits 240 and 241, respectively, each of whose other input is signal ACTRIVCLK1 from terminal B77. The output of AND circuit 240 provides the J input to flip flop 242 and the output of AND circuit 241 provides the J input to flip flop 246. Flip flops 242 and 246 have their clock inputs provided by signal ACTMCCLKfrom terminal B87. The K- input of flip flop 242 comes from the output of NAND circuit 243 whose inputs are provided by signals LICHLTCLRPS, from the read-only memory of LIC15, signal LFCHLTCLRPS from the ROM of LFC14 and signal SRCHLTCLRPS on terminal S08 from system read controller.

The K input of flip flop 246 is provided by the output of NAND circuit 244 whose inputs are signals LICHLTCLRWS from the ROM of LIC15, signal LFCHLTCLRWS from the ROM of LFC14 and signals WSCHLTCLRWS on terminal S09 from WSC26. The clear input of flip flop 242 is signal CLRPSC- from terminal B86. The clear input to flip flop 246 is provided by signal CLRTPC- from terminal B67.

Figure 15:
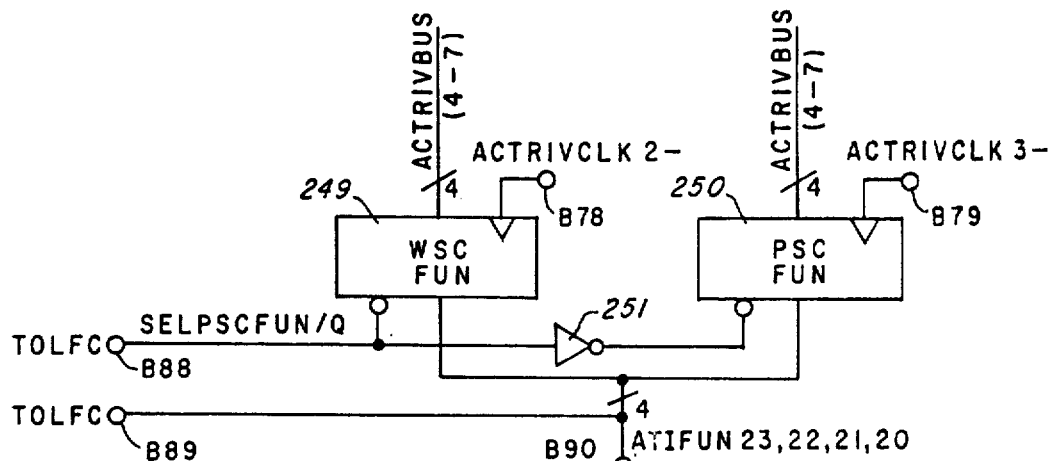
FIG. 15 illustrates the ATI function output.

FIG. 15 illustrates the ATI function output from the ACT right interface vector bus (ACTRIVBUS) lines 4–7 which provide inputs to WSC function flip flop array 249 and to PSC function flip flop array 250. Array 249 is clocked by signal ACTRIVCLK2- from terminal B78 and array 250 is clocked by signal ACTRIVCLK3- from terminal B79. The output control for array 249 is provided by signal SELPSCFUN/Q from terminal B88, which signal is inverted through inverter 251 and provides the output control to array 250. The four outputs from each of arrays 249 and 250 are connected together and then connected to output terminal B90 which is connected to list buffer 17, carrying signals ATIFUN23, 22, 21 and 20. The signals are provided to the list fetch controller 14 and connector B89.

Figure 16:
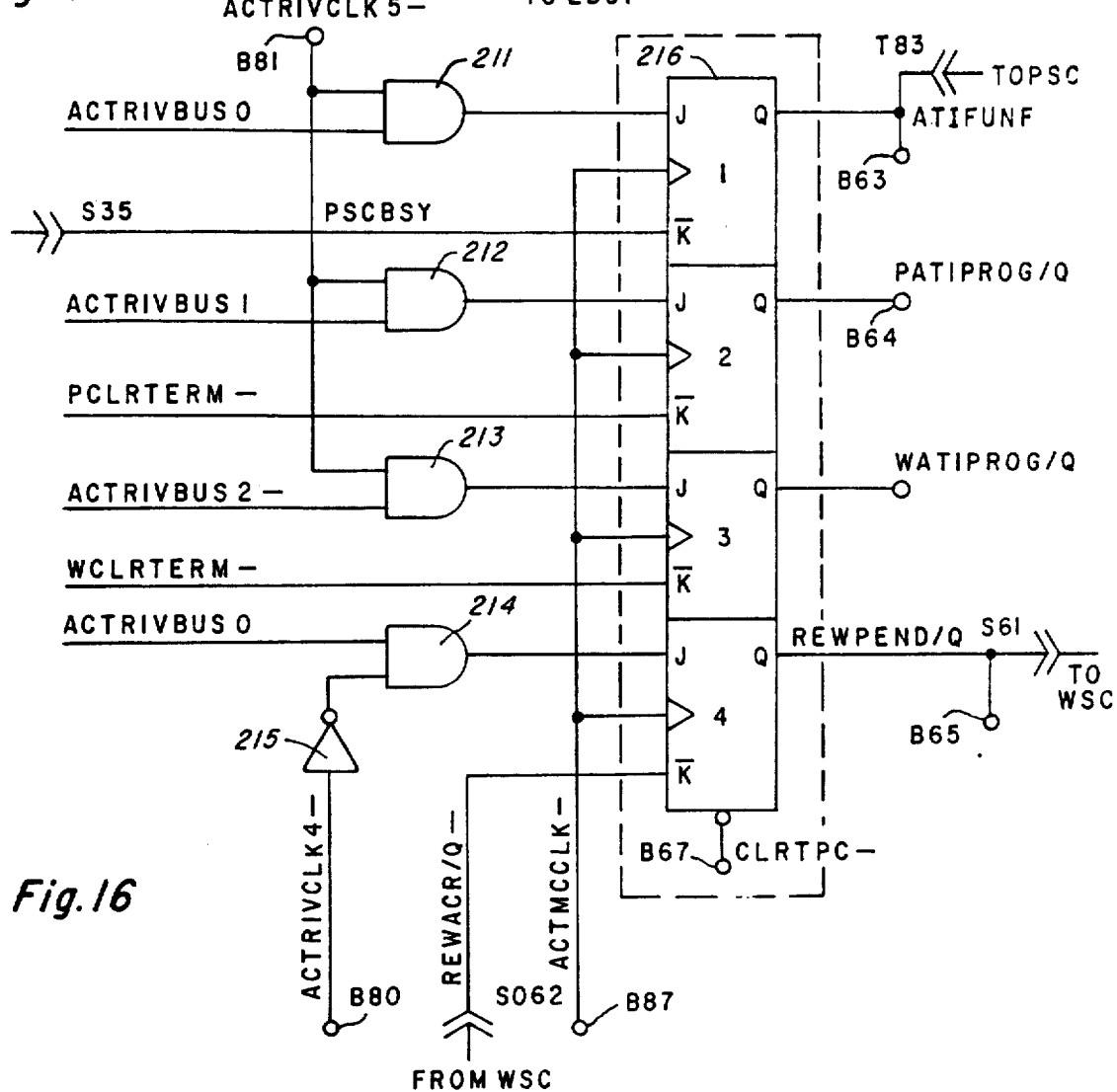
FIG. 16 illustrates the development of signals from the ACT.

FIG. 16 illustrates circuitry for the development of more signals in the activation controller 13. Lines 0, 1, and 2 from ACTRIV bus 199 provide one input to each of AND circuits 211, 212 and 213, respectively, with line 0 also providing one input to AND circuit 214. The other input to each of AND circuits 211-213 is signal ACTRIVCLK5- from terminal B81. The output of each of AND circuits 211–214 provide the J inputs to flip flop array 216. The other input to AND circuit 214 is signal ACTRIVCLK4- from terminal B80, inverted through inverter 215. The clock input to array 216 is provided by signal ACTMCCLK- from terminal B87 and the reset input is provided by signal CLRTPC- from terminal B67. The Q output of section 1 of array provides signal ATIFUNF to terminals T83 and B63. The Q output of section 2 is signal PATIPPROG/Q provided on terminal B64. The Q output of section 3 is signal WATIPROG/Q. The Q output from section 4 is signal REWPEND/Q provided on terminal S61.

Figures 17A, 17B:
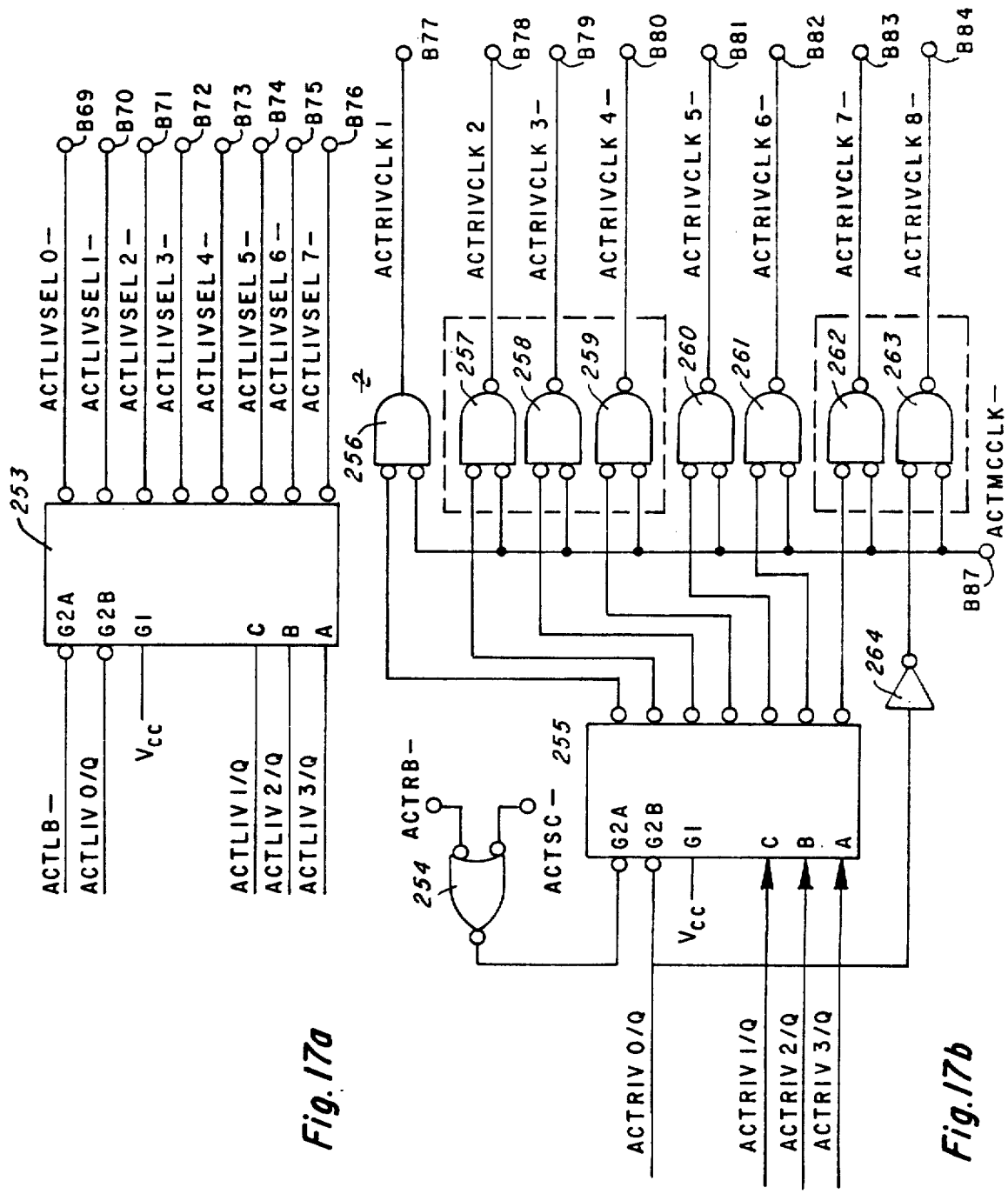
FIGS. 17a and 17b schematically illustrate the development of control signals for the ACT.

FIG. 17a shows the ACT controller left interface vector address logic. This logic is provided by a 3 to 8 line decoder 253 which is a Texas Instruments Type 74S138 described at page 7-134 of the TTL Data Book. Signal ACTLP- provides the G2A enable, and signal ACTLIV0/Q provides the G2B enable input, with voltage VCC being applied to enable input G1. Signals ACTLIV1/Q through ACTLIV3/Q are applied as the select inputs, providing one of eight possible output signals, namely, ACTLIVSEL0- through ACTLIVSEL7- on output terminals B69–B76, respectively.

FIG. 17b depicts the address logic for the ACT CONTROLLER RIGHT INTERFACE VECTOR. Decoder 255 is identical to decoder 253 and has select inputs provided by signals ACTRIV1/Q through ACTRIVc/Q. AND circuit 254 has inputs provided by signals ACTRB- and ACTSC- with its output providing the G2A enable input to decoder 255. Signal ACTRIV0/Q provides the G2B enable signal. The G1 enable signal is provided by voltage VCC. The combination provides one of eight possible output signals on output lines which provide inputs to NOR gate 256, OR gates 257, 258 and 259, NOR gate 260, and OR gates 261 and 262, respectively. OR gate 263 has one input from inverter 264 whose input is provided by signal ACTRIV0/Q. The other input to each of these gates is provided by the signal ACTMCCLK-from terminal B87. The output from each of these gates is signals ACTRIVCLK1, ACTRIVCLK2-, ACTRIVCLK3-, ACTRIVCLK4-, ACTRIVCLK5, ACTRIVCLK6-, ACTRIVCLK7-, and ACTRIVCLK8-, applied to terminals B77–B84, respectively.

Figure 18:
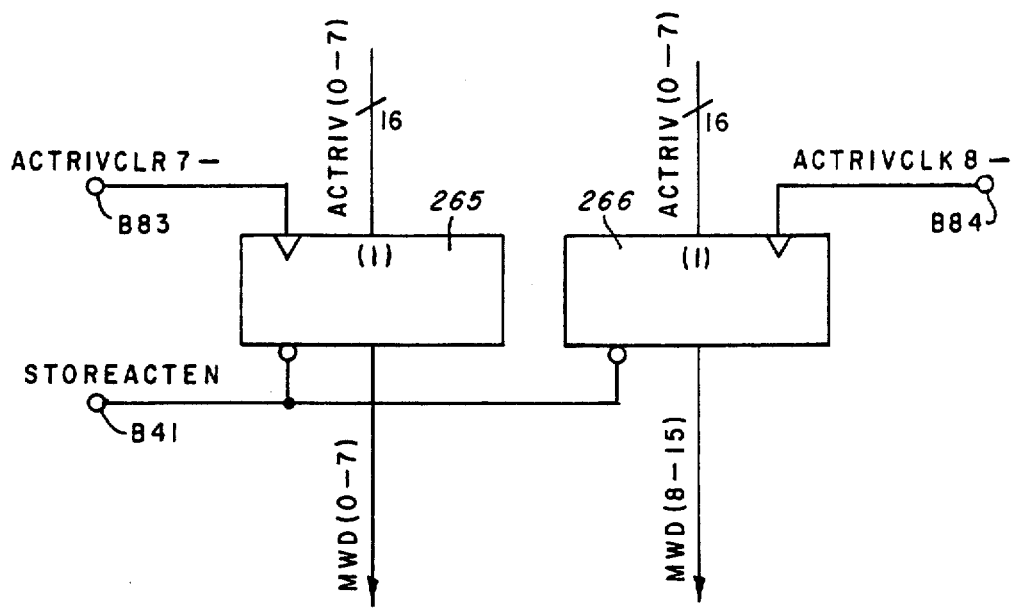
FIG. 18 is the ACT status store register.

FIG. 18 shows ACT status store circuitry with input signals ASTRIV(0–7) from the ACT controller right interface vector bus 199 applied to each of flip flop arrays 265 and 266. Array 265 is clocked by signal ACTRIVCLK7- from terminal B83 and array 266 is clocked by signal ACTRIVCLK8- from terminal B84. Both of these devices have their output control provided by signal STOREACTEN- from terminal B41.

The output signals from array 265 are DEVMWD(07) and from array 266 RDEVMWDWD(815).

Figure 19:
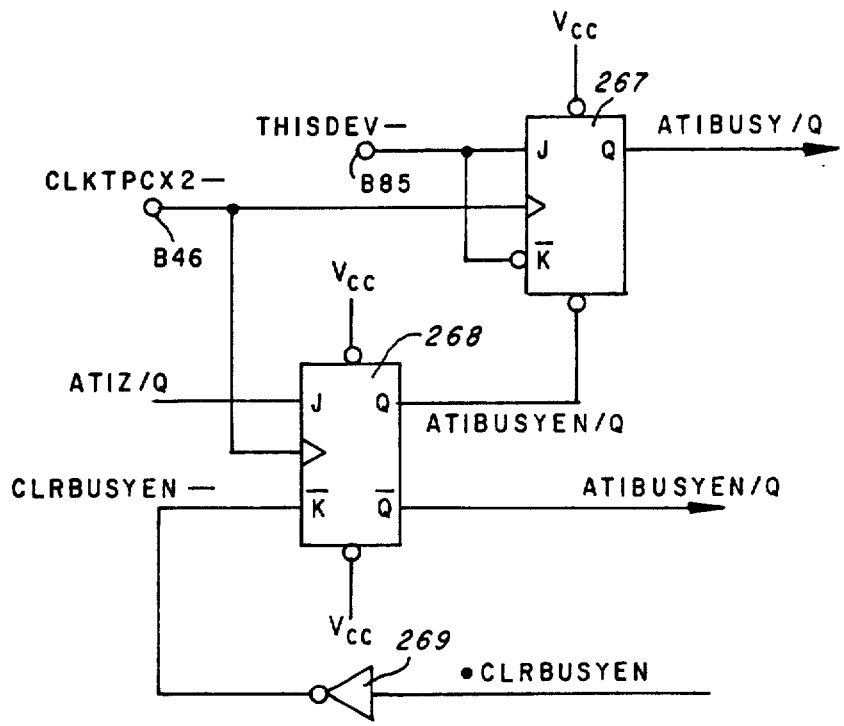
FIG. 19 is a schematic of the ATI BUSY signal development.

FIG. 19 shows the development of the ATI BUSY signal. THISDEV signal from terminal B85 provides the J and Kinputs to flip flop 267 whose Q output is signal ATIBUSY/Q. Flip flop 268 has applied to its J input signal ATI2/Q and has the ROM signal CLRBUSYEN from section 206 of ROM 202 inverted through inverter 269 and applied to its K- input. The output of flip flop 268 provides the reset input to flip flop 267 and the Q-output provides signal ATI2LATCH-.

Figure 20:
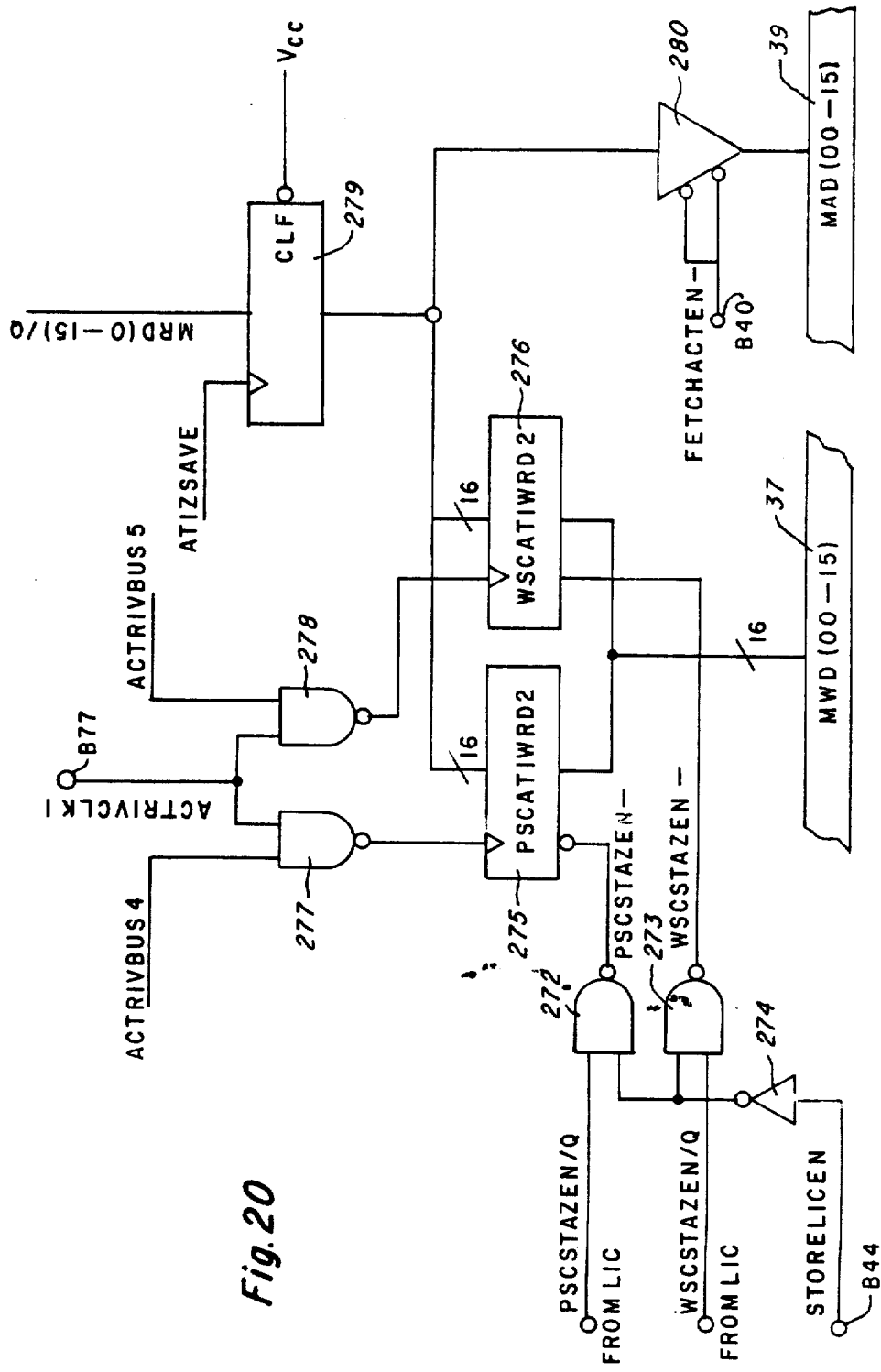
FIG. 20 is the circuit for storing ATI2.

FIG. 20 illustrates the appropriate circuitry for saving and storing the ATI word 2.

Signals PSCSTA2EN/Q and WSCSTA2EN/Q from the list interpret controller 15 are applied as inputs to AND gates 272 and 273, respectively. Signal STORELICEN- from terminal B44 is inverted through inverter 274 and applied as the other input to each of NAND gates 272 and 273. Signal ACTRIVCLK1 from terminal B77 provides one input to each of NAND gates 277 and 278. Signal ACTRIVBUS4 provides the other inputs to NAND gate 277 and ACTRIVBS5 provides the other input to NAND gate 278. The output of NAND gate 277 provides the clock input to PSCATIWRD2 to flip flop array 275. The output from NAND gate 278 provides the clock input to WSCATIWRD2 flip flop array 276. Memory data signals MRD(015)/Q provide inputs to flip flop array 279 whose clock input is provided by signal ACTI2SAVE from control CTL section 206 of ROM 202. The output signals provide inputs to flip flop arrays 275 and 276. The output signals from array 279 also provide inputs to buffer array 280 whose gate inputs are provided by the signal FETCHACTEN- from terminal B40 and whose outputs provide the DEVADD(0015) bus 282. The outputs of arrays 275 and 276 are connected together and form DEVMWD(0015) bus 281.

Figure 21:
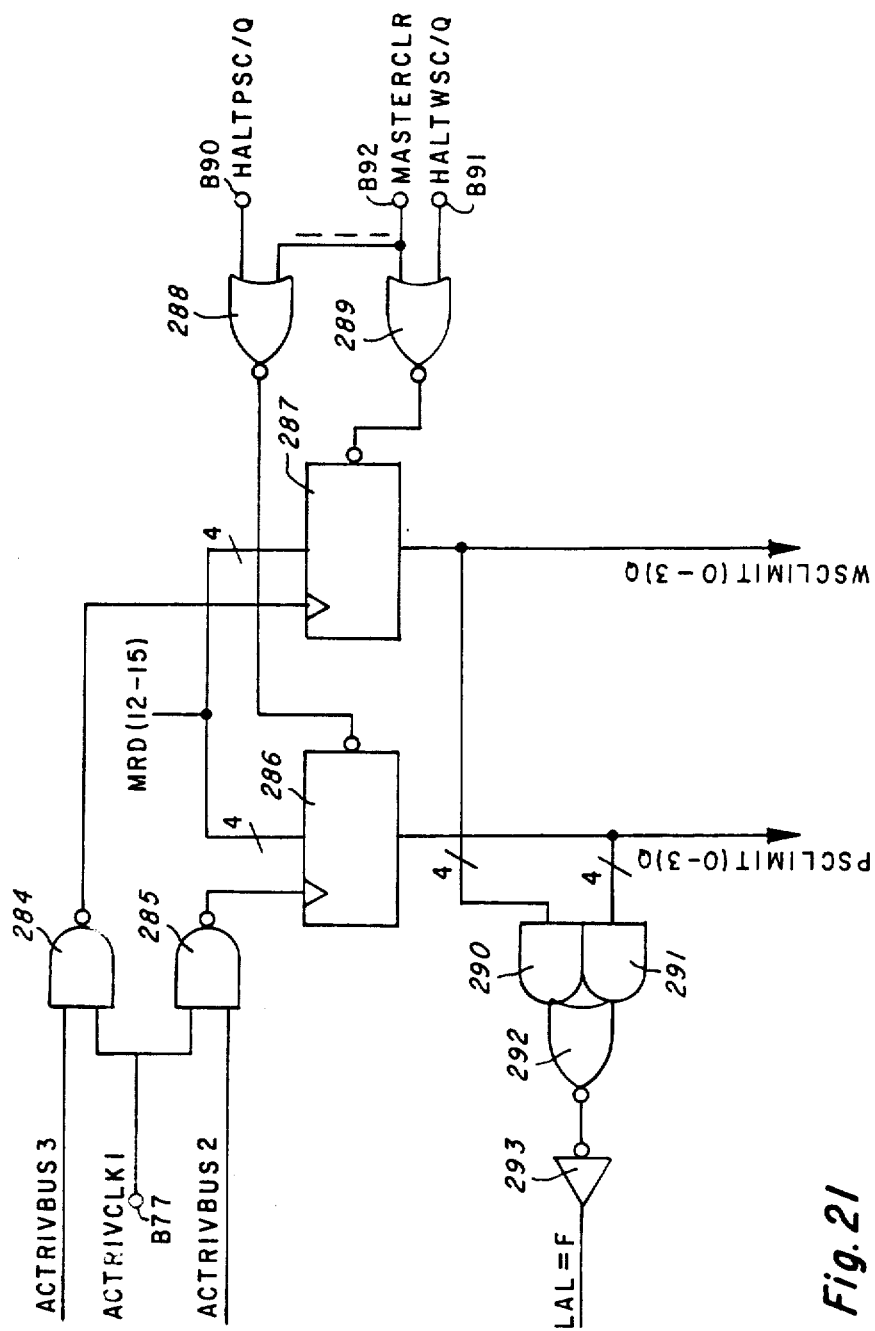
FIG. 21 illustrates the circuitry for providing the PSC and WSC list limits.

In this preferred embodiment, the look ahead list (LAL) of instructions that may be placed in list buffer 17 is limited to 256 16-bit words. This is organized into 16 blocks of 8 words each for the write sequence controller 26 and 16 blocks of 8 words each for the process sequence controller 28. FIG. 21 illustrates the circuitry that is employed in the ACT controller to bring out from the central memory the number of lisrs desired. That number is determined by bits 12–15 from the central memory shown as MRD(12–15)/Q providing four inputs to each of flip flop arrays 286 and 287. Lines 3 and 2 of bus 199 provide one input to each of NAND gates 284 and 285, respectively, whose other input is provided by the signal ACTRIVCLK1 from terminal B77. The output from AND circuit 284 provides a clock input to flip flop array 287 and the output from NAND gate 285 provides a clock input to flip flop array 286. Signal HALTPSC/Q from terminal B90 provides one input to NOR gate 288 and signal HALTWSC/Q from terminal B91 provides one input to NOR gate 289. The other input to each of these NOR gates 288 and 289 is provided by the signal MASTERCLR from terminal B92. The output of NOR gate 288 provides the clear input to flip flop array 286 and the output from NOR gate 289 provides the clear input for flip flop array 287. The outputs from flip flop arrays 286 and 287 are signals PSCLIMIT(0-3)Q and WSCLIMIT (0-3)Q, respectively, providing inputs to AND gates 290 and 291, respectively. AND gates 290 and 291 provide the inputs to NOR gate 292, whose output is inverted through inverter 293 and provides the signal LAL=F. Signal LAL=F provides a control input to inverter array 191.

Figure 22:
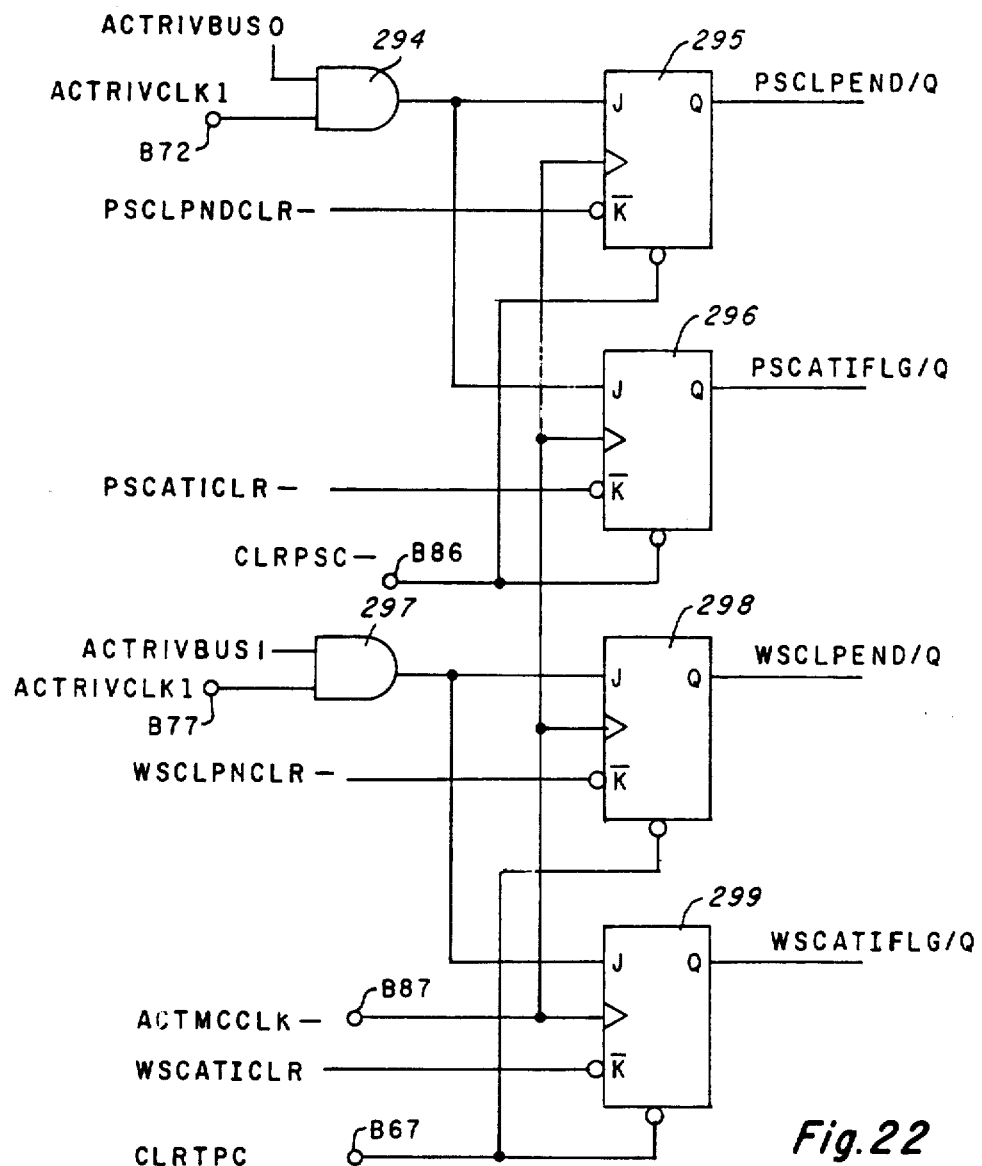
FIG. 22 illustrates L pending and ATI flags.

FIG. 22 illustrates the generation of certain flag signals. Lines 0 and 1 from bus 199 provide one input to each of AND circuits 294 and 297 whose other inputs are provided by the signal ACTRIVCLK1 from terminal B77. THe output from AND gate 294 provides the J input to flip flops 295 and 296. The clear inputs are provided by signal CLRPSC from terminal B86. The K-input to flip flop 95 is provided by signal PSCLPNDCLR- from the process sequence controller 28. The K- input of flip flop 296 is provided by signal PSCATICLR- from PSC28.

The output of AND gate 297 provides the J input to each of flip flops 298 and 299. The clear input to flip flops 298 and 299 is provided by the signal CLRTPC- from terminal B67. The K- input of flip flop 298 is the signal WSCLPNDCLR and the K-input on flip flop 299 is provided by signal WSCATICLR-, both of these signals coming from write sequence controller 26.

The Q output of flip flop 295 is signal PSCLPEND/Q; the Q output from flip flop 296 is signal PSCATIFLG/Q the Q output of flip flop 298 is signal WSCLPEND/Q; the Q output from flip flop 299 is WSCATIFLG/Q. These output signals are flags which are set by ACT13 and reset or cleared by list fetch controller 14 ROM bits.

LIST FETCH CONTROLLER

As indicated in FIG. 23a, LFC14 is designed around microprocessor 300 which, in this preferred embodiment, is a Signetics Type 8X300, identical to microprocessor 200 of ACT controller 13. ROM 302 is connected to microprocessor 300 in the same fashion as ROM 202 is connected to microprocessor 200 of ACT13. The ROM is divided into three sections, the LFCIR section 303 for instructions, the IVR, IVL section 304 and the control section 305. This latter section provides eight inputs to flip flop array 306 whose clear input is provided by the signal CLRTPC- and whose clocksignal is provided by signal LFCMCCLK- from terminal B99. Its output signals are PSCCHNLDEN, WSCCHNLDEN, LFCHLTCLRPS, LCHLTCLRWS, CYCREQLFC, STORELFC and FETCHLFC. Four outputs transmitting signals LFCIVR(0-3) and four outputs transmitting signals LFCIVL(0-3) are connected from section 304 to the inputs of flip flop arrays 308 and 309 respectively. Flip flop arrays 308 and 309 are clocked by a signal from terminal MCCLK of microprocessor 300 which is inverted through inverter 310 and designated signal LFCMCCLK-. Output signals LFCIVR(0-3)/Q and LFCIVL(0-3)/Q are provided from flip flop arrays 308 and 309, respectively. Address bus LFCAR is provided by the microprocessor 300 to the ROM 302 which responds with the instructions for microprocessor 300 in the form of a 16 bit word transmitted over bus LFCIR. Eight bits are transmitted as IVR, IVL signals and the remaining eight bits are control signals, the word being 32 bits long as indicated for the ACT controller 13. Voltage regulator 301 is attached to the microprocessor 300 as in the case of voltage regulator 201 with respect to microprocessor 200 of ACT13. The clock signal CLK8X300 from terminal B66 is inverted through inverter 330 and applied to terminal X2, the output of inverter 330 being biased through resistor R15 to voltage VCC. Signal CLK8X300 is also buffered through buffer 331 whose output is biased through resistor R14 to voltage VCC and which is applied as an input to terminal X1 of microprocessor 300.

Microprocessor 300 provides an output from its SC terminal, inverted through inverter 311 which provides the signal LFCSC-. The RB- terminal of microprocessor 300 provides signal LFCRB- and the LB terminal provides output signal LFCLB-. The signal CLRTPC- from terminal B67 is applied to the RST- terminal and voltage VCC is applied to the HALT- terminal of microprocessor 300. LFCLIVBUS(0-7)bus 312 is connected to microprocessor 300.

As in the case of ACT13, this bus 312 is for inputs which are applied through inverter arrays 316, 317, 318 and 319. Input signals are identified as DPEND#GTLMT and WPEND#GTLMT, from list fetch controller 14; PSCLPENDQQ, WSCLPEND/Q, PSCATIFLG/Q, WSCATIFLG/Q, ATIFUN23, ATIFUN22, and ATIFUN21 from ACT13; HALTPFC/Q-, HALTWSC/Q-, MRDPERR-, CYGRANTLFC-DATAVLFC- and LFCLBFGNT/Q- from LFC14. Bus 312 is also inverted through inverter array 320 whose output is LFCRIVBUS(0-7) of 321. Bus 321 provides inputs to flip flop array 326 which is clocked by signal LFCRIVCLK4- from terminal B96 to provide output signals ATI20E-, PSCCAROE-, WCSCCAROE- and LWIMWDOE-. Bus 321 is connected to the inputs of flip flop array 327 which is clocked by signal LFCRIVCLK3- from terminal B96 to provide output signals LFCPSCSEL/Q, SELPSCFUN/Q, PCLRTERM-, WCLRTERM-, PSCATICLR-, WSCATICLR-, PSCLPNDCLR-, and WSCLPNDCLR-. Bus 321 provides an input to list buffer 17, to be described later.

Figure 23B:
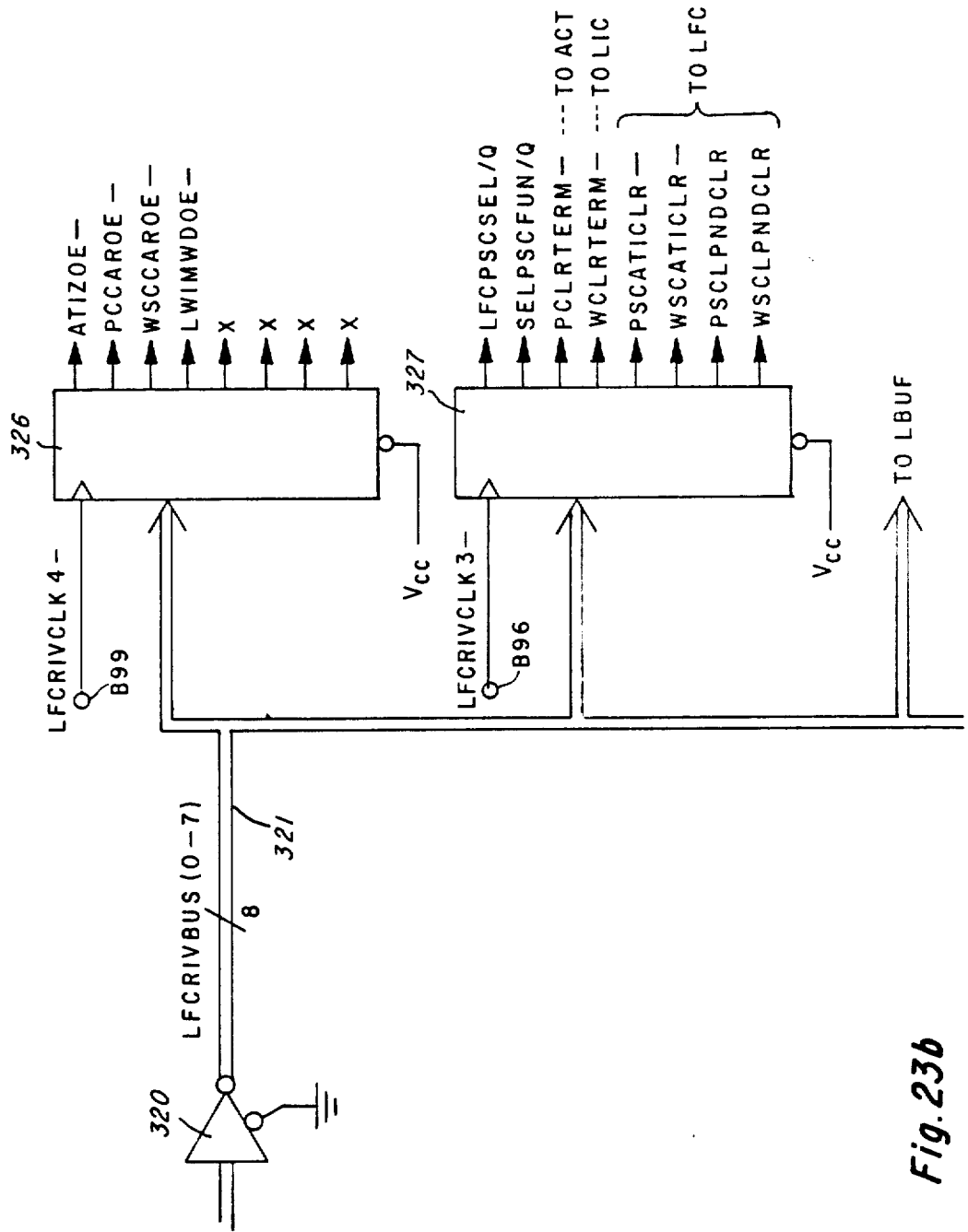
Figure 23C:
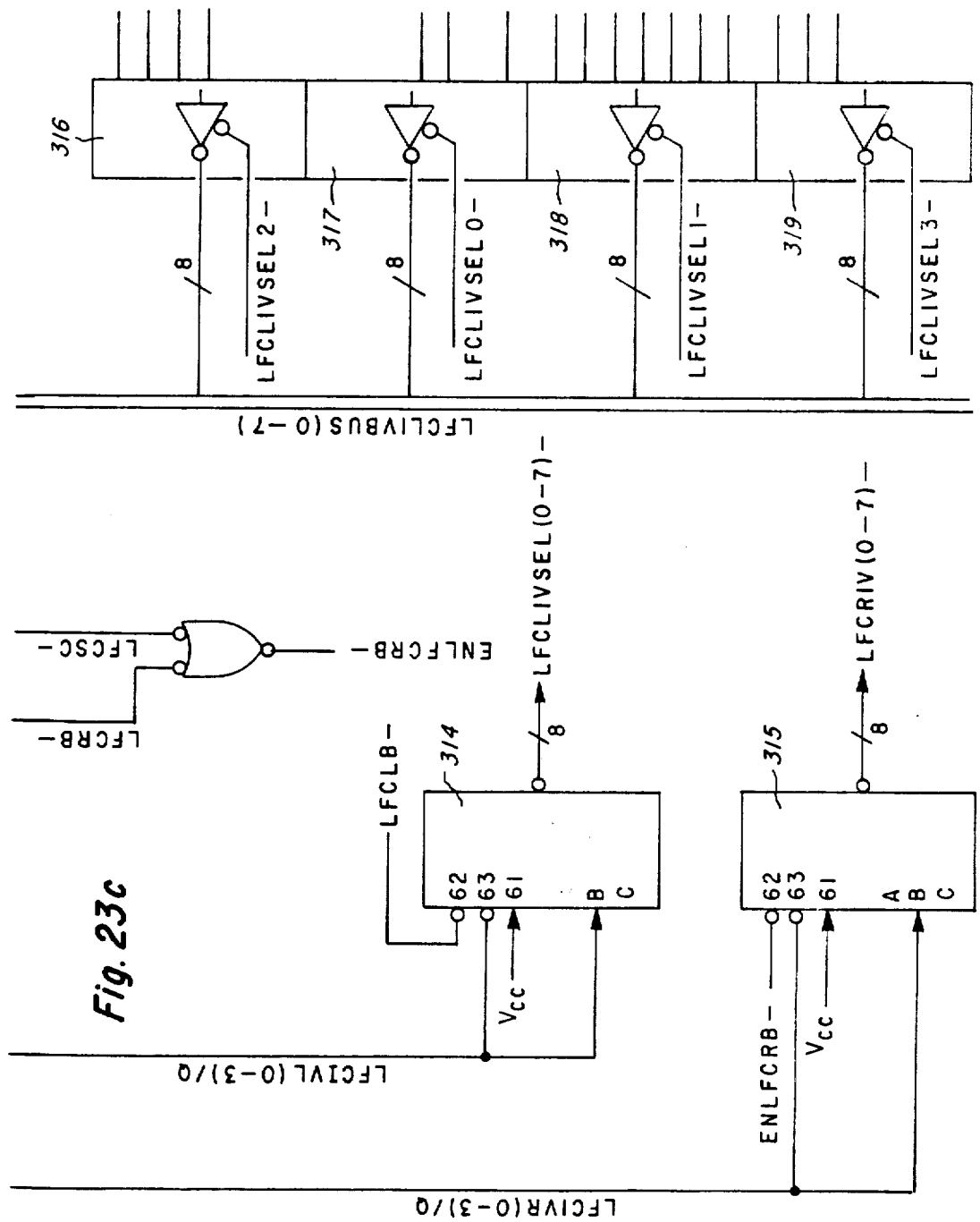
Figure 23D:
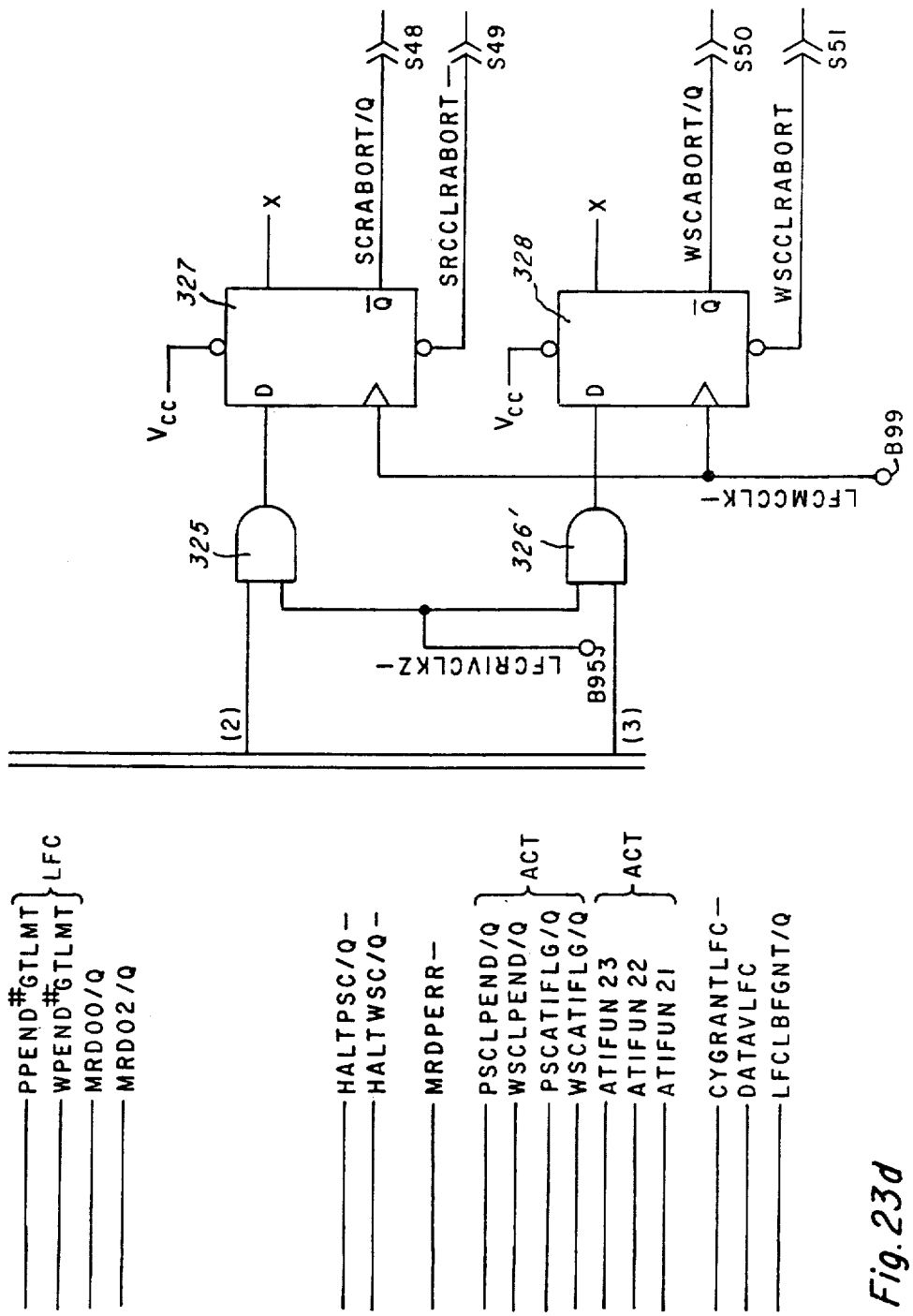

As shown in FIG. 23d, bus 321 provides one input, line 2, to AND gate 325 and another input, line 3, to AND gate 326' each of whose other input is provided by clock signal LFCRIVCLK2-from terminal B95. The output of AND gate 325 provides the D input to flip flop 327 which has a clear input provided by signal SRCCLRABORT- from terminal S49 and which provides a Q- output signal SRCABORT/Q to terminal S48. The output of AND gate 326 provides the D input to flip flop 328 which is cleared by signal WSCCLRABORT-from terminal S51 and which provides an output on its Q- terminal that is signal WSCABORT/Q- to terminal S50.

The circuitry for LFCSTORE/FETCH address is shown in FIGS. 24a-24d. Signal DATAVLFC- from terminal B54 is inverted through inverter 333 and applied as one input to each of NAND gates 330 and 331 whose other inputs are provided by signals PSCCHNLDEN and WSCCHNLDEN, respectively, outputs from flip flop array 306. The output of NAND gate 330 serves as the clock input to flip flop array 335 while the output of NAND gate 331 serves as the clock input of NAND gate 336. Central memory, bits 00-07 are applied as inputs to each of flip flop arrays 335 and 336. Flip flop arrays 335 and 336 form a part of a chain address register which is the address at which a new routine or program is started without referring back to the CPU. Bits 00-07 of word ATI2SAVE from flip flop 220, reflecting one output from the control section 206 of ROM 202 of ACT13, is applied through buffer array 334. Buffer array 334 is gated by signal ATI20E- from flip flop array 326 as shown on FIG. 23b.

Figure 24A:
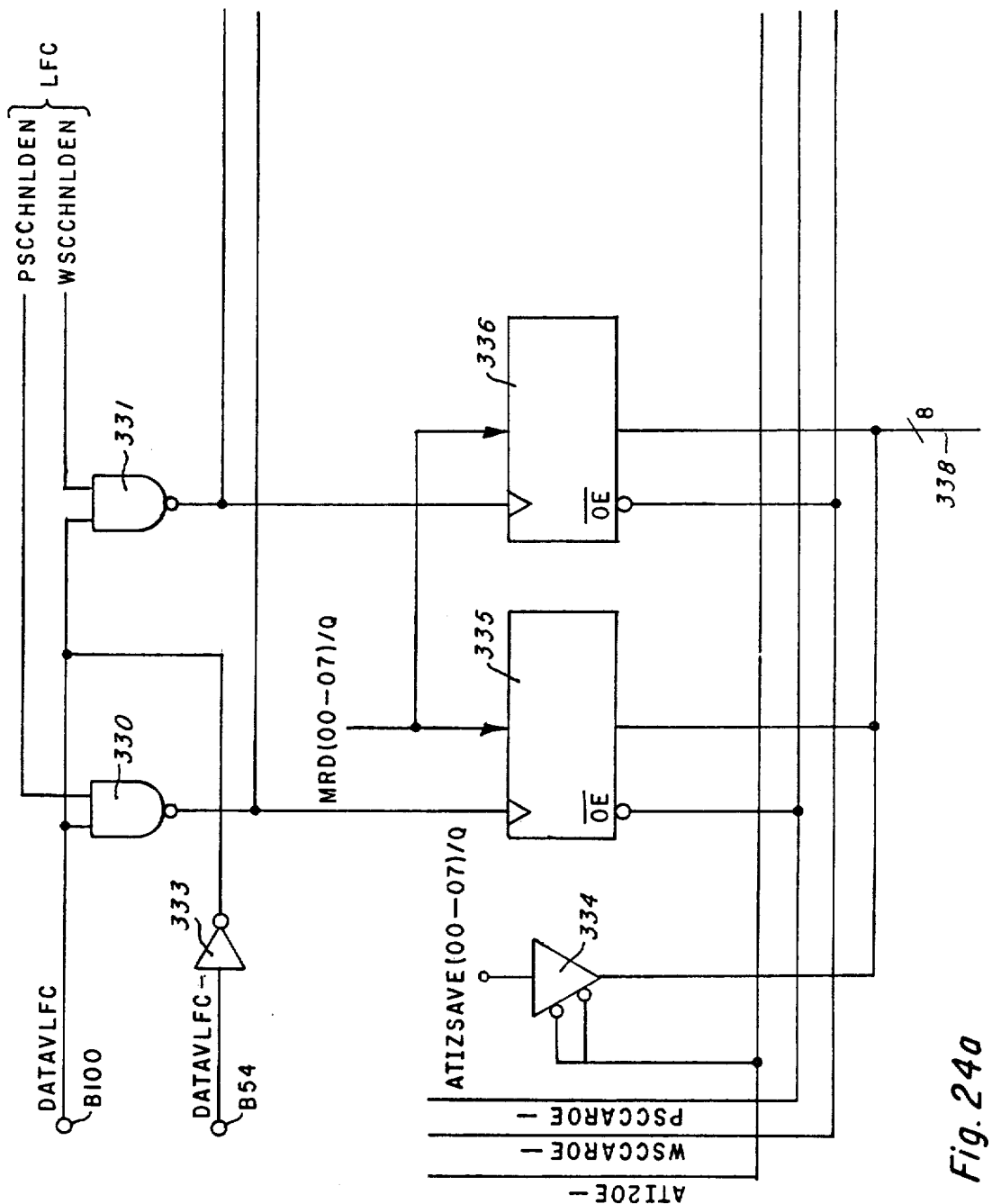
Figure 24B:
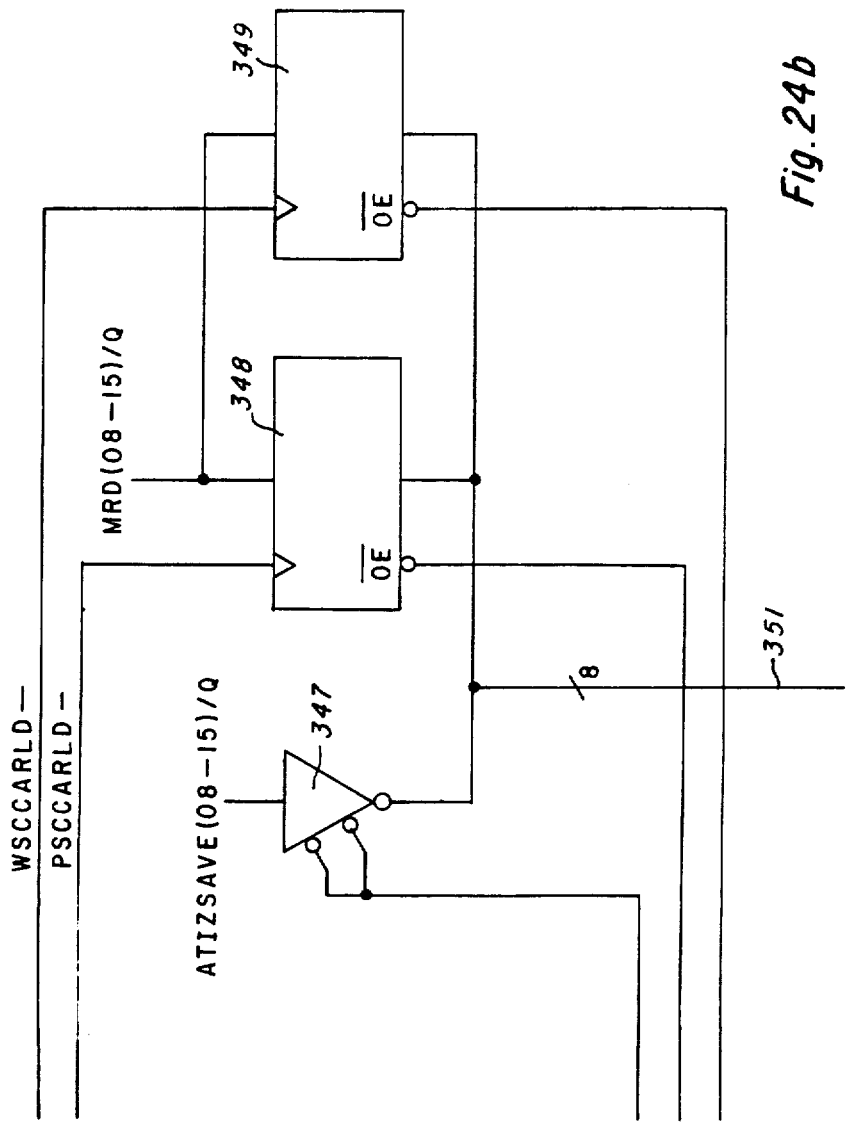

Referring to FIG. 24b, signal WSCCARLDfrom NAND gate 331 clocks flip flop array 349 and signal PSCCARLD- from AND gate 330 clocks flip flop array 348. The other half of ATI2SAVE, namely bits 08-15 is applied to buffer-array 347 which also is gated by signal ATI202-. The inputs to flip flop arrays 348 and 349 are bits 08-15 from memory. Signal WSCCAROE- from flip flop array 326 is used to enable the output of flip flop arrays 336 and 349. Signal PSCCAROE- from flip flop array 326 is used to enable the output from flip flop arrays 335 and 348.

Figure 24C:
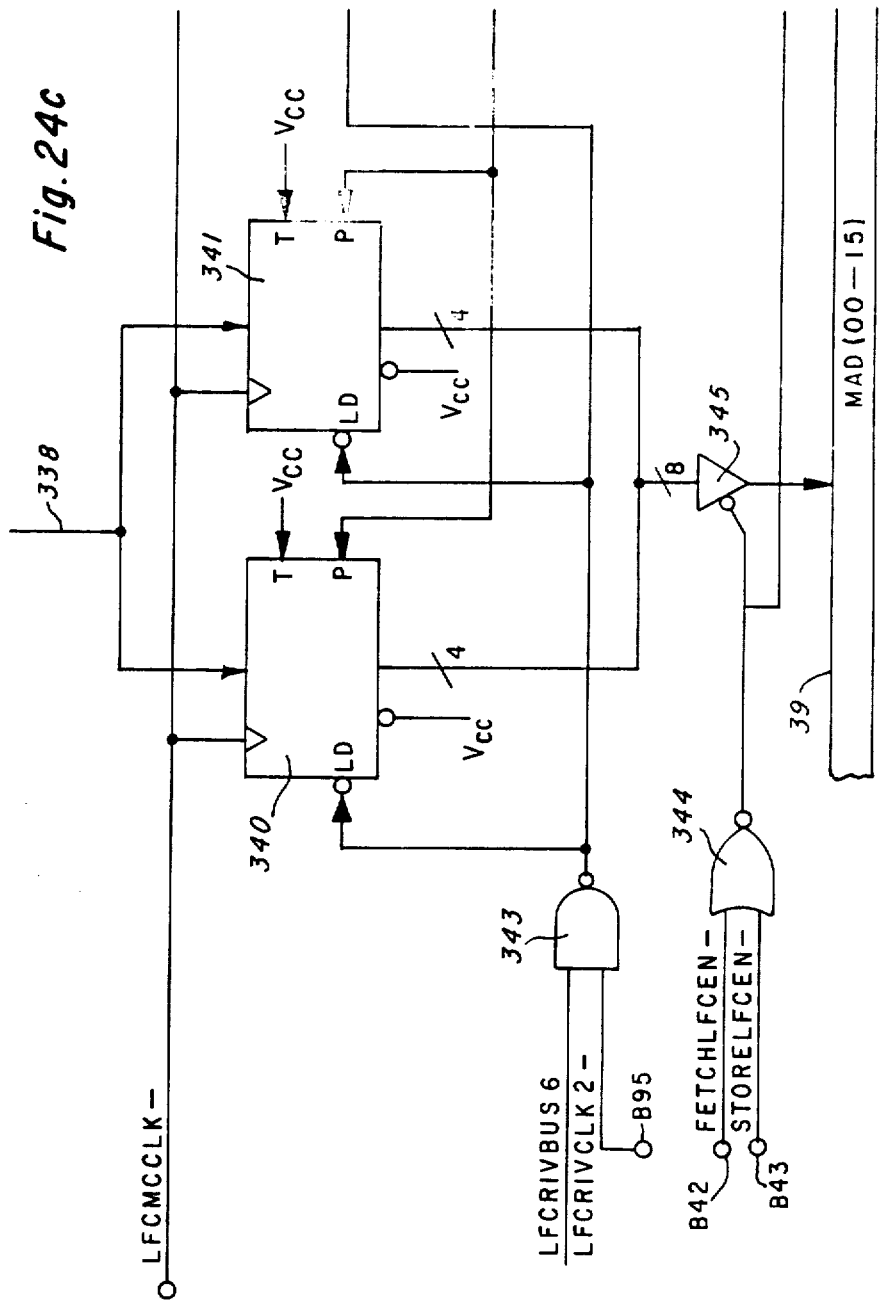

The output of buffer array 334 is tied together with the outputs from flip flop arrays 335 and 336 in bus 338 which provides inputs to counters 340 and 341 shown in FIG. 24C. The output from buffer array 347 is tied to the outputs from flip flop arrays 348 and 349 in bus 351 which is shown providing inputs, in FIG. 24d, to counters 352 and 353. Counters 340, 341, 352 and 353 are all clocked by signal LFCMCCLK- from terminal B99. In this preferred embodiment, these counters are Texas Instruments Type SN74LS163A Synchronous FourBit Counters, described beginning at page 7-190 of the TTL DAta Book. The load inputs for these counters is provided by the output from NAND gate 343. The inputs to NAND gate 343 are provided by line 6 of bus 321 and clock signal LFCRIVCLK2- from terminal B95. Potential VCC is applied to the one enable terminal so that when the other enable terminal has a potential provided by the output of AND gate 354, the counters are enabled. AND gate 354 has input signals from line 7 of bus 321 and clock signal LFCRIVCLK2- from terminal B95. This enable signal causes the counter combination of counters 340, 341, 352 and 353 to add one count.

The outputs of counters 340 and 341, as shown in FIG. 24c, are combined and buffered through buffer array 345 which is gated by the output of AND gate 344. The inputs to AND gate 344 are signals FETCHLFCEN- and STORELFCEN- from terminals B42 and B43, respectively. The outputs from counters 352 and 353 of FIG. 24d are combined and buffered through buffer array 355 which is enabled by the output of AND gate 344. The outputs of buffer arrays 345 and 355 are applied to MAD bus 39.

It can be seen then that the circuitry of FIGS. 24a-24d is designed to provide addresses dependent upon information from the central memory of the CPU. Specifically, an address for saving the ATI2 word is provided, as well as other addresses from the CPU central memory for fetching and storing.

The list buffer 17 of FIG. 1a, in this preferred embodiment, has the capability of storing a total of 256 16-bit words. This capacity is divided up by providing 16 blocks of eight words each for the WSC section and 16 blocks of eight words each for the PSC section. That is, output operations for WSC26 and input operations for PSC28 may be stored prior to their use in list buffer 17. To provide this feature of having such information available, it is necessary that the limit of the list buffer 17 not be exceeded. The circuitry for determining the limits is illustrated in FIGS. 25 and 26.

Figure 25:
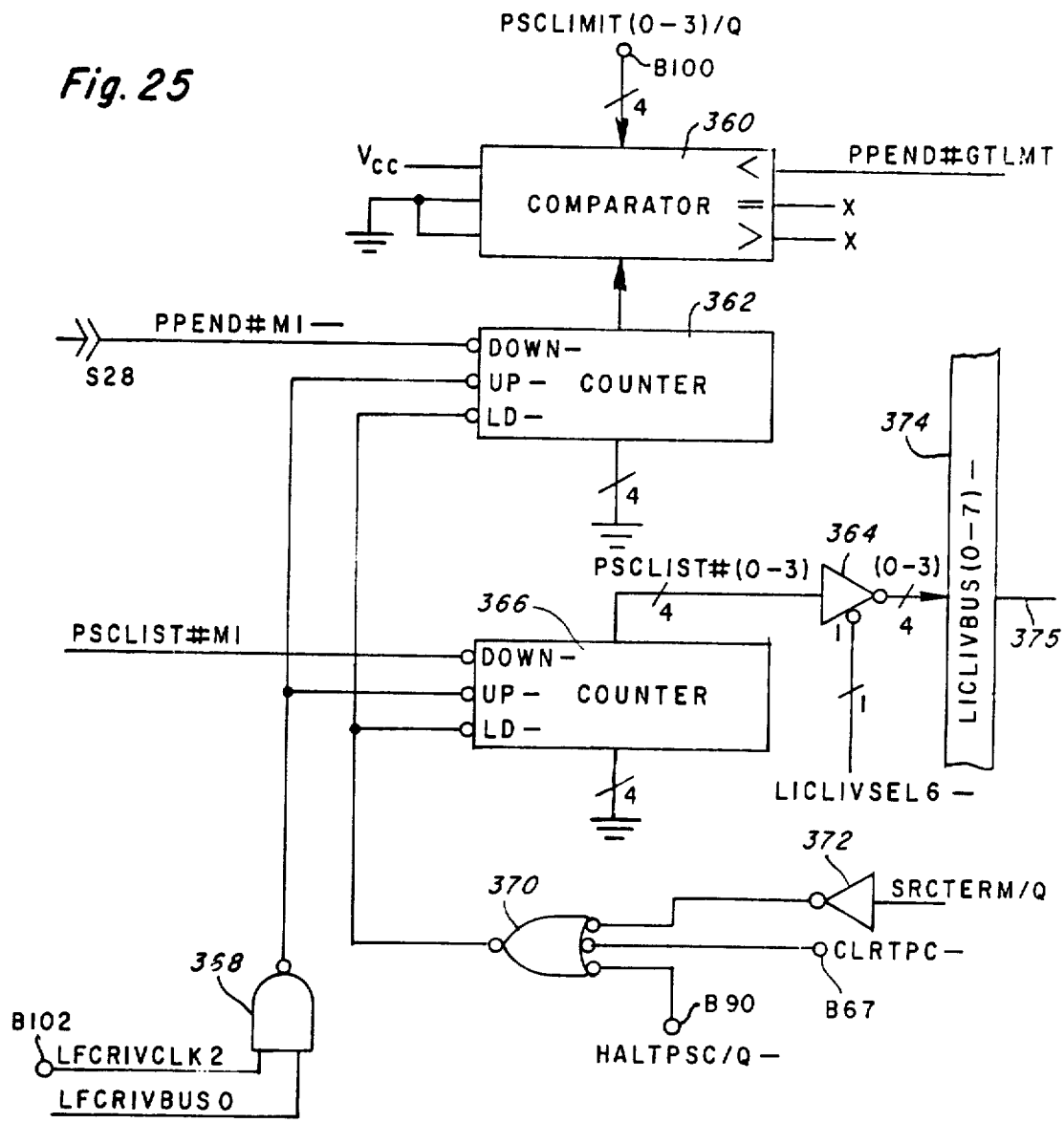
FIG. 25 is the PSC look-ahead limit counter and compare circuitry.

In FIG. 25, signals PSCLIMIT(0-3)/Q from terminal B100 of FIG. 21 provide four inputs to comparator 360. Four other input signals for comparison are provided from counter 362. Counter 362, in this preferred embodiment, is a Texas Instruments Type 74LS193 described beginning at page 7-306 of the TTL Data Book. Signal PPEND#M1- from terminal S28, originated in the system read controller 27 is applied to the count down terminal. The output of NAND gate 368 is connected to the count up terminal of counter 362. The inputs to NAND gate 368 are line 0 from bus 321 and LFCRIVCLK2 from terminal B102. AND gate 370 provides the signal applied to the load terminal of counter 362. The inputs to AND gate 370 are signals SRCTERM/Q, inverted through inverter 372, signal CLRTPC- from terminal B67 and signal HALTPSC/Q- from flip flop 242 of FIG. 14. Counter 362 counts under control of these various signals and applies the result to comparator 360 which compares the information from counter 362 with the process sequence controller limit number. If the limit number is smaller than the number from the counter, an output signal PPEND#GTLMT is present, as indicated.

Counter 366 is identical to counter 362 except that its down count input is provided by signal PSCLIST#Ml- which is provided ultimately from the ROM of list interpret controller 15. The four outputs from counter 366 are inverted through inverter array 364 and applied to bus 374, identified as LICLIVBUS(0-7)-.

Figure 26:
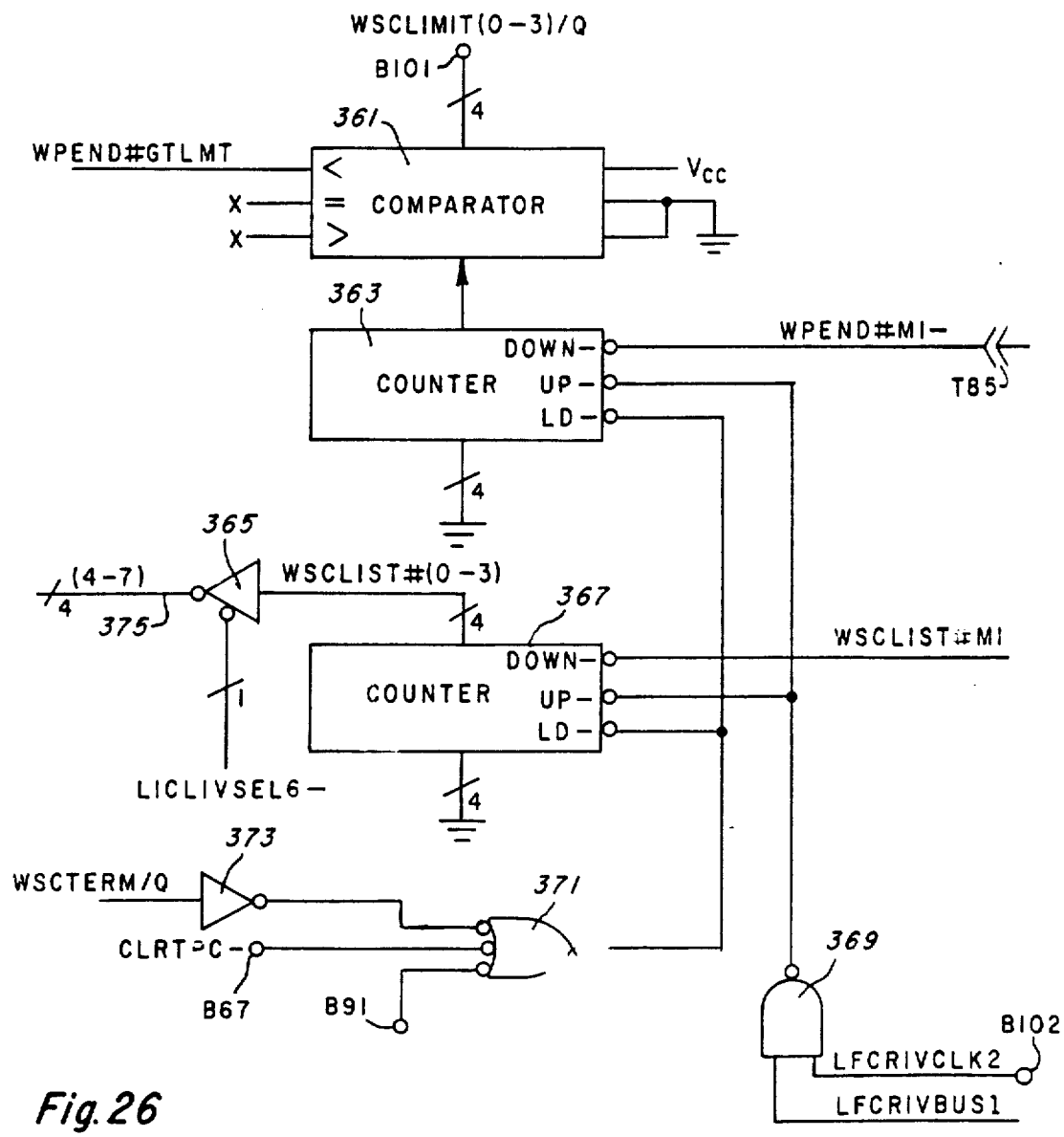
FIG. 26 is the WSC look-ahead limit counter and compare circuitry.

The circuit of FIG. 26 is identical to that of FIG. 25 except for the input signals. That is, comparator 361 (identical to comparator 360) receives input signals WSCLIMIT()-3)/Q from terminal B101. The output signal from comparator 361 is identified as WPEND#GTLMT. The count down input to counter 363 (identical to counter 362) is provided by signal WPEND#Ml- from terminal T85. The count up input is provided by NAND gate 389 whose inputs are signals LFCRIVBUS1 from bus 321 and clock signal LFCRIVCLK2 from terminal B102. The load input is provided by the output of AND circuit 371 which has a clear input CLRTPC-from terminal B67, signal WSCTERM/Q inverted through inverter 373, and signal HALTWSC/Q- from flip flop 246 of FIG. 14. Counter 367 is identical to counter 366, having a count down input provided by the signal WSCLIST#M1- from the ROM of list interpret controller 15 with its count up and load inputs the same as those of counter 363. The output of counter 367 is buffered through buffer array 365 which is gated by line 6 of the left interface vector bus of LIC15, as is buffer array 364. The output from buffer array 365 is connected to bus 374 over line 375.

Figure 27:
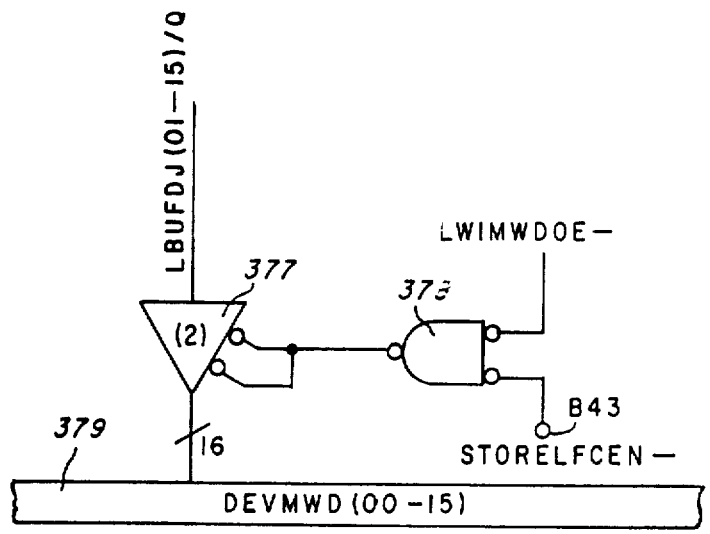
FIG. 27 is the circuitry for storing list word 1 back into the memory.

FIG. 27 simply illustrates the circuitry required to store list word 1 back in the memory. The signal LBUF-DI(0115)/Q is provided from the list buffer 17 and is buffered through buffer array 377 whose output is enabled by the output from AND gate 378. The inputs to AND gate 378 are signals STORELFCEN- from terminal B43 and LWIMWDOE- from flip flop array 326. The output of buffer array 377 is applied to device memory write data bus 379.

Figure 28:
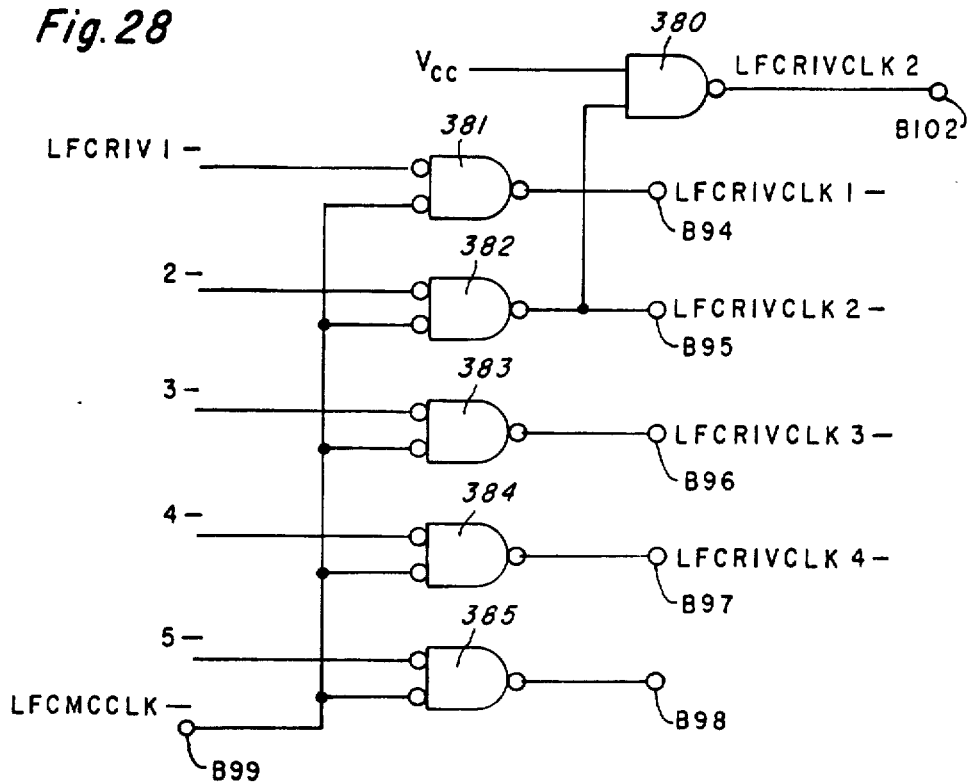
FIG. 28 illustrates circuitry for the development of certain control signals for the LFC.

FIG. 28 illustrates the development of certain clock pulse signals from bus 321. LFCRIV1-, 2-, 3-, 4-, and 5- are applied as one input to each of AND gates 381, 382, 383 and 384 and NOR gate 385, respectively. The above menioned gates are enabled by signal LFCMCCLK- from terminal B99. The output from AND gate 382 is applied to one input of NAND gate 380 whose other input is voltage VCC, providing an output signal LFCRIVCLK2 on terminal B102. AND gates 381-384 provide output signals LFCRIVCLK1-, 2-, 3- and 4- on terminals B94-B97, respectively. NOR gate 385 provides signal LFCRIVCLK5 on terminal B98.

FIG. 29 is a map of the contents of ROM 302.

LIST INTERPRET CONTROLLER

Figure 30A:
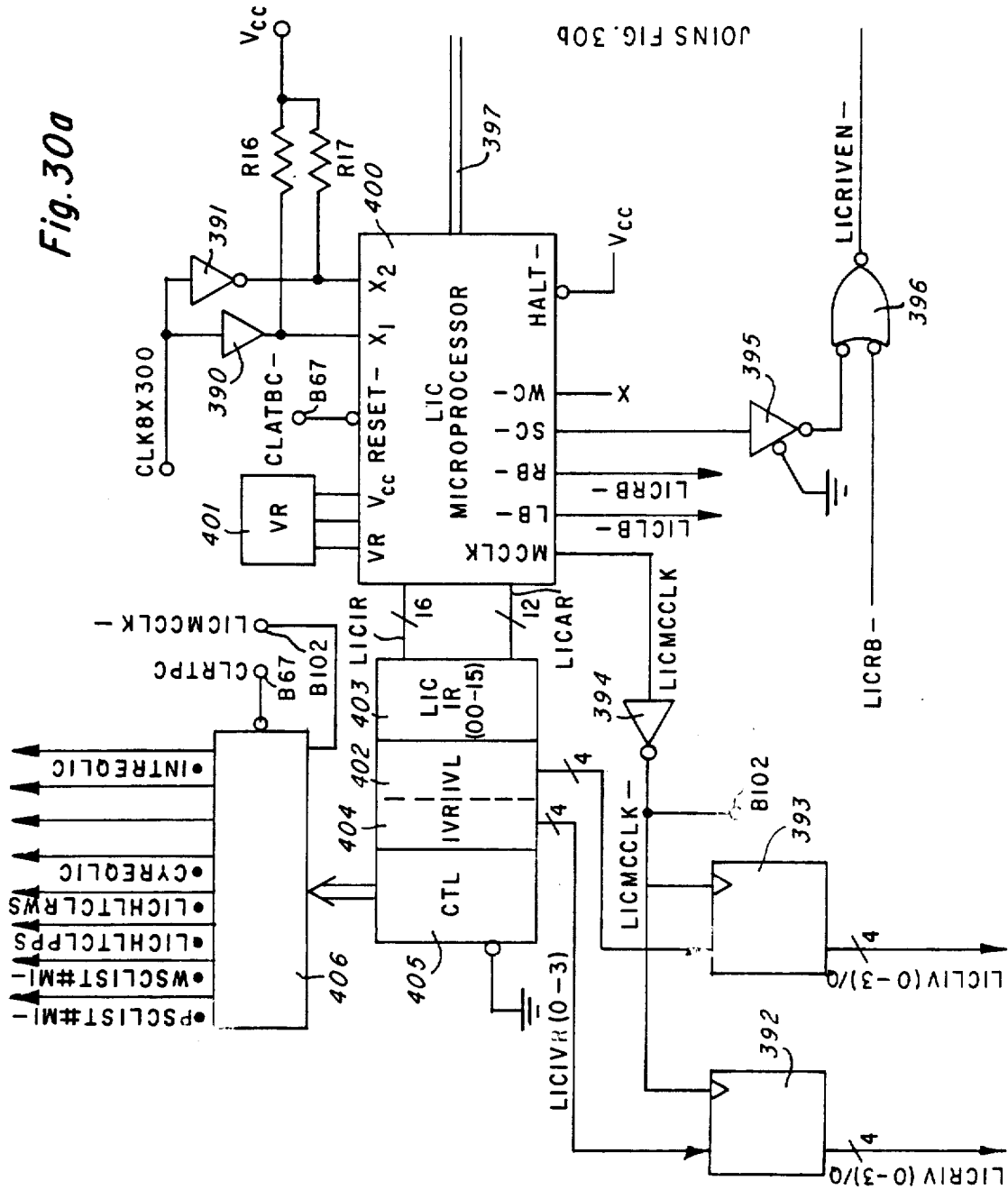
Figure 30B:
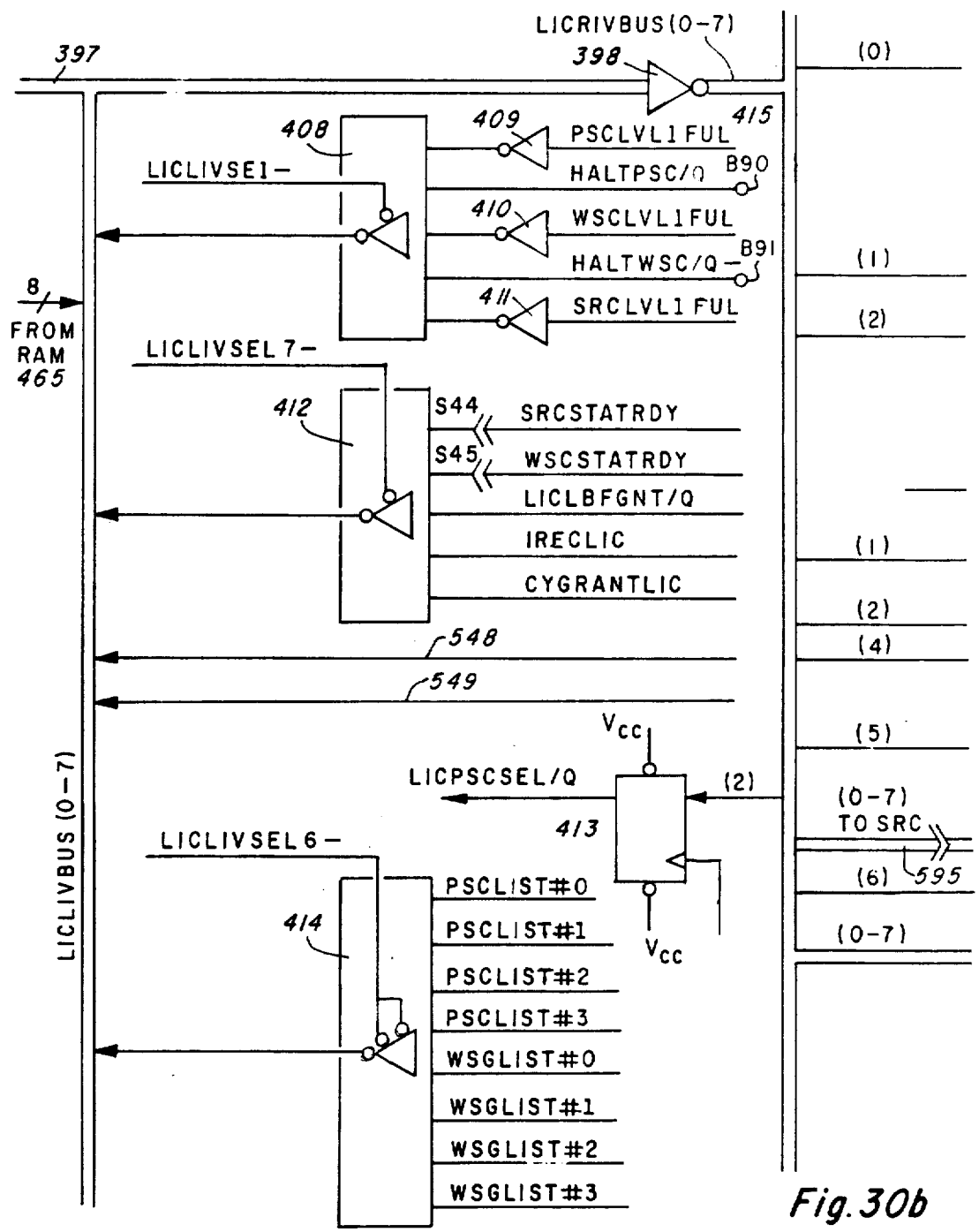
Figure 30C:
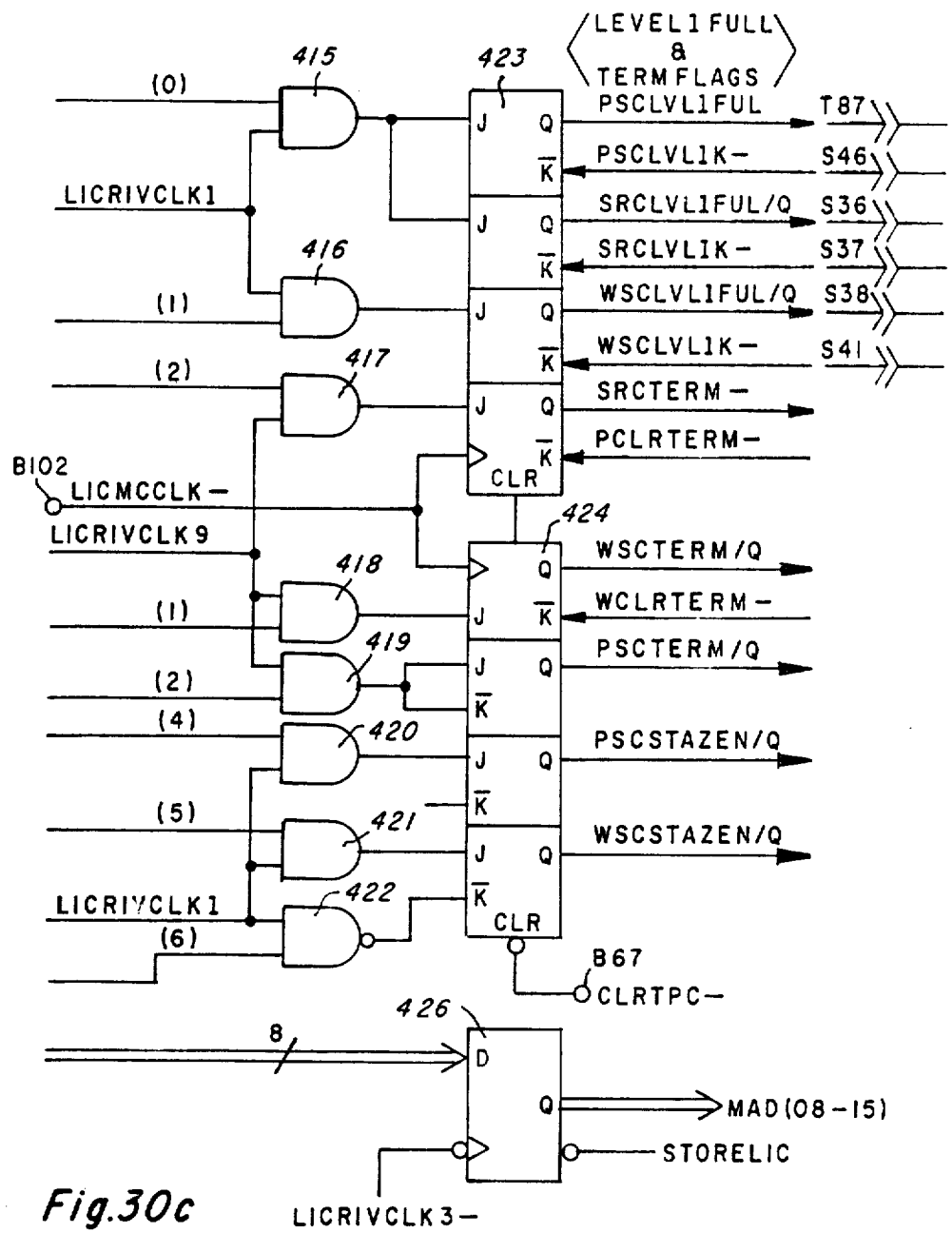

The List Interpret Controller 15 primarily provides the process sequence controller 28 with an interpreted command list block from the list buffer 17. LIC 15 also receives status information from status registers 22 and 23 and transmits that status to the central memory of the CPU. As shown in FIG. 30a-30c, LIC 15 has a microproessor 400 which is identical to the microprocessors 200 and 300 previously described. It has a voltage regulator 401 and a read-only memory 402 having section 403 which contains 16-bit words for the operation of the microprocessor 400, section IVR/IVL/404 and control section 405, all as described earlier with respect to microprocessors 200 and 300. The output of the control portion 405 inputs flip flop array 406 which provides signals PSCLIST#Ml-, WSCLIST#MI-, LICHLTCLRPS, LICHLTCLRWS, CRYEQLIC and INTREQLIC. Flip flop array 406 is clocked by the signal LICMCCLK- from terminal B102 and is cleared by the signal CLRTPC- from terminal B67. Addressing information comes over 12-bit bus LICAR and the instruction words for microprocessor 400 come back over 16-bit bus LICIR. Clock 8X300 from terminal B66 is applied through buffer 390 to terminal X1 of microprocessor 400 and is inverted through inverter 391 and applied to terminal X2 of microprocessor 400. Voltage VCC is applied through resistor R16 to terminal X1 and through resistor R17 to terminal X2. The output of terminal MCCLK is inverted through inverter 394 providing signal LICMCCLK- at terminal B102 and also as a clock input to flip flop arrays 392 and 393. Four bits from the IVR portion of section 404 provide inputs to flip flop 392 and four bits from the IVL portion of section 404 provide inputs to flip flop array 393. The outputs of flip flop array 392 are signals LICRIV(0-3)/Q and the outputs from flip flop array 393 are LICLIV(0-3)/Q. The output from the SC- terminal of microprocessor 400 is inverted through inverter 395 and provides one input to AND circuit 396 whose other input is provided by the signal LICRB-, from the RB- output of microprocessor 400. The output from AND gate 396 is signal LICRIVEN-. LICLIV bus 397 is connected to microprocessor 400 for receiving command inputs exterior to the processor.

Those inputs include, as shown in FIG. 30b, signal PSCLVL1FUL which is inverted through inverter 409 and applied to one input of inverter array 408. Signal WSCLVL1FUL is inverted through inverter 410 and applied to another input of inverter array 408. Signal SRCLVLIFUL is inverted through inverter 411 and also applied to array 408. These inputs indicate that registers 20, 18 and 19, respectvely, are full and therefore no further information can be entered.

Signal HALTPSC/Q- and signal HALTWSC/Q- are also inputs to inverter array 408. Signals are for halting the operation of the proces sequence controller 28 and the write sequence controller 26 and come from flip flops 242 and 246, respectively, as shown in FIG. 14.

Signals SRCSTATRDY from terminal S44 and signal WSCSTATRDY from terminal S45 are inputs to inverter array 412. These signals indicate that registers 23 and 22 respectively, as shown in FIG. 1b are ready. Signals LICLBFGNT/Q- which orders a fetching of data from the list buffer 17 is another input to array 412; signal IRECLIC-, an interrupt request, and signal CY-GRANTLIC-, a cycle grant for the LIC15 are also inputs to array 412. Buses 548 and 549 are direct inputs to bus 397. The inverted outputs of inverter arrays 408 and 412 also are inputs to bus 397. The outputs of inverter arrays 408 and 412 are enabled by signals LI- CLIVSEL1- and LICLIVSEL7-, respectively, both signals coming from the decoder 444.

Inverter array 414 also provides inputs to bus 397, those inputs being enabled by signal LICLIVSEL6- from decoder 444. The inputs to array 414 are signals PSCLIST#0 through PSCLIST#3, and WSCLIST#0 through WSCLIST#3. These groups of signals are from counters 366 and 367 as shown in FIGS. 25 and 26, respectively.

Bus 397 having eight lines, connects to an inverter array 398, providing an eight line bus output LICRIV bus 415. Bus 415 is connected as an input to system read controller 27, described later.

Lines 0 of bus 415, as shown in FIG. 30c, provides one input to AND gate 415. Line 1 provides an input to AND gate 416 and to AND gate 418. Line 2 provides an input to AND gate 417 and to AND gate 419. Line 4 provides an input to AND gate 420, line 5 provides an input to AND gate 421 and line 6 provides an input to NAND gate 422. The other input to AND gates 415, 416, 420 and 421, and also to NAND gate 422 is provided by signal LICRIVCLK1 from NOR gate 430 of FIG. 31. The other input to NAND gates 417, 418 and 419 are provided by signal LICRIVCLK9 from NOR gate 439 of FIG. 31. The output of AND gate 415 provides the J input to two flip flops of flip flop array 423 with the K- inputs of those two flip flops provided by signals PSCLVLIK-from terminal S46 and signal SRCLVL1K- from terminal S37. The output of AND gate 416 provides the J input to the third flip flop of array 423 whose K- input is provided by signal WSCLVL1K- from terminal S41. The output of AND gate 417 provides the J input to the fourth flip flop of array 423 whose K- input is provided by signal PCLRTERM- from array 327 shown in FIG. 23b.

The output of AND gate 418 provides the J input to the first flip flop of array 424 whose K- input is signal WCLRTERM- from flip flop array 327. AND gate 419 provides both the J and K inputs to the second flip flop of array 424. AND gate 420 provides the J input to the third flip flop and AND gate 421 provides the J input to the fourth flip flop whose K- input is provided by NAND gate 422. Flip flop arrays 423 and 424 are clocked by signal LICMCLLK- from terminal B102 and are cleared by signal CLRTPC- from terminal B67.

The output from the first flip flop of array 423 is signal PSCLVL1FUL applied to terminal T87; the output of the second flip flop is signal SRCLVL1FUL/Q applied to terminal S36; the output of the fourth flip flop is signal WSCLVL1FUL/Q applied to terminal S38 and the Q output of the fourth flip flop is signal SRCTERM/Q.

The Q output of the first flip flop of array 424 is signal WSCTERM/Q; the Q output of the second flip flop is signal PSCTERM/Q; the Q output of the third flip flop is signal PSCSTA2EN/Q; the Q output of the fourth flip flop is signal WSCSTA2EN/Q.

Bus 415 also provides eight inputs to flip flop array 426 whose eight outputs are applied to MAD bus 39. Array 426 is clocked by signal LICRIVCLK3- from FIG. 31 and is cleared by signal STORELIC-, inverted from flip flop array 146 of FIG. 7C. The memory is thereby addressed by the eight lines of bus 415 for storing of status information.

Figure 31:
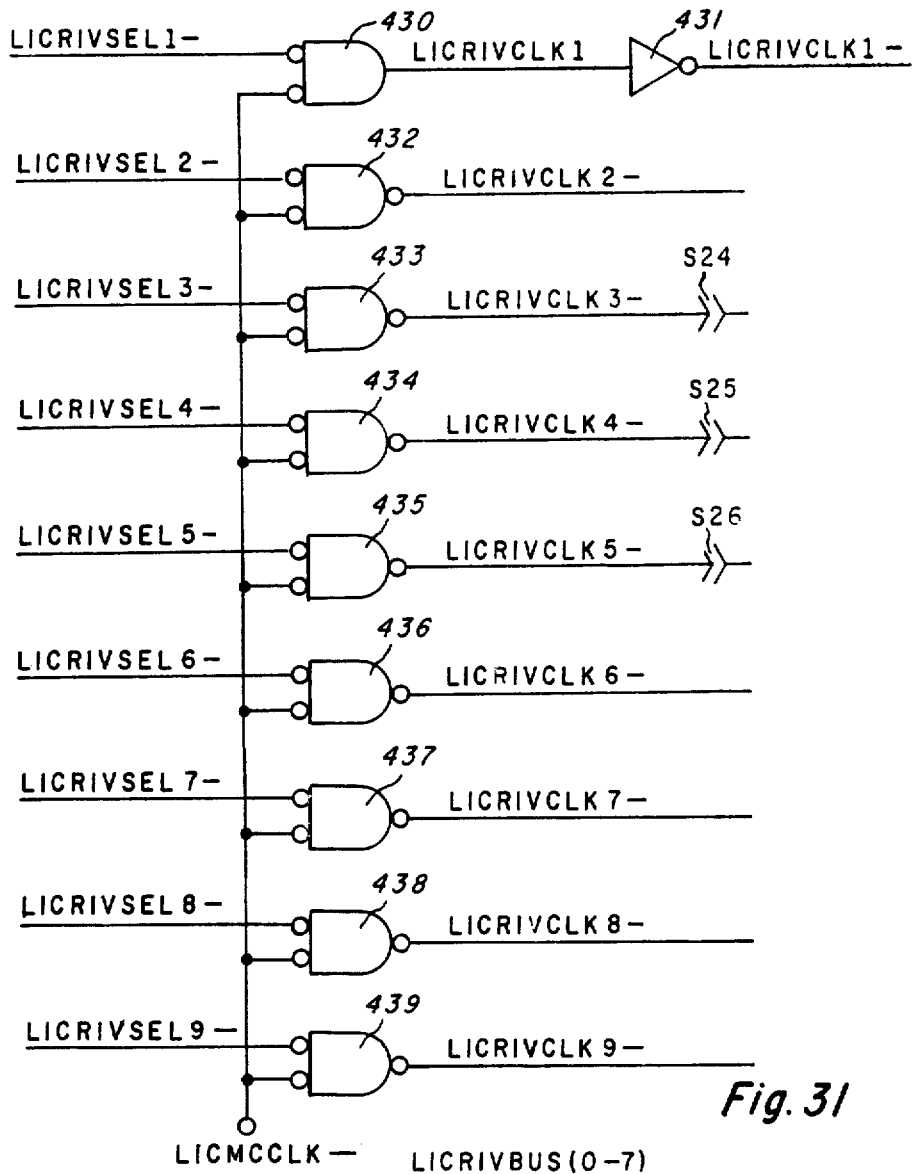
FIG. 31 illustrates circuitry for the development of control signals for LIC.
Figure 33:
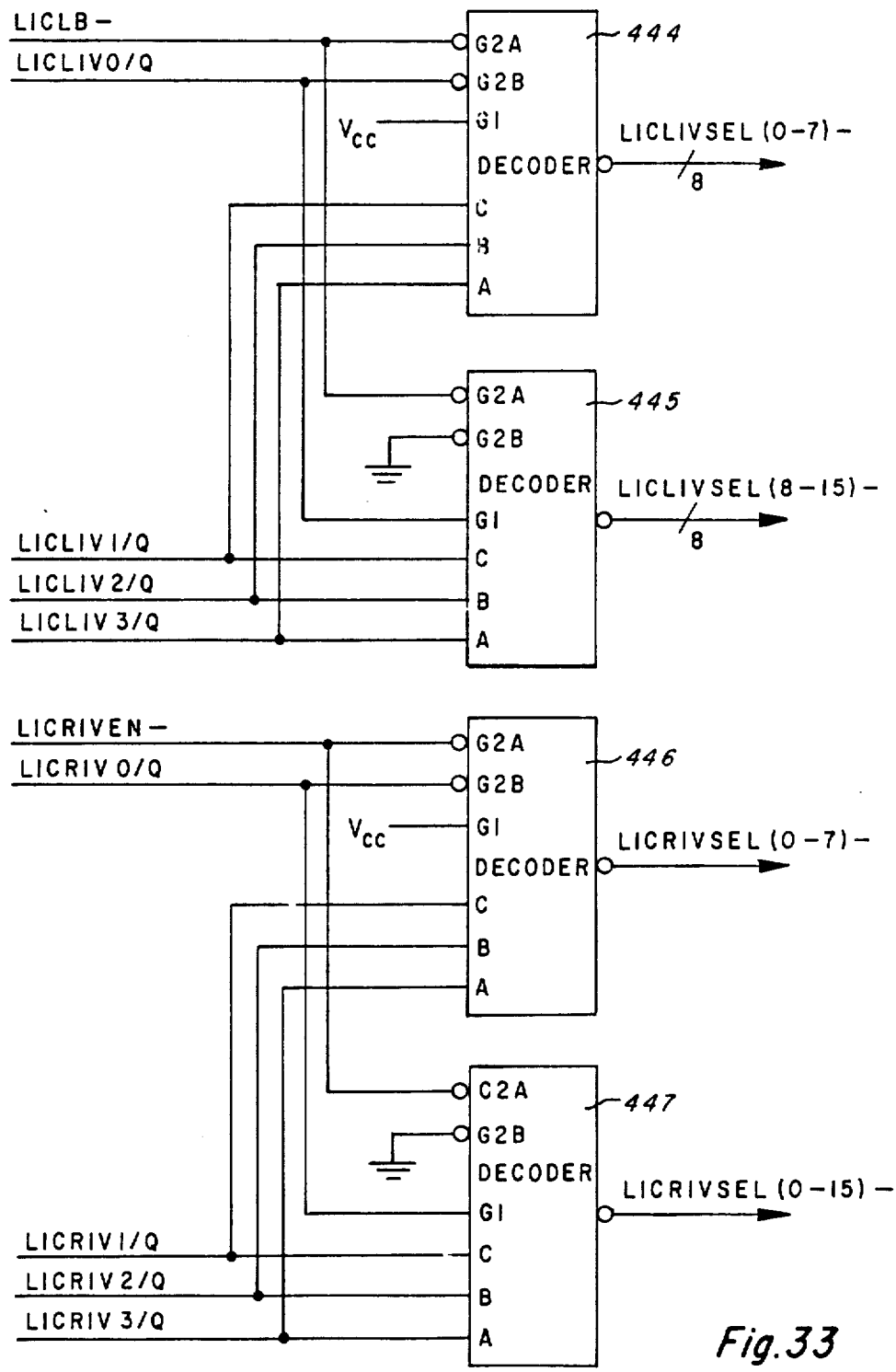
FIG. 33 illustrates circuitry for the development of control signals for LIC.

FIG. 31 illustrates the development of clock signals from inputs signals shown in FIG. 33. That is, AND gates 432-438 have signals LICRIVSEL2- through LICRIVSEL8-, respectively. The other inputs to AND gates 432-438 is provided by signal LICMCCLK- from terminal B102. NOR gate 430 has one input provided by signal LICRIVSEL1- and NOR gate 439 has one input provided by signal LICRIVSEL9-. The output from NOR gate 430 is inverted through inverter 431, supplying signal LICRIVCLK1-. The output of AND gate 432 is signal LICRIVCLK2-; the output of AND gate 433 is signal LICRIVCLK3-; the output of AND gate 434 is signal LICRIVCLK4-; the output of AND gate 435 is signal LICRIVCLK5-; the output of AND gate 436 is signal LICRIVCLK6-; the output of AND gate 437 is signal LICRIVCLK7-; the output of AND gate 438 is signal LICRIVCLK8-; the output of NOR gate 439 is signal LICRIVCLK9.

Figure 32:
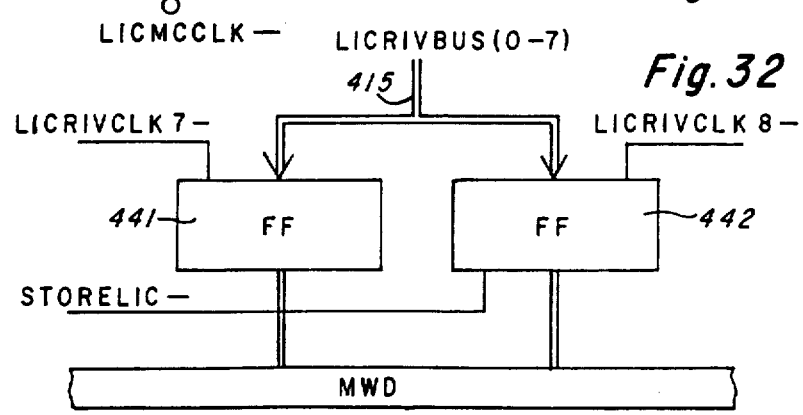
FIG. 32 illustrates circuitry for writing status information.

FIG. 32 illustrates simple circuitry for the writing of status data in association with the addressing mentioned above. The eight conductors of bus 415 are applied to the inputs of flip flop arrays 441 and 442, respectively. Flip flop 441 is clocked by signal LICRIVCLK7- and flip flop array 442 is clocked by signal LICRIVCLK8-. Flip flop 441 provides output bits 0-7 for application to bus MWD37 and flip flop array 442 provides output bits 8-15 for application to bus 37.

FIG. 33 illustrates the development of control signals by decoders 444-447. The decoders are Texas Instruments Type SN74LS138 described earlier. Decoders 444 and 445 have their C, B and A select inputs provided by conductors 1, 2 and 3, respectively, of bus 397. The enable input of G2A of decoders 444 and 445 are connected to receive signal LICLB- from microprocessor 400. Enable input G2B of decoder 444 and G1 of decoder 445 have conductor 0 of bus 397 attached. Enable input G1 of decoder 444 has voltage VCC applied, and enable input G2B of decoder 445 is attached to ground.

decoders 446 and 447 have connected to their C, B and A select inputs, lines 1, 2 and 3 from bus 415. Line 0 of bus 415 is connected to enable input G2B of decoder 446 and enable input G1 of decoder 447. Signal LICRIVEN- from AND gate 396 provides the input signal for enable terminals G2A of decoders 446 and 447. Enable terminal G1 of decoder 446 is connected to voltage VCC and enable terminal G2B of decoder 447 is connected to ground. The decoders then, in a prescribed manner as set out beginning at page 7134 of the TTL Data Book, have one of eight outputs available. Decoder 444 provides signals LICLIVSEL(0-7)-; decoder 445 provides signals LICLIVSEL(8-15)-; decoder 446 provides signals LICRIVSEL(0-7)-; decoder 447 provides output signals LICRIVSEL(8-15)-.

FIG. 34 is a map of the contents of ROM 402.

LIST BUFFER AND ADDRESS REGISTER

Figure 35A:
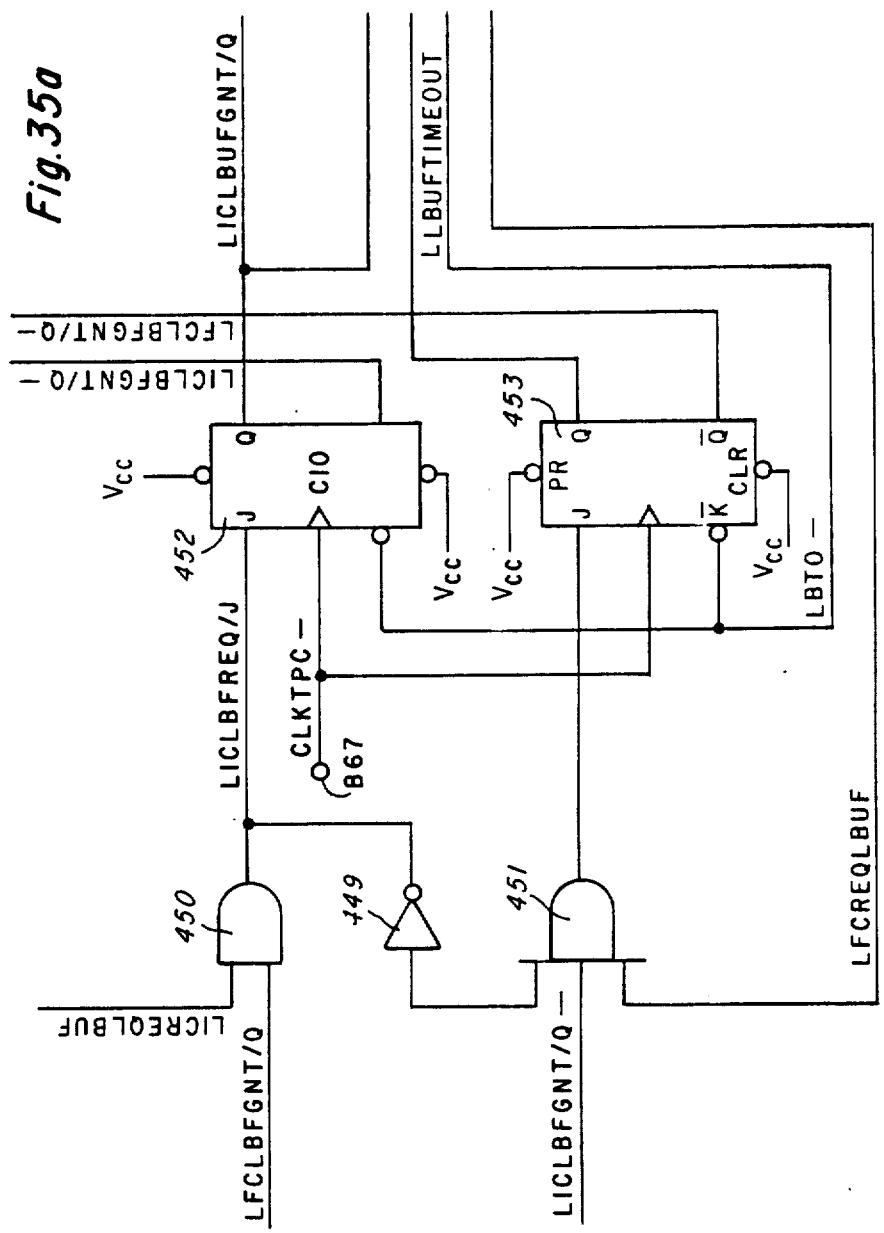
Figure 35B:
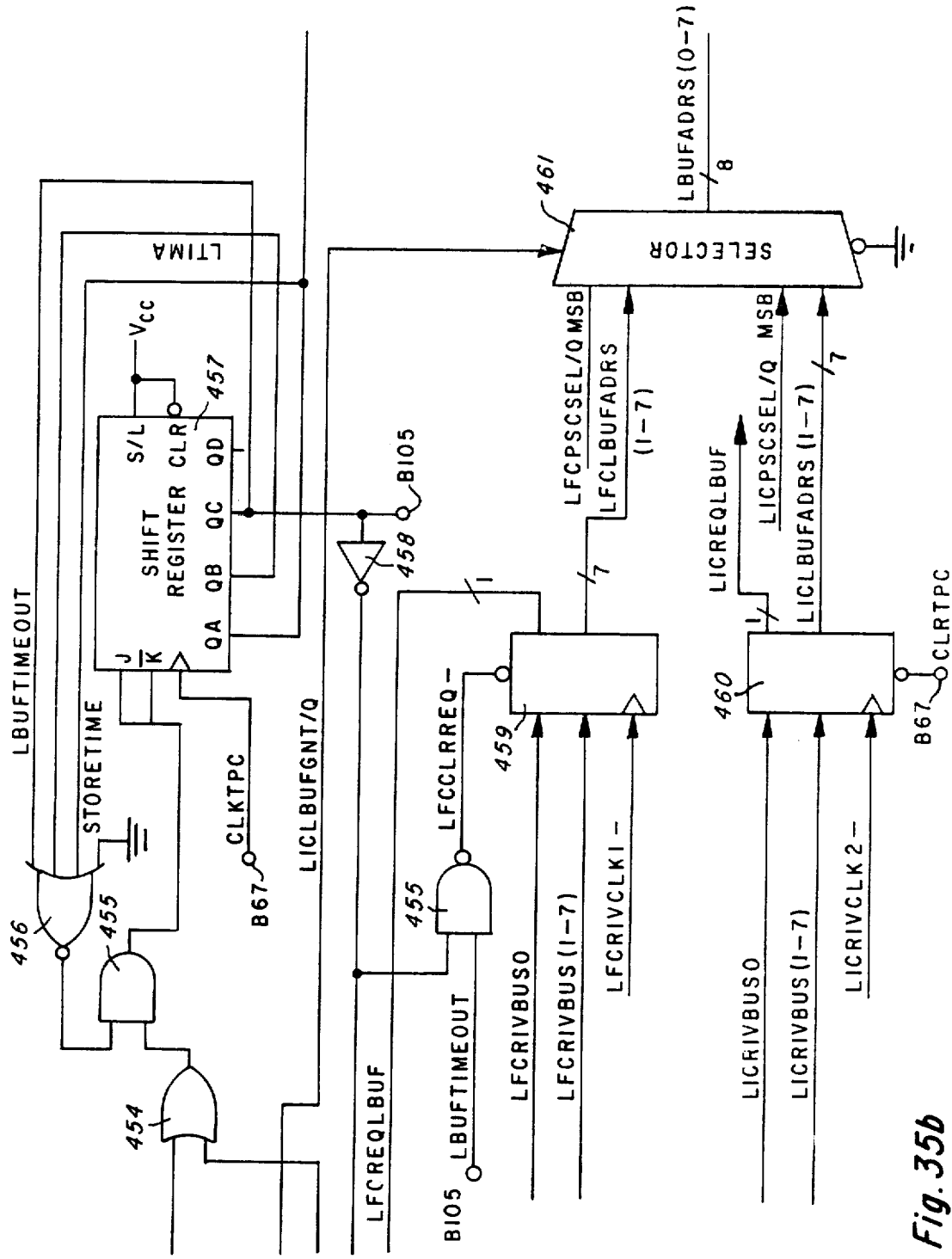
Figure 35C:
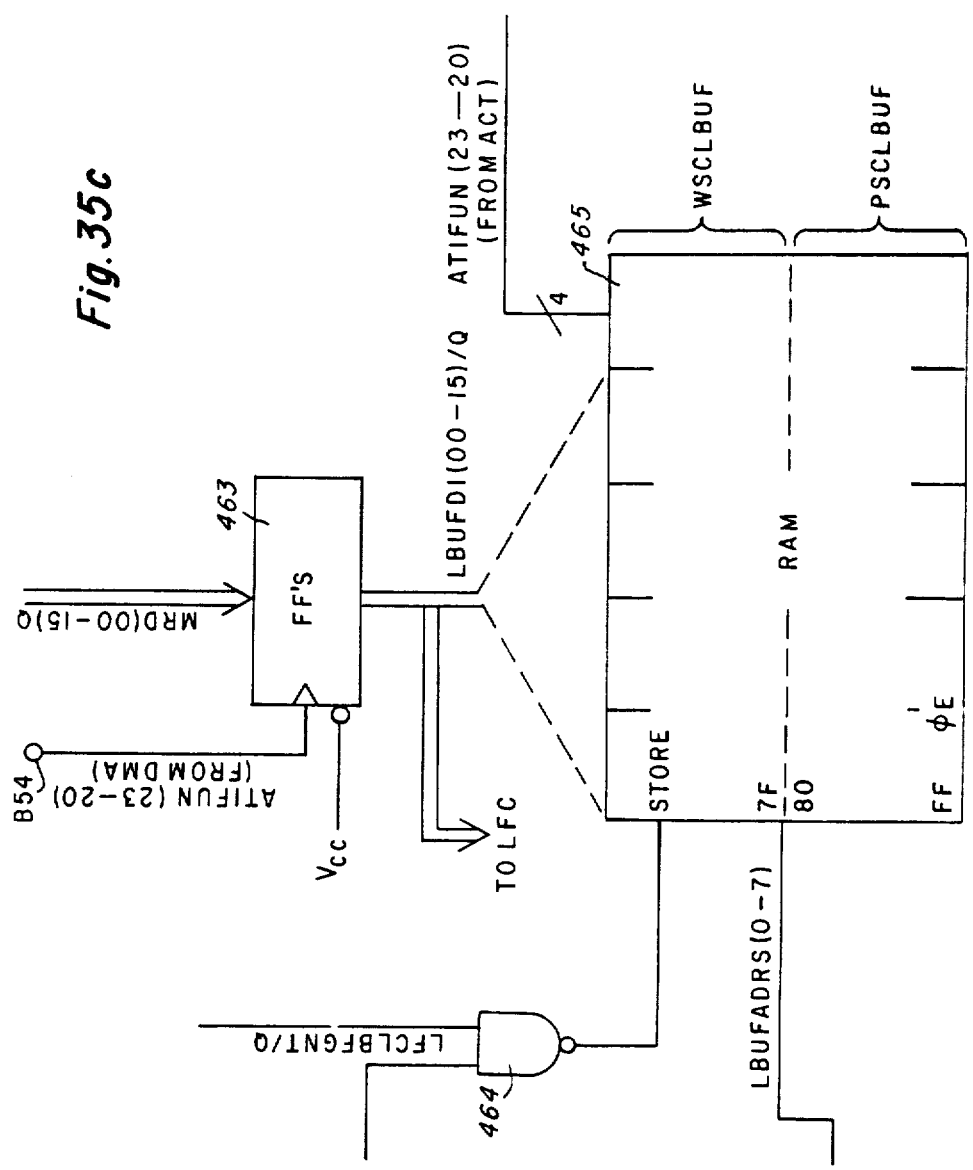

Referring to FIG. 35a, 35b and 35c, the circuitry for the list buffer address register 16 of FIG. 1a is described. Flip flop arrays 459 and 460 receive address input information from line 0 and lines 1-7 of each of LFCRIV bus 321 and LICRIV bus 415, respectively. Flip flop array 459 is clocked by signal LFCRIVCLK1- shown on FIG. 23b and flip flop array 460 is clocked by the signal LICRIVCLK-2 from FIG. 31. The Q output of array 459, that refers to the line 0 input, carries signal LFCREQLBUF. The Q output of array 460 that corresponds to line 0 input carries signal LICREQLBF. The seven other outputs from array 459 provides an input to data selector 461 which, in this preferred embodiment, is a Texas Instruments Type 74LS157, described beginning at Page 7-181 of the TTL Data Book. The other seven outputs from array 460 also provide inputs to data selector 461 which is made up of two of the above mentioned 74LS157's. Signal LFCPSCSEL/Q from FIG. 23b is an input along with the inputs from array 459. Signal LICPSCSEL/Q is an input to selector 461, along with the seven inputs from array 460.

The output from selector 461 is an eight line bus, LBUFADRS(0-7) which is connected to random access memory (RAM) 465 which is the memory in which the 16-bit words from memory are stored, together with four bits of the ATI instruction word. That is, RAM 465 has a capacity of 256 words that are 20 bits in length. As indicated, one half of those words are devoted to the write sequence controller 26, while the other 128 words are for the process sequence controller 28.

Control circuitry for list buffer 17 is shown in FIG. 35a. Signal LICREQLBUF from flip flop array 460 is applied as one input to AND circuit 450 whose output is inverted through inverter 449 and applied to one input of AND gate 451 which has another input provided by signal LFCREQLBUF from array 459. The output of AND gate 450 also provides the J input to flip flop 452 whose Q output provides signal LICLBUFGNT/Q, providing one input to NOR gate 454, and whose Q- output provides the signal LICLBFGNT/Q- which provides the other input to AND gate 451. AND gate 451 has an output for providing the J input to flip flop 453, whose Q output provides the other input to NOR gate 454 and also provides an input to NAND gate 455. The Qoutput of flip flop 453 provides signal LFCLBFGNT/Q- which is the second input to AND gate 450. Flip flops 452 and 453 are clocked by signal CLKTPC.

Shift register 457 is a Texas Instruments Type 74LS195, a 4-bit parallel-access shift register described beginning at page 7-324 of the TTL Data Book. Its serial inputs are provided by the output of ANDgate 455; its outputs QA, QB and QC all provide inputs to NOR gate 456. Output QC of shif register 457 provides the signal LBUFTIMEOUT on terminal B105, which is then inverted through inverter 458, providing the K-input to each of flip flops 452 and 453. Shift register 457 is clocked by the signal CLKTPC-. The output of OR gate 454 provides one input to AND gate 455, whose other input is provided by the output from NOR gate 456. The signal LBUFTIMEOUT from terminal B105 provides the other input to NAND gate 455 whose output is used as the clear input to flip flop array 459. Flip flop array 460 is cleared by the signal CLRTPC- from terminal B67.

Output terminal QA of shift register 457 is also connected to the one input of NAND gate 464 whose other input is the signal LCFLBFGNT/Q from the Q output of flip flop 453.

FIG. 35c shows the connection made to NAND gate 464 whose output provides the store input to RAM 465. The memory read data signals MRD(00-15)/Q are applied as inputs to flip flop array 463 which is clocked by the signal DATAVLFC- from terminal B54 of FIG. 4b. These 16-bits provide the input to the RAM 465 and also to LFC14 as shown in FIG. 27. The ATI function bits from FIG. 15 are seen as signals ATIFUN(23-20) for storage in RAM 465.

Figure 36:
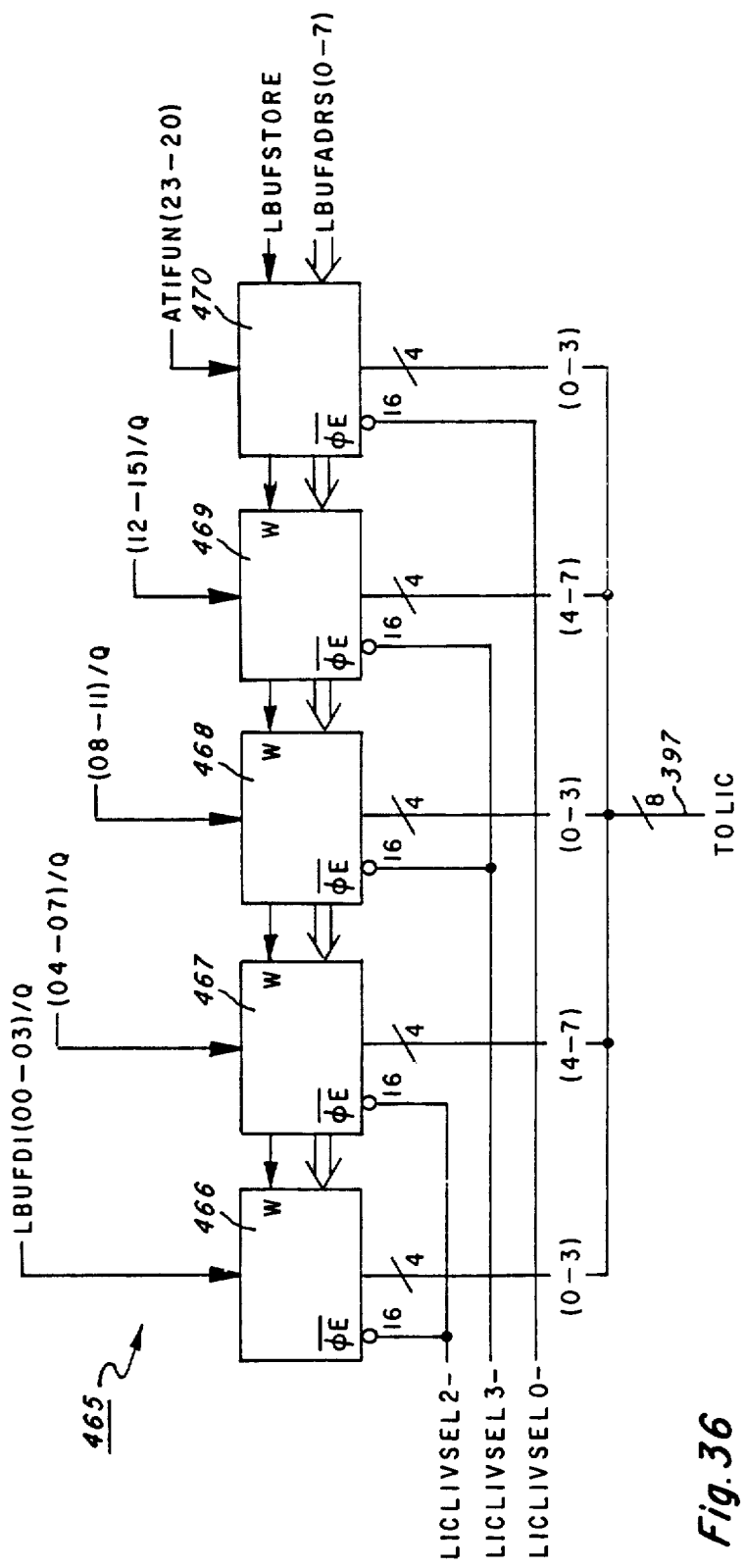
FIG. 36 details RAM 465 of FIG. 35c.

FIG. 36 provides more detail of RAM 465 illustrating five sections, 466-470 which make up the total ROM.

In this preferred embodiment, the RAM sections are Texas Instruments Type 74LS208 random-access memories each having 256 4-bit words of storage and described fully in the Bipolar Microcomputer Components Data Book, LCC4270. The output enable signals to sections 466 and 467 are LICLIVSEL2from decoder 444 of FIG. 33. The output enable inputs to sections 468 and 469 are provided by signal LICLIVSEL3- from decoder 444. The output enable input to section 470 is provided by signal LICLIVSEL0-, also from ecoder 444. The input data from flip flop array 463 is divided into four groups of four bits each. The four bits 00-03 are stored in section 466; bits 04-07 are stored in section 467; bits 08-11 are stored in section 468 and the four bits 12—15 are stored in section 469; ATI function bits 23-20 are stored in section 470. The output signal from NAND gate 464 is BUFSTORE applied to input W of each of the sections. The four bit outputs from each of the sections 466-470 are connected to LICLIV bus 397 as shown in FIG. 30b.

The combination of list buffer 17 and list buffer address register 16 then provides a list buffer grant and address selection. The list buffer is used by the LFC14 and LIC15. LFC14 fetches a list from the central memory and stores it in the list buffer 17 at an address determined by the circuitry of FIG. 35b. The list interpret controller 15, on the other hand, causes the lists to be removed from storage in list buffer 17 and moved into the list interpret controller.

SYSTEM READ CONTROLLER

The system read controller 27 is a part of the device interface controller. The SRC 27 accepts commands from LIC15 through SRCLVL1 register 19. The details of SRC 27 and register 19 follow.

Figure 37A:
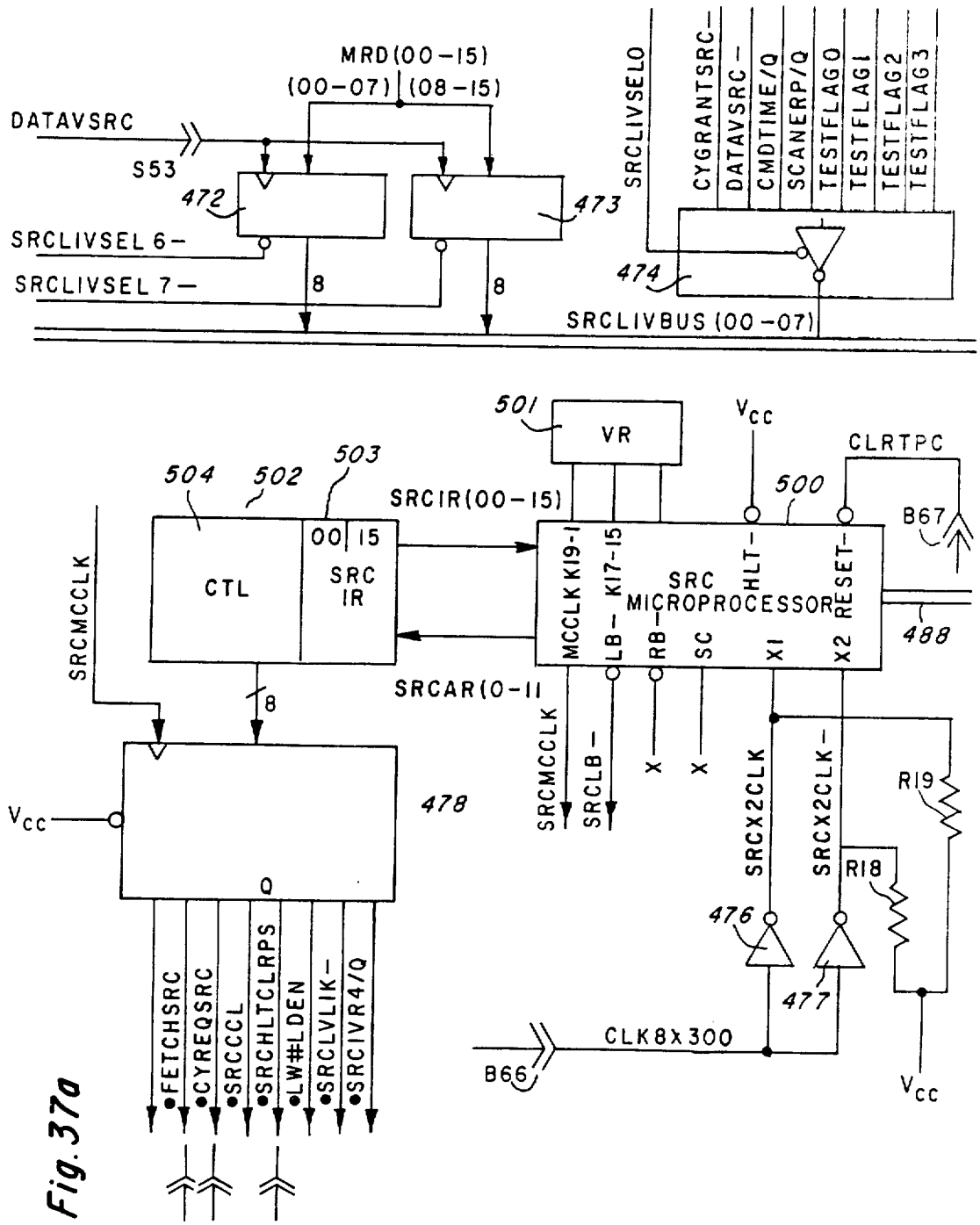
FIGS. 37a–37c illustrate the circuitry of the system read controller 27.
Figure 37B:
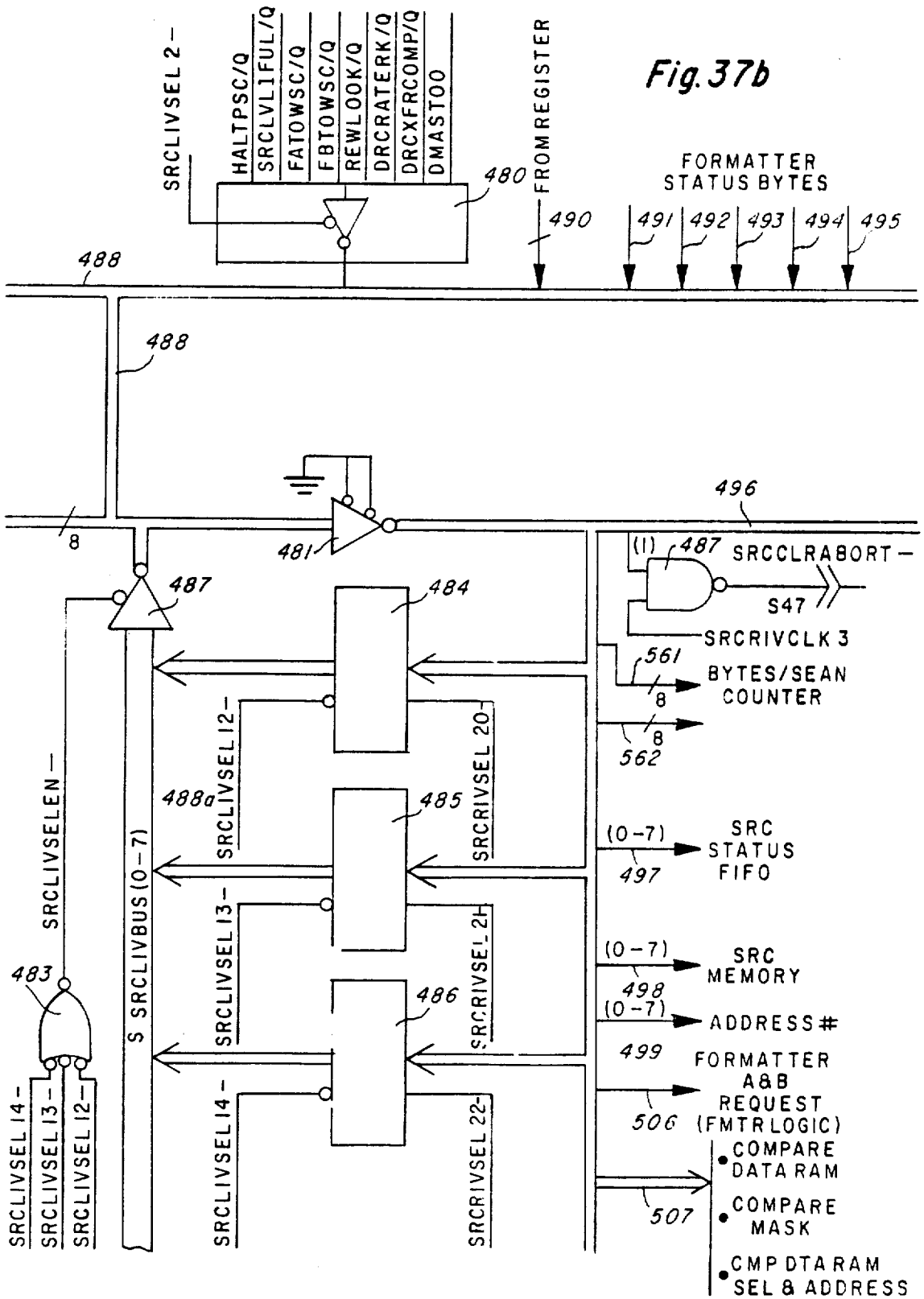
Figure 37C:
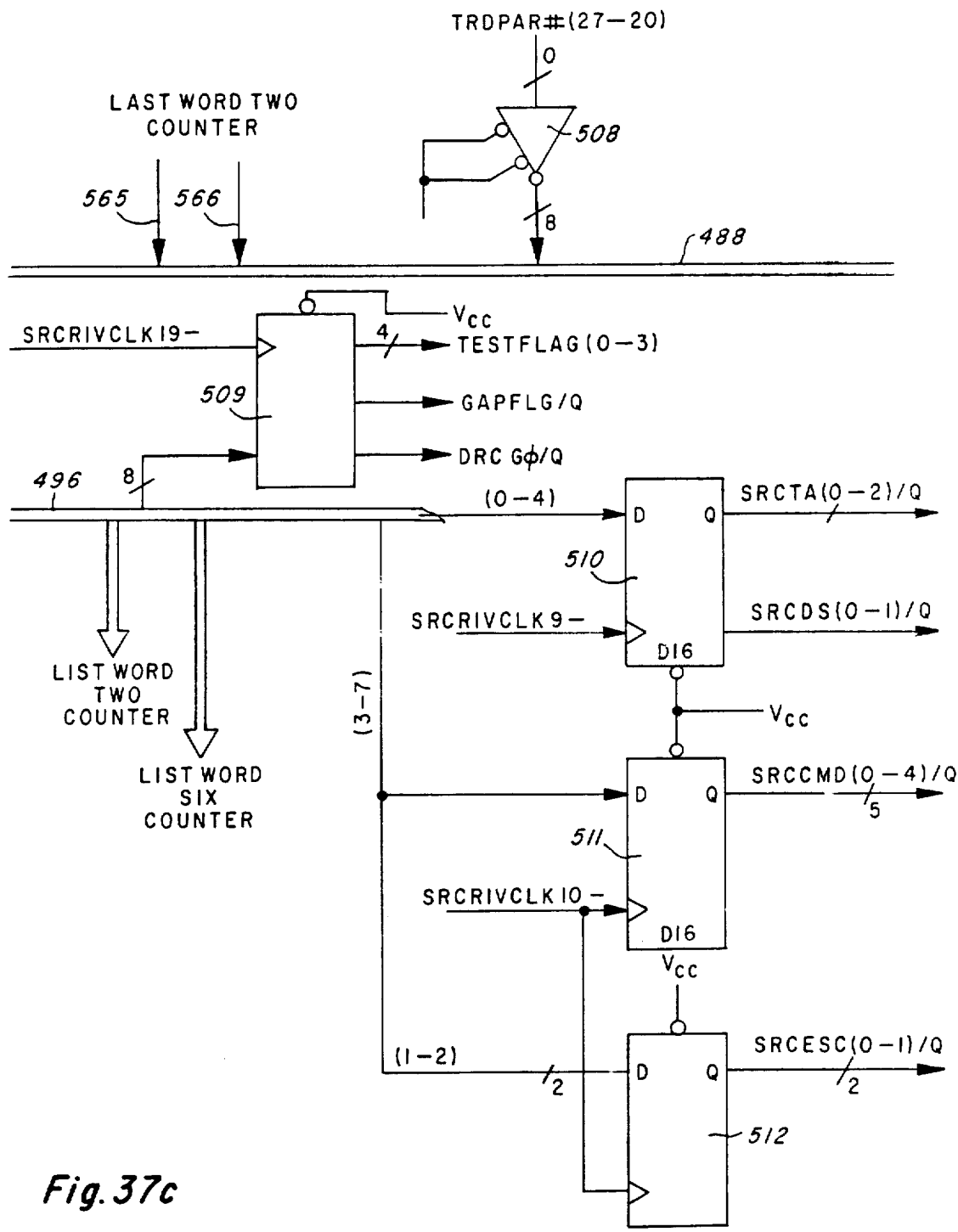

FIGS. 37a, 37b and 37c make up the block diagram of SRC 27.

FIG. 37 illustrates microprocessor 500, voltage regulator 501 and ROM 502, identical to the previously described microprocessors and their associated ROM's. ROM 502 has an instruction portion 503 for holding the instructions or microprocessor 500 which are addressed from the microprocessor 500 over bus SRCAR(0-11) with those instructions sent from section 503 over bus SRCIR(00-15) to microprocessor 500. Control section 504 provides eight outputs to flip flop array 478 which in turn provides the output signals SRCIVR4/Q, SRCLVL1K-, LW#LDEN, SRCHLTCLKPS, SRCCCL, CYREQSRC, and FETCHSRC. The inputs to microprocessor 500 include clock signal CLK8X300 from terminal B66, which is buffered through buffer 476 and applied to terminal X1 and which is inverted through inverter 477 and applied to terminal X2. Voltage VCC is applied through resistor R19 to terminal X1 and through resistor R18 to terminal X2 of microprocessor 500. Terminal MCCLK of microprocessor 500 provides the signal SRCMCCLK and terminal LB- provides output signal SRCLB-.

Microprocessor 500 has eight internal registers, but for its application in SRC27, it was found useful to add registers 484, 485 and 486, whose outputs are connected to SRCLIV bus (0-7) 488a. Registers 484-486 are clocked by signals SRCRIVCLK20- through 22-, respectively. Registers 484-486 are cleared by signals SRCLIVSEL12- through 14-, respectively. AND gate 483 has inputs SRCLIVSEL12- through 14- and output signal SRCLIVSELEN- which is the enable signal for inverter 482 whose input accepts bus 488a and whose output is connected to bus 488 which is SRCLIV-BUS(00-07).

Bus 488 is similar to the left interface vector buses described in connection with the other controllers. That is, it is connected to microprocessor 500 and has a number of inputs. Data from memory, namely MRD(00-15) is applied to flip flop arrays 472 and 473 with bits 00-07 being applied to flip flop 472 and bits 08-15 being applied to flip flop array 473. The arrays 472 and 473 are clocked by signal DATAVSRC- from terminal S53 of FIG. 4b. Array 472 is cleared by the signal SRCLVSEL6- and array 473 is cleared by signal SRCLIVSEL7-. Eight outputs from each of arrays 472 and 473 provide inputs to bus 488.

Inverters arrays 474 and 480 each have eight outputs connected to bus 488. Inverter array 474 has the following inputs: CYGRANTSRC-, DATAVSRC-, CMDTIM/Q, SCANERR/Q, TESTFLAG03. Array 474 has its outputs enabled by signal SRCLIVSEL0.

Array 480 has the following inputs: HALTPSC/Q, SRCLVL1FUL/Q,FATOWSC/Q, FBTOWSC/Q, REWLOOK/Q, DRCRATERR/Q, DRCXFRCOMP/Q and DMASTOD. Inverter array 480 has its outputs enabled by signal SRCLIVSEL2-.

Bus 490 carries the command word from SRCLVL1 register 19, the level 1 register, to bus 488 of the system read controller.

Buses 491–495 carry formatter status bytes from the SRC/WSC formatter, to be described later.

Figure 44A:
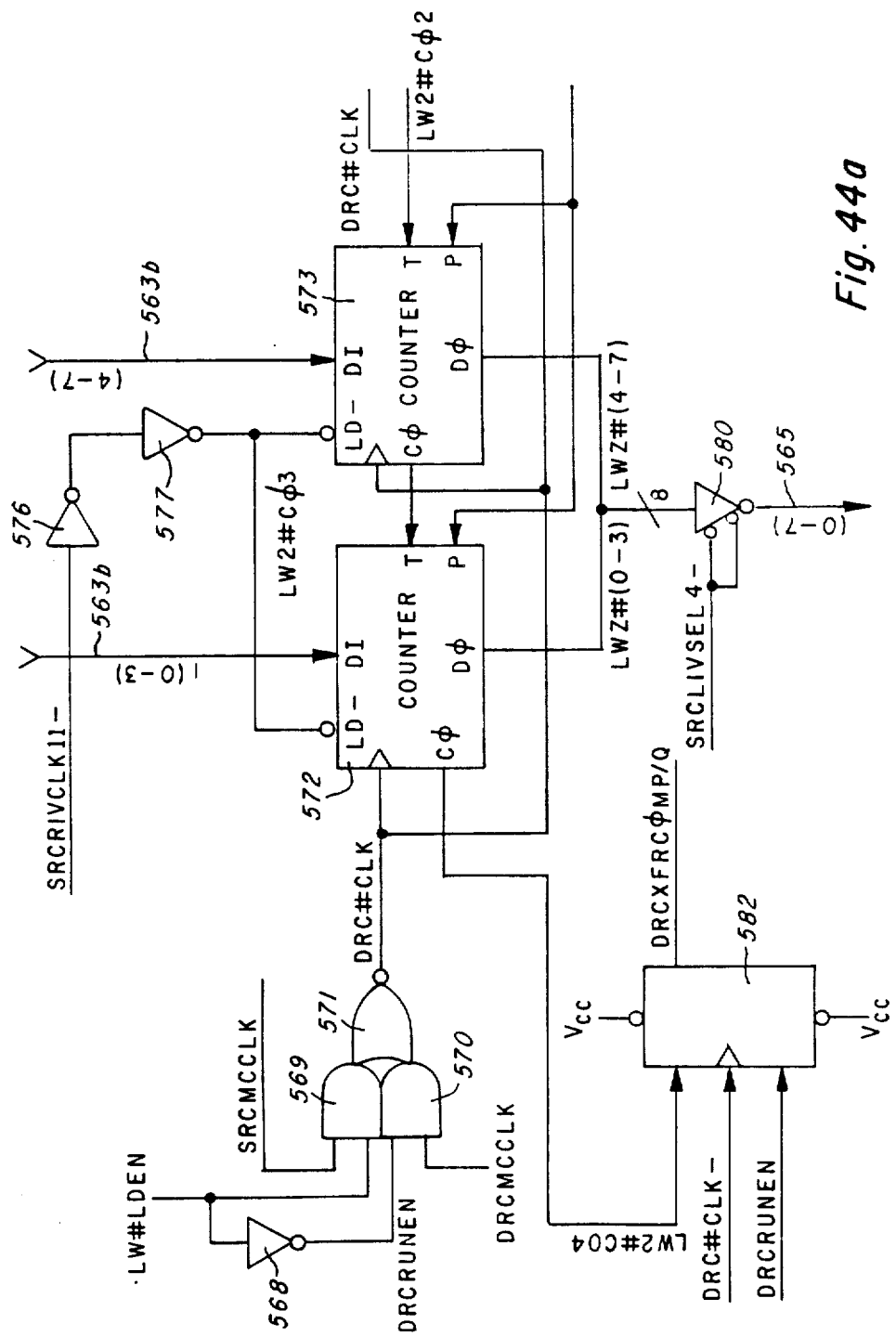
FIGS. 44a and 44b form a schematic of the list word two counter.
Figure 44B:
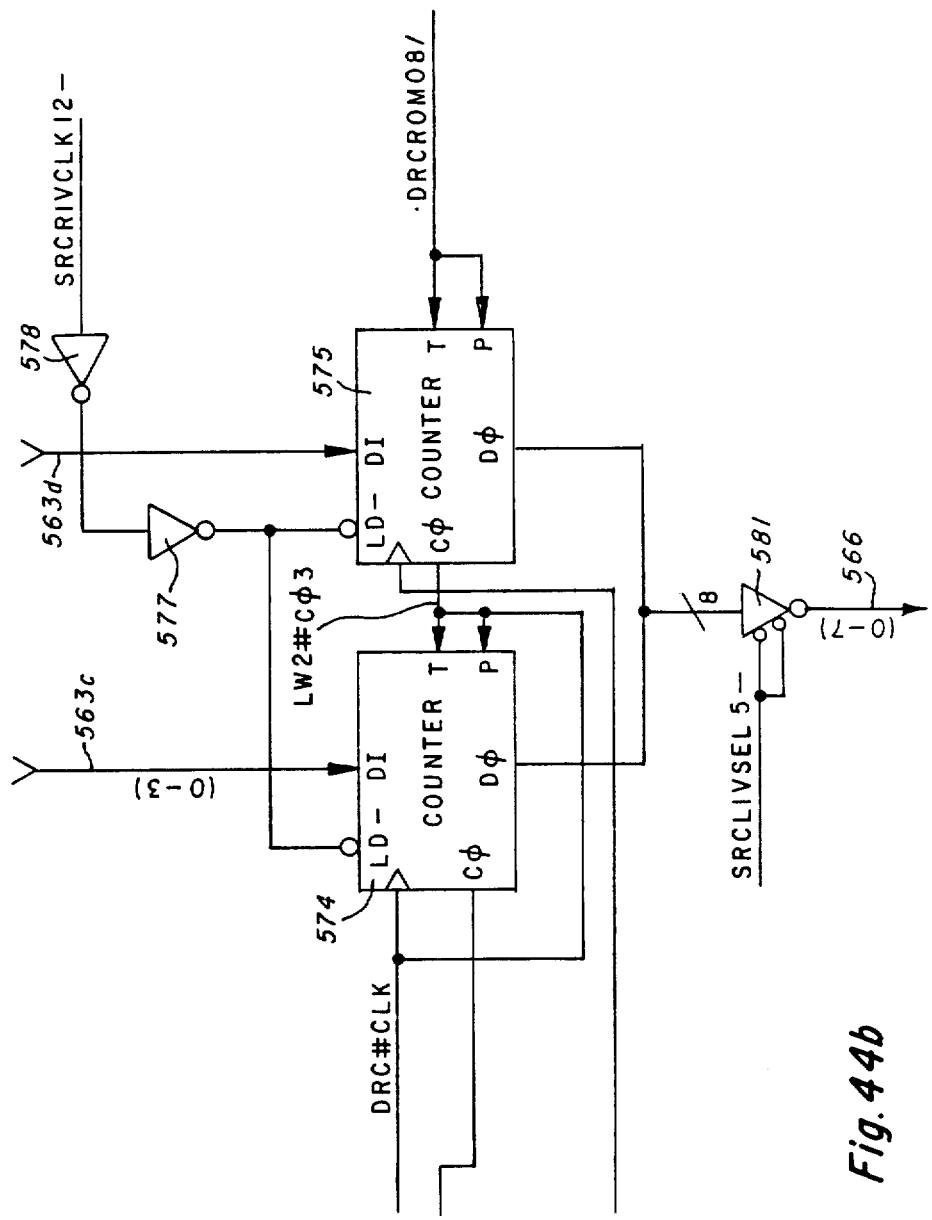

Still other inputs to bus 488 include buses 565 and 566 from the list word two counter of FIGS. 44a and 44b.

Still another set of inputs to bus 488 is the output set of inverter array 508 whose outputs are enabled by signal SRCLIVSEL3-and whose inputs are provided from the data read controller 30. The input signals to array 508 are the TRDPAR#(27-20) signal outputs from a tape read data parity error counter to be described later. The number of parity errors is counted and transferred to the memory by way of this circuit.

Bus 488 provides the inputs to inverter array 481 whose output is bus 496, the write interface vector bus, similar to those previously described in association with the other controllers. SRCRIVBUS(0–7) bus 496 provides outputs to the registers 484–486. It also provides outputs on buses 561 and 562 to the bytes/scan counter of FIGS. 43a and 43b. Bus 496 provides bus 497 to the SRC status FIFO of FIG. 42. Further provided are eight line buses 498 and 499 to the SRC memory address counter, FIGS. 39a and 39b. Also, eight-line bus 506 from bus 496 provides inputs to the formatter logic to be described later. Bus 507 from bus 496 goes to the data read controller 30 and is described later.

Line 1 of bus 496 provides one input to NAND gate 487 whose other input is provided by signal SRCRIVCLK3 and whose output is signal SRCCLRABORT-, applied to terminal S47. Bus assemblies 563(i a–d) and 564(a–d) go to the list word two counter of FIGS. 44a and 44b and to the list word six counter of FIGS. 45a and 45b respectively.

The eight lines of bus 496 provide an input to flip flop array 509 which is clocked by signal SRCRIVCLK19- which has four outputs corresponding to lines 0–3 of bus 496 that are used for test flags, one line used for GAPFLG/Q and one for signal DRCGO/Q.

Lines 0–4 from bus 496 provide the input to flip flop array 510 which is clocked by signal SRCRIVCLK9- and which has three outputs providing signals SRCTA(0-2)/Q and two outputs providing signals SRCDS(0-1)/Q.

Lines 3–7 of bus 496 provide inputs to flip flop array 511 whose outputs are signals SRCCMD(0-4)/Q.

Lines 1 and 2 of bus 496 provide inputs to flip flop array 512 whose outputs are signals SRCESC(0-1)/Q. Signal SRCRIVCLK10- provides the clock input to both flip flop arrays 511 and 512.

Figure 38A:
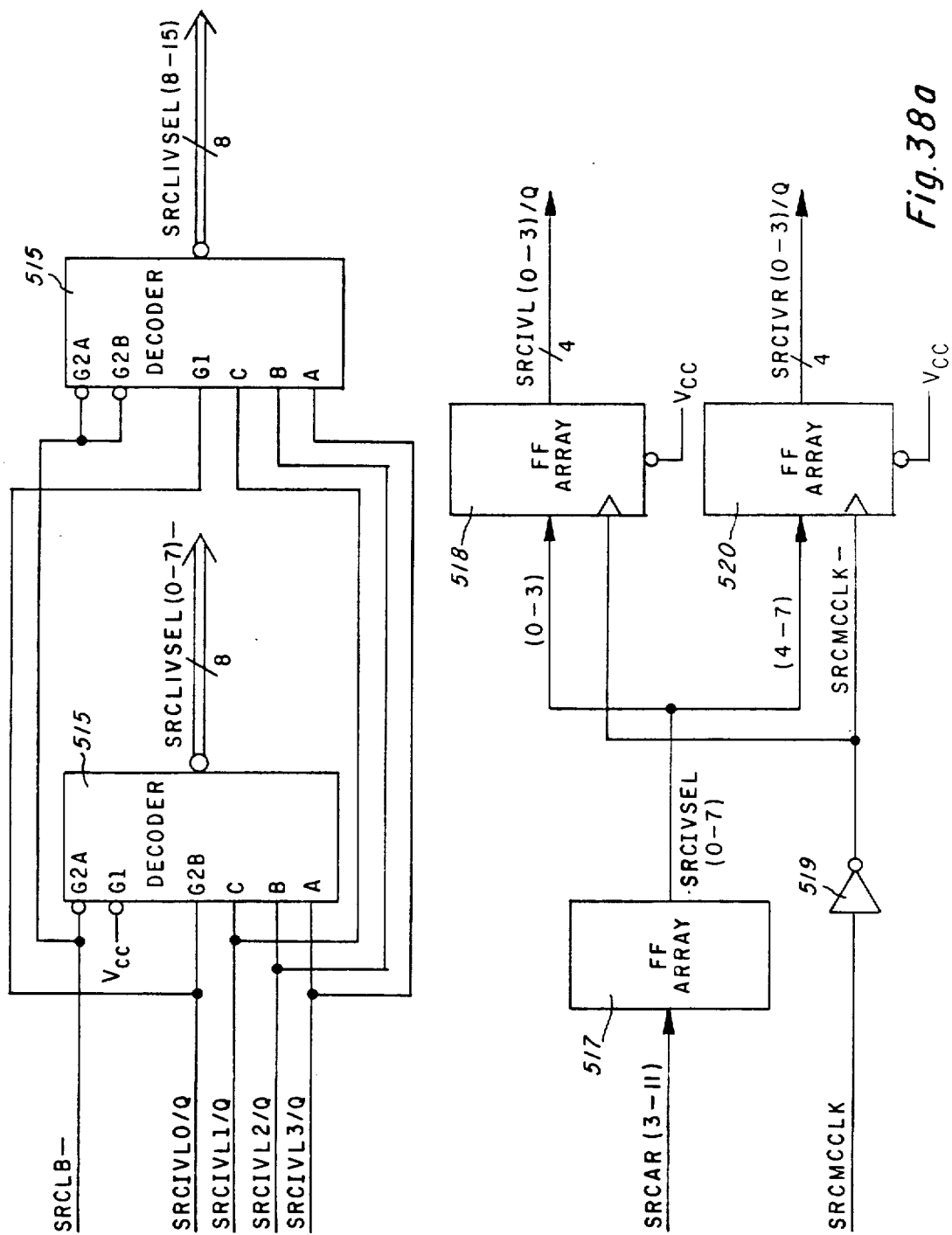
FIGS. 38a and 38b illustrate circuitry for the development of control signals for the SRC.
Figure 38B:
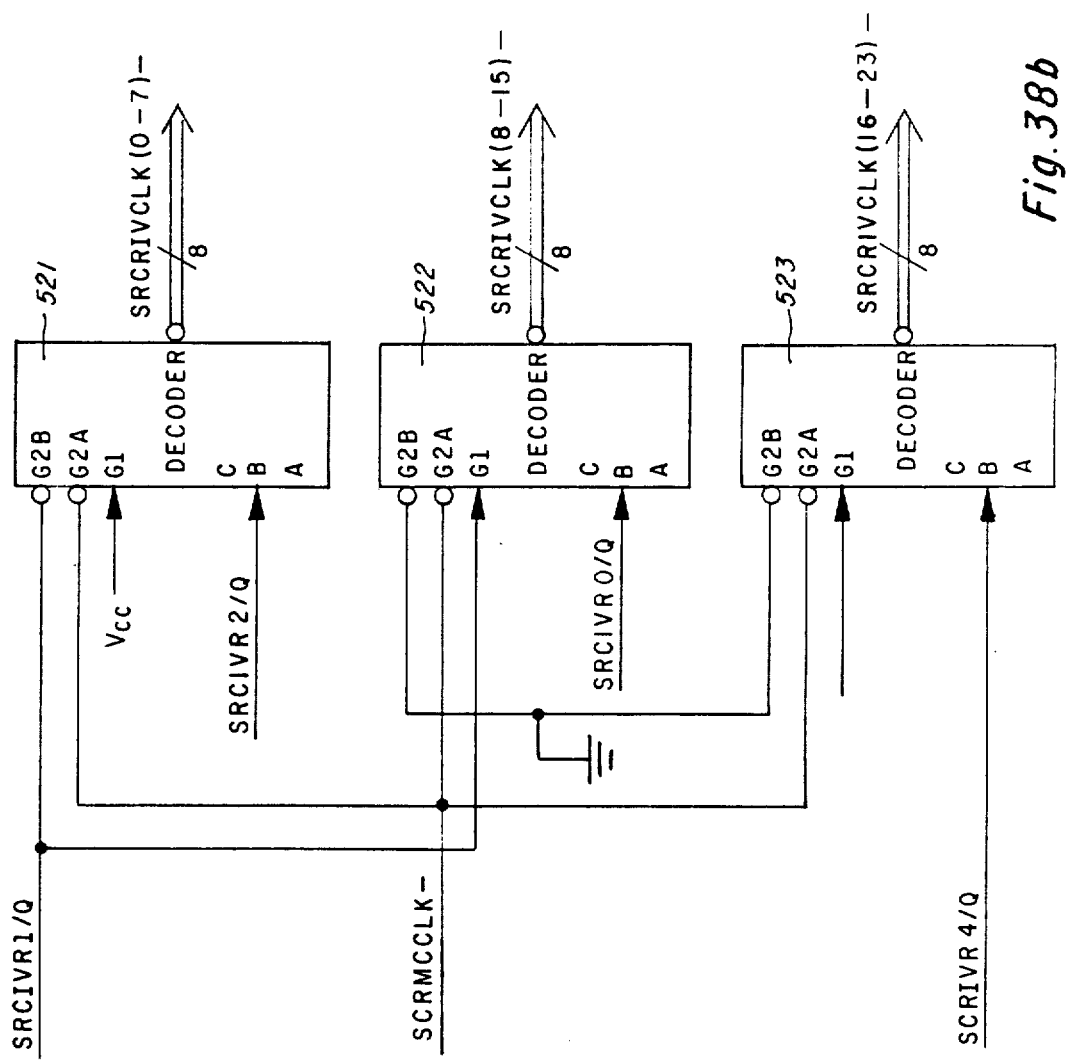

FIGS. 38a and 38b illustrate the SRCIV select circuitry. Decoders 515, 516, 521, 522 and 523 are all Texas Instruments Type 138 3-to-8 line decoders described beginning at page 7-134 of the TTL Data Book.

Signal SRCLB- from terminal LB- of microprocessor 500 provides the G2A enable input of decoder 515 and the G2A and G2B enable inputs of decoder 516. Voltage VCC is applied to the G1 enable input of decoder 515. Signal SRCIVLO/Q from flip flop array 518 is connected to the G2B enable input of decoder 515 and to the G1 enable input of decoder 516. Signals SRCIVL3/Q, SRCIVL2/Q and SRCIVL1/Q provide the A, B and C select inputs to each of decoders 515 and 516. Decoder 515 provides signals SRCLIVSEL(0-7) and decoder 516 provides outputs SRCLIVSEL(8-15)-.

Lines 3–11 of bus SRCAR from microprocessor 500 provide the inputs to flip flop array 517 whose output signals SRCLIVSEL(0-7) are applied to flip flop array 518 (0-3) and to flip flop array 520 (4-7). Signal SRCMCCLK from microprocessor 500 is inverted through inverter 519 and provides the clock input to each of flip flop arrays 518 and 520. The output signals of flip flop array 518 are SRCIVL(0-3)/Q and the output signals from flip flop array 520 are SRCIVR(0-3)/Q Signal SRCIVR1/Q from flip flop array 520 provides the G2B and G1 enable inputs of decoders 521 and 522, respectively. Voltage VCC is connected to the G1 enable input of decoder 521. Signal SRCMCCLK-, from the output of inverter 519, is applied to the G2A enable input of each of decoders 521, 522 and 523. The G2B enable inputs of decoders 522 and 523 are grounded. Signal SRCIVR0/Q, from flip flop array 520, provides the input signal to enable input G1 of decoder 523. Select input terminal B of each of decoders 521, 522 and 523 are activated by signals SRCIVR2/Q through 4/Q from flip flop array 520.

The output signals from flip flop 521 are SRCRIVCLK(0-7)-; the outputs from decoder 522 are signals SRCRIVCLK(8-15); the outputs from decoder 523 are signals SRCRIVCLK(16-23)-.

The circuitry of FIGS. 30a and 30b then provides the various select signals and clock signals that are used throughout the SRC27.

FIGS. 39a and 39b illustrate the SRC memory address counter circuitry. The addressing is done to effect reading from the central memory of various words that are to be compared in the circuitry of the data read controller 30, to be described later.

Counter assemblies 530–533 are Texas Instruments Type 74LS163, described beginning at page 7-190 of the TTL Data Book. Bits 0–3 from bus 498, connected to bus 496, provide the-input signals to counter 530. Bits 4–7 from bus 498 provide the inputs to counter 531. Bits 0–3 from bus 499, connected to bus 496, provide the inputs to counter 532 and bits 4–7 from bus 499 provide the inputs to counter 533.

Signal SRCRIVCLK3-, from decoder 521, is inverted through inverter 536 and provides one input to AND gate 535 whose other input is provided by line 0 of bus 496. The output of AND gate 535 provides the enable P input of counter 533 whose enable T input is connected to voltage VCC. Each of counters 530–533 is clocked by signal SRCMCCLK-. The ripple carry output of counter 533 provides both enable P and enable T signals for counter 532. The ripple carry output from counter 533 also provides the enable P input to each of counters 531 and 530. The ripple carry output of counter 532 provides the enable T connection to counter 531 whose ripple carry output is connected to the enable T terminal of counter 530.

Signal SRCRIVCLK8-, from decoder 522, is inverted through inverter 538 and again through inverter 537 and provides the load inputs to counters 533 and 532. Signal SRCRIVCLK7-, from decoder 521, is inverted through inverter 540 and then through inverter 539, providing the load inputs to each of counters 531 and 530. The clock input to each of counters 530-533 is provided by the signal SRCMCCLK-, mentioned above.

The outputs from counters 530 and 531 are inputs to buffer array 534 which provides eight inputs to the memory address bus 39. The outputs from counters 532 and 533 provide eight inputs to buffer array 541 whose eight outputs are inputted to memory address bus 39. Buffer arrays 534 and 541 are enabled by signal FETCHSRCEN-from terminal S64.

FIG. 40 is a schematic illustrating the generation of a control signal. Signal DMACST00, indicating that the PSC28 is inactive, provides a J input to flip flop 479. The output of inverter 477, signal SRCX2CLK-clocks flip flop 479. Signal CLRPSC is inverted through inverter 489 and provides the clear input to flip flop 479 with the Q output providing generated signal PSCSTO/Q.

FIG. 41 is another simple schematic illustrating the generation of a control signal. Line 0 of bus 496 provides one input to AND gate 543. Signal SRCRIVCLK10- from decoder 522 is inverted through inverter 542 and provides the other input to AND gate 543. The output of AND gate 543 provides the J input to flip flop 544 which is clocked by the signal SRCMCCLK- and whose Q- output is control signal PPEND#M1-, applied to terminal S28 and to the K-input of flip flop 544.

Figure 42:
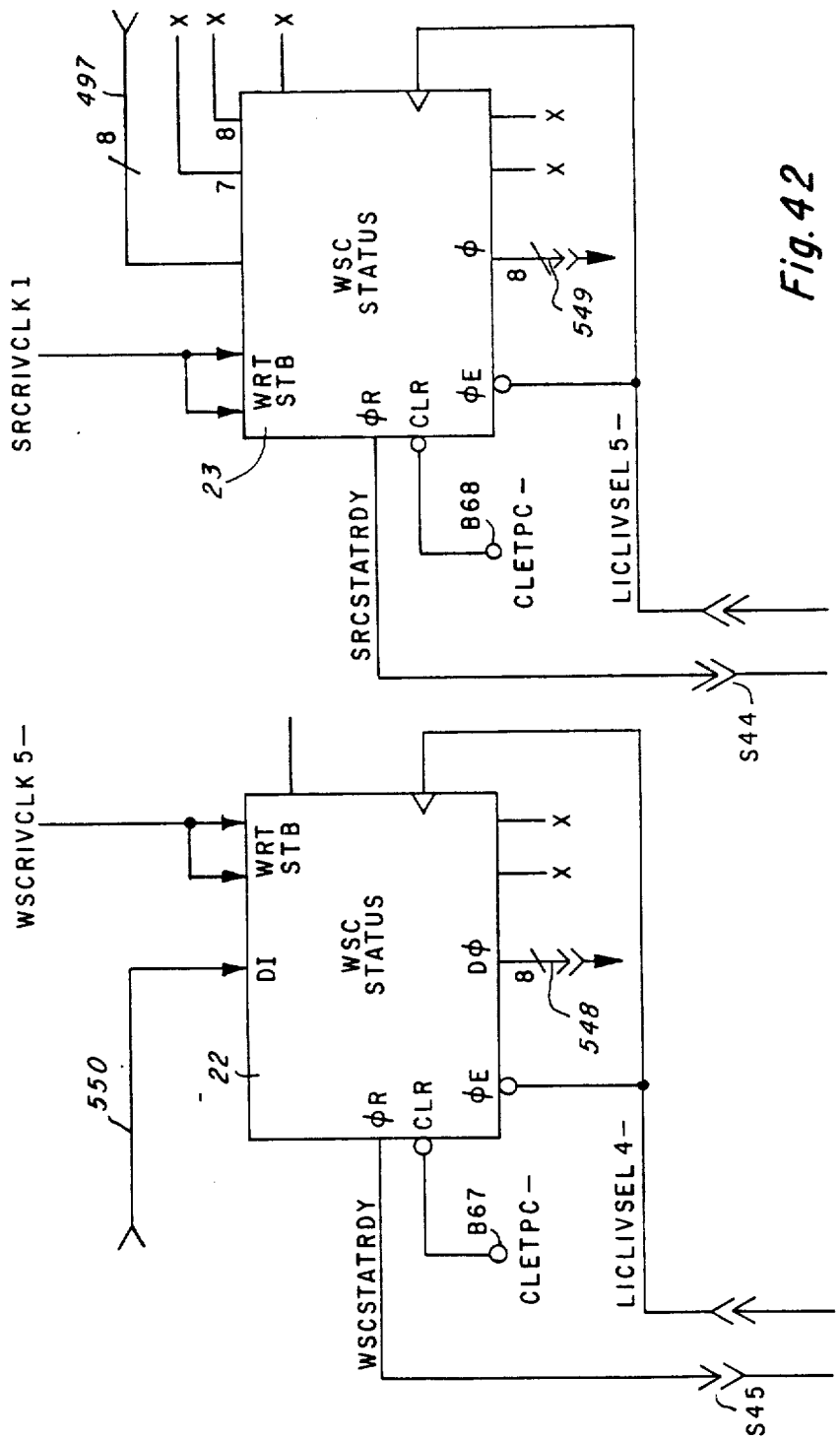
FIG. 42 illustrates the status FIFO's 22 and 23 of FIG. 1b.

FIG. 42 illustrates, in more detail, the status FIFO's 22 and 23 of Figure 1b. These devices are Texas Instruments Type 74S225 asynchronous first-in first-out memories described in the Bipolar Microcomputer Components Data Book, LCC4270. Bus 550 from the right interface vector bus of write sequence controller 26 provides eight inputs to status FIFO 22 whose CK A and B inputs are provided by signal WSCRIVCLK5-. Its clear input is provided by the signal CLRTPC-; its OR input is provided by the signal WSCSTATRDY, its UNLOADCK input is provided by the signal LICLIV-SEL4- from decoder 446 and its OE- input is provided by signal LICLIVSEL4-. Its outputs are provided on bus 548 to LIC bus 397.

Bus 497 from bus 496 provides eight inputs to status FIFO 523 which is clocked by signal SRCRIVCLK1- from decoder 521. It is cleared by signal CLRTPC-and its OR input is provided by signal SRCSTATRDY from terminal S44. Its OE-input and UNLOADCK input is provided by signal LICLIVSEL5- from decoder 444. Eight outputs from status FIFO 23 are combined in bus 549 and connected to bus 397 of LIC15.

A status word held in the status FIFO 23 contains first, an interrupt CPU bit to provide an interrupt capability. Also provided are status indicator, a terminate status, a store instruction bit and an abnormal termination bit. LIC15, by way of controlling the OE-terminal of each of status FIFO's 22 and 23, sends any status information received for storage into the central memory.

Figure 43A:
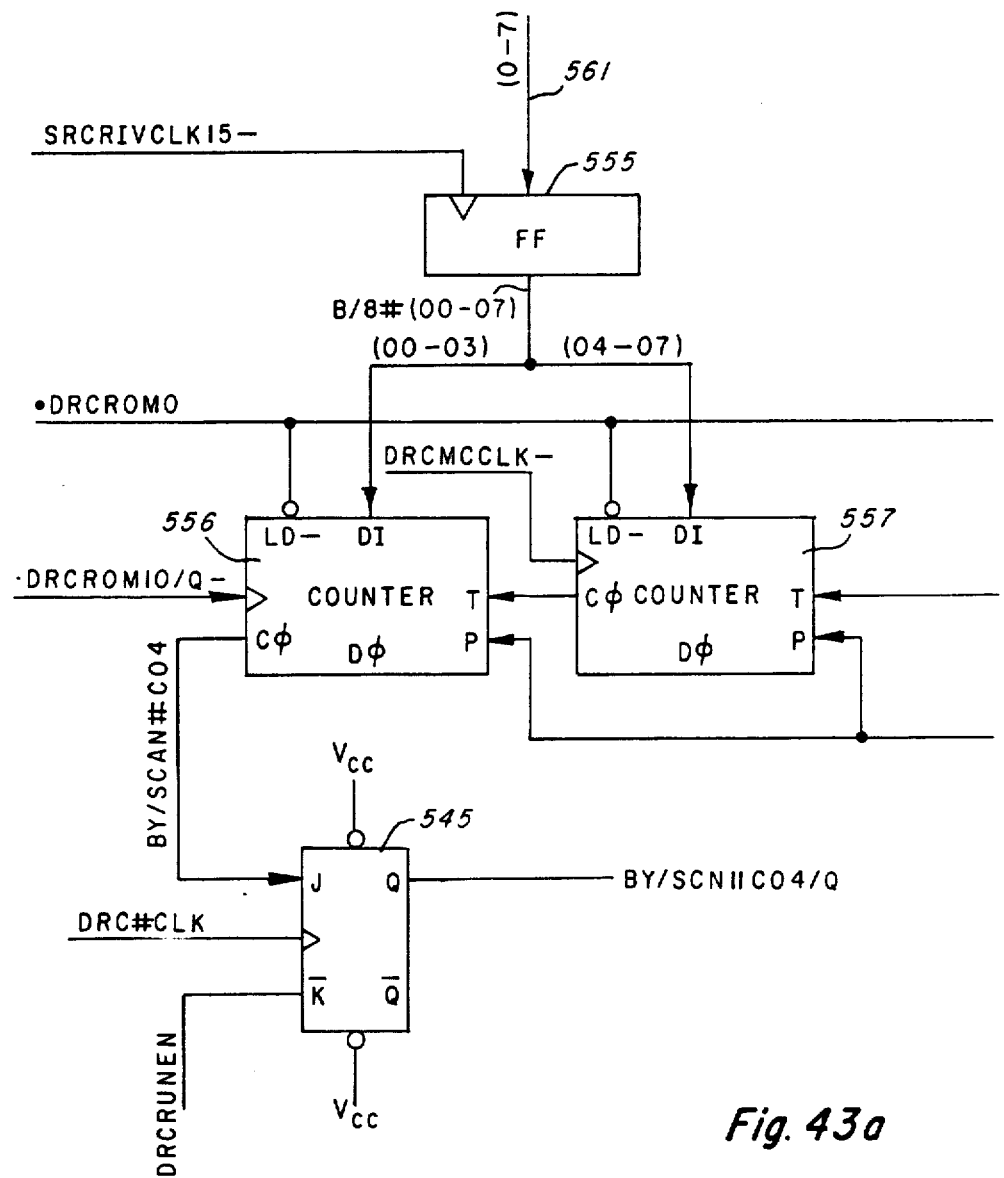
FIGS. 43a and 43b, together, are a schematic of the bytes per scan counter.
Figure 43B:
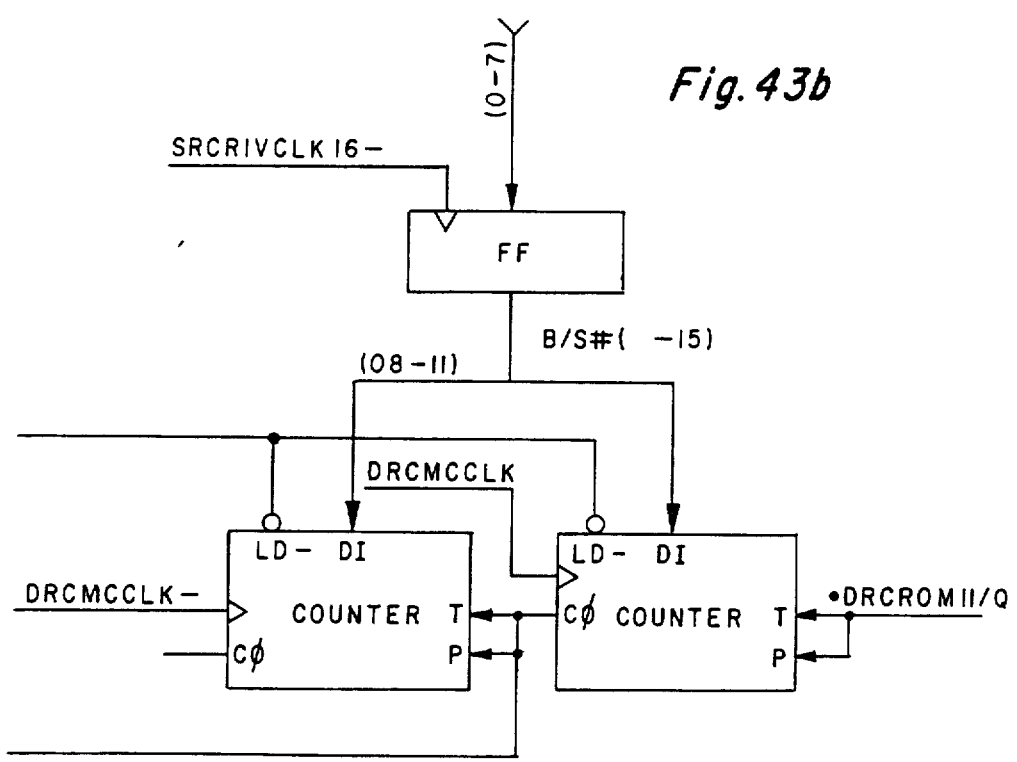

FIGS. 43a and 43b schematically represent the "bytes per scan counter". The counter is loaded by SRC27 and incremented by the data read controller 30. This particular counter is used for a tape read purpose to be described later.

Buse 561 and 562 from bus 496 provide inputs to flip flop arrays 555 and 558, respectively. These arrays are clocked by signals SRCRIVCLK15- and SRCRIVCLK16-, respectively, from decoders 522 and 523, respectively. Bits 00-03 from array 555 are input to counter 556 and bits 4-7 are input to counter 557. Counters 556, 557, 559 and 560 are Texas Instruments Type 74LS163 synchronous 4-bit counters described beginning at Page 7-190 of the TTL Data Book. The load input of all these counters is provided by signal DRCROM10/Q-, ultimately from the ROM of the data read controller.

Bits 8-11 from array 558 provide inputs to counter 559, bits and bits 12-15 provide inputs to counter 560. Signal DRCROM11/Q, ultimately from the ROM of DRC30, provides the P and T enable inputs to counter 560 whose ripple carry output provides the T and P enable inputs to counter 559 and the P enable inputs to counters 557 and 556. The ripple carry output of counter 559 provides the T enable input to counter 557 and the ripple carry output of counter 557 provides the T enable input to counter 556. The ripple carry output of counter 556 provides the J input to flip flop 545 which is clocked by signal DRC#CLK- from DRC30 and whose K- input is provided by signal DRCRUNEN from DRC30. The Q output of flip flop 545 provides the counter output signal BY/SCN#CO4/Q.

FIGS. 44a and 44b schematically illustrate another counter assembly made up of counters 572, 573, 574 and 575, all identical to the counters described in association with FIGS. 43a and 43b. Lines 0-3 from bus 46 provide inputs to counters 572 and 574 while lines 4-7 of bus 496 provide inputs to counters 573 and 575. The load input signals for counters 572 and 573 are provided by signal SRCRIVCLK11- from decoder 522, inverted through inverter 576 and again through 577. The load signal for counters 574 and 575 is provided by signal SRCRIVCLK12- from decoder 522, inverted through inverter 578 and again through inverter 579.

Signal LW#LDEN from flip flop array 478 provides one input to AND gate 569. Signal LW#LDN is inverted through inverter 568 and provides one input to AND gate 570. The other input to AND gate 569 is signal SRCMCCLK and the other input to AND gate 570 is signal DRCMCCLK, from DRC30. The outputs of AND gates 569 provide the inputs to NOR gate 571 whose output signal, DRC#CLK- provides the clock input to each of counters 572-575.

Signal DRCROM08/Q, ultimately from the DRC30 ROM provides the enable T and P inputs to counter 575 whose ripple carry output provides the enable T and P inputs to counter 574 and the enable P inputs of counters 573 and 572. The ripple carry output from counter 574 provides the enable T input to counter 573 whose ripple carry out provides the T input to the enable input of counter 572. The ripple carry output from counter 572 is connected to the J input of flip flop 582 which is clocked by the signal DRC#CLK-, from NOR circuit 571, and whose K- input is provided by the signal DRCRUNEN from inverter 568. The Q output of flip flop 582 is signal DRCXFRCOMP/Q. The outputs of counters 572 and 573 are inverted through inverter array 580 whose output is enabled by signal SRCLIVSEL4-. The output of inverter array 580 is connected through bus 565 to bus 488. The outputs from counters 574 and 575 are inverted through inverter 581 whose output is enabled by signal SRCLIVSEL5- from decoder 515, whose output is bus 566, connected to bus 488.

Figure 45A:
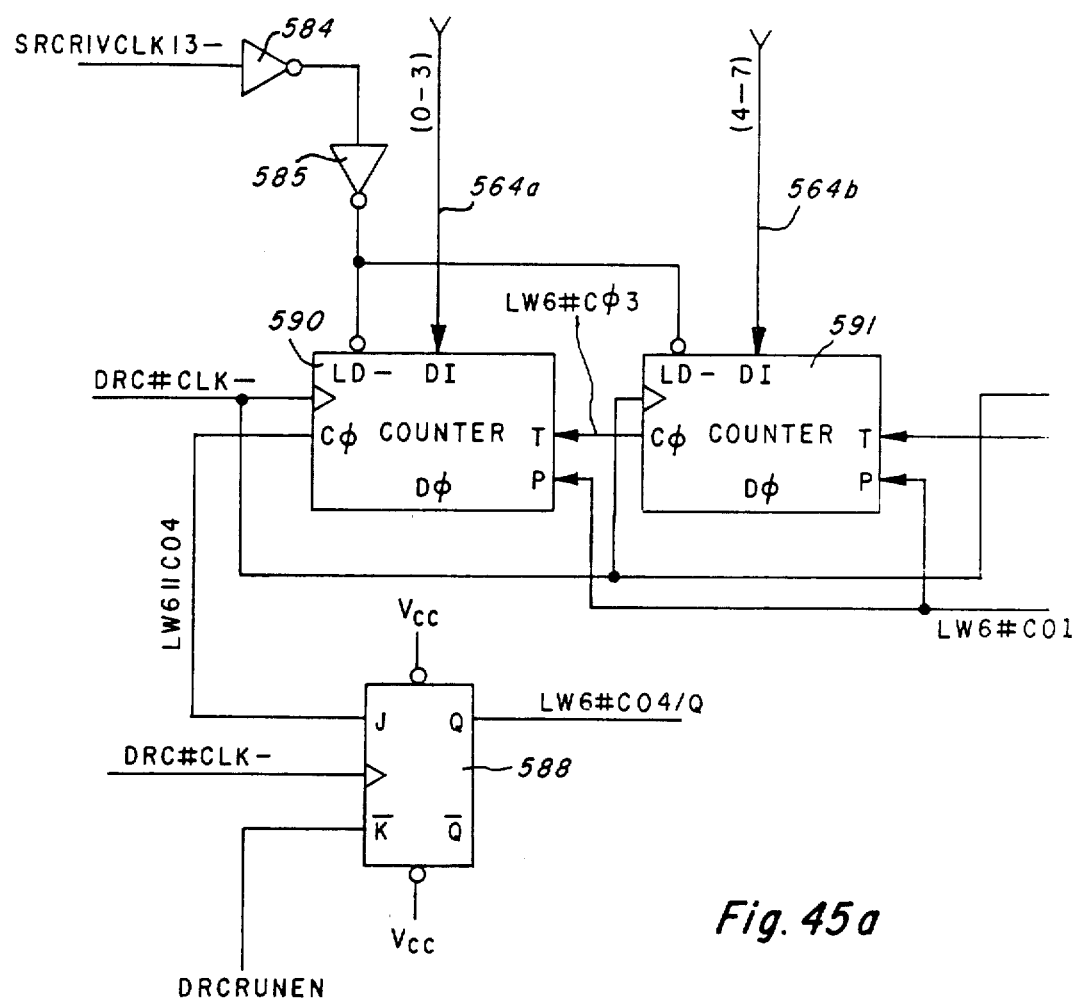
FIGS. 45a and 45b are schematic of the list word six counter.
Figure 45B:
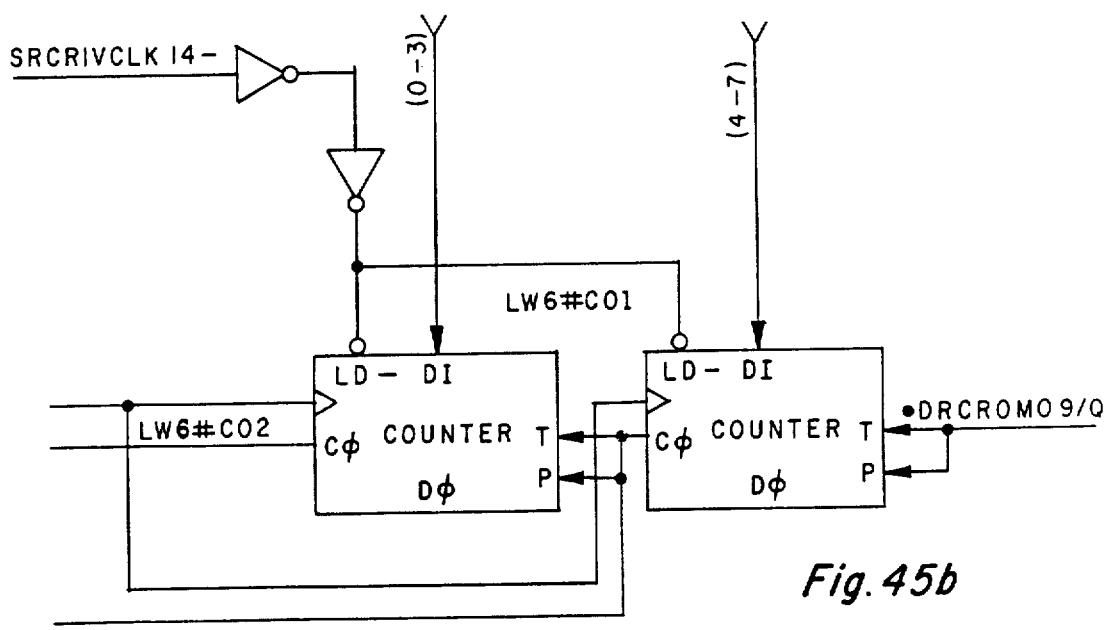

FIGS. 45a and 45b depict still another counter, this one for counting list word 6. The reasons for such counting will be provided in the Mode of Operation description that follows.

This general purpose counter assembly is made up of four counters assemblies, 590-593, identical to the counters of FIGS. 44a and 44b. Lines 0-3 from bus 496 provide the inputs to counters 590 and 592. Lines 4-7 of bus 496 provide the inputs to counters 591 and 593. The load signal for counters 590 and 591 is provided by signal SRCRIVCLK13- from decoder 522, inverted through inverter 584 and again through inverter 585. The load input for counters 592 and 593 is provided by signal SRCRIVCLK14- from decoder 522, inverted through inverters 586 and 587. Counters 590-593 are all clocked by the signal DRC#CLK- from NOR circuit 571.

Signal DRCROM09/Q, ultimately from the DRC ROM, provides the P and T enable inputs to counter 593 whose ripple carry output provides the T and P enable inputs to counter 592 and the P enable inputs to counters 591 and 590. The ripple carry output from counter 592 provides the T enable input to counter 591 whose ripple carry output provides the T enable input to counter 590. The ripple carry output from counter 590 provides the J input to flip flop 588 which is clocked by signal DRC#CLK-, whose K- input is provided by signal DRCRUNEN and whose output is signal WL6#CO4/Q.

None of the data outputs are used in this operation, but simply the last carry out of counter 590.

Figure 46A:
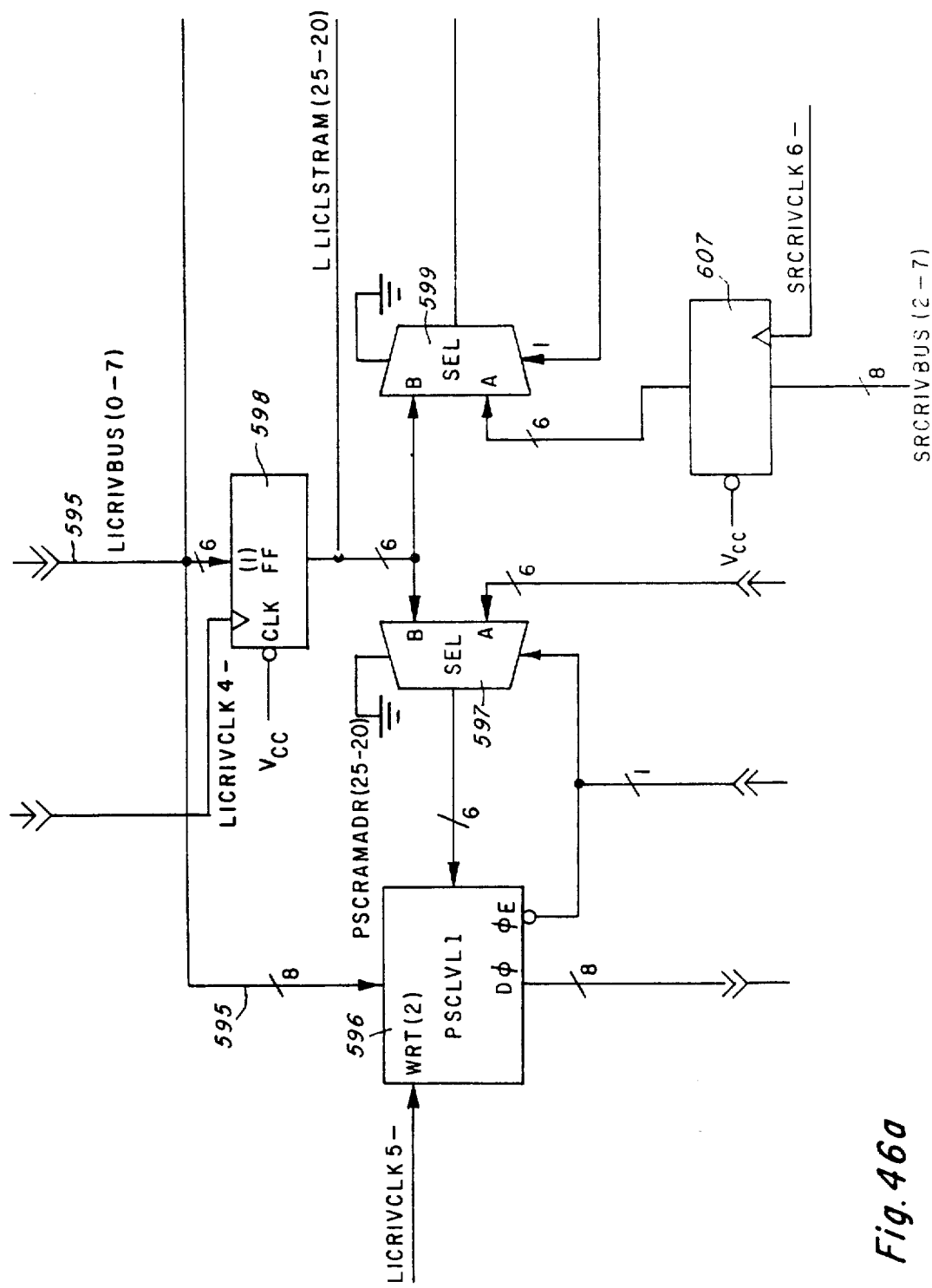
FIGS. 46a and 46b form a schematic of the level one files for PSC, SRC and WSC.
Figure 46B:
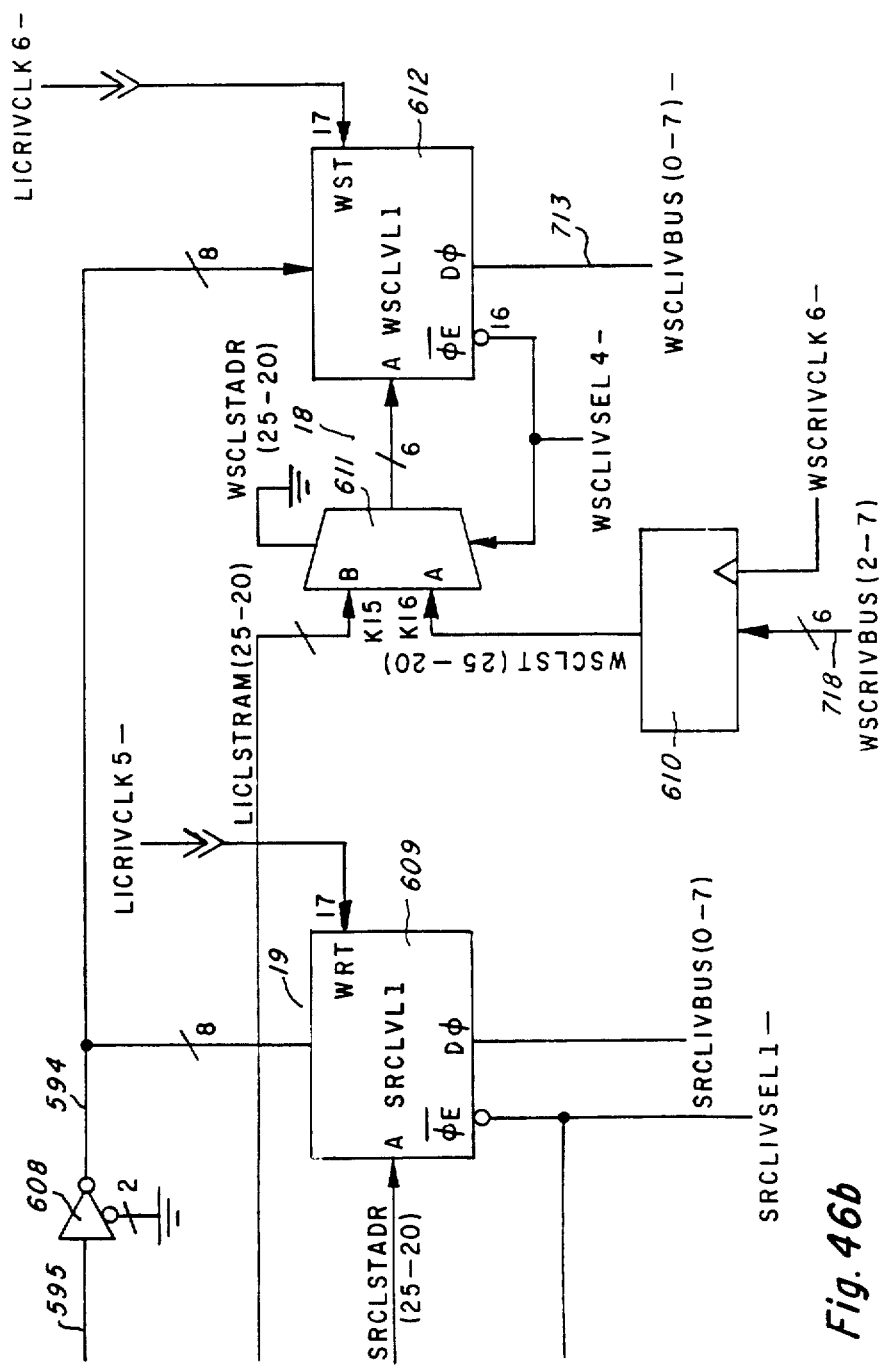

FIGS. 46a and 46b schematically illustrate the WSCLVL1 register 18, the SRCLVL1 register 19 and the PSCLVL1 register 20 shown in FIG. 1a. RAM's 596, 609 and 612, in this preferred embodiment, are Texas Instruments Type 74S208 random-access memories described in the Bipolar Microcomputer Components Data Book, LCC4270. Selectors 597, 599 and 611 select addresses for the RAM's 596, 609 and 612, respectively. Selectors 597, 599 and 611 are Texas Instruments Type 74LS157 Data Selectors/Multiplexers described beginning at page 7181 of the TTL Data Book. All of the three selectors have their B inputs provided by the outputs of flip flop array 598 whose inputs are provided from bus 496 over connecting bus 595. Flip flop array 598 is clocked by signal LICRIVCLK4-, from decoder 521. The A inputs to selector 597 are provided by signals XFR(10-15) from PSC28. Selector 599 receives its A inputs from flip flop array 607. The inputs to flip flop array 607 are provided by lines 2-7 of bus 496 and it is clocked by signals SRCRIVCLK6- from decoder 521. Th A inputs for the WSC selector 611 come from the output of of flip flop array 610 whose inputs are provided by lines 2-7 of the right interface vector bus of WSC26. Flip flop array 610 is clocked by signal WSCRIVCLK6- from WSC26. The inputs to PSC RAM 596 are provided from bus 595 while the inputs to SRC RAM 609 and WSC RAM 612 come from bus 594 which is the inverted output of inverter array 608. Array 608 receives bus 595 as an input. RAM's 596 and 609 are clocked by signal LICRIVCLK5- and RAM 612 is clocked by signal LICRIVCLK6-, both signals from decoder 521. The select input of selector 597 and the output enable input of RAM 596 are controlled by signal LICSEL0- from PSC 28. The select input of selector 599 and the output enable input of RAM 609 are controlled by signal SRCLIVSEL1- from decoder 515. A select input to selector 611 and the output enable input of RAM 612 is controlled by signal WSCLIVSEL4-, from WSC26.

The combination of selector 597 and RAM 596 comprises the PSCLVL1 register 20 of FIG. 1a and provides 8-bit word outputs to the PSC28. Selector 599 and RAM 609 comprise SRCLVL1 register 19 of FIG. 1a with RAM 609 providing 8-bit words to the bus 488. Selector 611 and RAM 612 comprise WSCLVL1 register 18 with RAM 612 providing an 8-bit word output to the left interface vector bus of WSC26.

It should be noted that the RAM's 596, 609 and 612 have addresses selected as though they were FIFO's. That is, the first word entered is the first word removed. However, since they are in fact RAM's, any desired sequencing could be accomplished.

Figure 47C:
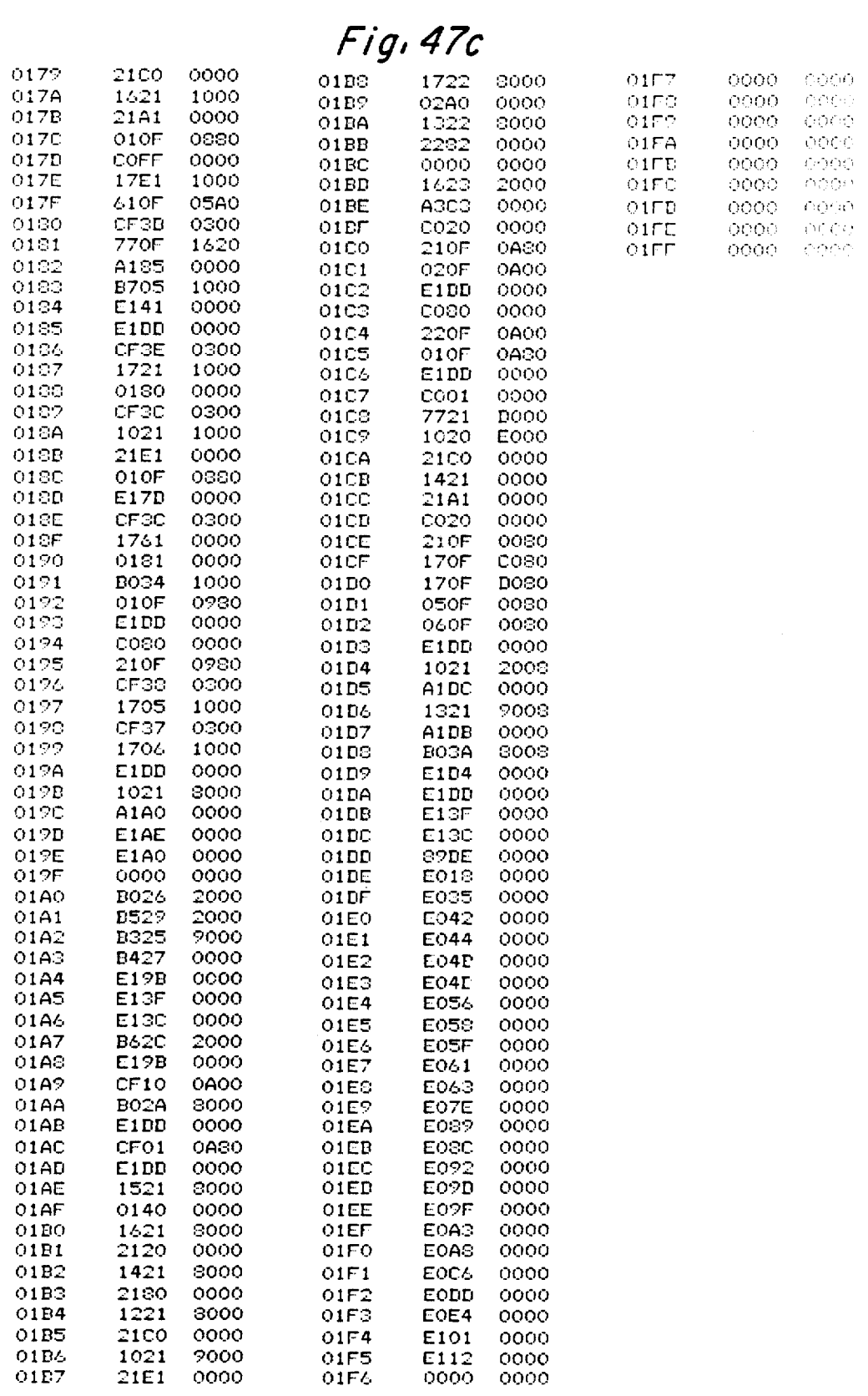

FIG. 47 is a map of the contents of ROM 502.

DATA READ CONTROLLER

Figure 48A:
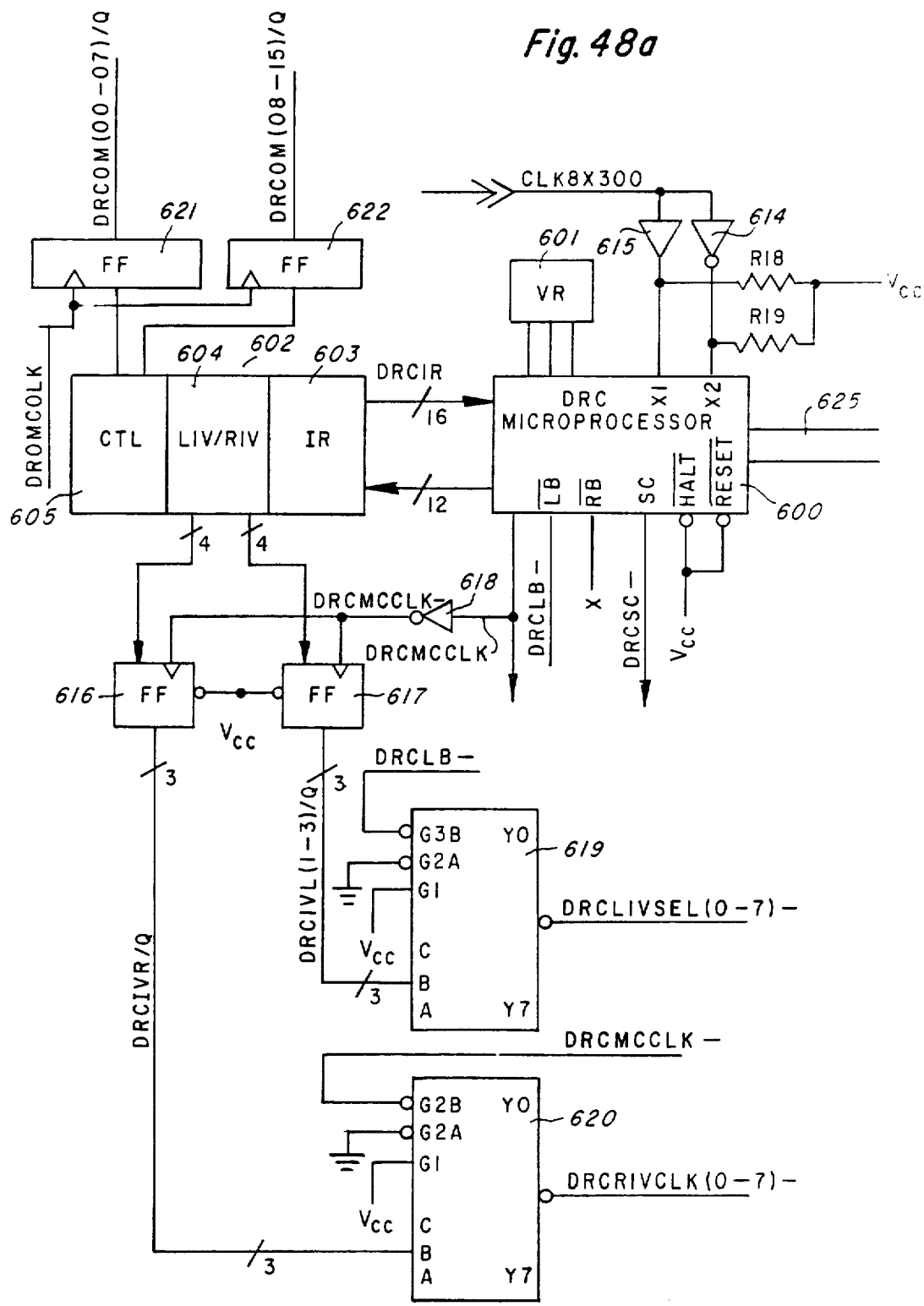
FIGS. 48a–48c form a schematic of the data read controller 30 of FIG. 1b.
Figure 48B:
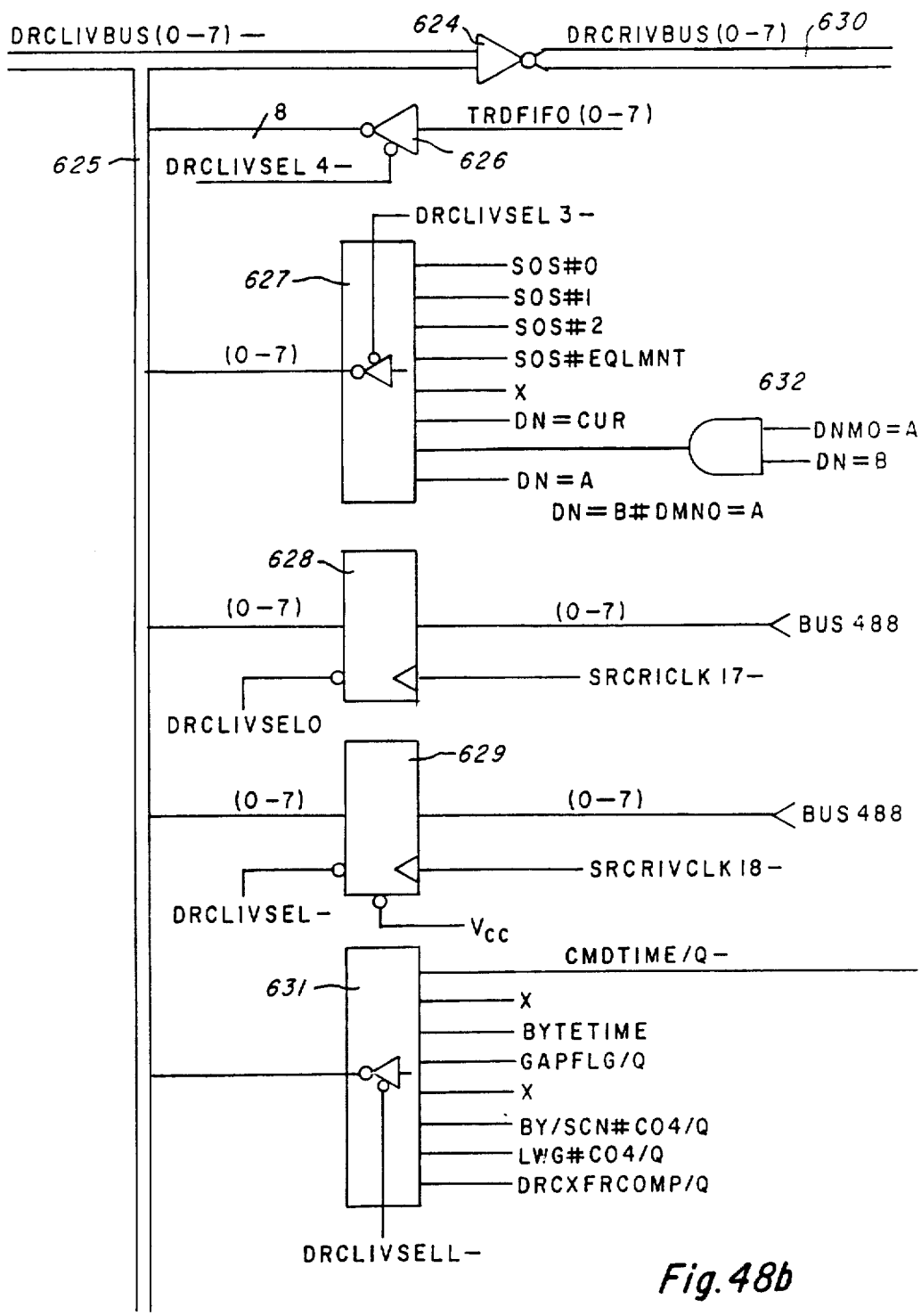
Figure 48C:
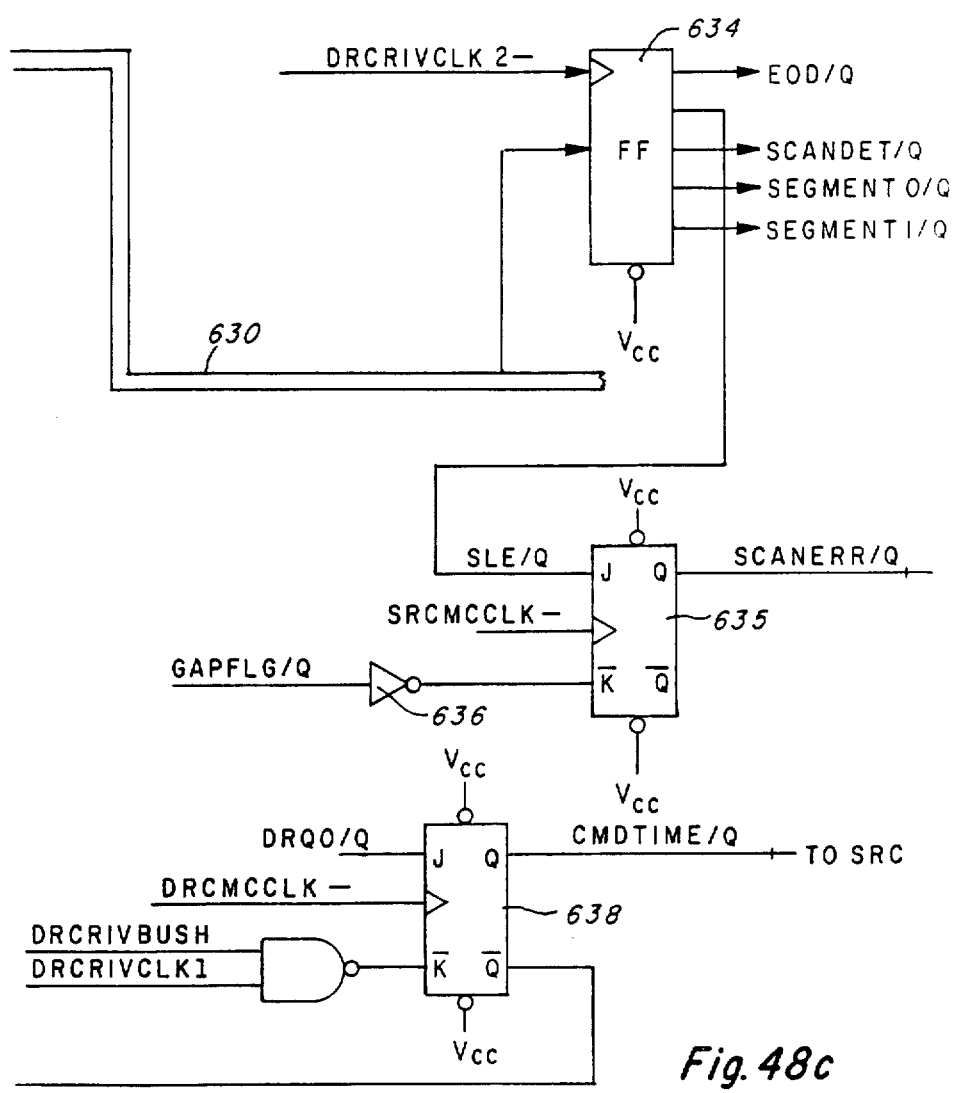

FIGS. 48a, b and c diagrmmatically illustrate DRC 30 that is designed around its microprocessor 600. Microprocessor 600 is identical to microprocessors 200-500 having voltage regulator 601 and ROM 602. ROM 602 has instruction register portion 603, and LIV/RIV address portion 604, and a control portion 605. Control portion 605 provides 8 bits to flip flop array 621 and the next higher order 8 bits to flip flop array 622. The outputs of array 621 are signals DRCROM(00-07)/Q and in the outputs from array 622 are signals DRCROM(08-15)/Q. Clock signal CLK8X300, as in the prior cases, is buffered through buffer 612 and applied to terminal X1. CLK8X300 is also inverted through inverter 614 and applied to terminal X2. Voltage VCC is applied, through resistor R18 to terminal X1 and through resistor 19 to terminal X2. Signal DRCMCCLK from terminal MCCLK of microprocessor 600 is inverted through inverter 618 and clocks flip flop arrays 616 and 617. Signal DRCSC- is provided from terminal SC of microprocessor 600. Four bits from the LIC/RIV portion 604 provide inputs to flip flop array 616, and another four bits from portion 604 provide inputs to flip flop array 617 Three outputs from array 616 are applied to the select input terminals A, B and C of decoder 620, a Texas Instruments Type 74LS138. Three outputs from array 617 provide the A, B and C select inputs for decoder 619, identical to decoder 620. Signal DRCLB- from microprocessor 600, terminal LB-, provides the G2B enable input signal of decoder 619 and signal DRCMCCLK- from the output of inverter 618 provides the input to enable terminal G2B of decoder 620. Enable inputs G2A and G1 of each of decoders 610 and 620 are grounded and connected to voltage VCC, respectively. The outputs of decoder 619 are signals DRCLIVSEL(0-7)- and the outputs of decoder 620 are signals DRCRIVCLK(0-7)-.

RCLIVBUS(0-7)-, which is bus 625, is connected to microprocessor 600 and has various inputs similar to such left interface vector buses described earlier. The tape read data FIFO signals, TRDFIFO(0-7) provide inputs to inverter array 626, whose outputs are enabled by signal DRCLIVSEL4-, from decoder 619 (providing eight outputs to bus 625). The start of scan counters 0, 1 and 2 provide input signals to inverter array 627 whose outputs are enabled by signal DRCLIVSEL3- from decoder 619. Signals DN=CUR and DN=A from the DRC data comparator shown in FIGS. 52a and 52b also provide inputs to array 627. Signals DN=B and DNMO=A are inputs to AND gate 632 which provides the last input to array 627. The outputs from array 627 are connected to bus 625. Bus 488 provides eight inputs to each of flip flop arrays 628 and 269, each providing eight inputs to bus 625. The output control terminal of array 625 is activated by signal DRCLIVSEL0- and the output control of array 629 is activated by signal DRCLIVSEL1-, both outputs of decoder 619. Flip flop array 628 is clocked by signal SRCRIVCLK17-, and array 629 is clocked by signal SRCRIVCLK18-, both signals being outputs from decoder 523.

Inverter array 631 whose outputs are connected to bus 625 has input signals CMDTIME/Q- from the Q-outut of flip flop 638; signal BYTETIME from SRC27; signal GAPFLG/Q from SRC27; signal BY/SCN#C04/Q from flip flop 545 of FIG. 43a; signal LW6#C04/Q from flip flop 588 of FIG. 45a and DRCXFRCOMP/Q. The outputs of array 631 are enabled by signal DRCLIVSEL2- from decoder 619.

Bus 625 provides inputs to inverter array 624 whose outputs make up the bus DRCRIVBUS(0-7) which is bus 630. Bus 630 provides inputs to flip flop array 634 which is blocked by signal DRCRIVCLK2- from decoder 620. Its outputs are signals EOD/Q, SCANDT/Q, SEGMENT0/Q, SEGMENT1/Q and FLE/Q, this last output providing the J input to flip flop 635. Signal GAPFLG/Q from flip flop array 509 is inverted through inverter 636 and provides the K- input to flip flop 635 whose Q output is signal SCANERR/Q.

Figure 49:
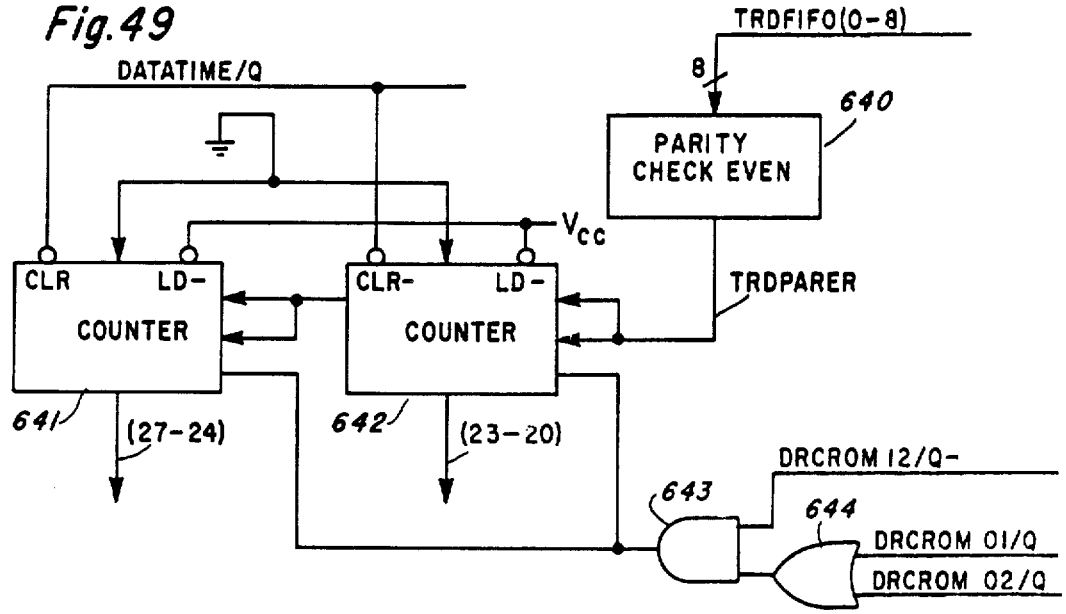
FIG. 49 is a schematic diagram of the tape read data parity counter.

FIG. 49 is a schematic diagram of the tape read data parity counter. This counter reports the number of parity errors detected during a record. Signals TRDFIFO(0-8) from the output of FIFO's 658 and 659 are applied to parity generator 640 which is a Texas Instruments Type 74180 9-bit odd/even parity generator/checker, described beginning at page 7-269 of the TTL Data Book. A detected parity error is transmitted to counter 642 which is combined with counter 641, both being Texas Instruments Type LS161A described beginning at page 7-190 of the TTL Data Book. The clear input of counters 641 and 642 is activated by the signal DATATIME/Q, the Q output of flip flop 653. Signals DRCROM01/Q and DRCROM02/Q from flip flop 621 provide inputs to OR gate 644 whose output supplies one input to AND gate 643. Signal DRCROM12/Q- from flip flop 622 provides the other input to AND gate 643 whose output supplies the clock input to counters 642 and 641. The ripple carry output from counter 642 provides the P and T enable inputs to counter 641. The data input pins of counters 641 and 642 are grounded and the load input of each is connected to voltage VCC. The counting then is done of the parity errors to form a signal supplied from parity check 640 with outputs supplied from each of counters 641 and 642 to inverter array 508 of FIG. 37c, thereby providing the counts of parity errors to the SRC27 for ultimate transmission to the central memory.

Figure 50A:
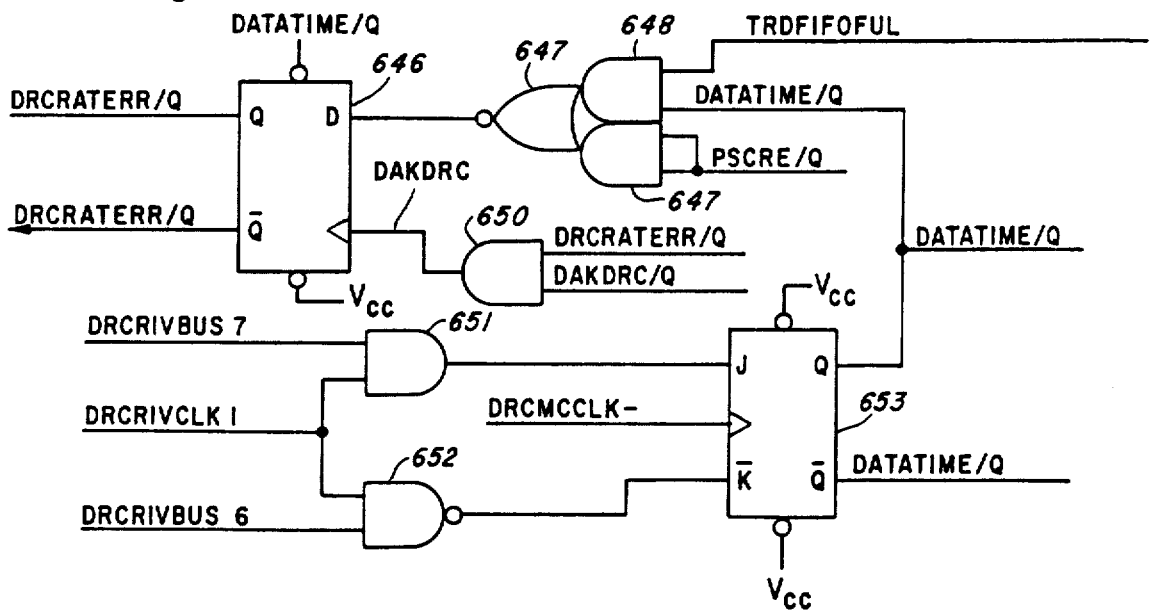
FIGS. 50a–50c form a schematic diagram of the data read controller FIFO.
Figure 50B:
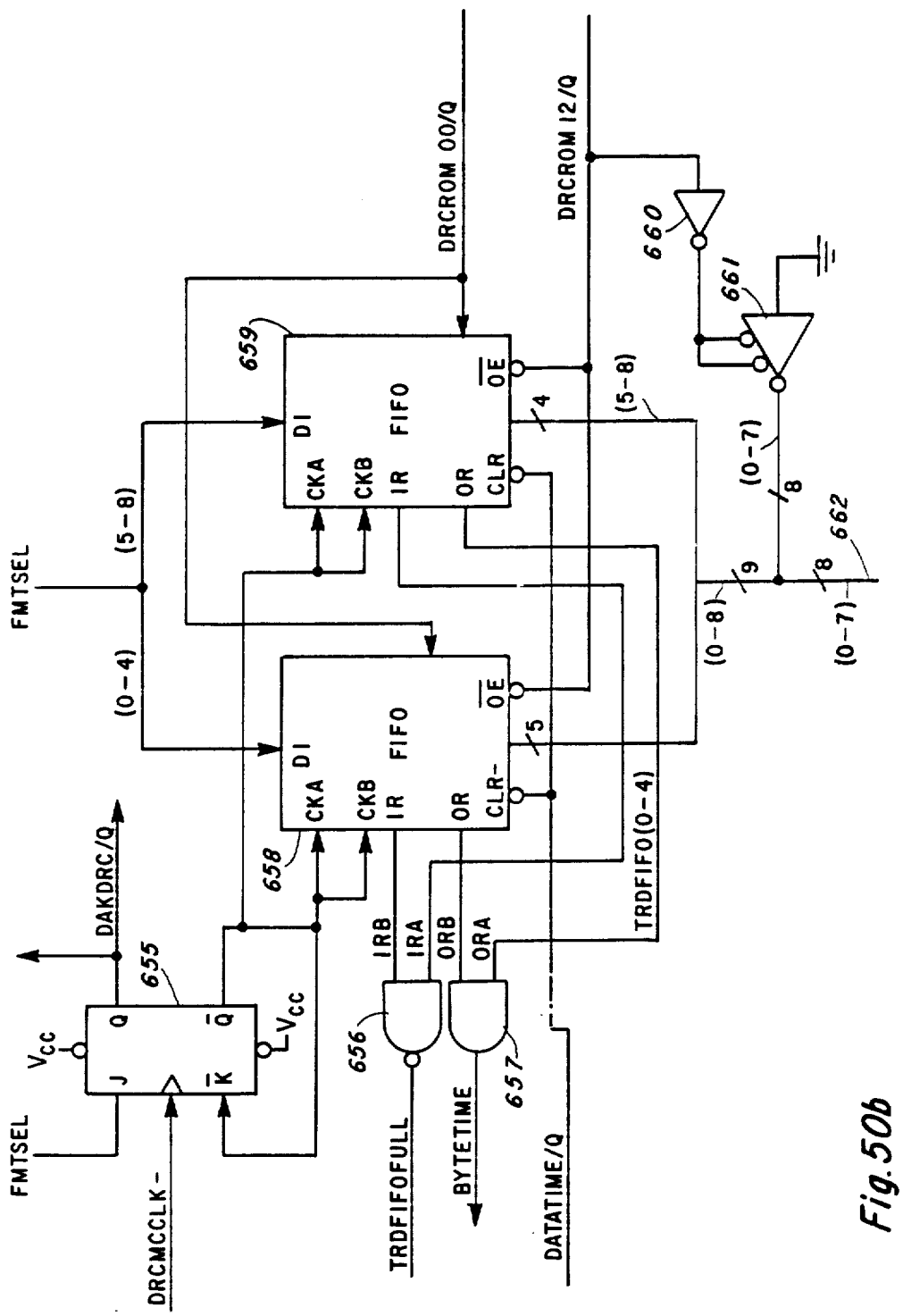
Figure 50C:
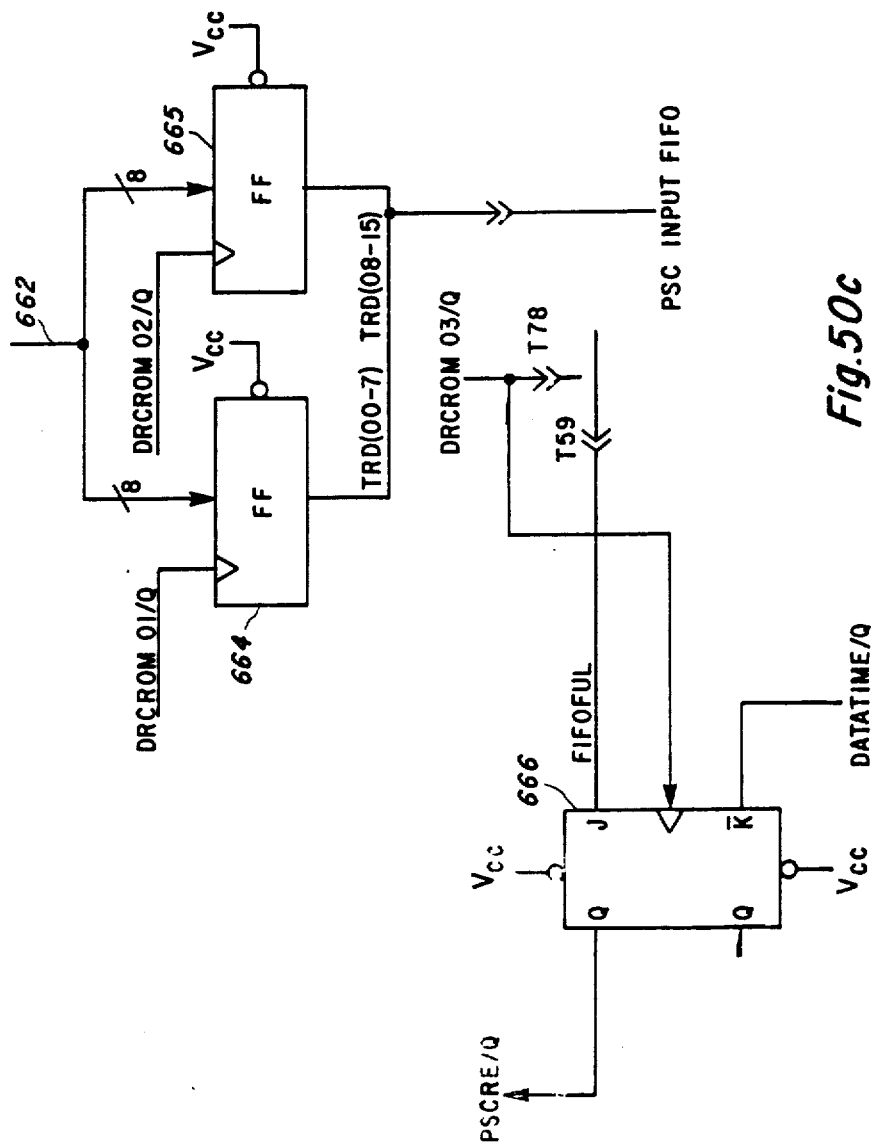

FIGS. 50a–50c provide a schematic diagram of the data read controller FIFO's and associated circuitry.

Specifically referring to FIG. 50b, input signal SRCDRQ on line 654 from the formatter SRC select, to be described later, is applied to the J input of flip flop 655 whose Q output provides signal DAKDRC/Q and whose Q- output is connected to the K- input of flip flop 655 and also to the CKA and CKB inputs of FIFO's 658 and 659. FIFO's 658 and 659 are Texas Instruments Type 74S225, mentioned earlier. Bus 663 from the formatter SRC select applies bits 04 to FIFO 658 and bits 5–8 of a 9-bit word to FIFO 659. Signal DRCROM12/Q from flip flop 622 provides the OE- (output enable) inputs to the FIFO's 658 and 659. Signal DRCROM00/Q provides the clock input to FIFO's 658 and 659. The OR output of FIFO 659 provides one input to AND gate 657 whose other input is provided by the OR output of FIFO 658. The IR output of FIFO 659 provides one input to NAND gate 656 whose other input is provided by the IR output of FIFO 658. The output of AND gate 657 is signal BYTETIME which provides an input to inverter array 631. The output of NAND gate 656 is signal TRDFIFOFULL which provides one input to AND gate 648 shown in FIG. 50a. Signal DRCROM12/Q is inverted through inverter 660 and is the output enable for inverter array 661 whose inputs are grounded. The five outputs of FIFO 658 are combined with the four outputs of 659 and connected to the eight outputs from inverter 661. Thus, when signal DRCROM12/Q is present, eight outputs of FIFO's 658 and 659 are selected on bus 662.

Referring to FIG. 50c, the bus 662 provides inputs to flip flop arrays 664 and 665 which are clocked by signals DRCROM01/Q and DRCROM04/Q, respectively, from flip flop array 621. The outputs from flip flop array 664 are signals TRD(00-07) and the outputs from flip flop array 665 are signals TRD(08-15) which are transmitted to the process sequence controller 28 input FIFO. Also, upon occurrence of signal DRCROM03/Q from flip flop array 621, the input FIFO of the PSC28 provides a FIFOFUL signal to the J input of flip flop 666 which is clocked by signal DRCROM03/Q. The K- input to flip flop 666 is the signal DATATIME/Q and the Q output of flip flop 666 is signal PSCRE/Q.

Referring to FIG. 50a, the Q output of flip flop 653 provides the other input to AND gate 648 and, as mentioned above, provides the clear input to FIFO's 658 and 659. AND gate 649 has, as both inputs the signal PSCRE/Q from flip flop 666. The outputs of AND gates 648 and 649 provide the inputs to NOR gate 647 whose output provides the D input to flip flop 646. Signals DRCRATERR/Q- and DAKDRC/Q provide the input to AND gate 650 whose output clocks flip flop 646. The Q output of flip flop 646 provides signal DRCRATERR/Q- and signal DATATIME/Q is applied to the SET- input of flip flop 646. The Q- output of flip flop 646 provides signal DRCRATERR/Q. byD gate 651 and NAND gate 652 each have one input provided by signal DRCRIVCLK1 from selector 620 with conductor 6 of bus 630 providing the other input to NAND gate 652, conductor 7 providing the other input to AND gate 651. The output from NAND gate 651 is connected to the J input of flip flop 653 and the output from NAND gate 652 is connected to the K- input of flip flop 653 whose Q- output provides the signal DATATIME/Q-. The clock input to flip flop 653 is provided by signal DRCMCCLK from the output of inverter 618.

Figure 51:
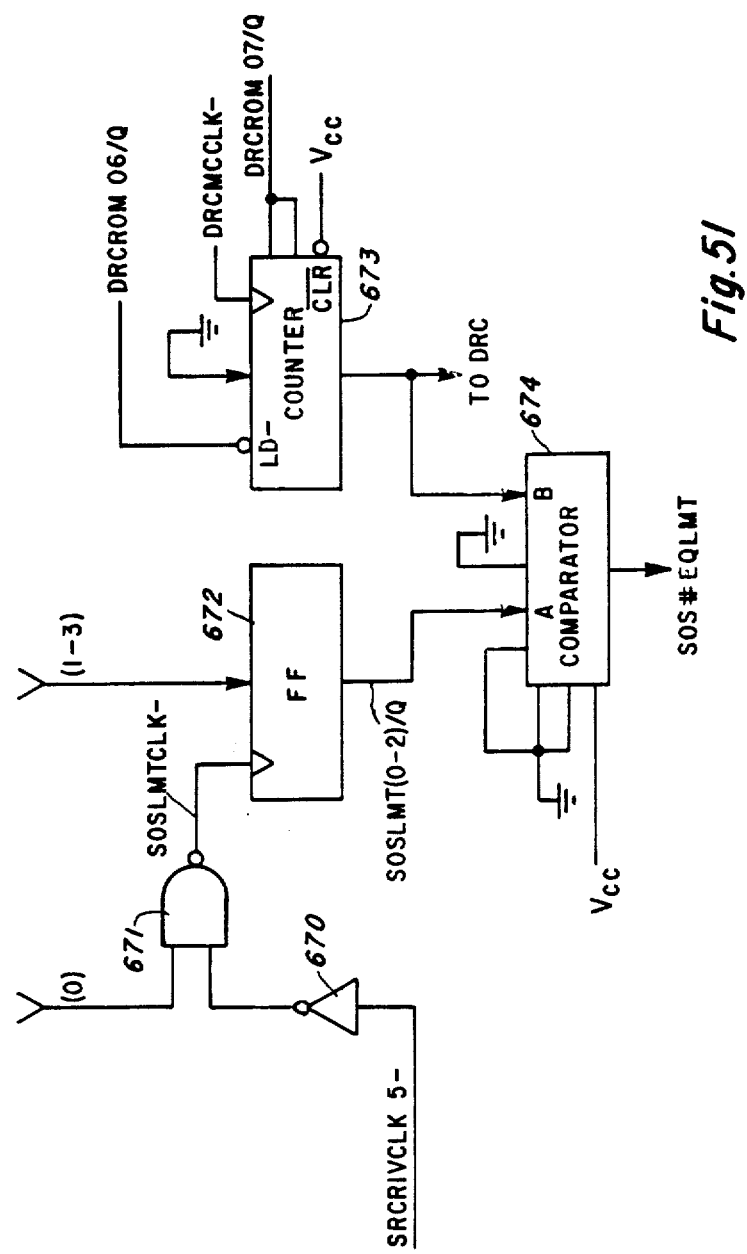
FIG. 51 is a schematic of the start of scan counter and limit.

FIG. 51 is a schematic diagram of the start of scan counter and limit. Signal DRCROM06/Q provides the LD signal input to counter 673, which is a Texas Instruments Type 74LS163. Signal DRCROM07/Q from flip flop 621 provides the P and T enable input signals to counter of 673. The inputs to counter 673 are grounded and the clock signal is provided by signal DRCMCCLK-.

Line 0 from bus 496 provides one input for NAND gate 671. Signal SRCRIVCLK5- is inverted through inverter 678 provides the other input to NAND gate 671 whose output clocks flip flop array 672. Lines 1-3 from bus 496 provide the limit information as inputs to flip flop 672. The output signals from flip flop 72, SOSLMT(0-2)Q- provide the input connections to the A inputs of comparator 674 which is a Texas Instruments Type 74LS85 4-bit magnitude comparator described beginning at page 7-57 of the TTL Data Book. The D inputs to comparator 674 are provided by the output of counter 673. The A=B output of comparator 674 provides signal SOS#EQLMT which indicates that the counter and the prescribed limit are equal.

Figure 52A:
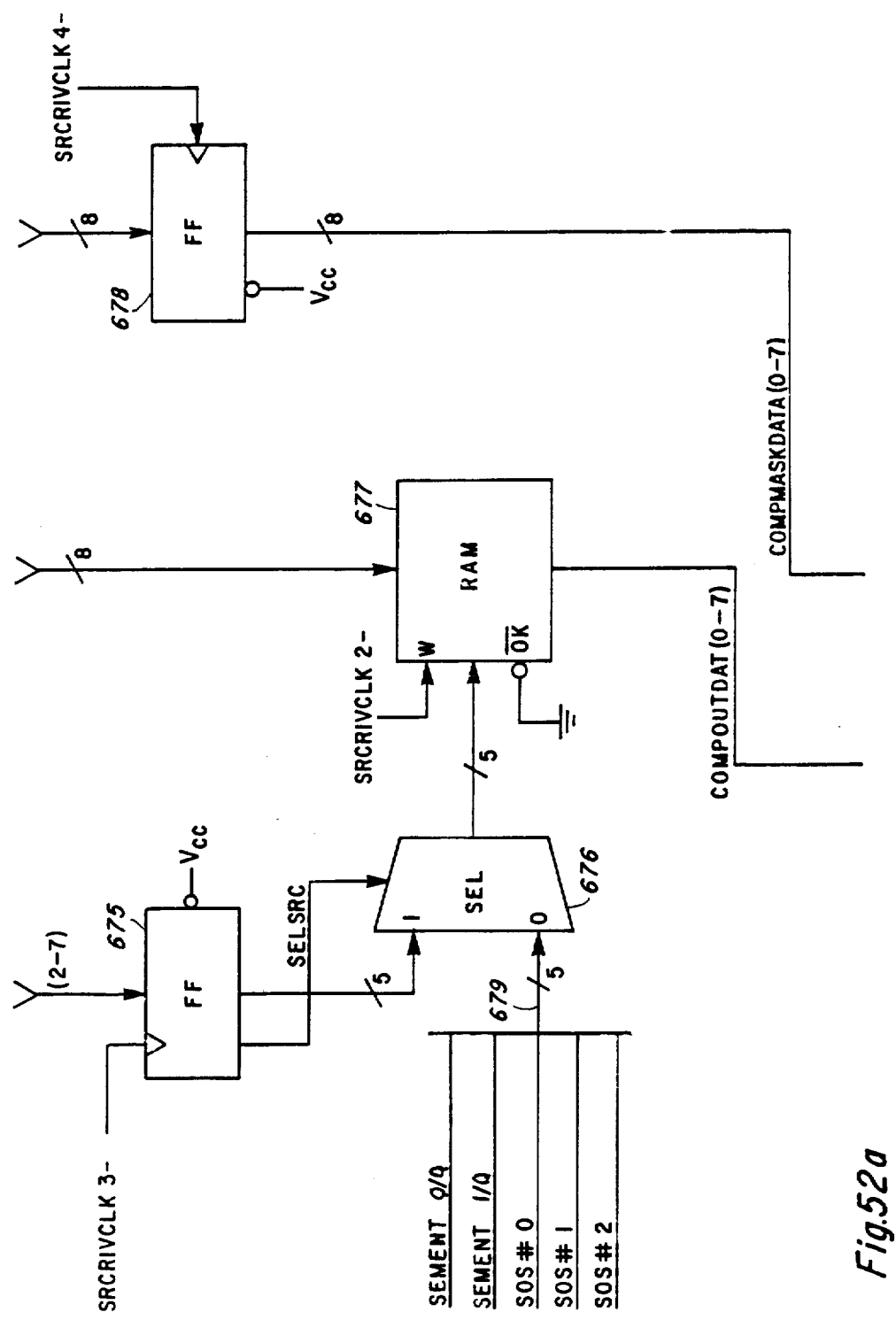
FIGS. 52a and 52b form a schematic of the DRC data comparator.
Figure 52B:
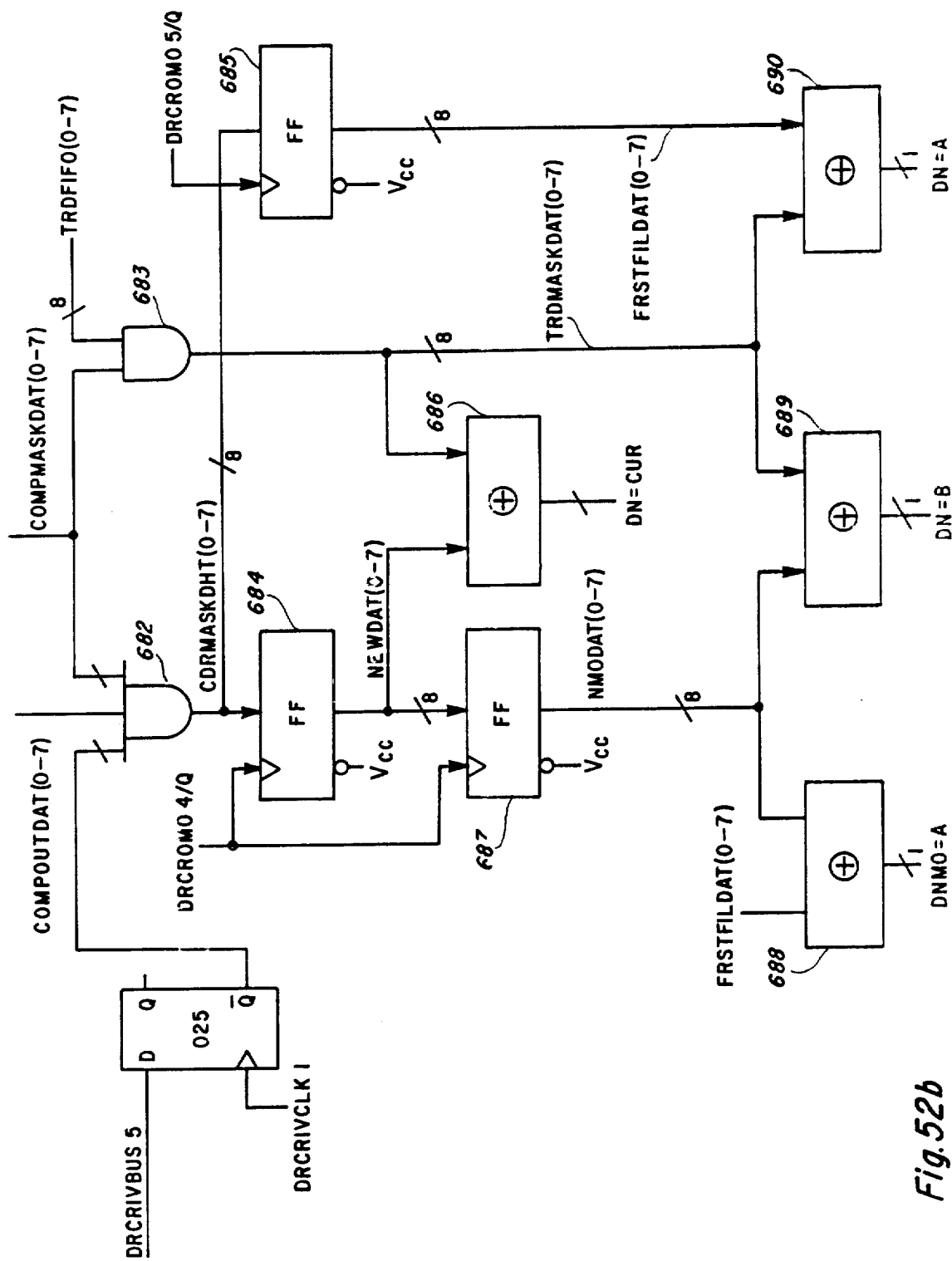

FIGS. 52A and 52B schematically illustrate the DRC data comparator. Conductors 2-7 of bus 496 provide inputs to flip flop array 675 which is clocked by signal SRCRIVCLK3- . The Q outputs of one of the flip flops of array 675 is signal SELSRC and is connected to selector 676, providing the strobe input. The other five Q outputs from array 675 provide inputs to the selector 676. Signals SEGMENT0/Q, SEGMENT1/Q, SOS#0, SOS#1, and SOS#2 make up bus 679 and provide the other five inputs to selector 676 which is a Texas Instruments Type 74LS157, a quadruple two-line-to-one-line data selector/ multiplexer described beginning at page 7-181 of the TTL Data Book.

The eight conductors from bus 496 provide the input signals to be stored in RAM 677 which is a 74S208 of Texas Instruments, mentioned earlier. The W input for storing the data is provided by signal SRCRIVCLK2-. The addressing is accomplished by the five outputs from selector 676 which select between the outputs from flip flop 675 or bus 679. The eight outputs from RAM 677 are signals COMPOUTDAT(0-7) which are applied as eight inputs to AND gate 682. Eight more inputs to AND gate 682 are provided by the eight output bits from flip flop array 678. Finally, one more input to AND gate 682 is provided by the Q- output from flip flop 681 whose D input is provided by the signal on line 5 of bus 630 and which is clocked by signal DRCRIVCLK1. AND gate 682 effectively compares the data from RAM 677 with data supplied from the system read controller, providing a masking operation with eight outputs providing the inputs to flip flop array 684 and to flip flop array 685. The signals COMPMASKDAT(0-7)- provide inputs to AND gate 683 which has eight other inputs supplied by the signals TRDFIFO(0-7). The output of AND gate 683 provides eight inputs to each of exclusive OR circuits 686, 689 and 690. These exclusive OR circuits, including exclusive OR circuit 688, are American Micro Devices, Type 25LS2521. Flip flop array 684 is clocked by signal DRCROM04/Q as is flip flop array 687. The output from flip flop array 684 provides the inputs to flip flop array 687 and also to exclusive OR gate 686. The output of exclusive OR gate 686 provides th signal DN=CUR. The output of flip flop array 687 provides eight inputs to exclusive OR gates 688 and 689. Signals FRSTFILDAT(0-7) provide eight other inputs to exclusive OR circuits 688 whose output signal is DNMO=A. The outputs from flip flop 685 provide eight inputs to exclusive OR circuit 690 whose output signal is EN=A.

FIG. 53 is a map of the contents of ROM 602.

WRITE SEQUENCE CONTROLLER

Figure 54B:
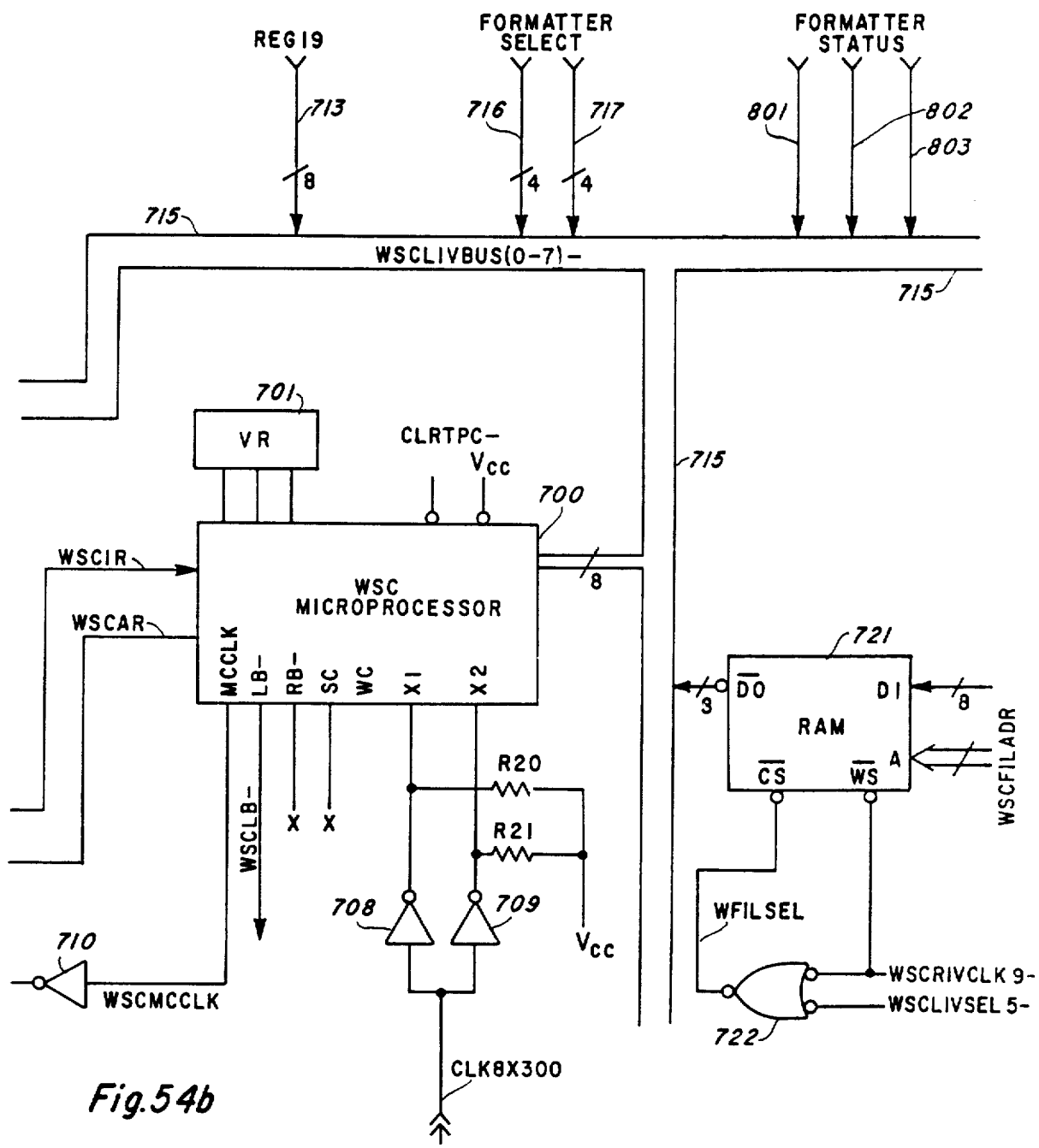
Figure 54C:
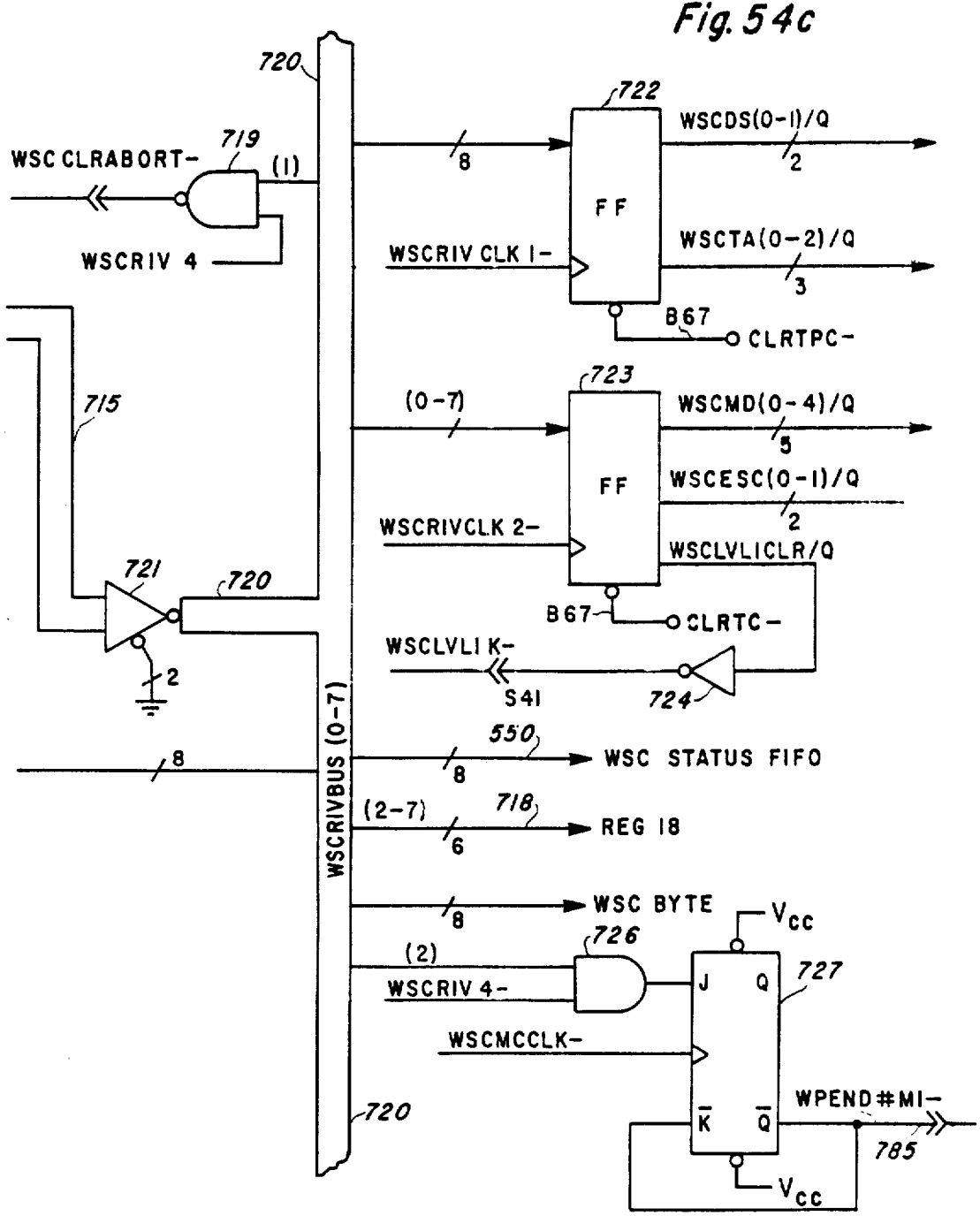

FIGS. 54a, 54b and 54c schematically illustrate the write sequence controller 26 of this invention. The similarities with the previously described controllers is at once evident with WSC microprocessor 700 being identical to the previously described microprocessors and also being at the heart of the WSC. Associated with microprocessor 700 is voltage regulator 701 and ROM 702, such ROM being divided into the IR section 703, the IVR/IVL section 704 and the control (CTL) section 705. The gate outputs of section 705 provide inputs to flip flop array 714 which is clocked by signal WSCMCCLK-, the output from inverter 710 of FIG. 54b. The outputs from flip flop array 714, shown in FIG. 54a, are the signals WSCBY#+1; WSCHLTCLRWS; WRTLSH; CYREQWSC; WSCFILADR)23-20).

Four bits from the IVR portion of section 704 provide inputs to flip flop array 706 and the four bits from the IVL portion provide inputs to flip flop array 707, both of these flip flop arrays being clocked by signal WSCMCCLK-. Flip flop array 706 provides outputs signals WSCRIV(0-3)/Q and the flip flop array 707 provides outputs WSCLIV(0-3)/Q.

Thus, WSCIR takes information from the IR section 703 and responds to address signals sent to ROM 702 over bus WSCAR from the microprocessor 700. Terminal CCLK of microprocessor 700 is connected to inverter 710 whose output is signal WSCMCCLK-. Terminal LB- of microprocessor provides signal WSCLB-. Clock 8X300 is buffered by buffer 708 and inverted through inverter 709 and biased to VCC through resistors R20 and R21, as described with respect to the other microprocessors. The output of buffer 708 is connected to terminal X1 and the output of inverter 709 is connected to terminal X2, both of the microprocessor 700.

A left interface vector bus 715 is connected to microprocessor 700 and has a number of inputs to it. Inverter array 711, clocked by signal WSCLIVSEL0- has as inputs signals HALTWSC/Q; REWPEND/Q; REWINTEN; REWUNLOAD; REWFMTSELB; REWXPT22; REWXPT21. All of these signals are provided from the activation controller 13.

Inverter array 712, whose outputs are enabled by signal WSCLIVSEL1- has as inputs CYGRANTWSC-; DATAVWSC-; WSCLVL1FUL/Q; WSCXFRCOMP/Q; TWFIFOFULL; TWFIFOEMPTY; FATOSRC/Q; FBTOSRC/Q.

Another input set is from bus 713 which carries information from register 19 of FIG. 1a. Four bit buses 716 and 717 apply data from the formatter to bus 715. RAM 721 provides eight inputs to bus 715. RAM 721 is a Texas Instruments Type 74S189 described in the Bipolar Microcomputer Components Data Book. RAM 721 is incorporated in this design to extend the eight internal registers of microprocessor 700 to a total of 24. In this particular application, many registers are required to maintain flag information, etc. The address signals for RAM 721 are signals WSCFILADR(23-20) from flip flop array 714. The information to be stored comes from the write interface vector bus 720 of WSC26. The WS-input of RAM 721 has signal WSCRIVCLK9- applied to it, which signal also provides one input to AND gate 722 whose other input is provided by the signal WSCLIVSEL5-. The output of AND gate 722 provides the input to the CS- terminal of RAM 721.

Bus 715 provides the inputs to inverter array 721 whose outputs form bus 720. Line 1 of bus 720 provides one input to NAND gate 719 whose other input is signal WSCRIV4 and whose output is signal WSCCLRABORT-, applied to terminal S49.

Flip flop array 722 receives eight inputs from bus 720, is clocked by signal WSCRIVCLK1- and provides output signals WSCDS(0-1)/Q which are the density signal array and signals WSCTA(0-2)/Q which are a tape address signal array to the formatter selector.

Flip flop array 723 receives the eight lines from bus 720, is clocked by the signal WSCRIVCLK2-, provides output signals WSCMD(0-4)/Q and signals WSCESC(0-1)/Q, which is the error status control select signals. The WSCMD signals are interpreted as follows.

WRT=00001
WRD=00111
UNL=01111
WFM=11111
ERG=10111
EVG=10110
CLR=10011
NOP=00000
TUS=10101
SNS=10100

Another output of array 723 is inverted through inverter 724 and provides the signal WSCLVL1K- applied to terminal S41.

Eight line bus 550 from bus 720 is applied to the WSC status FIFO, described below.

Lines 2-7 form bus 718 from bus and are 720, applied to register 18.

Eight lines from bus 720 are applied to the WSC byte counter, described below.

Line 2 from bus 720 provides one input to AND gate 726 whose other input is provided by the signal WSCRIV4-. The output of AND gate 726 is connected to the J input terminal of flip flop 727 which is clocked by the signal WSCMCCLK-. The Q- output of flip flop 727 is signal WPEND#M1-, applied to terminal T85 and also to the K-input of flip flop 727.

FIGS. 55a, 55b and 55c illustrate circuitry for the development of the various control and clock signals used, primarily, by WSC26.

FIG. 55a illustrates inverter 730, inverting signal WSCRIVCLK4- and applying it as one input to each of AND gates 729 and 731. The other input to AND gate 729 is line 3 of bus 720 and the other input to AND gate 731 is line 4 of bus 720. The output of AND gate 729 is connected to the J input of flip flop 732 and the output of AND gate 731 is connected to the J input of flip flop 733. Both of these flip flops are clocked by the signal WSCMCCLK-. The Q- output of flip flop 732 provides signal REWACK/Q- and also is connected to the K- input of flip flop 732. The Q output of flip flop 733 provides the signal WSCCCL/Q and its Q- output is connected to its K- input.

In FIG. 55b, decoder 735 is shown. Decoder 735 is a Texas Instruments Type 74S138 3-to-8 line decoder described beginning at page 7-134 of the TTL Data Book. Signal WSCRIV0/Q, from flip flop array 706 provides the G1 enable input with signal WSCMCCLK- providing the G2B enable input, enable input G2A being grounded. The select inputs A, B and C of decoder 735 have applied to them signals WSCRIV(1-3)/Q, respectively, from flip flop array 706. The output of decoder 735 is one of eight lines selected by the three select inputs as dictated by the three enable inputs, the output signals identified as WSCRIVCLK(8-15)-.

FIG. 55c illustrates decoders 736 and 737, identical to decoder 735. Enable input G2B of decoder 736 is activated by signal WSCMCCLK-, enable input G2A is activated by signal WSCRIV0/Q and enable input G1 is connected to voltage VCC. Th select inputs A, B and C of decoder 736 are activated by the signals WSCRIV(1-3)/Q, respectively, The output of decoder 736 provides signals WSCRIVCLK(0-7)-.

The G2A enable input signal for decoder 737 is provided by signal WSCLIV0/Q and enable input G1 is connected to voltage VCC. The select inputs A, B and C are provided by signals WSCLIV(1-3)/Q, respectively. The output from decoder 737 are the signals WSCLIVFCL(0-7)-.

These three circuits, in straightforward fashion, provide the signals that will be referenced and which have previously been referenced as inputs.

FIG. 56 is a schematic diagram of the circuitry required for addressing the central memory for data to be written on tape. Such addressing is accomplished by a counter assembly made up of individual counters 740, 741, 742 and 743, all Texas Instruments Type 74LS163, previously mentioned. The T and P inputs of counter 745 are connected to the output of OR gate 749 whose inputs are the signals WRTLSH-, inverted from flip flop array 714, and TWFIFOSTB- from the output of OR gate 772. A ripple carry output of counter 745 provides the T and P enable inputs for counter 746 and the P enable inputs for counters 747 and 748. The ripple carry output of counter 746 provides the T enable input for counter 747 whose ripple carry output provides the T enable input to counter 748. The LD- inputs of counters 740 and 741 are provided by the signal WSCRIV10- and for counters 742 and 743 are provided by the signal WSCRIV11-. The counters are all clocked by signal WSCMCCLK. The four outputs from counter 740 are combined with the four outputs from 741 and buffered through buffer 474 whose output is enabled by the signal FETCHWSCEN- from terminal S65. The four outputs from counter 742 are combined with the four outputs from 745 and buffered through buffer 748 whose output is enabled by the signal from terminal S65. The outputs from buffers 747 and 748 are combined in terminal 750 and from there go to the memory address bus 39. The input signals are supplied over buses 740, 741, 742 and 743 to counters 748-745, respectively. These buses are connected to bus 720.

FIG. 57 illustrates another counter, this one for counting the bytes to write on tape. The inputs come from bus 720, exacctly as in the case of the address counter, with bus 752 carrying lines 0-3, bus 753 carrying lines 4-7, bus 754 carrying lines 0-3 and bus 755 carrying lines 4-7 to counters 759, counter 758, 575 and 756, respectively. These counters are identical to those described in FIG. 56. The T and P enable inputs to counter 756 are provided by the signal WSCBY#+1, from flip flop array 714. The interconnection between the counters is identical to that described with respect to FIG. 56. The LD- inputs to counters 758 and 759 are provided by the signal WSCRIV7- and the LD- inputs to counters 757 and 756 are provided by signal WSCRIV8-. All of the counters are clocked by the signal WSCMCCLK-. None of the outputs from the count are used, but the ripple carry out of counter 759, signal WSCBY#C04 provides the J input to flip flop 760 which is clocked by signal WSCMCCLK-, whose K- input is supplied by signal WSCRIV7- and whose Q output is signal WSCXFRCOMP/Q.

This counter operates by loading the one's complement of the number of bytes to be written and then incrementing until a signal sets flip flop 760.

Figure 58A:
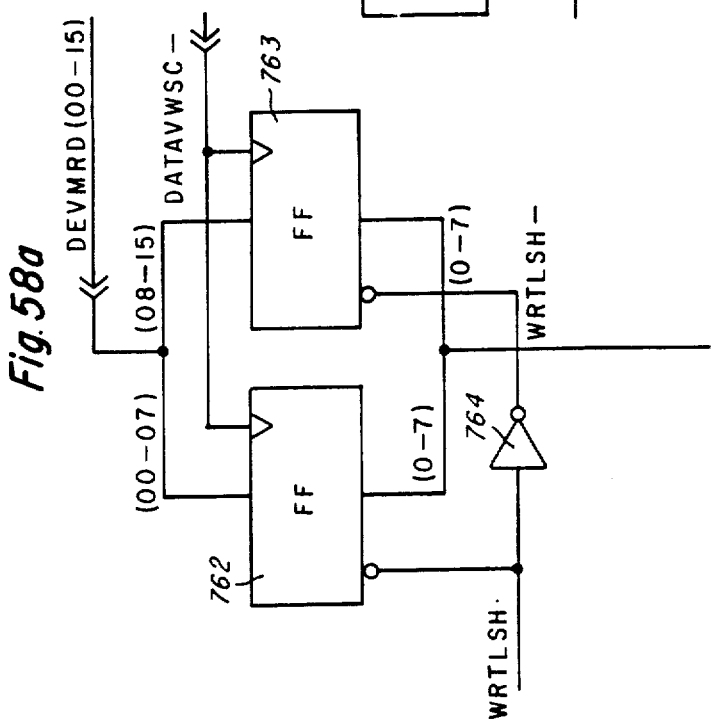
FIGS. 58a and 58b are the 32 byte tape write FIFO.
Figure 58B:
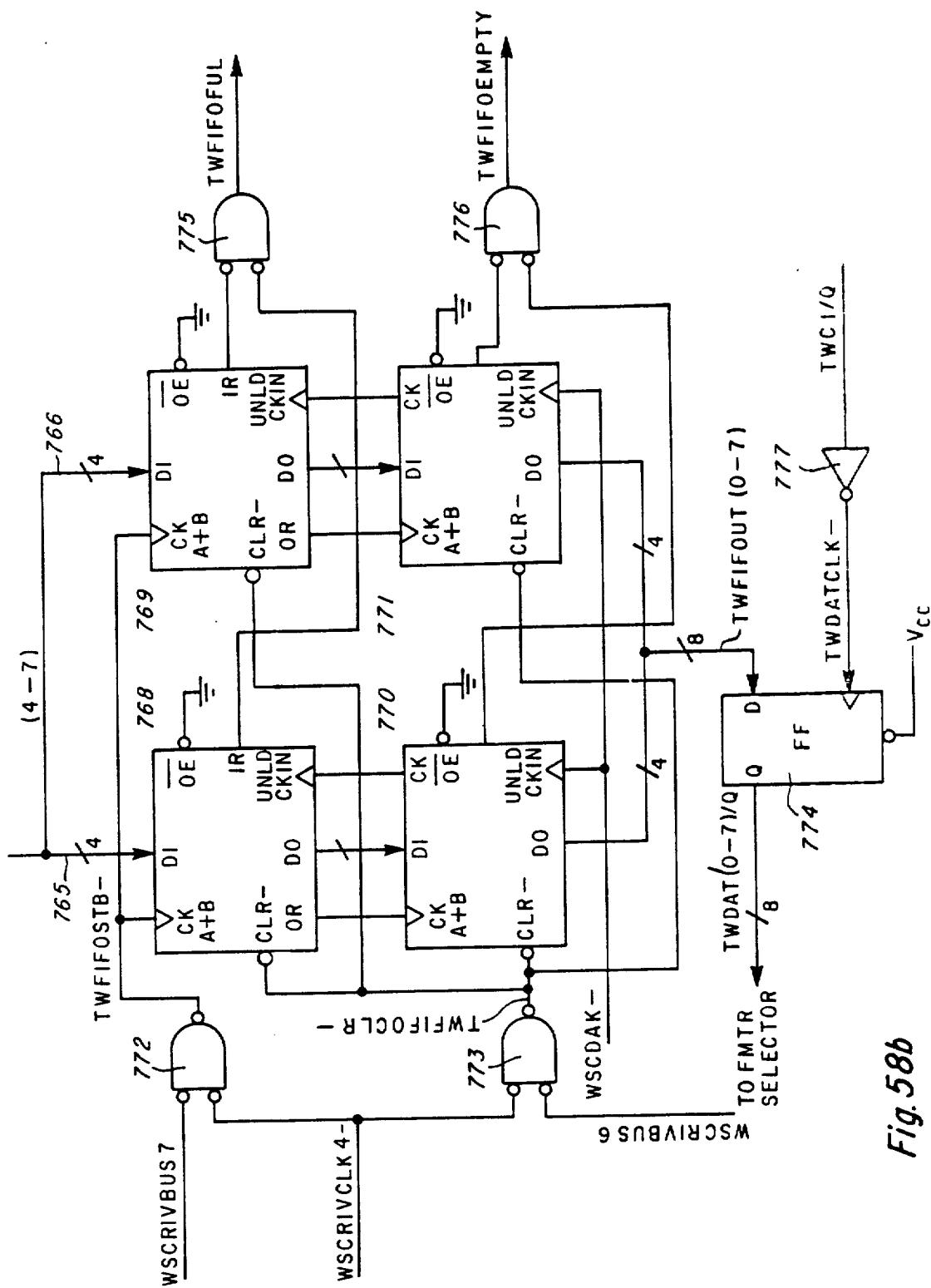

FIGS. 58a and 58b schematically illustrate a 32 byte tape write FIFO. The FIFO units themselves, 768-771, are Texas Instruments Type 74S225, described earlier.

Information to be written comes from the memory in the form of signals DEVMRD(00-15) with bits 0-7 providing inputs to flip flop array 762 and bits 8-15 providing inputs to flip flop array 763. Both of these flip flops are clocked by the signal DATAVWSC-. The output enable signal for flip flop array 762 is provided by signal WRTLSH, from flip flop array 714 and the output enable signal of array 763 is provided by signal WRTLSH-, the output of inverter 764. Outputs 0-7 from each of flip flops 762 and 763 are combined and then divided into bits 0-3 which provide inputs to FIFO 768, and into bits 4-7 which provide inputs to FIFO 769.

Signal WSCRIVCLK4- provides one input to each of OR gates 772 and 773 whose other inputs are provided by lines 7 and 6, respectively of bus 720. The output from NOR gate 772 provides the CK A and CK B inputs to FIFO 768 and 769. The output of NOR gate 773 provides the CLR- input to all of FIFO's 768-771. The OR outputs from each of FIFO's 768 and 769 are connected to the CK A and CK B inputs of each of FIFO's 770 and 771, respectively. The data out from each of FIFO's 768 and 769 provide the data into each of FIFO's 770 and 771, respectively. The CK OUT output of FIFO's 770 and 771 are connected to provide the UNLD CKIN pin of each of FIFO's 768 and 769, respectively. The IR outputs from FIFO's 768 and 769 provide the inputs to NOR gate 775 whose output is signal TWFIFOFUL. The OR output from FIFO's 770 and 771 provide the inputs to NOR gate 776 whose output is signal TWFIFOEMPTY. The UNLD CKN activating signal for FIFO's 770 and 771 is provided by the signal WSCAK-. The four bits out of FIFO's 770 and 771 are combined as eight inputs to flip flop array 774. Flip flop array 774 is clocked by the signal TWC1/Q, inverted through inverter 777. The outputs of flip flop array 774 are signals TWDAT(0-7)/Q which are used in the formatter selector, discussed later.

As can be seen, the purpose of this FIFO is simply to store information that is to be written on tape. As indicated, the structure and operation of the FIFO's making up this FIFO assembly is well known.

Figure 60:
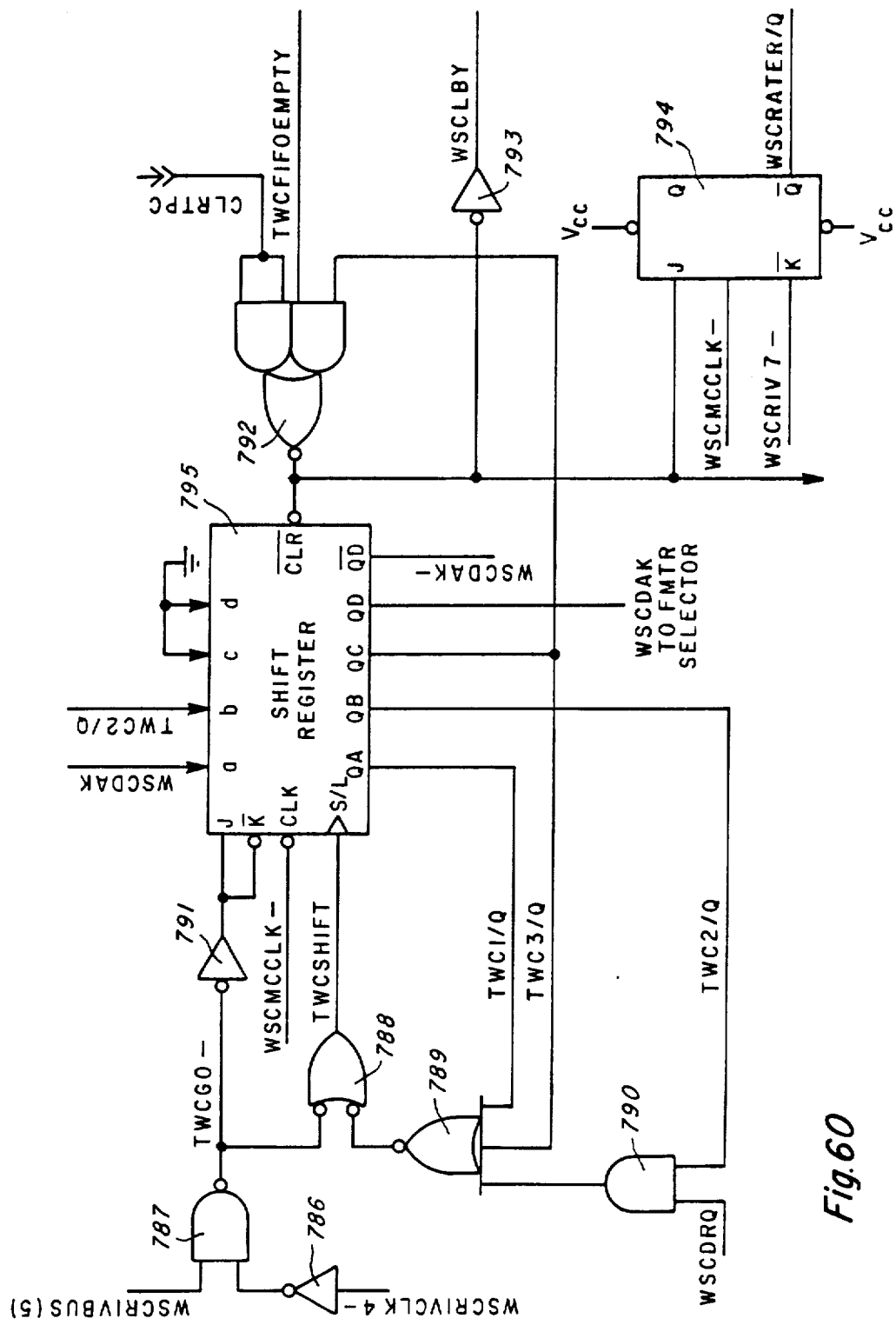
FIG. 60 is a schematic of the tape write FIFO controller.

FIG. 60 is a schematic representation of the TWC controller which controls the mechanism for writing on the tape. At the heart of this controller is shift register 795 which is a Texas Instruments Type 74LS195 4-parallel-access shift register, mentioned earlier. Signals WSCDAK and TWC2/Q provide two of the parallel inputs to register 795 with the two remaining inputs grounded. Signal WSCRIVCLK4-is inverted through inverter 786 and provides one input to NAND gate 787 whose other input is provided by line 5 of bus 720. The output of NAND gate 787 is inverted through inverter 791, providig serial inputs J and K-to register 795. Signal WSCMCCLK- provides the CLK input to register 795. The output from NAND gate 787 provides one input to NAND gate 788. The other input from NAND gate 788 is provided by the output from NOR gate 789. AND gate 790 provides one input to NOR gate 789. Signal SWCDRQ provides one input to AND gate 790. The other input to AND gate 790 is provided by output $Q_B$ from regiser 795. The other inputs to NOR gate 789 are provided by outputs $Q_A$ and $Q_C$ of register 795. The output of NAND gate 788 provides the shift/load input signal to register 795.

Signal CLRTPC provides both inputs to one of two AND gates in an AND-OR-INVERT gate. The other AND gate has as one input signal TWCFIFOEMPTY and as the other input has the signal from terminal $Q_C$ of register 795. The output of AND-OR invert logic 792 provides the CLR input to register 795. It also is inverted through inverter 793 to provide signal WSCLBY. The output of logic 792 provides the J input to flip flop 794 which is clocked by signal WSCMCCLK-. The K- input to flip flop 794 is provided by signal WSCRIV7- and the Q- output is signal WSCRATER/Q.

Figure 59:
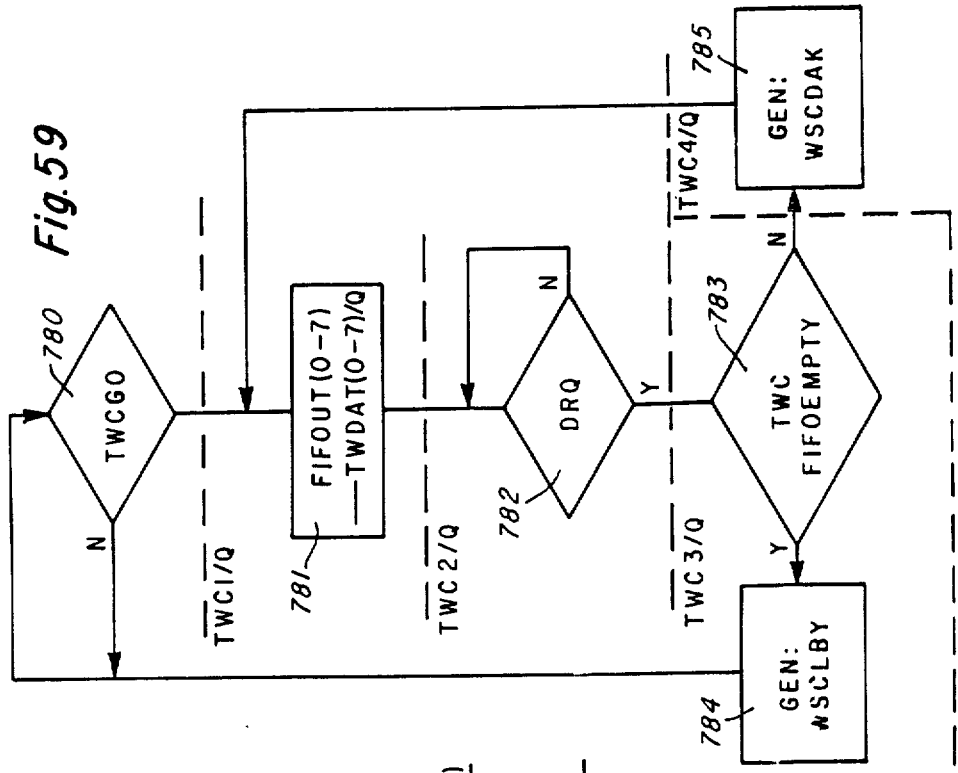
FIG. 59 is a flow diagram of the tape write FIFO controller.

FIG. 59 is a flowchart illustrating the operation of FIG. 60. At decision block 780, a determination of whether signal TWCGO, the output of inverter 791, is made. If the signal is present, the operation proceeds to block 781 which is state TWC1/Q. At that point, signals FIFOUT(0-7) are gated out of FIFO's 770 and 771 by the signal WSCDAK-, from the $Q_D$- output of shift register 795. Also at that time, flip flop 774 is clocked by signal TWC1/Q from output $Q_A$ of register 795 to send out signals TWDAT(0-7)/Q to the formatter selector. At that point, state TWC2/Q arrives at decision block 782 where it is determined whether there has been a data request. If the answer is no, the system remains in state TWC2/Q until there is such a request. If the answer is yes, the system moves into atete TWC3/Q at decision block 782 where it is determined whether the TWC FIFO is empty or not. If it is not empty, then at block 785 a data acknowledge signal is generated and the system returns to state TWC1/Q. If the FIFO is empty, block 784, the signal last byte is generated and the sequence is ended.

FIG. 61 is a map of the contents of ROM 702.

FORMATTER SELECTOR SWITCH

Formatter selector switch 31 communicates with WSC26, SRC27, TWC29 and DRC30 for selecting, in this preferred embodiment, formatter A or formatter B which control up to eight tape transports each. As indicated earlier, in this preferred embodiment, if one tape transport is in the read mode in formatter A, for example, then formatter B can have one tape transport operating in the write mode. No two transports can be operating in the same mode at the same time.

Figure 62:
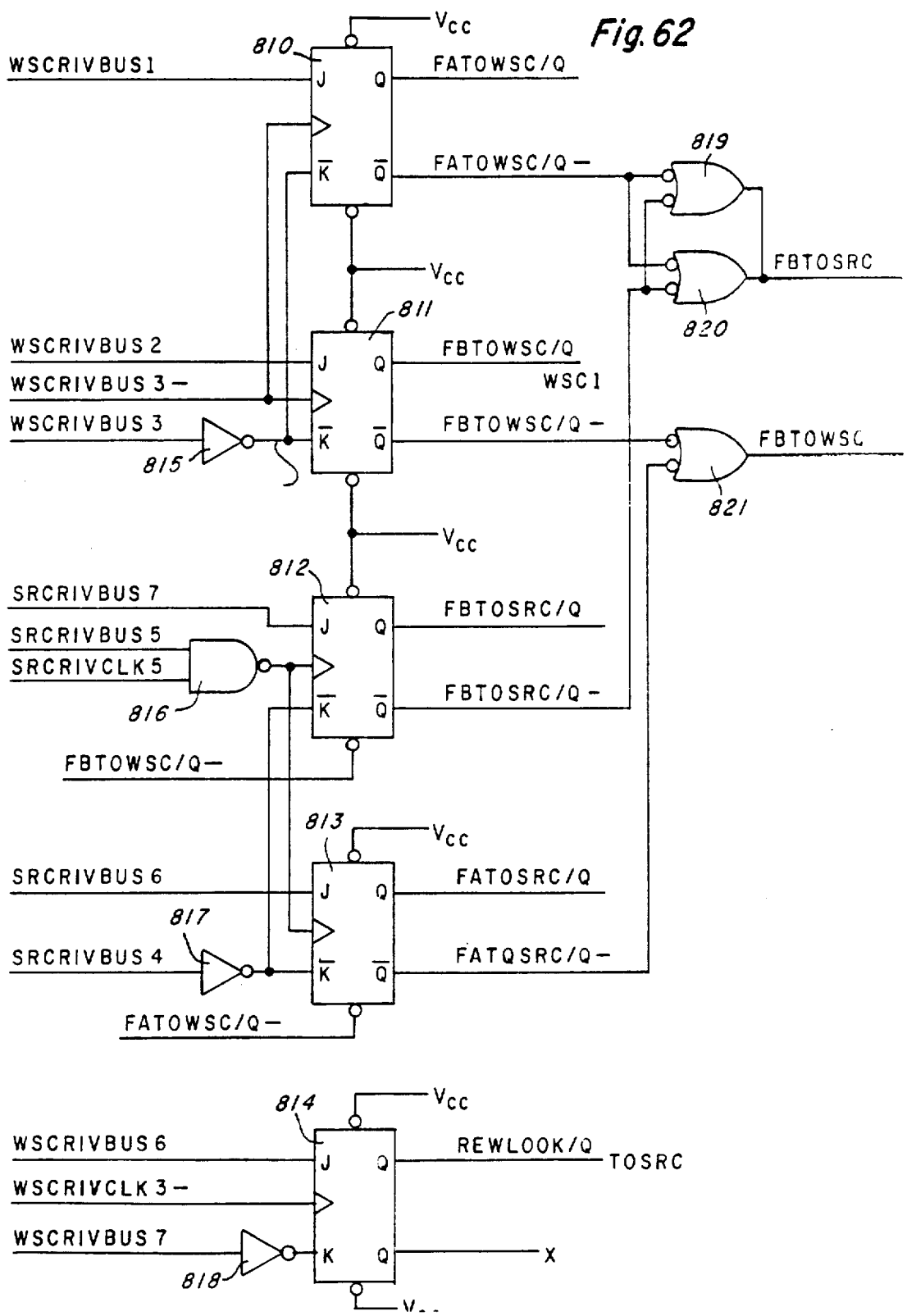
FIG. 62 schematically illustrates the prioritizing circuitry of formatter selector switch 31 of FIG. 1b.

FIG. 62 schematically represents the prioritizing circuitry of formatter selector switch 31. The priority is arranged between the write sequence controller 26 and the system read controller 27. Each of those controllers must test the other's formatter usage prior to setting its formatter flag.

When WSC26 is using a formatter to check rewind status, it sets the REWLOOK/Q flag. If SRC27 needs the formatter and it is busy, SRC27 tests the REWLOOK/Q flag and if it is set, SRC27 waits for FMTR(N) to become available instead of reporting formatter busy status. The SRC must:

1. Test
2. set

3. Test again

This testing is necessary in the event that SWC26 and SRC27 flags got set at exactly the same time., i.e., on the same clock edge. In this case, the SWC26 will win.

FIG. 62 has five flip flops, 810–814. Conductor 1 of the WSCRIV bus 720 provides the J input to flip flop 810. Conductor 2 of bus 720 provides the J input to flip flop 811. Conductor 6 of bus 720 is connected to the J input terminal of flip flop 814.

Conductor 7 of SRCRIV bus 496 is connected to the J input of flip flop 812. Conductor 7 of bus 496 is connected to the J input of flip flop 813.

The clock input to flip flop 810 is provided by the signal WSCRIVCLK3-. Conductor 3 of bus 720 is connected to inverter 815 whose output is connected to the K- input of flip flop 810. Flip flop 810 provides, on its Q output, signal FATOWSC/Q which is the formatter A to WSC signal. The complement of the signal appears on the Q- output of flip flop 810.

The clock input of flip flop 811 is signal WSCRIVCLK3-and the signal applied to the K- input is from the output of inverter 815. The Q output of 811 provides signal FBTOWSC/Q (formatter B to WSC). The complement of that signal appears on the Q- output.

The clock input to flip flop 812 is provided by the output of NAND gate 816. One input signal to NAND gate 816 is SRCRIVCLK5. The other input is provided by conductor 5 of bus 496. The K- input of flip flop 812 is provided by the output of inverter 817 whose input is from conductor 4 of bus 496. The Q output of flip flop 812 provides the signal FBTOSRC/Q (formatter B to SRC) while the complement of that signal appears on the Q- output.

Flip flop 813 has its clock input supplied by the output of NAND gate 816 and its K- input is supplied by the output of inverter 817. Its Q output is signal FATOSR/Q (formatter to SRC). The complement of that signal appears on the Q- output.

The clock input to flip flop 814 is provided by signal WSCRIVCLK3- and the K- input is provided by the output of inverter 818 whose input is conductor 7 of bus 720. The Q output of flip flop 814 is the signal REWLOOK/Q, the flag that is tested by SRC27.

NAND gates 819 and 820 are connected in parallel with their inputs coming from the Q- output of flip flop 810 and the Q- output of flip flop 812 providing signals FATOWSC/Q-and FBTOSRC/Q-, respectively. The output of these two NAND gates is the signal FBTOSRC.

NAND gate 821 has its inputs provided by the Q- output of flip flop 811 and the Q- output of flip flop 813 providing signals FBTOWSC/Q- and FATOSRC/Q-, respectively. The output of NAND gate 821 is signal FBTOSWC.

Figure 63A:
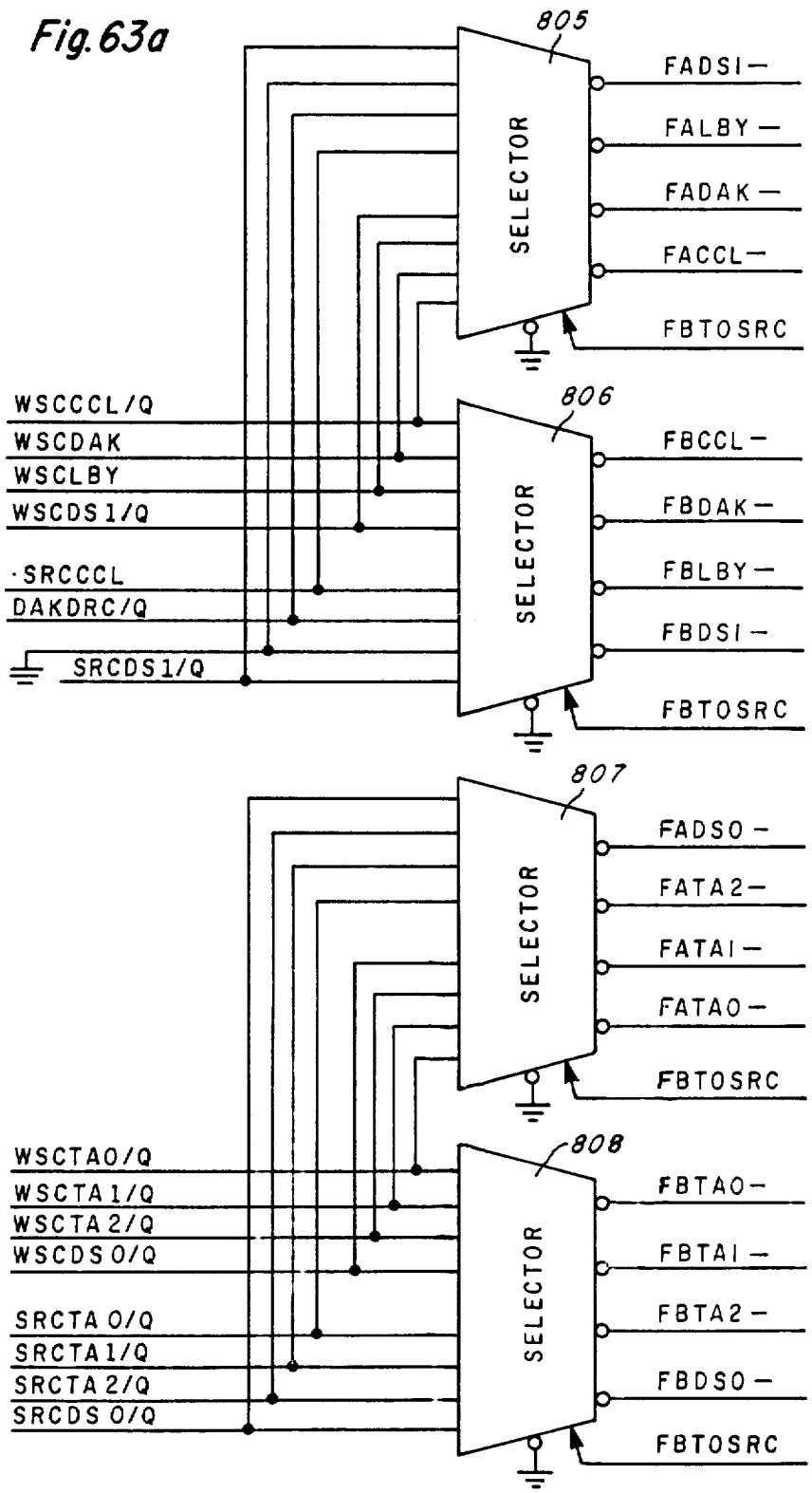
FIGS. 63a–63c are schematics of a development of formatter commands from signals provided by WSC and SRC.
Figure 63B:
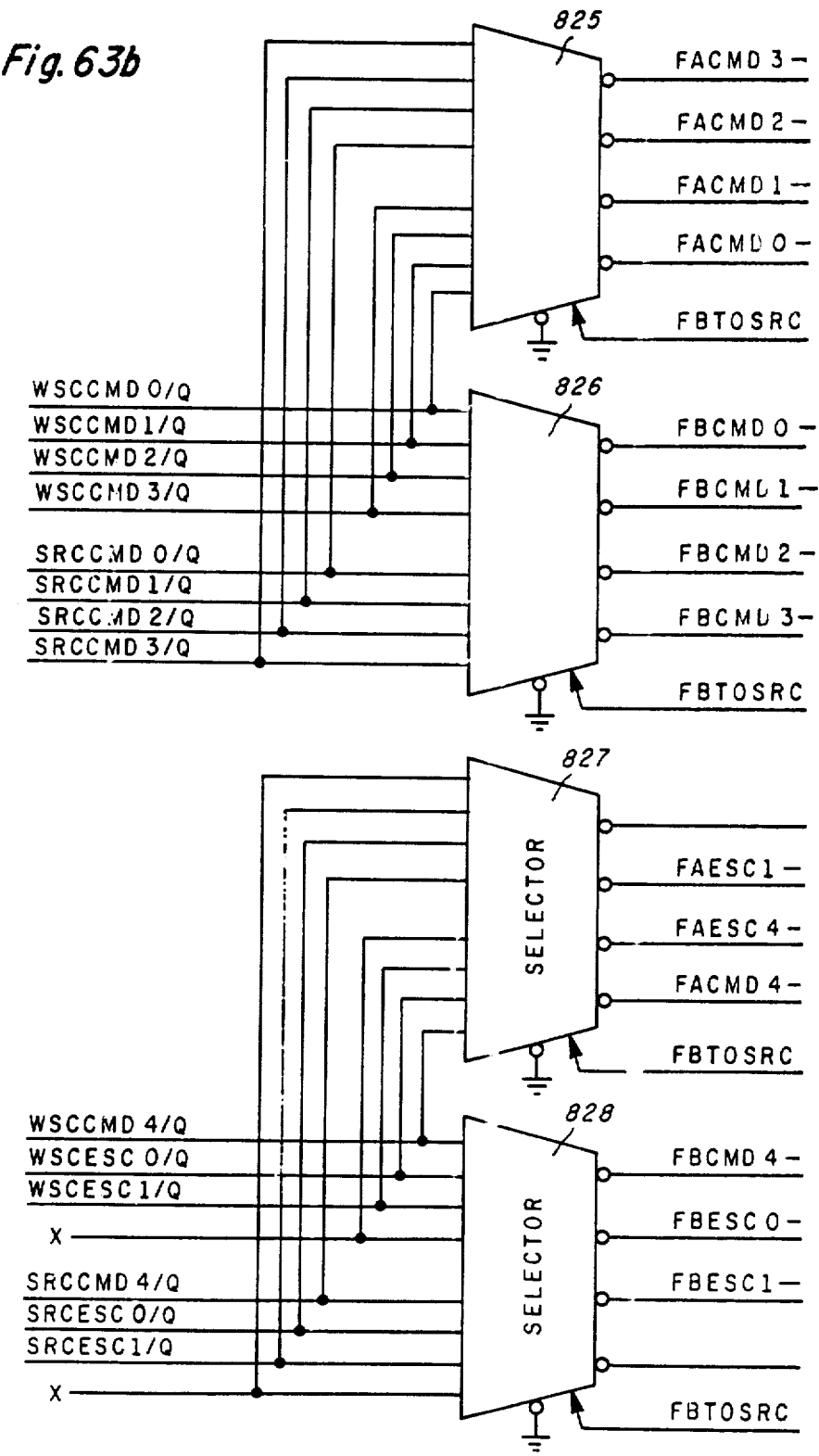
Figure 63C:
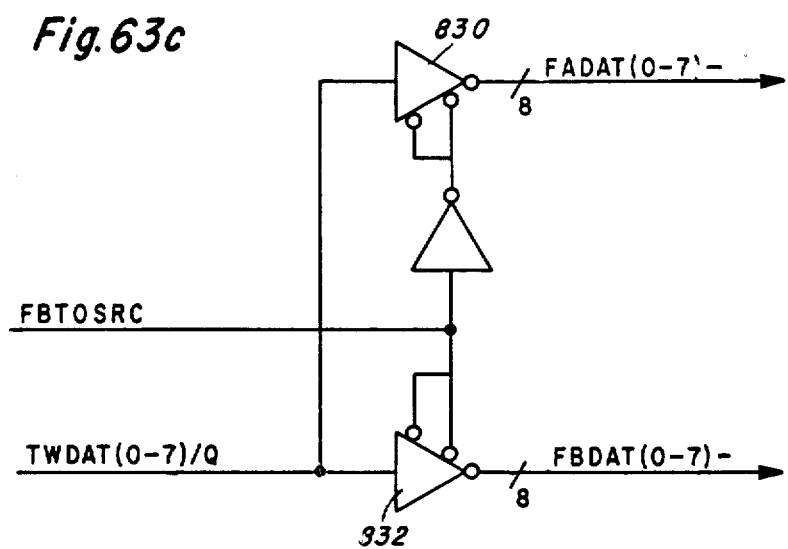

FIGS. 63a, 63b and 63c are schematics of the formatter commands developed from signals provided by WSC26 and SRC27. FIG. 63a illustrates four selectors, Texas Instruments Type 74S158 Quad 2-to 1-line Data Selector, mentioned earlier. The select input of these four selectors is activated by signal FBTOSRC, the signal output from NAND gates 819 and 820.

The inputs to selectors 805 and 806 are identical, except that they are applied to different input connections, resulting in a different pattern of output signals, albeit identical output signals. Signal WSCCCL/Q is applied to pins 1a and 4b of sectors 806 and 805, respectively. Signal WSCDAK is applied to pins 2a and 3b; WSCLBY is applied to pins 3a and 2b; WSCDS1/Q is applied to 4a and 1b; SRCCCL is GROUND is applied to 3b and 3a; SRCDSI/Q is applied to 4b and 1a. Outputs 1y-4y of selector 805 provide signals FAOS1, FALBY-, FADAK- and FACCL-. Outputs 1y-4y of selector 806 provide output signals FBCCL-, FBDAK-, FBLBY-, and FBDSI-.

Selectors 807 and 808 have eight inputs arranged identically to the inputs with respect to selectors 805 and 806. THe inputs to selectors 807 and 808 are signals WSCTA(0-2), WSCDSO/Q, SRCTA(0-2)/Q and SRCDSO/Q. As a result of these inputs signals, selector 807 provides available output signals FADS0-, FATA2-, FATA1-, and FATA0-. The available output signals from selector 808 are FBTA0-, FBTA1-, FBTA2-, and FBDS0-.

FIG. 63b also illustrates four selectors of the same type as those illustrated in FIG. 63a with the select signal for all four being FBTOSRC. The input signals are again arranged in identical fashion to the input signals with respect to selector pairs 805806 and 807–808. The inputs to selectors 825 and 826 are WSCCMD(0-3)/Q and SRCCMD(0-3)/Q.

Likewise, the inputs to selectors 827 and 828 are arranged identically to the inputs to selectors 825 and 826 except that only three inputs are available for each half. The inputs are WSCCMD4/Q, WSCESCO/Q, WSCESC1/Q, SRCCMD4/Q, SRCES0/Q and SRCESC1/Q. Input pins 4a and 4b of selector 828 are open, as are input pins 1b and 1a of selector 827.

The outputs from selector 825 are signals FACMD(3-0)-. The outputs from selector 826 are signals FBCMD(0-3)-. The outputs from selector 827 are FAESC1-, FAESC0- and FACMD4-. The output signals from selector 828 are FBCMD4-, FBESCO-and FBESC1-.

FIGS. 63a and 63b illustrate how a selection is made between one of two formatters.

FIG. 63c illustrates the development of other command signals. Signals TWDAT(0-7)/Q from flip flop array 774 are applied to the inputs of inverter arrays 830 and 832. Signal FBTOSRC provides the output enables for inverter array 832 and is inverted through inverter 831 to provide the output enable signals for inverter array 830. The output signals from inverter array 830 are FADAT(0-7)- and the output signals from inverter array 832 are FBDAT(0-7)-.

Figure 64B:
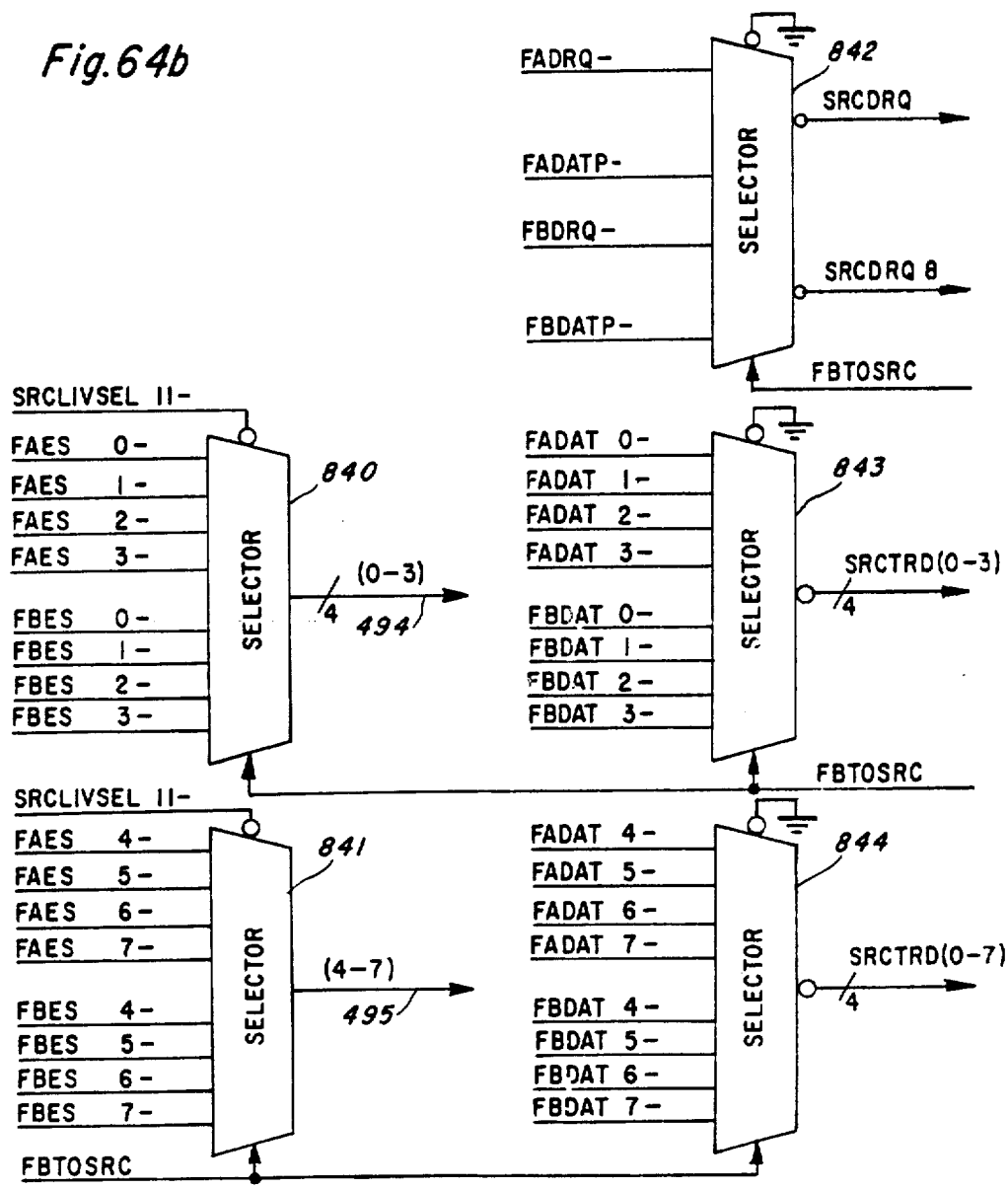

FIGS. 64a and 64b depict, in schematic form, the generation of formatter status sent to SRC 27. FIG. 64a illustrates three selectors, Texas Instruments Type 74LS257 Quad Data Selectors described beginning at page 7-372 of the TTL Data Book. Selectors 835 and 836 have their output control activated by signal SRCLIVSEL8- and selector 837 has its output control activated by signal SRCLIVSEL9-. Each of selectors 835-837 have the signal FBTOSRC applied to their select input. The formatter status signals applied to selector 835 are FAFUBSY-, FAXPTROY-, FAERR-, FAOVR-, FBFUBSY-, FBXPTRDY-, FBERR-, and FBOVR-.

Selector 836 has applied to it formatter status signals FAFMK-, FAEOT-, FABOT-, FACER-, FBFMK-, FBEOT-, FBBOT-, and FBCER-.

Selector 837 has applied to it signals FAPER-, FADEP-, FBPER-, FBDPE and SRCABORT/Q-.

FIG. 64b illustrates five more selectors of the same type as mentioned in respect of FIG. 64a. Selectors 840 and 841 have signal SRCLIVSEL1I- applied to their output control input while the output control input of selectors 842, 843 and 844 are grounded. All of the selectors have signal FBTOSRC applied to their output control terminals. Applied to selector 840 are signals FAES(0-3)- and FBES(0-3)-. Applied to selector 841 are signals FAES(4-7)- and FBEs(4-7)-. Applied to selector 843 are signals FADAT(0-3)-and FBDAT(0-3)-. Applied to selector 844 are signals FADAT(4-7)- and FBDAT(4-7)-.

Referring to both FIGS. 64a and 64b, the outputs of selectors 835, 836, 837, 840 and 841 are buses 491, 492, 493, 494 and 495, respectively, all buses being connected to the SRCLIV bus 488. The output signals from selector 842 are SRCDRQ and SRCTRD8. The outputs from selectors 843 and 844 are signals SRCTRD(0-3) and SRCTRD(4-7), respectively.

Figure 65:
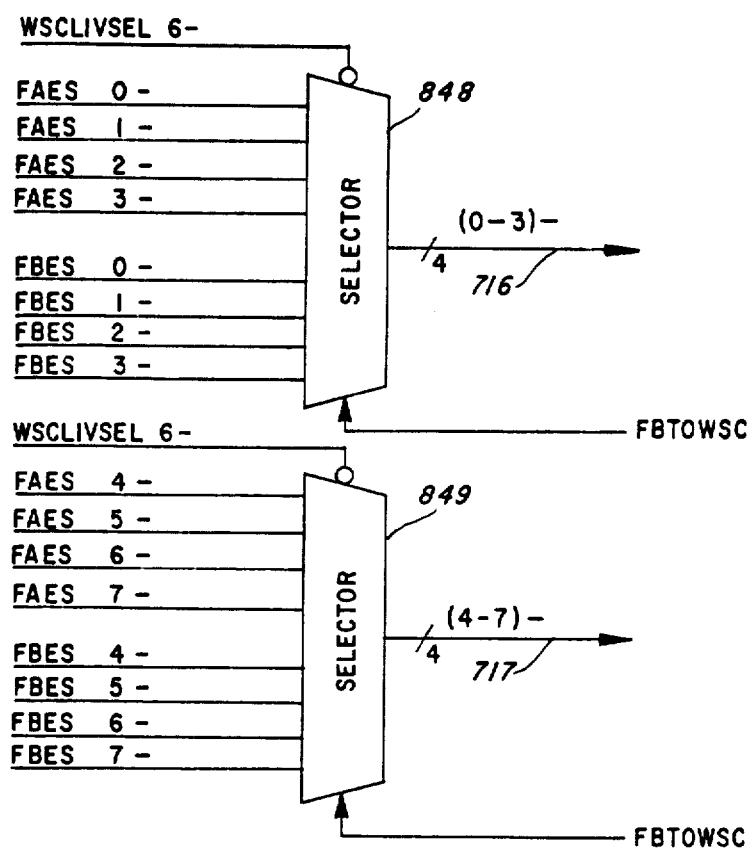
FIG. 65 schematically illustrates formatter to WSC select.

FIG. 65 illustrates two selectors 848 and 849 for formatter selection in response to a WSC select. These FBTOWSC applied. The inputs to selector 848 are signals FES(0-3)- and FBS(0-3)-. The inputs to selector 849 are signals FAES(4-7)- and FBES(4-7)-. The outputs of selectors 848 and 849 are buses 716 and 717, respectively, which connect to WSCLIV bus 715.

Figure 66:
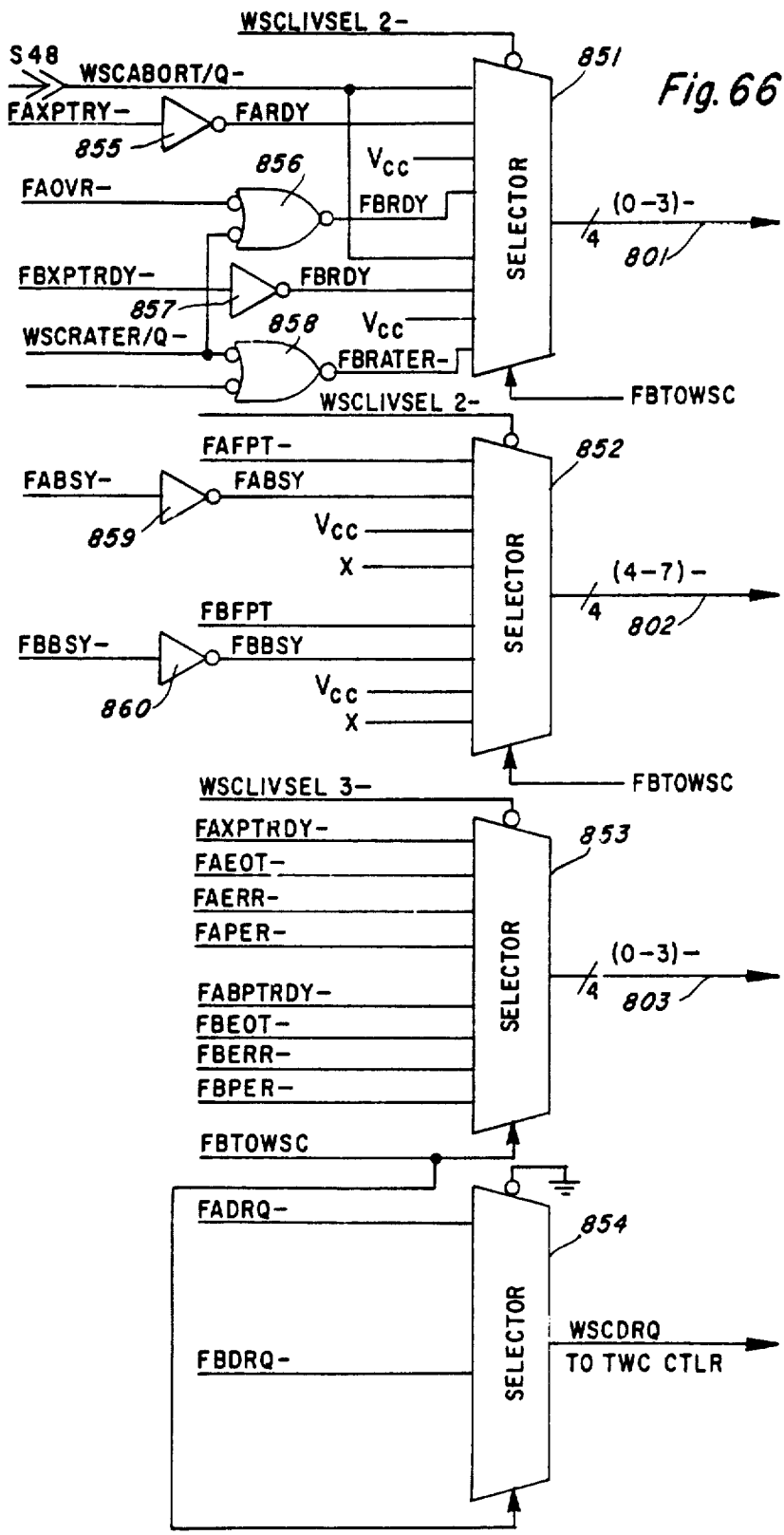
FIG. 66 schematically illustrates formatter status to WSC select.

FIG. 66 schematically depicts circuitry for sending formatter status in response to WSC select. Selectors 851-854-854 are shown. Selectors 851-853 are Texas Instruments Type 74LS257 and selector 854 is a Texas Instruments Type 74LS258, which is the same as the 74LS257, except that the outputs are inverted.

The output control terminals of selectors 851 and 852 have signal WSCLIVSEL2- applied and the output control terminal of selector 853 has signal WSCLIV-SEL3- applied. The output control terminal of selector 854 is grounded. The select input of all of selectors 851-854 has signal FBTOWSC applied.

Signals WSCABORT/Q- from terminal S48 supplies an input to each half of selector 851. Signal FAXPRT-DY- is inverted through inverter 855 and applied as an input to selector 851. Signal FA0VR- provides one input to AND gate 856 whose other input is provided by signal WSCRATER/Q- and whose output signal, FARATER- is applied as an input to selector 851. Signal FBXPRTDY- is inverted through inverter 857 whose output signal FBRDY is applied as an input to the second half of selector 851. AND gate 858 has signals FBOVR- and WSCRATER/Q- as inputs with signal FBRATER- as an output applied to the second half of selector 851 which also has the voltage VCC applied to both halves.

Signal FAFPT- is applied to the first half of selector 852. Signal FABSY- is inverted through inverter 859 and applied to the first half of selector 852. Signal FBFPT- is applied to the second half of selector 852 and signal FBBSY- is inverted through inverter 860 and applied to the second half of selector 882. Voltage VCC is applied to both halves of selector 852.

The first half of selector 853 has applied it signals FAXPTRDY-, FAEOT-, FAERR-, and FAPER-. The second half of selector 853 has signals FABPTRDY-, FBEDT-, FBERR-and FBPERapplied as inputs. Selector 854 has signal FADRQ- applied to the first half and signal FBDRQ- applied to the second half. The outputs of selectors 851-853 are buses 801, 802 and 803, respectively, all of which are connected to WSCLIV bus 715. The output signal from selector 854 is WSCDRQ which is applied to AND gate 790 of FIG. 60.

The various signals from the formatters A and B are peculiar to this particular application wherein magnetic tape transports are the input output devices. It should be understood, of course, that the signals will vary, depending upon the particular type of input/output device.

PROCESS SEQUENCE CONTROLLER

The third section of the intelligent controller is the process sequence controller section. The central element is a concatenation of four Advanced Micro Devices 2901 Bit Slice Processing Elements, known as the microprocessor unit (MPU). The MPU is controlled by the contents of a ROM (not shown) which may be made up of Texas Instruments Type 74S472, mentioned earlier, to provide command words that are 64 bits in length. The ROM is addressed by four Texas Instruments Type 74S482 4-Bit-Slice Expandable Control Elements (not shown) which provide the sequencing function that is not available in the MPU. The sequencer and ROM combination are present to provide the commands to the MPU and to other components associated with the MPU in the process sequence controller section.

FIG. 67 illustrates, in block form, process sequence controller 28. PSC FIFO 903 receives input signals TRD(00-19) from flip flop arrays 664 and 665 shown in FIG. 50c of the Data Read Controller 30. Certain informational bits are also sent, such as parity end of data, scan detect and scan length error.

The data bits are sent from buffer 903 to memory 901, Buf A section. FIFO controller 904 controls the flow of data from PSC FIFO 903 to memory 901. Addresses are provided from FIFO controller 904 and MPU 900 through selector 907. Up down counter 905 is used to monitor the incoming information and the availability of memory space, providing an indication (Test $\neq 0$) that there is space over line 906 to MPU 900. MPU 900 provides line IPBUFSELCT to control selector 907. The selector 907 allows MPU 900 to address memory 901 so that information will be transmitted into MPU 900 for processing, and also allows addressing of memory 901 for loading information from FIFO 903.

Store controller 910 is identical to FIFO controller 904 and controller 910 loads information from memory 902 into central memory, through selector 911. MPU 900, through selector 911, addresses memory 902 to cause processed data to be removed from MPU 900 and stored in memory 902.

Buf A section of memory 901 may be swapped with the Buf B section and Buf C section of memory 902 may be swapped with Buf D section. This is referenced in FIG. 68 by a simple table with the buffer sections indicated at the left of the illustrated block. The swapping function is accomplished by hardware shown in FIGS. 71 and 73. The table indicates that, at time t1, the input buffer is Buf A, the process buffer is Buf B, the processor OP buffer is Buf C and the store DMA buffer is Buf D. At time t2, the roles are reversed, as indicated. This enables fast movement of data from the FIFO into the memory 901 and then into MPU900 for processing. The processed data then is transmitted into memory 902, into either buffer C or buffer D, depending upon the swap status. The processed information is then sent to the central memory. The store controller, 910, functions much like the FIFO controller 904 in that its function is to take data out of the store DMA buffer and send it to the central memory.

In this particular application, the amount of data that is transmitted for processing through MPU 900 is so great that the swapping of buffers must be done to be able to keep the data flowing. That is, if the memories 901 and 902 were infinitely large, the swapping arrangement shown herein would not be necessary. In this application, however, it is necessary that information be processed through MPU 900 while the input buffer is receiving data to keep the stream continuous.

FIG. 69 illustrates the PSC FIFO 903 which is made up of four Texas Instruments Type 74S225, FIFO's mentioned earlier. Signal FIFOEN from a ROM (not shown) provides one input to AND gate 919 whose other input is signal FIFOST02. The output of AND gate 919 provides one input to OR gate 920 whose other input is signal FIFOCK, the generation of which is described below. The output of NOR gate 920 is signal FIFOUTEN which provides one input to NAND gate 921 whose other input is provided by the clock signal SYCK which is the system clock at 4 MHz. The output of NAND gate 921 provides the input to the UN-LOADCKN pin of each of FIFO's 915, 916, 917 and 918. The FIFO write strobe signal (FIFOWRTSTB) provides the CK B input to each of the FIFO's and the signal ISTB provides the clear input for each of the FIFO's. Signals TRD00-TRD04 are the inputs to FIFO 915 with corresponding outputs FIFO00-FIFO04. Signals TRD05-TRD09 provide inputs to FIFO 916 with corresponding outputs FIFO05 to FIFO09. Input signals TRD10 through TRD14 are provided to FIFO 917 with corresponding outputs FIFO10-FIFO14. Signals TRD15, EODFLG, SCANDET, and SLE provide inputs to FIFO 918 with corresponding outputs FIFO 15, EODFG/F, SCANDET/F and SLE/F.

The development of certain control signals should also be pointed out at this time. Outputs IRl from FIFO 915, IR2 from FIFO 916, IR3 from FIFO 917 and IR4 from FIFO 918 are all applied as inputs to NAND gate 923 which provides the signal FIFOOFUL. Outputs OR1, OR2, OR3 and OR4 from FIFO's 915-918, respectively, provide inputs to AND gate 924 whose output is connected to the D input of flip flop 925, clocked by system clock SYCK and having a Q output signal EMPTY/Q and Q- output signal EMPTY/Q-.

FIG. 70 is a schematic diagram of the controller 904 of FIG. 67. Nand gate 930 has buffer full signal (BUFUL) as one input and signal FIFOST02 as its other input. Its output is connected to the K terminal of flip flop 932, whose Q- output provides one input to AND gate 933. Signal FWPSLD- (from MPU 900) is inverted through inverter 931 and provides the other input to AND gate 933. The output of AND gate 933 is signal FIFOSTOORST which is a reset sighal providing one input to OR gate 935 and which also provides an input to the J terminal of flip flop 932. Signal FIFOST02 provides one input to AND gate 934 whose other input is provided by the signal FICLK which comes from the ROM (not shown). The output signal from 934, FIFOCK) provides the other input to OR gate 935 and as indicated above, provides the other input to OR gate 920. The output of OR gate 935 is connected to the J input of flip flop 936 which is clocked by the system clock and whose Q output provides one input to AND gate 938. Signal IMBSY, from the ROM, is inverted through inverter 937 and provides another input to 938. The third input to 938 is the signal EMPTY/Q from the flip flop 925. The output of AND gate 935 is connected to the D input of flip flop 942 which is clocked by the system clock SYCK and whose K- input is provided by signal BUFUL. The Q output of flip flop 942 is signal FIFOST02, which provides an input to NAND gate 930. The output of AND gate 938 is also inverted through inverted 939 and provides one input to NAND gate 940 whose other input is provided by the signal IMLD-, from the ROM. The output of NAND gate 940 provides one input to NAND gate 941 whose other input is the signal SYCK, its output being the signal IMWEN.

FIG. 71a illustrates AND gate 943 whose inputs are signals SLE/J from the FIFO and signal FIFOST02 mentioned earlier. Its output is inverted through inverter 944 providing control signal FIFOSLE-.

FIG. 71b illustrates NAND gate 723 having inputs IR1-IR4 providing output signal FIFOFUL.

FIG. 71c illustrates NAND gate 924 having inputs OR1-OR4, providing output signal EMPTYD which provides the J input of flip flop 925 whose Q output is EMPTY/Q, - and which is clocked by signal SYCK.

FIG. 71d illustrates signal SWAPIM from the ROM applied to the J input of flip flop 926, and inverted through inverter 927 and applied to the K- input. Flip flop 926 is clocked by system clock SYCK, providing on its Q output signal BFRIM/Q and on its Q- output signal BFRIM/Q-.

FIG. 71e illustrates the signal SWAPIMN from the ROM applied to the J input of flip flop 928 with signal SWAPIMN- applied to the K- input. Flip flop 928 is clocked by the system clock and provides output signal BFRIMN/Q on the Q output and signal BFRIMN/Q- on the Q- output.

Figure 72:
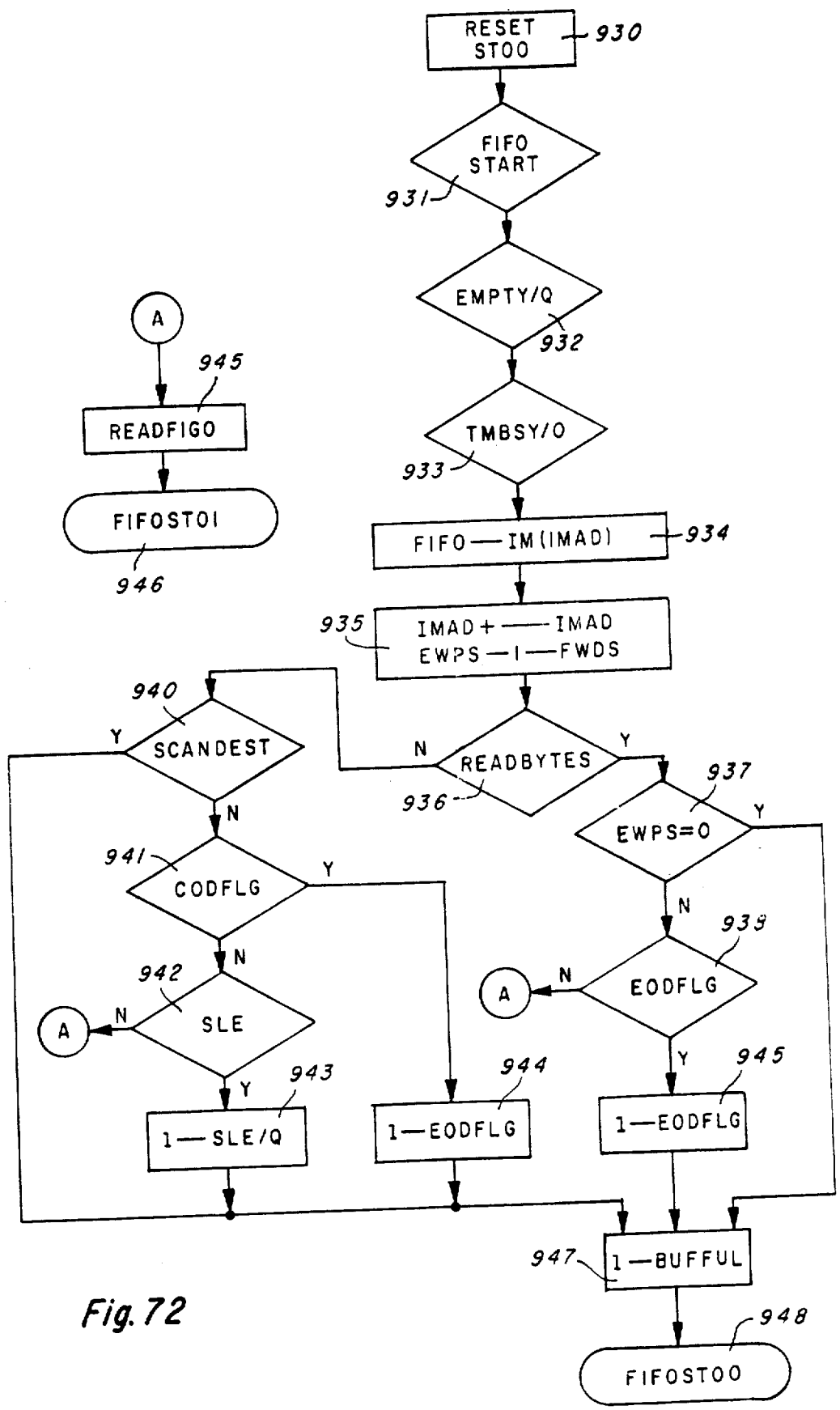
FIG. 72 is a flowchart illustrating the operation of the PSC.

FIG. 72 is a flowchart representing the function of the controller 904. Block 930 illustrates the controller being in state ST00. At block 931, it is determined whether there is a FIFO start signal. If the answer is yes at decision block 932, it is determined whether there is an EMPTY/Q signal. If the answer is yes, then the controller remains in state FIFO STOl. If the answer is no, then at decision block 933, it is determined whether the internal memory is busy by the signal IMBSY/Q. If the answer is yes, the controller waits in state FIFO STO1 until the answer becomes no, at which time at block 934, the FIFO contents are transferred to the internal memory, which is memory 901 shown in FIG. 67. The operation then moves to block 935 where internal memory address plus one is transferred to the internal memory and the word count minus one is transferred to the word counter. The operation then enters state FIFOST02 and at decision block 936 it is determined whether a READ BYTES signal is present. If the answer is yes,then at decision block 937, it is determined whether the WORDCOUNT=0, and if the answer is yes, then the system goes to block 947 where a 1 is transferred to the BUFFER FULL count and the system returns to the beginning at state FIFO ST00 shown at 948. If, at decision block 937, it is determined that the word count is not zero, then at block 938 it is determined whether there is an END OF DATA flag present. If the answer is yes, then a 1 is transferred to the END OF DATA flag at block 939, terminating the operation. If the answer is no, then at block 945 there is a read FIFO operation and the system, at block 946, returns to state FIFOSTO1.

If at block 936 there was no READ BYTE signal, then at decision block 940, it is determined whether there is a SCAN DETECT, the operation goes to block 947 with a transfer of one to the BUFFER FULL flag. If the answer is no, a decision at block 941 as to whether there is an END OF DATA flag. If the answer is yes, then at block 944, a 1 is transferred to the END OF DATA flag and the operation terminates. If the answer is no, then at decision block 942, it is determined whether there is a SYSTEM LENGTH ERROR flag. If the answer is yes, then a 1 is transmitted to the SLE/Q flag at block 943 and the operation terminates. If the answer is no, then a READ FIFO operation occurs at block 945 and the system, at block 946 returns to state 01.

FIGS. 73a–73d in more detailed block diagram form, illustrate PSC 28.

Figure 73A:
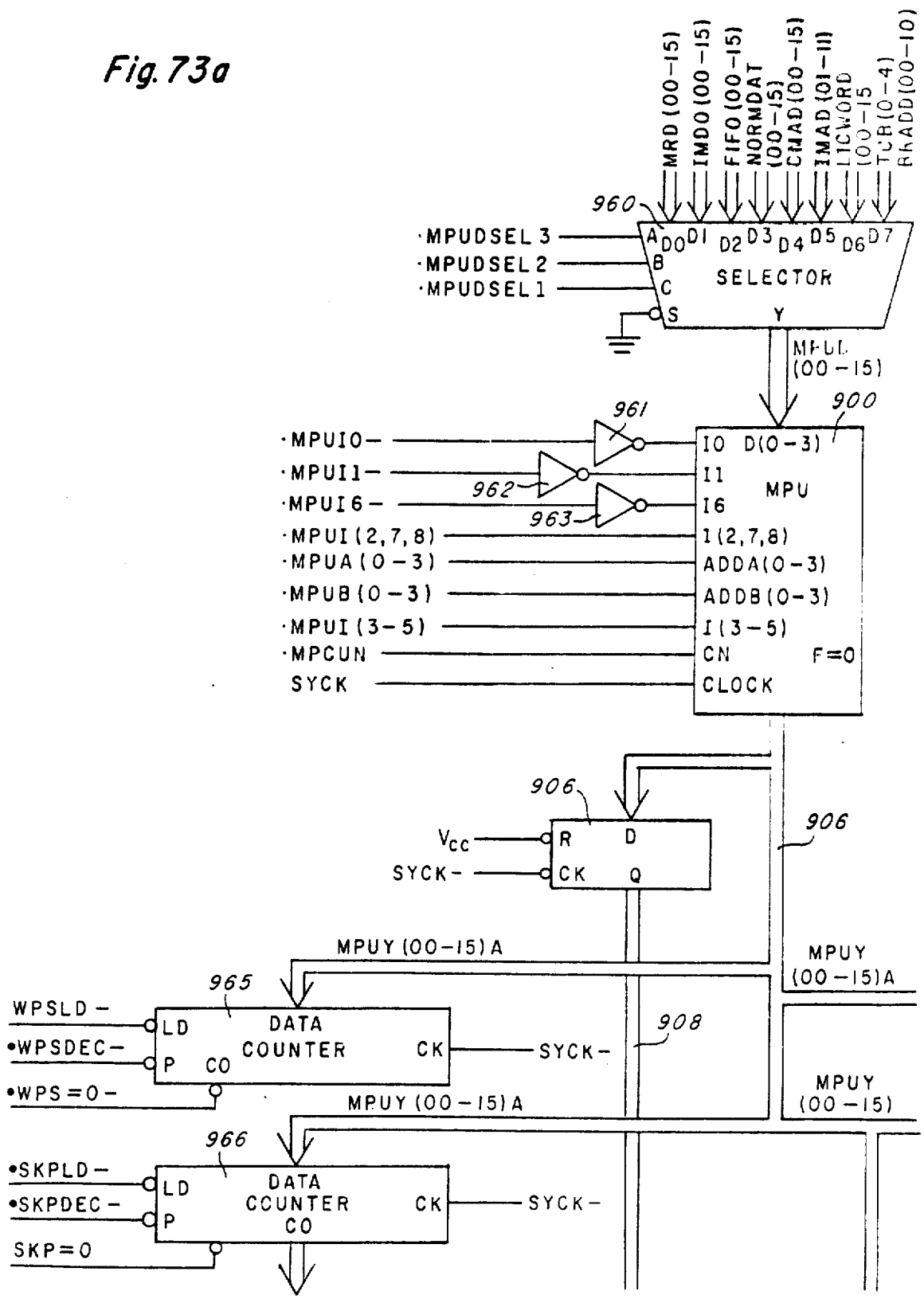
FIGS. 73a–73d, together, are a detailed block diagram of the PSC.

In FIG. 73a, selector 960 is shown with input selection signals from the ROM (not shown) as MPUDSEL-1-MPUDSEL3. Selector 960 is made up of 16 Texas Instruments Type 251 Data Selectors, described beginning at page 7-362 of the TTL Data Book. The signals available as inputs to selector 960 are TCB(0-4) and BRADD(00-10) from the ROM; LIC words (00-15) from FIG. 75; internal memory address signals (IMAD) central memory address signals (CMAD); normalizer data from normalizer 969 (NORMDAT); tape read data FIFO information (FIFO); internal memory data (IMD); and memory read data (MRD). This data selection is done according to the table shown in FIG. 74 where the ROM information is referred to as "INTEGER".

Inputs to MPU 900 include the information from selector 960 by way of bus MPUD(00-15) and input signals from the ROM. These include MPUIO-, inverted through inverter 961 and applied to the I0 input; MPUI inverted through inverter 962 and applied to terminal I1; MPUI6 inverted through inverter 963 and applied to terminal I6; MPUI(2, 7, 8) applied to terminals I (2, 7, 8); MPUA(0-3) applied to Terminals ADDA0-3); MPUB(0-3) applied to terminals ADDB(03); MPUI(3-5) applied to terminals I (3-5); MPUCN applied to terminal CN; system clock signal SYCK- applied to CLOCK terminal.

Buf 906 is connected to MPU 900 and provides 16 inputs to flip flop array 964. Flip flop array 964 is clocked by the system clock SYCK- providing MPUY(00-15) bus 908 as its outputs. Bus 908 provides inputs to selector 907, to buffer memory 902 and to selector 974.

Buf 906 provides inputs to counters 965, 966, 980, 981, 982, 967 and 968, all general purpose 4-bit up-/down synchronous binary counters, with counters 982, 983 and 967 being made up of three Texas Instruments Type 669 counters, the other counters being made up of four of the TI counters. The counters are general purpose so that their use depends upon the particular application to which the intelligent controller is put. In some instances, in the application of this preferred embodiment, the counters are dedicated. For example, counter 981 is a central memory address counter; counter 982 is an internal memory counter for buffer memory 901; counter 983 is an internal memory address counter for buffer memory 902; counter 967 is a status word counter; counter 968 is a words per sector counter.

Counter 965 has its load input provided by signal WPSLD- and its enable P input provided by signal WPSDEC-, both from the ROM. Its carry out signal is WPS=0. Its clock input is provided by the system clock signal SYCK-, as is the case with all of the counters mentioned above.

The load input of counter 966 is provided by signal SKPLD- and the enable P input is provided by signal SKPDEC-, both from the ROM. The carry out output is the signal SKP=0.

Figure 73B:
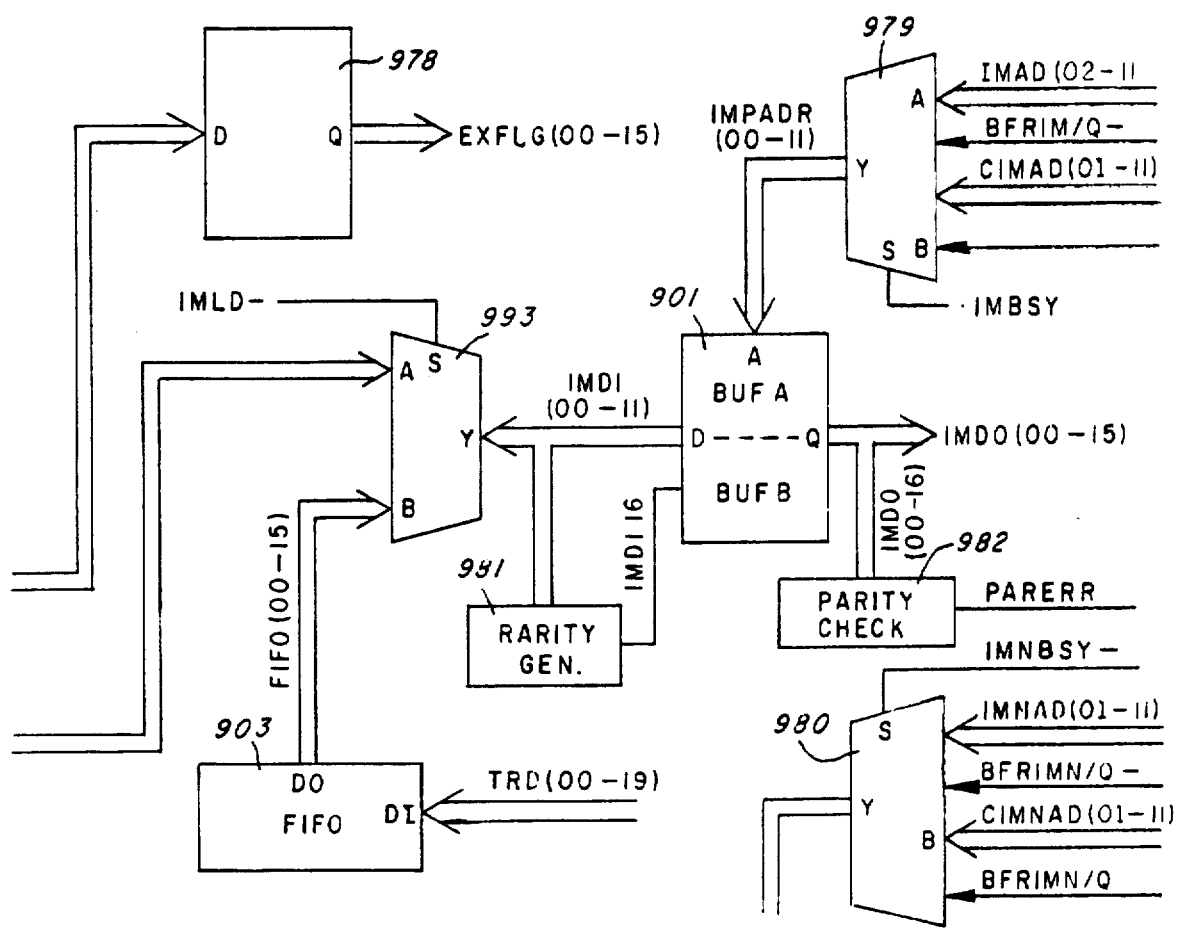
Figure 73C:
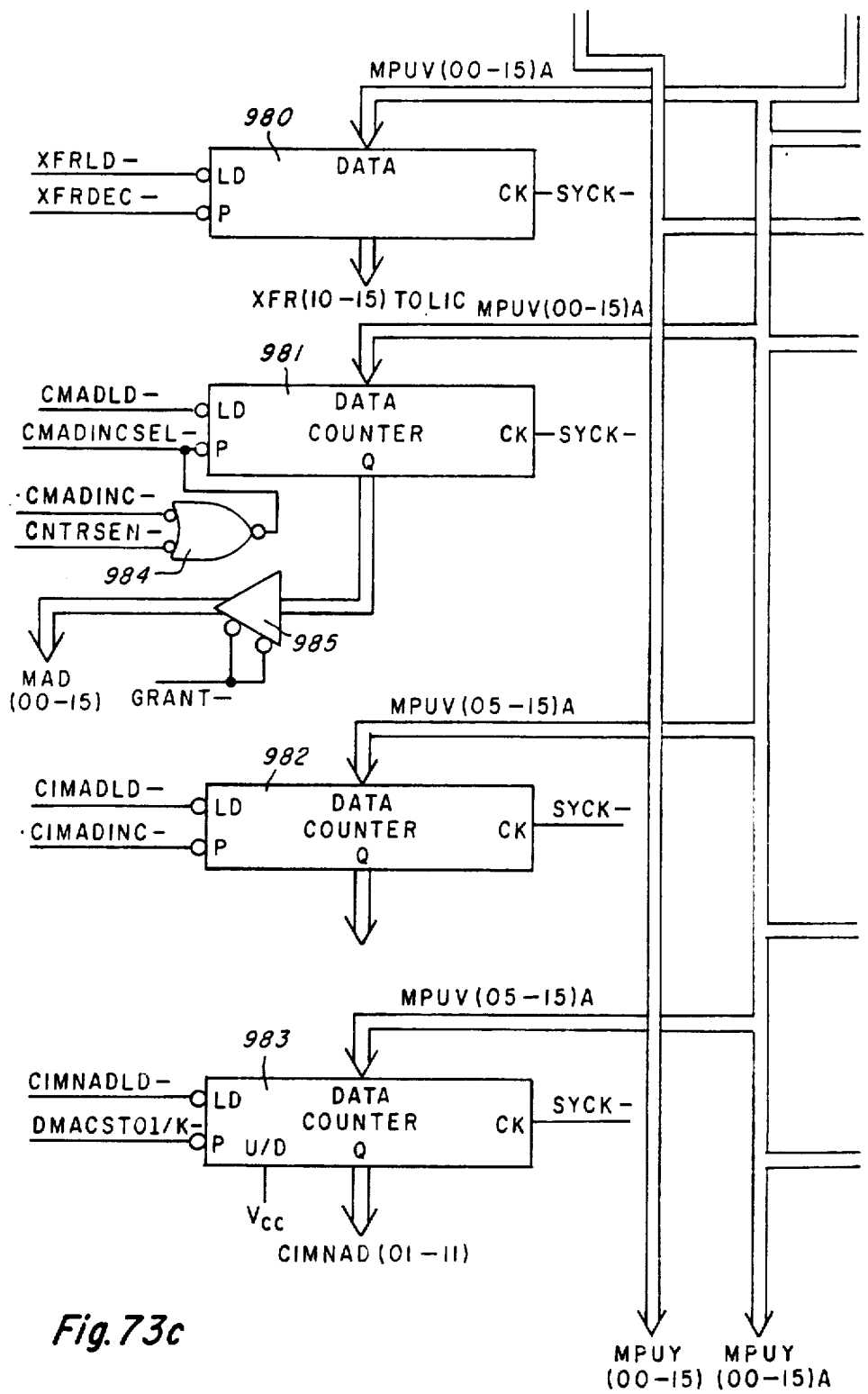

Counter 980, shown in FIG. 73c, has its LD input supplied by signal XFRLD- and its enable P- input applied by signal XFRTEC-, both signals ultimately provided by the ROM. The output of counter 980 from the CO terminal is signal XFR=0-.

Counter 981 has its LD input provided by signal CMADLDfrom the ROM. Signal CMADINC- and signal CNTRSEN-, from the ROM, provide inputs to AND gate 984 whose output, signal CMADINCSEL-, is applied to the enable P- input. The Q outputs are gated through buffer 985 by signal GRANT- to provide 16 inputs to the memory address bus 39.

Counter 982, which is the address counter for the buffer memory 901, has its load input provided by signal CIMADLD- and its enable P input provided by signal CIMADINC-, both from the ROM. Its output is address buf CIMAD(01-11).

Counter 983, which is the memory address counter for buffer memory 902 has its load input provided by signal CIMNADLD and its enable P input provided by signal DMACST01/Kboth from the ROM. Its output is CIMNAD(01-11).

Figure 73D:
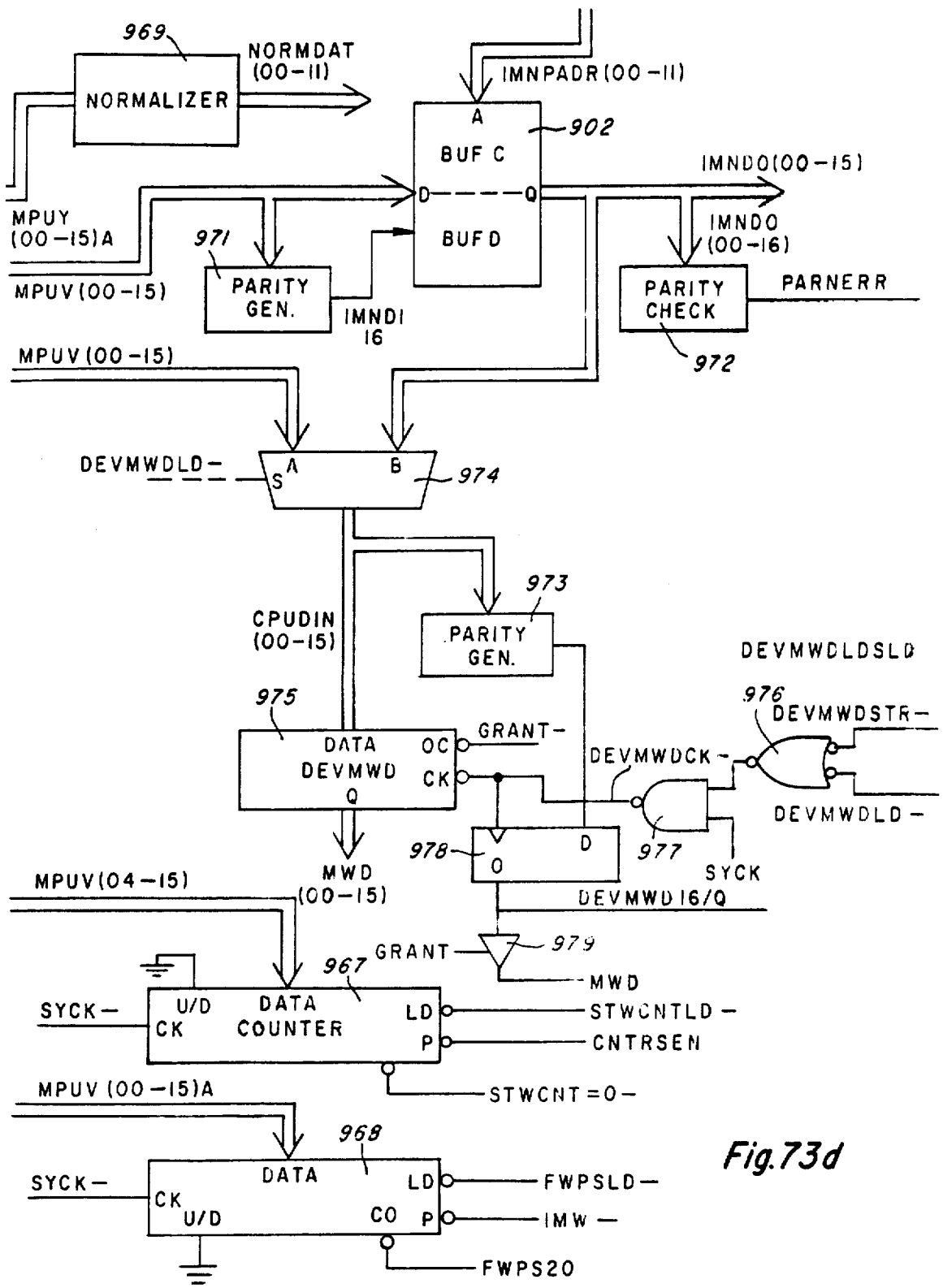

Counter 967, shown in FIG. 73d, has its load input provided by signal STWCNTLD- and its enable P input provided by signal CNTRSEN-. Its carry out output provides the signal STWCNT=0-. Ccounter 967, in this application counts the status words.

The load input signal to counter 968 is signal FWPSLDand the P enable signal is IMW- with the carry out output being signal FWPSC0-.

Flip flop array 978, shown in FIG. 73b, receives bus 906 and provides output signals EXFG(00-15). Selector 993 which is a Texas Instruments Type 74LS257 has 16 inputs from bus 908 and 16 inputs from FIFO 903. A selection between the output of FIFO 903 or MPU 900 is made based upon the signal IMLD- from MPU 900, such signal providing the selection input to selector 907. The outputs of selector 993 provide 16 data inptts to buffer memory 901 and also are used to generate a parity signal through parity generator 981 which, in this preferred embodiment, is a Texas Instruments Type 74180. The output data from memory 901 are signals IMDO(00-15) with parity checker 982, also a Texas Instruments Type 74180, also receiving the 16 outputs to provide an error signal PARERR.

The addressing of memory 901 is accomplished through the use of selector 979 which is made up of Texas Instruments Type 74LS257 selectors. The selection input is provided by signal IMBSY from the ROM with address signals IMAD(01-11) applied to one half of selector 979 and address signals CIMAD(1-11) applied to the other half. Associated with thsignals IMAD(01-11) is signal BFRIM/Q- from FIG. 71e, the inverse of the swap signal. Associated with signals CIMAD(01-11) is signal BFRIM/Q, the true swap signal. The development of signals IMAD(01-11) is not shown, but is identical to the development of the CIMAD signals. That is, a counter receives inputs from buf 906 and supplies the load terminal with signal IMADLD and the enable P- input with signal IMADINC-. Likewise, the IMNAD(01-11) signal development is not illustrated, but is identical to that of the development of CIMNAD signals. That is, a counter receives eleven signals from bus 906, the counter receives its load input from signal IMNADLD-and its P enable input is activated by signal DMACSTO1/K-. All of these signals are originated in the ROM. In this manner, buffer A or buffer B of memory 901 is selected through selector 979.

Selector 980 selects either buffer C or buffer D of memory 902 in the same manner. That is, signals IM-NAD(01-11), together with signal BFRIMN/Q- are input to one half of the selector, while signal CIM-NAD(01-11), together with signal BFRIMN/Q are input to the other half. The select signal, IMNBSY- is inverted from the ROM with either buffer C or buffer D being selected. The output of selector 980, of course, is input to the memory 902 for address selection. The data into buffer C and buffer D comes only from MPU 900 through bus 908. Parity generator 971 and parity check 972 are exactly the same as parity generator 981 and parity check 982 associated with memory 901 and are used in identically the same fashion.

Normalizer 969, shown in FIG. 73d, has 16 inputs from bus 906 and is simply a shift register mechanism. The normalizer shifting apparatus used in this preferred embodiment is the Texas Instruments 74LS399 multiplexer described beginning at page 7-499 of the TTL Data Book, and may be used as a universal type register for implementing various shift patterns. In this preferred embodiment, the 74LS399, together with appropriate control, normalizes the input data from bus 906, in a well-known manner.

Selector 974 receives the bus from buffer memory 902 as one half of its inputs and the bus 908 provides the other half of its inputs. The signal DEVMWDLD- causes a selection between these two groups of inputs, and the output bus enters flip flop array 975. Parity generator 973 receives the outputs from selector 974 and its output provides the D input to flip flop 978.

NAND gate 976 receives as inputs signals DEVMWDSTR-and DEVMWDLD- and provides on its output an input to NAND gate 977. The other input to NAND gate 977 is the clock signal SYCK. The output of NAND gate 977 provides the clock input to flip flop array 975 and also to flip flop 978. The outputs from flip flop array 975 provide 16 bits to the MWD bus 37 and the output from flip flop 978, gated through buffer 979 by signal GRANT provides a parity bit to MWD bus 37.

Figure 75:
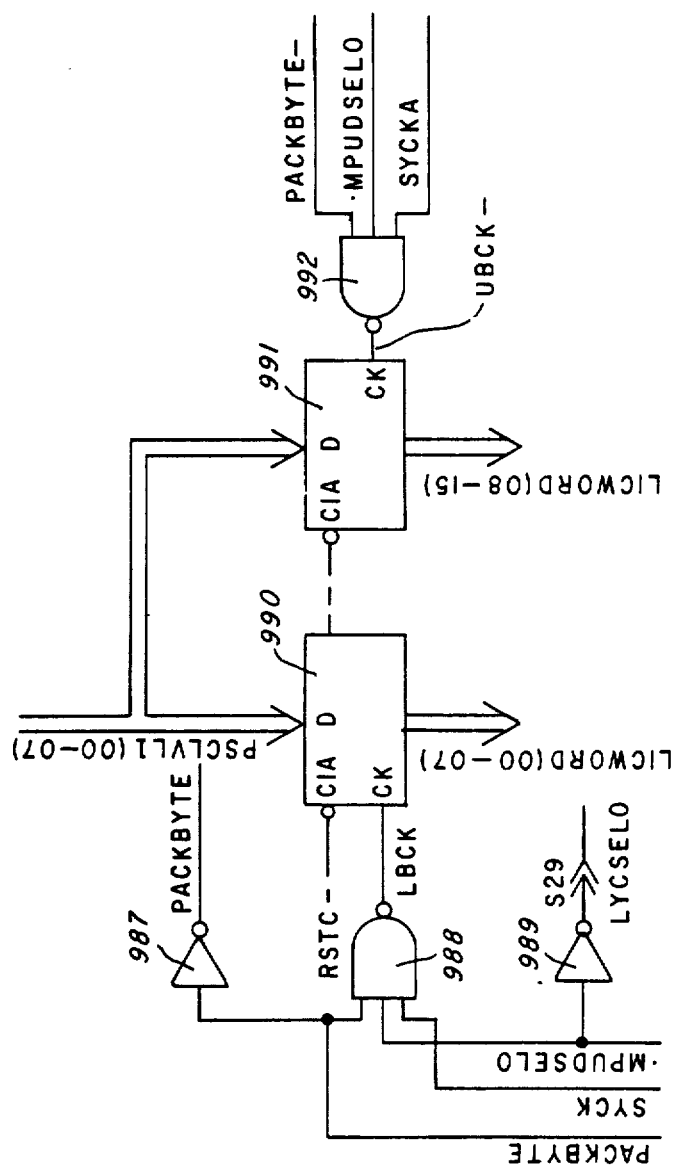
FIG. 75 is a schematic of the development of PSC input signals.

FIG. 75 is a schematic of the development of signals LICWORD(00-15). Signals PSCLVLl(00-07) are input to flip flop arrays 990 and 991. The clear input to arrays 990 and 991 is provided by signal RSTC-. The clock input to array to NAND gate 988 is the signal PACKBYTE which also is inverted through inverter 987 providing signal PACKBYTE-. A second input to NAND gate 988 is signal MPUDSELO and the third input is signal SYCK. Signal MPUDSELO is inverted through inverter 989 and provides output signal LICSELO- to terminal S29. The clock input to array 991 is provided by the output of NAND gate 992 which also has signals MPUDSELO and SYCK as inputs. The third input to NAND gate 992 is signal PACKBYTEthe output of inverter 987. The outputs from arrays 990 and 991 are input to selector 960 of FIG. 73a.

FIG. 76 is a map of the ROM used to control the operation of MPU900.

MODE OF OPERATION OF THE INVENTION

The intelligent controller (IC) supervises and controls block transfers of data between the central memory of a Texas Instruments Type 980B Computer (in this preferred embodiment) and the formatter selector switch 31. A tape write operation to one formatter and a tape lead operation to the other formatter may be concurrent. The IC is capable of addressing one of eight transports via each of two independent tape formatters. The IC is capable of maintaining a combined tape read and write rate of 1,500,000 bytes per second in the memory image (read or write bytes) mode of operation. Other data transfer rates are dependent on the internal processing done by the process sequence controller 28 to the incoming data.

The operations falling under the write category (CATA) include any operation requiring tape write functions. These operations are:
Write bytes
Write file mark
Erase bytes
where a "byte" is eight bits.

The operations falling under the process category (CATB) include any operation requiring the transfer or monitor of tape read data or any operation requiring the use of the process sequence control. These operations are;
Read scans
Read bytes
Record number search
Skip file mark
Skip record
Any type E list operation
SOS definition command Command list nesting or list look-ahead fetching is provided for all CATA and CATB operations. A maximum of 16 list blocks, each block having a maximum of 16 8-bit words, for each of PSG 28 or WSC 26, can be acquired on a look-ahead fetch basis. This level of list command nesting (number of look-ahead list fetched and stored in the appropriate LBUF17 section) is determined by the value stored into WSC or PSC 28 list look-ahead limit counters as determined-by the circuitry of FIG. 21.

The application of the IC in this preferred embodiment relates to the processing of seismic data. Due to the requirement that the proper data boundaries be maintained in memory when seismic data is read from tape, the IC has the capability to perform a special scan length check. A scan, as used in the SEG seismic formats, consists of a sequence of sample values, one for each channel of the recording system (plus other information as may be appropriate). In the formats to be processed by the IC, the scans may contain a variable number of bytes, including a start-of-scan code, sample values, and any other information bytes that may be appropriate. The beginning of each scan is designated by a "start-of-scan" (SOS) code.

The SOS code for type A list commands consists of three bytes of all "1's". The SOS code for type B list commands consist of up to eight bytes defined by the user via the SOS definition list command.

As each scan transfer to memory begins, the bytes/-scan counter of FIG. 43a, 43b is set to N-1 (N is a programmed integer), and the count is decremented once for each byte read from tape. If the length of the scan is correct, the counter will decrement to zero as the last byte of the scan is read.

The scan length check logic enables the IT to compensate for either short or long scans by insuring that the next scan starts in the proper buffer address. When a long scan is detected, those bytes read after the Bytes/Scan counter has decremented to zero, but before the next start-of-scan code is detected, are discarded. DAta transfer will. continue aftter the next SOS code is detected.

When a short scan is detected, that is, when a SOS code is detected before the Bytes/Scan counter decrements to zero, the remaining bytes of that scan buffer are not stored in central memory. The IC begins transfer of the next scan to the proper buffer in memory.

When either a short scan or a long scan is detected during the execution of a type A command list, the SOS code of the following scan is stored with the high order bit of the first byte set to zero.

When either a short scan or a long scan is detected during the execution of a Type B command list, the floating point value representing the last seismic sample in the scan is set to all zeros.

For Type A list command execution, the point in the data scan at which the SOS search is started will be dependent upon whether the recorded data is one's or two's complement. If one's complement data is specified, the search will start at the beginning of each data scan. If two's complement data is specified, the SOS code detection is inhibited until the end of each scan. Inhibiting the SOS search will be accomplished by waiting until the Bytes/Scan counter has decremented to two. This means that if a scan is short by one or two bytes, the next scan will be detected and started in the proper buffer address. However, if the scan is short by three or more bytes the next scan will not be detected and will therefore not be transferred to memory. Bit 0 of the next start-of-scan code transferred to memory will be reset to zero, indicating that a scan error occurred.

Figure 77:
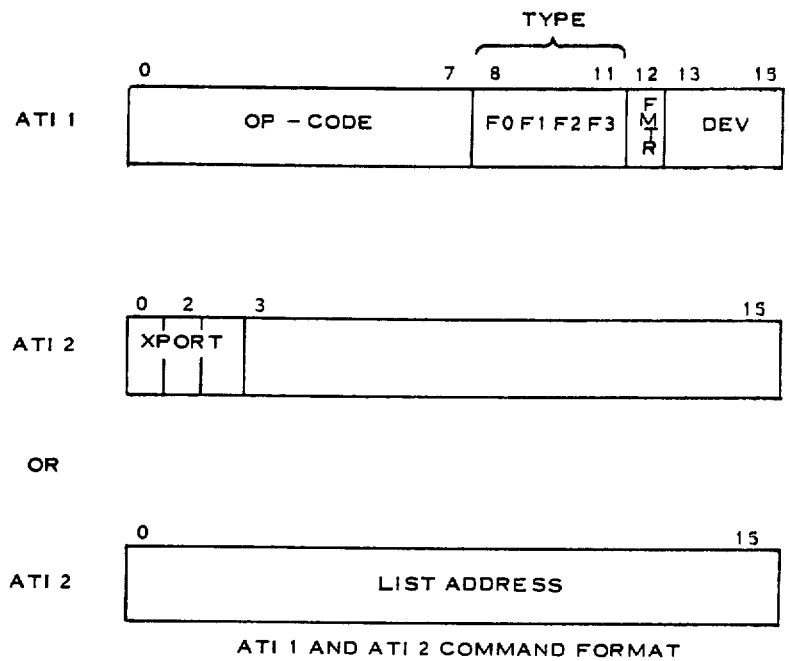
FIG. 77 illustrates words ATI1 and ATI2.

The CPU addresses and commands peripherals attached to DMAIF11 through SFC12 by use of an ATI instruction. The ATI comprises two 16-bit words ATI1 and ATI2, as shown in FIG. 77. ATI1 contains the device address formatter address, and function code. ATI2 contains either an initialization list address, a transport address, or a look ahead limit value.

The command list comprises seven different types: A, B, C, D, E,,F and G.

Figure 79A:
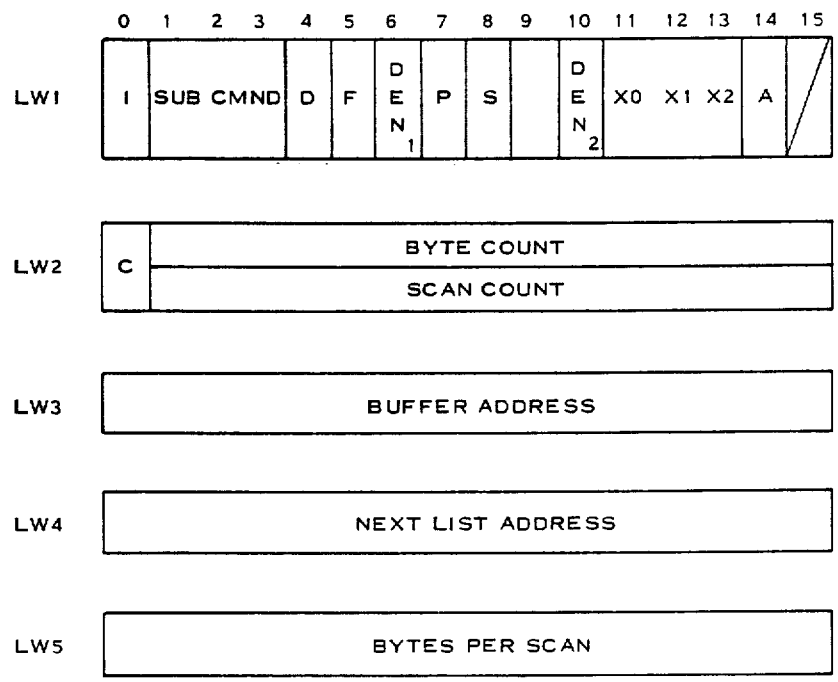

Type A, shown in FIG. 79a, list emulates the Texas Instruments TIMAP Model 2 half-inch tape controller and is software compatible therewith.

Figure 79B:
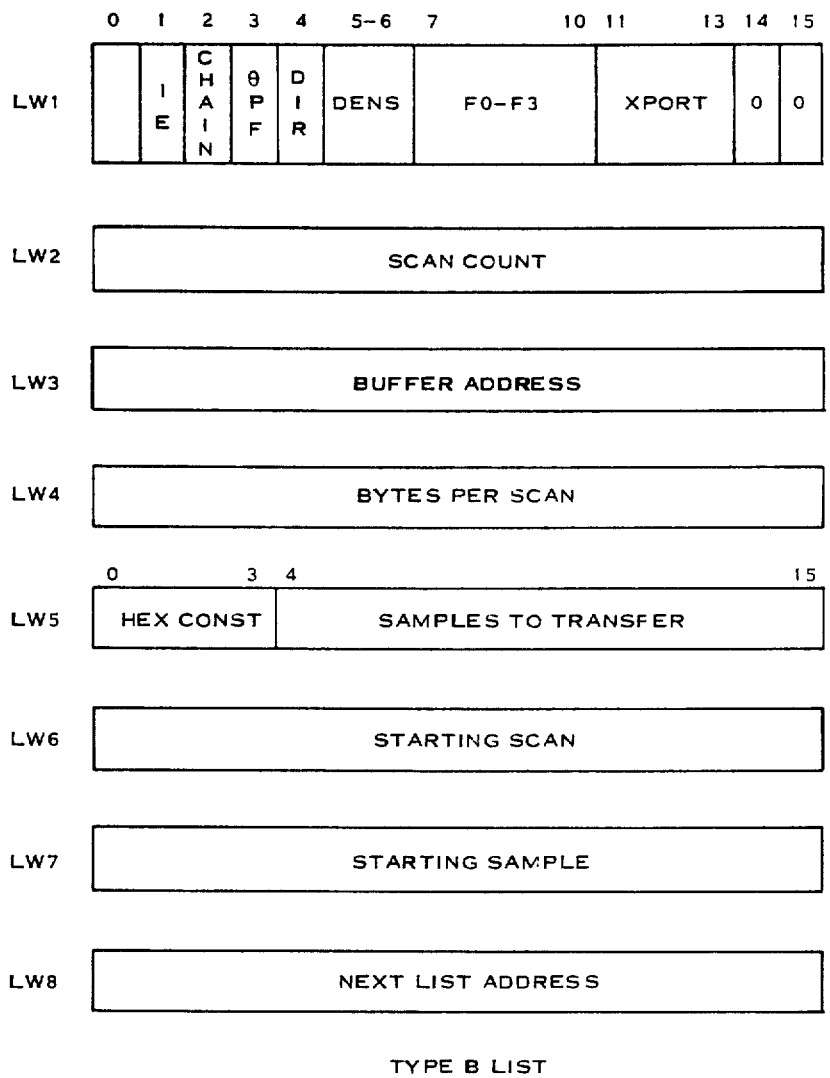

Type B, shown in FIG. 79b, list is used for seismic read scans operations to detect scans and transfer converted (gain/millivolt to floating point) scan data to memory.

Type C, shown in FIG. 79c, list is used for record number search and special read bytes operations.

Figure 79D:
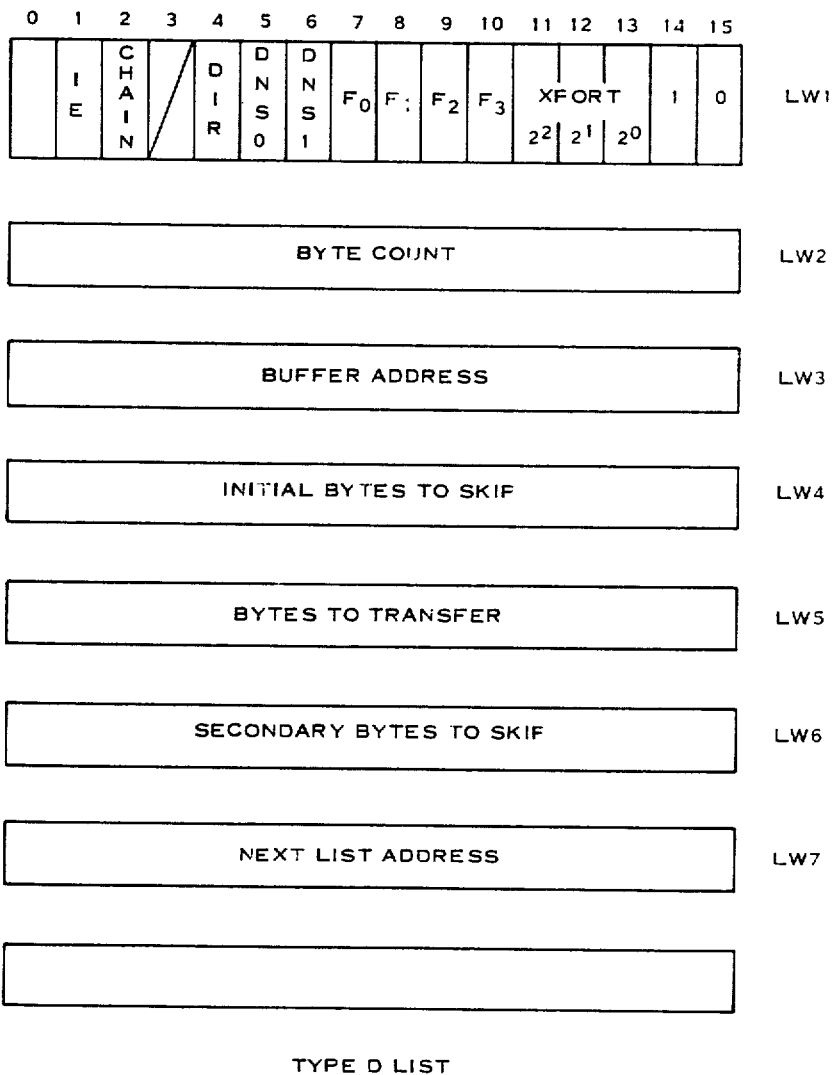

Type D, shown in FIG. 79d, list is used for a Read Segments operation (Ref. Para. 4.3.11 and 5.4).

Figure 79E:
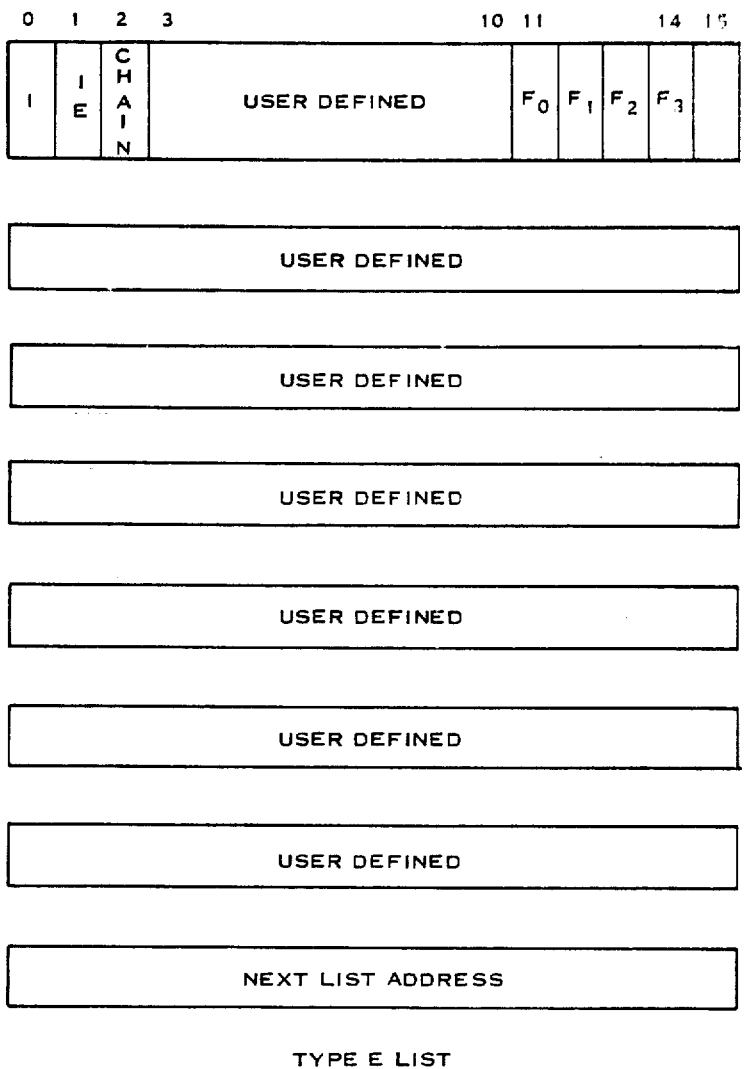

Type E, shown in FIG. 79e, list is a general purpose user defined list used to process data residing in internal or central memory.

Type F, shown in FIG. 79F, list is used to define the seismic start of scan code and replacement early gain value for type B list operations.

Type G List is used to down load PSC user micro code into a Fairchild Random Access Memcry made up of four Type 94322 units (not shown).

The format for the automatic transfer initiate instruction (ATI) is illustrated in Table 4A and defined in the following paragraghs.

ATI WORD 1

A strobe accompanies ATI word which instructs the IC to decode the channel address bits. The IC will respsond to any address from 0 through 7, inclusive. If the indicated address (bits I3 through 15) coincides with the address assigned (hardwired) to the IC, bits 8 through 12 are registered and the appropriate action follows. Bits 8 through 11 are the encoded function to be executed. These functions are listed in the function code table below, and described in the following paragraphs.

Bit I2 is the formatter address bit allowing the IC to address one of two tape formatter units, 32 or 33.

TABLE 4A
ATI FUNCTION CODE

| | BIT | | | | FUNCTION |
|---|---|---|---|---|---|
| | 8 | 9 | 10 | 11 | |
| 1 | 0 | 0 | 0 | 0 | Acquire type A list |
| 2 | 0 | 1 | 0 | 0 | Acquire type A list (I) |
| 3 | 0 | 0 | 1 | 0 | Rewind transport N |
| 4 | 0 | 1 | 1 | 0 | Rewind transport N (I) |
| 5 | 1 | 0 | 1 | 0 | Halt PSC (I) |
| 6 | 1 | 1 | 1 | 0 | Halt WSC (I) |
| 7 | 1 | 1 | 0 | 0 | Test (I) |
| 8 | 1 | 0 | 0 | 0 | Reset IC |
| 9 | 0 | 0 | 0 | 1 | Acquire Type B or Type C or Type D list |
| 10 | 0 | 1 | 1 | 1 | Acquire SOS definition list (Type F) (I) |
| 11 | 1 | 0 | 1 | 1 | Set list look ahead limit (I) |
| 12 | 1 | 1 | 0 | 1 | Rewind and unload xport N (I) |
| 13 | 1 | 1 | 1 | 1 | PSC RAM down load (I) |

(I) = CPU interrupts enabled by ATI function code

A strobe accompanies ATI2 which instructs the IC to accept the second word of the ATI command. For ATI commands requiring a command list to be fetched from central memory, ATI2 contains the address of the first word of the command list. For those commands not requiring a command list, ATI2 contains information pertinent to the command.

ATI1 FUNCTION CODE DEFINITION

The following paragraphs provide brief descriptions of the ATI1 function codes as listed above.

1. ACQUIRE TYPE A W/0 INTERRUPT

A type A command list is acquired and processed, the address of the first word of the list being in ATI word 2. IC interrupt is disabled.

2. ACQUIRE TYPE A LIST W/INTERRUPT

Same as 1, except IC interrupt is enabled.

3. REWIND W/0 INTERRUPT

A rewind is initiated on the transport specified by bits 0 through 2 of ATI word 2, Bit 1 = LSB and bit 2 = MSB transport address. REWIND COMMAND ACCEPTED status is stored immediately after initiation of the rewind without an interrupt. The IC interrupt is disabled for rewind complete status.

ATI word 2 bits 02 are encoded as shown below for rewind/unload commands.

| BITS | | | |
|---|---|---|---|
| 0 | 1 | 2 | TRANSPORT ADDRESS |
| 0 | 1 | 0 | TRANSPORT NO. 1 |
| 1 | 0 | 0 | TRANSPORT NO. 2 |
| 1 | 1 | 0 | TRANSPORT NO. 3 |
| 0 | 0 | 1 | TRANSPORT NO. 4 |
| 0 | 1 | 1 | TRANSPORT NO. 5 |
| 1 | 0 | 1 | TRANSPORT NO. 6 |

| BITS | | | |
|---|---|---|---|
| 0 | 1 | 2 | TRANSPORT ADDRESS |
| 1 | 1 | 1 | TRANSPORT NO. 7 |
| 0 | 0 | 0 | TRANSPORT NO. 8 |

4. REWIND W/INTERRUPT

Rewind initiation and storage of REWIND COMMAND ACCEPTED status is the same as 3. The controller interrupt is enabled for rewind complete status.

5. HALT PSC W/INTERRUPT

A HALT PSC command terminates the current input operation in progress and causes input transfers to cease. All previously defined list blocks contained in the PSC list buffer are lost. The PSC list look ahead is set to Zero. Tape motion is stopped in the interblock gap, at which time HALT STATUS is reported to the CPU. The IC may receive new PSC ATI commands during the time between when the HALT command is issued and HALT STATUS is reported. However, no action is taken on these commands until after the HALT STATUS is reported.

6. HALT WSC W/INTERRUPT

A HALT WSC command terminates the current output operation in progress and causes output transfers to cease. All previously defined list blocks contained in the WSC list buffer are lost. The WSC list look ahead is set to ZERO. Tape motion is stopped in the interblock gap, at which time HALT STATUS is reported to the CPU.

The IC may receive new WSC ATI commands during the time between when the HALT command is issued and HALT STATUS is reported. However, no action is taken on these commands until after the HALT STATUS is reported.

7. TEST W/INTERRUPT

IC activity is checked and reported to the CPU with an interruptive status store cycle. The Indicator Status Word bit 6 is reported on receipt of this command (unless the ACTIVE controller was busy). Bits 0, 1, and 3 of the Indicator Status Word are used to report IC activity as follows:

| BITS | | | STATUS MEANING |
|---|---|---|---|
| 0 | 1 | 3 | |
| 0 | 0 | 0 | No subcontroller busy |
| 0 | 0 | 1 | The ACTIVE subcontroller did not accept the TEST ATI command (bit 6 is not set for this condition) |
| 0 | 1 | 0 | The WSC controller is busy |
| 1 | 0 | 0 | The PSC controller is busy |
| 1 | 1 | 0 | Both WSC and PSC are busy |

8. RESET IC (ATI FUN 8)

This command functions the same as the master reset switch on the CPU front panel. All sections of the IC are unconditionally reset.

9b. ACQUIRE TEST B LIST

TYPE B LIST words are used to read seismic scans and convert sample values to IBM excess 64 data representation. TYPE B LIST can be chained only to TYPE C or TYPE D list commands.

9c. ACQUIRE TYPE C LIST

TYPE C LIST words are used to search for tape record numbers and conditional read bytes operations. TYPE C LIST can be chained only to TYPE B or TYPE D list commands.

9d. ACQUIRE TYPE D LIST

TYPE D LIST words are used to read defined segments of data from a tape record. TYPE D LIST can be chained only to TYPE B or TYPE C list commands.

10. ACQUIRE TYPE F LIST

TYPE F LIST words are used to define a seismic start-of-scan code (up to 8 bytes) and to set a fixed gain value by which all seismic data channels are to be scaled.

11. SET LIST LOOK-AHEAD LIMIT COMMAND

Figure 78:
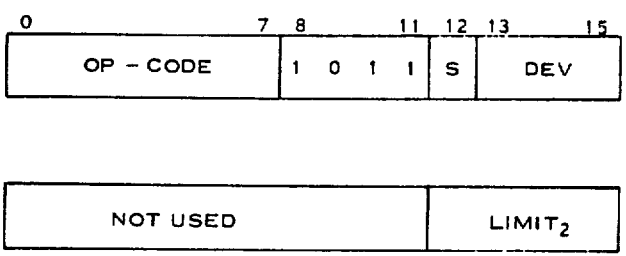
FIG. 78 illustrates the set list look-ahead limit register command.

This command is used to set the command list look-ahead limit counters to a value of from 0 to 14. THere are two of these command counters used for list nesting. One counter controls the number of list look-ahead fetches allowed for the PSC controller shown in FIG. 25 and one for the WSC controller shown in FIG. 26. As illustrated in FIG. 78, the limit value is contained in ATI2 bits 12 through 15. ATI1 bit 12 controls loading the limit value into the WSC or PSC limit counter. A reset command or halt command will preset the limit counters(s) to zero allowing no list lookahead fetching. In other words, when the limit counters =0, the IC will not accept new ATI commands or fetch the next chain-linked list until the current list operation has executed to completion. Upon successful completion of this command, look-ahead limit accepted status is stored in the IC indicator status block. A value of hex F is illegal and indicator status Bit 7 will be reported on receipt of a look-ahead limit value of F.

12. REWIND/UNLOAD COMMAND

A REW/UNL is initiated on the transport specified by bits 0 through 2 of ATI word 2. Bit 1 = LSB and bit 2 = NSB transport address. Rewind command accepted status or rewind busy status is reported in the indicator status word upon acceptance of the command. REWIND COMPLETE status, along with the formatter and transport address (bits 11 through 15) are stored in the indicator status word when the transport has reach load point.

First, consider Type A, List Word One (LW1):

1. BIT 0 - INDICATOR BIT

When Type A list word 1 is acquired by the IC, bit 0 is ignored. However, before acquiring list word 2, list word 1 is stored back in memory by the circuitry of FIG. 27 with bit 0 forced to a logic one. The central memory address at which list word 1 is stored is the same address from which it was acquired.

2. BITS 1, 2, 3 - SUB-COMMAND BITS

Bits 1, 2 and 3 are the encoded sub-command field andhave the significance listed in the table below:

| BIT | | | COMMAND |
|---|---|---|---|
| 1 | 2 | 3 | |
| 0 | 0 | 0 | Read bytes (forward or reverse) |
| 0 | 0 | 1 | Read scans (forward) |
| 0 | 1 | 0 | Skip block (forward or reverse) |
| 0 | 1 | 1 | Skip file (forward or reverse) |
| 1 | 0 | 0 | Write |
| 1 | 0 | 1 | Erase |
| 1 | 1 | 0 | Write tape mark |
| 1 | 1 | 1 | Illegal; sets NO-OP status |

3. BIT 4-DIRECTION BIT

Bit 4 specifies the direction of tape motion for a read bytes, skip block" or skip file command; it is ignored for all other commands.

4. BIT 5 - FORMAT BIT

The <format bit specifies the memory format to be utilized for a read scans operation only when scan length checking is also specified.

A logic zero indicates that data from tape is to be stored in memory as illustrated in FIG. 81. Data bits 0 through 14 of each two byte sample from tape will be stored in bits 0 through 14 of the first memory word of a two word pair. Bit 15 of the first word will be forced to zero and bit 15 from tape will be stored in bit 0 of the second memory word. The remainder of the second word will be forced to zero. This "unpacked" format can be used to separate the "G" bit of each data sample in SEG A from the data portion (mantissa).

A logic one indicates that data from tape is to be stored in memory as illustrated in FIG. 82. Because the data is to be packed two bytes per memory word the start-of-scan code will be stored as three bytes in memory instead of three words as in the unpacked format of FIG. 81. This "packed" format can be used to read SEG C or SEG A without unpacking the "G" bit.

5. BIT 6-PE/NRZI BIT

Bit 6 indicates whether the recorded data is to be phase encoded (PE) or non-return to zero (NRZI). A logic zero specifies the NRZI mode and a logic one specifies the PE mode.

6. BIT 7 - SEG B, 1600 BPI

When bit 7 is a logical one, it allows the IC to ignore the leading zero's in SEG B, 800 BPI or 1600 BPI data records. When the first start of scan code is detected, the controller starts to transfer data to memory.

7. BIT 8-SYNC CHECK BIT

Bit 8 indicates whether the scan length checking is to be enabled for a read scans command. A logic zero indicates that scan length checking is not required. A logic one indicates that the scan length checking is to be enabled. Bit 8 has no significance for commands cther than the read scans command.

8. BIT 9 - NOT USED

9. BIT 10 - 6250 BPI DENSITY SELECT

This bit, if set, over-rides bit 6 and indicates to the tape formatter the addressed transport is 6250 BPI.

10. BITS 11, 12, 13 - TRANSPORT ADDRESS
BITS 11, 12, 13 - TRANSPORT ADDRESS

Bits 11, 12 and 13 are the encoded transport address as listed below:

| BITS | | | |
|---|---|---|---|
| 11 | 12 | 13 | TRANSPORT/COMMENT |
| 0 | 0 | 1 | Transport address 1 |
| 0 | 1 | 0 | Transport address 2 |
| 0 | 1 | 1 | Transport address 3 |
| 1 | 0 | 0 | Transport address 4 |
| 1 | 0 | 1 | Transport address 5 |
| 1 | 1 | 0 | Transport address 6 |
| 1 | 1 | 1 | Transport address 7 |
| 0 | 0 | 0 | Transport address 8 |

11. BIT 14 - NUMBER SYSTEM (BIT A)

0—One's complement data (enable sync check)
1—Two's complement data (inhibit sync check until end of scan). This bit can be used to inhibit sync check when reading SEG A two's complement data or SEG C data.

12. BIT 15 - Not Used

Now consider List Word 2 (LW2) which contains the chain bit and the byte or scan count.

1. BIT 0 - CHAIN BIT

Bit 0 specifies whether the present list is linked to a succeeding type A list. A logic zero indicates that the list is not linked. A logic one indicates that the IC is to acquire a new list when the current list operation is completed. This process is called "chaining" and may be continued through as many lists as desirable until a final list with the chain bit a logic zero is acquired. All chaining must be between equal sub-commands and in the same tape direction with the exception of the read bytes (forward) and the read scans commands. Any violation of this constraint results in a program error status cycle and the tape operation is aborted.

BITS 1 THROUGH 15 - BYTE/SCAN COUNT

Bits 1 through 15 specify the scan count for a read scans command or a byte count for a read byte, write and erase commands. This field is ignored for a skip block, skip file, or write type mark command.

The remaining list words are:

List word 3 specifies the starting buffer address when data transfer is involved. When no data transfer is involved, this word is ignored.

List word 4 specifies the link address when the chain bit of list word 2 is a logic one. If chaining is not indicated, this word is acquired but ignored.

List word 5 specifies the number of bytes per scan, with a maximum value of 510. Bit 7 is the most significant bit. A value of less than four or an odd number for this field constitutes a program error when a read scans command is performed.

Refer back to LW1 and specifically to the commands ordered by bits 1, 2 and 3. Following are details of those commands

1. READ BYTES (TYPE A)

In a read bytes operation (forward or reverse), data is transferred by bytes from tape to the controller where it is assembled into words for transfer to memory. When an odd number of bytes is involved, the low order half of the last word transferred is loaded with all one's. Regardless of the direction of tape motion, the first byte received is loaded in the high order (most significant) half of the first data word and the next byte is loaded in the low order (least significant) half of that word. Succeeding bytes are similarly loaded. The tape will be stopped only in an interblock gap. When a (non-linked) read bytes operation is completed before an interblock gap is detected, final status is not reported until the gap is detected and the controller is busy (active) until that time. A read bytes operation may be linked to another read bytes operation in the same direction only. A read bytes (forward) may be linked to a read scans operation (either preceeding or succeeding), but may not be linked to any other operation.

2. READ SCANS (TYPE A)

A read scans subcommand initiates a read in the forward direction, with data transfer beginning only after a "start of scan" code has been detected. Data encountered prior to the start-of-scan code is not transferred to memory and is not checked for vertical (byte) parity. Scan length checking may be either enabled or disabled as specified by list word 1, but B.

When scan length checking is disabled, data transfer begins only after a start-of-scan code has been detected, but data transfer is the same as for a read bytes operation, that is, two bytes per memory word. Once an initial start-of-scan code has been encountered, data transfer continues until the specified number of scans (start-of-scan codes) have been detected and read, by the circuitry of FIG. 51, or until an end of record is encountered. The scan count is decremented once each time a start-of-scan code is detected. Thus, a scan count that has been decremented to zero indicates that the last scan of the list is being read and the list operation will be complete upon detection of another start-of-scan code or an end of record gap. A read scans operation may be linked to another read scans operation or to a read bytes forward operation (either preceeding or succeeding), but may not be linked to any other operation. Tape motion is stopped only in an interblock gap. The direction bit is ignored for a read scans operation.

3. SKIP BLOCK (TYPE A)

In a skip block operation (forward or reverse), tape is moved over the next successive record until an interblock gap is detected. A skip block operation may be linked to another skip block operation in the same direction only, and it may not be linked to any other operation. Detection of a tape mark terminates skip block operation with the appropriate status stored and chaining is ignored. Tape motion is stopped only in an interblock gap.

4. SKIP FILE (TYPE A)

In a skip file operation (forward or reverse), tape is moved until a tape mark is detected A skip file operation may be linked to another skip file operation in the same direction only, and it may not be linked to any other operation. Tape motion is stopped only in an interblock gap.

5. WRITE (TYPE A)

In a write operation (forward only), data is transferred from memory to the controller where the data words are disassembled into bytes for writing on tape. The left (most significant) half byte of the data word is written on tape first followed by the byte from the right (least significant) half of the word. If an odd number of bytes are specified, the least significant half of the last word is ignored. A write operation may be linked only to another write operation. Tape motion is halted only when an interblock gap is detected following termination of the write operation. The direction bit is ignored for a write operation.

6. ERASE (TYPE A)

An erase operation moves tape in the forward direction, erasing a length of tape corresponding to the number of bytes specified by list word 2. An erase operation may be linked only to another erase operation. The direction bit is ignored for an erase operation.

7. WRITE TAPE MARK (TYPE A)

The write tape mark operation moves tape in the forward direction, erases 3.5 inches of tape, and writes a tape mark. A write tape mark operation may be linked only to another write tape mark operation. The direction bit is ignored for a write tape mark operation.

The TYPE B command list is used to read and process seismic scans in the following manner:

(A) Detect the SOS code as defined in the type F list.

(B) Apply fixed gain value to the sample gain values as defined by the type F list.

(C) Convert discrete sample gain/data values to IBM excess 64 floating point.

(D) Perform scan length error checking and manintain memory scan boundaries.

(E) Perform input sample data clipping to an assigned maximum gain value. The various bits of list word 1 as shown in FIG. 79b are defined in the following paragraphs.

1. BIT 0 NOT USED
2. BIT 1 INTERRUPT ENABLE

When IE=1, the IC will issue a CPU interrupt request signal and wait for a CPU interrupt recognized prior to storing interruptive status conditions.

3. BIT 2 CHAIN

Bit 2 specifies whether this command list is to be chain-linked to a succeeding TYPE B or TYPE C list. C=1 indicates the IC is to acquire a new command list beginning at the central memory address specified by the contents of list word B. When C=0, command chaining will cease and data transfer will complete upon the successful execution of the current list command. For type B commands all chaining is between equal subcommands and in the same tape direction.

4. BIT 3 - OUTPUT FORMAT

This bit specifies the IC floating point output format length:

OPF=0=32 bit long form format
OPF=1=16 bit short form format

5. BIT 4 TAPE DIRECTION

This bit specifies the direction of tape motion. Bit 4=0 indicates the forward tape the forward tape motion and bit 4=1 indicates the reverse tape motion.

6. BITS 5 and 6 TAPE DENSITY

This binary coded 2 bit field specifies the tape recording format as follows:

00=NRZI (800 BPI)
01=PE (1600 BPI)
10=GCR (6250 BPI)

7. BITS 7 - 10 - FORMAT FIELD

This binary coded 4 bit field specifies the seismic input format as follows:

0000=SEG B

This command will result in the SEG B seismic tape samples being converted from a gain/millivolt value to an excess 64 signed magnitude floating point value, either long or short form. The long form format is 32 bits (24 bits of fraction) and the short form is 16 bits (8 bits of fraction). The converted data samples are stored in central memory in a common blocked floating point format with the seis samples stored prior to the auxiliary channel values in each scan block.

A sample exponent clip value may be specified to limit the range of the converted sample values to be stored in central memory.

8. BITS 11-13 TRANSPORT ADDRESS
9. BIT 14 - 15=TYPE CODE=00

For all TYPE B READ SCANS operations, this field must equal zero.

The remaining list words in FIG. 79b are:

LIST WORD 2 - SCAN COUNT

LW2 specifies the total number of seismic scans to be processed. A scan length count of zero is an illegal value and will result in command error status.

LIST WORD 3 - BUFFER ADDRESS

LW3 specifies the starting memcry addresses to begin data transfer from the IC.

LIST WORD 4 - BYTES PER SCAN COUNT

LW4 specifies the number of data bytes expected for each seismic scan read from tape. The IC will expect SOS bytes at this count interval.

LIST WORD 5

(A) BITS 0-3 HEX SAMPLE CLIP VALUE

This 4 bit binary encoded field is used to specify a sample value clip point in increments of 24 DB for incoming tape seismic samples. This clip value is applied to the sample value after the sample has been converted to excess 64 floating point. If the converted sample exponent is greater than the specified clip exponent, the clip exponent is substituted in place of the sample exponent and the mantissa is set to full scale. A correspondence between the hex clip encoded field and sample gain (decibes) and sample exponent (base 16) is given below:

| HEX CLIP VALUE | SAMPLE GAIN (DB) VALUE | CONVERTED SAMPLE EXPONENT (BASE 16) |
|---|---|---|
| 0000 | NO CLIP | NO CLIP |
| 0001 | 0 | 43 |
| 0010 | 24 | 42 |
| 0011 | 48 | 41 |
| 0100 | 72 | 40 |
| 0101 | 96 | 3F |
| 0110 | 120 | 3F |
| 0111 | 144 | 3D |
| 1000 | 168 | 3C |
| 1001 | 192 | 3B |
| 1011 | 216 | 3A |
| 1100 | 240 | 39 |
| 1101 | 264 | 38 |
| 1110 | ILLEGAL | ILLEGAL |
| 1111 | ILLEGAL | ILLEGAL |

B. BITS 4-15 - SAMPLES TO TRANSFER

This field represents the number of sample values within each seismic scan to transfer to memory.

LIST WORD 6 - STARTING SCAN

LW6 specifies the starting the starting scan within a seismic event to begin transfer to memory.

LIST WORD 7 - STARTING SAMPLE

LW7 specifies the starting sample within the seismic scan to begin data tranasfer to memory.

LIST WORD 8 - NEXT LIST ADDRESS

LW8 is used by the IC as the starting memory address to acquire the succeeding command list of chaining when specified.

The TYPE C command block, shown in FIG. 79c is used for search operations and conditional read bytes. Bits 7 through 10 of LW 1 define the options available for this command.

A TYPE C list has the format as discussed in the following paragraphs:

LIST WORD ONE

1. Bits. 0 THROUGH 6 - are functionally the same as is described for TYPE B list.
2. BITS 7 THROUGH 10 - FUNCTION FIELD This binary coded field allows for 16 various record search/conditional read bytes operations as described below:

FUN 0000 = READ BYTES

Fun 0 uses information in LW1, LW2, and LW3 only

FUN 0001 = RECORD SEARCH/CONDITIONAL READ BYTES

POSITION AT START OF RECORD

Fun 1 will search for the defined record number (FORWARD or REVERSE) for LW4(0-4) 16 records. If the record is found; the first LW2 bytes within the record will be transferred to CM and the tape will be positioned in the gap preceeding the found record (recycled if tape motion was forward).

FUN 0010 = RECORD SEARCH/CONDITIONAL READ BYTES pOSITION AT START OF RECORD +1

Fun 2 will search for the defined record number (FORWARD or REVERSE) for LW4(0-4) 16 records. If the record is found, the first LW2 bytes within the record will be transferred to central memory and the tape will be positioned in the gap preceeding the found record (recycled if tape motion was reverse).

3. BITS 11 THROUGH 13 - TRANSPORT ADDRESS
4. BITS 14 - 15 = TYPE CODE = 01

For a TYPE C command these two bits must be binary 01.

5. BIT 15 - NOT USED

LIST WORD 2 - BYTE COUNT

LW2 is used in read bytes operation to specify the total number of bytes to be transferred for a given operation.

LIST WORD 3 - BUFFER ADDRESS

LIST WORD 4

1. BITS 0 - 4 = RECORD SEARCH LIMIT (MODULO 16)

This field defines the number of records to search for the defined record number before aborting the operation. A value of zero in this field represents no record limit.

2. BITS 5 - 12 = BYTES TO SKIP A (BSA)

BSA 13 - 15 = NO. OF BYTE TO COMPARE A (NBA)

NBA field (1-8) 10 represents the number of tape bytes to compare to data in central memory whose address is contained in LW6.

LIST WORD 5

LIST WORD 5 defines the second set of bytes to skip and compare for the TYPE C LIST.

1. BITS 5 - 12 = BYTES TO SKIP B (BSB)

BSB field represent the number of bytes to skip from the successful compare of NBA bytes before comparing NBB bytes.

2. BITS 13 - 15 = NO. OF BYTES TO COMPARE B (NBB)

NBB field represents the number of tape bytes to compare to the data in central memory whose address is contained in LW7.

LIST WORD 6 - address of COMPARE A

LIST WORD 6 contains the central memory address of the NBA bytes to be compared to bytes read from tape after skipping BSA bytes from the beginning of the record.

LIST WORD 7 - ADDRESS OF COMPARE B

LIST WORD 7 contains the central memory address of the NBB bytes to be compared to bytes read from tape after skipping BSB bytes from the NBA compare.

LIST WORD 8 - NLA

LW8 contains the starting memory address of the next command list if chaining is specified.

TYPE D LIST - READ RECORD SEGMENTS OPERATION - FIG. 79d

The command block is used to read defined segments of data from a record. Bits 7-10 of LW1 define the options available for this command.

LIST WORD ONE
BITS 0 THROUGH 6

Bits 0 through 6 are functionally the same as described for the TYPE B list.

BITS 7 THROUGH 10 - FUNCTION FIELD

This binary coded field allows 16 variations of the basic TYPE D command.

FUN 0000 = READ SEGMENTS, Tape Image Transfer

FUN 0 will perform a read bytes operation in the following manner:
(1) SKIP LW4 bytes
(22) Transfer LW5 bytes to central memory (LW3)
(3) SKIP LW6 bytes
(4) Perform steps 1, 2 and 3 until either LW2 bytes have been transferred or until the end of record gap has been detected.

TYPE E (PROCESSOR LIST)

The Type E list is a general purpose command list provided to allow the user to define IC processor operations via microcoded routines. These operations could include arithmetic, logical, mask, or data manipulation algorithms on as many as four arrays of data in central memory.

LIST WORD ]

BITS 0-2 are functionally the same as described for Type B list.
2. BITS 3-10 USER DEFINED
3. BITS 11-14 FUNCTION CODE
These bits represent an operation code for one of 16 user defined operations.

LIST WORDS 2-7

LW2-7 data may be user defined.

LIST WORD 8

LW8 specifies address of next list for chaining operations.

TYPE F SOS DEFINITION LIST

The TYPE F list, shown in FIG. 79F, is used to define the Byte pattern of the seismic start-of-scan (SOS) code. A SOS sequence of up to 8 bytes may be defined for any combination sequence of up to three bytes, the SOS definition sequence must be of the same byte value for SOS detection to be insured. Execution of a TYPE F list is required to define the SOS code for Type B read scans operations. Execution of Type F list for Type A read scans operation is not required.
1. BITS 0-7 SOS MASK
This eight bit field is used to enable or disable tape track data to be included in the SOS detection, a logic one = enable and a logic 0 = don't care.
2. BIT 8 - GS
This bit specifies the IC to add LW1 bits 9-12 to each incoming sample value. These 4 bits represent a fixed gain value; NSB = 48 db, LSB = 6 db. GS = 0 = do not apply fixed gain GS = 1 + apply LW1 (9-12) to sample values as fixed gain
3. BITS 13-15 NB This 3 bit binary field specifies the number of bytes to be used in the SOS definition. The central memory address of, the SOS definition bytes is contained in LW2.

LIST WORD 2

This list word contains the starting central memory address of the SOS byte pattern, two bytes per word.

The IC reports status words to the CPU at appropriate times. An interrupt may be issued to the CPU prior to status word storage as defined by the AT1 function field or list word one interrupt enable bit and/or any special conditions as will be defined herein.

Status words are stored by the circuitry of FIG. 32 in central memory locations, the first address of which is defined by IC micro-code. The address of the first status location of each status block is restricted to be such that the two low-order address bits are logic zeros. The status blocks are shown in FIG. 80. A status store condition may-be either a non-abortive (intermediate) status condition or an abortive (terminating) status condition. A non-abortive status condition is one which may be reported while an operation is in progress, and does not directly affect or alter the operation. An abortive status condition is a condition which prevents an operation from being initiated; a condition which prevents an on-going operation from completing; or the ending status condition specifying the completion of an operation. In any case, an abortive status storage cycle will indicate either the successful or non-successful completion of an operation.

A satus store condition causes the IC to determine if interrupt enable is set for the current operation. If interrupts are enabled, the IC will issue a CPU interrupt request and wait for CPU interrupt recognition prior to storing the status block.

Several status conditions exist which do not initiate a status store cycle, but are reported only when a status store condition arises.

For those status conditions requiring only the INDICATOR STATUS WORD to convey the appropriate status information, the six status words of the PSC and/or the WSC status block are not stored.

For those terminating conditions requiring a PSC and/or WSC status block store cycle, the number of status words stored in central memory is always six plus the Indicator Status Word. Status words within the WSC or PSC status block not containing any valid information are stored as zero value. For the non-terminating buffer complete status condition (pSC or WSC), only the first two words of the PSC or WSC status block are stored along with the Indicator Status Word.

The IC is capable of storing three (3) types of status block information. These three types are:
(1) Tape Read Status Block
(2) Tape Write Status Block
(3) Tape Rewind/Unload Status Word Each of the three status block types has a unique beginning central memory address, and status storage for each of the three types is preceeded by an Indicator Status Word Store cycle. For cases where coincident status block cycles of the three types are requested; Tape Read Status storage has higher priority over Tape Write Status Storage, and Tape Write Status Storage has priority over Rewind/Unload Status Storage.

INDICATOR STATUS WORD

The indicator status word is stored at a micro-coded central memory location and indicates the following type of information:

(a) which status block was stored (PSC, WSC, or REW)
(b) that the IC could not accept the previous ATI command.
(c) IC executed a HALT command.
(d) IC executed an ATI LookAhead List Limit Command
(e) IC executed a TEST command
(f) IC detected a command priority error
(g) IC received an operation which was not defined Bits 0-2 - These three most significant bits identify the type of status block stored by the IC.

BIT 0 - PSC STATUS BLOCK
BIT 1 WSC STATUS BLOCK
BIT 2 - REWIND/UNLOAD
BIT 3 IC ATI BUSY (1)

This bit indicates that the IC could not accept the previous ATI command. This bit is interpreted by software as follows:

(a) Bit 3=1 and bits 0 and 1=0. For this condition the IC active controller was busy at the time the ATI command was received.

(b) Bit 3=1 and bit 0 or bit 1=1. This condition indicates that the PSC or WSC controller (depending on bit 0 and 1) had a LIST BUFFER FULL condition or CHAIN LIST PENDING condition at the time of the ATI command and could not accept the ATI command.

BIT 4 - LIST LOOK AHEAD LIMIT ACCEPTED STATUS (I)

This bit is stored when the IC accepts a list look ahead limit command.

BIT 5 - HALT STATUS (I)

This bit is stored when the IC executes a HALT command.

This bit is stored when the IC executes a HALT command. Indicator status bits 0 and 1 specify which section (PSC or WSC) was halted.

BIT 6 - TEST STATUS
BIT 7 - COMMAND PARITY ERROR (I))

This bit is set if a DMA parity error is detected on an ATI or list word. This bit is abortive (causes PSC or WSC section operations to be aborted). Bit 0 or 1 of this status word accompanies this status bit, defining the type of operation (PSC/WSC) on which the command parity error occurred.

BIT 8 - NO OPERATION DEFINED STATUS (I)
This bit is reported if the ACT controller receives an ATI function, a list look ahead value of hex f, or a TYPE A command function which is not defined.

BITS 9-15 NOT USED

IC status conditions associated with any operation requiring transfer or monitor of tape read data (BATB) are reported in the read status block. This status block has a unique microcoded central memory starting address. These operations include:

READ BYTES
READ SCANS
SKIP FILE
SKIP RECORD
SEARCH RECORD NUMBER
SOS DEFINITION

A read status block, status store cycle is always preceded by a status store cycle with bit 0 of the status type indicator word=1.

| STATUS WORD ONE (READ BLOCK): | |
|---|---|
| BIT | ASSIGNMENT |
| 0 | Operation complete*(I) |
| 1 | Transport not ready*(I) |
| 2 | Illegal command*(I) |
| 3 | Rate error*(I) |
| 4 | Corrected Tape Read Error |
| 5 | Formatter busy*(I) |
| 6 | Parity error channel*@(I) |
| 7 | Scan length error@ |
| 8 | BOT*(I) |
| 9 | EOT@(I) |
| 10 | EOB*(I) |
| 11 | EOF*(J) |
| 12 | Spare |
| 13 | Error status indicator |
| 14 | Formatter Error*(I) |
| 15 | Buffer complete(I) |

*Abortive status
(i) Interruptive status cycle
@ This status does not initiate a status cycle for storing the status register (status word 1). Once this status bit is set during an operation, it remains set until a termination status cycle occurs. Thus, it will be stored with any intermediate status prior to (and including) a terminating status cycle.

A detailed description of each bit of status word one follows:

| BIT | DEFINITION |
|---|---|
| 0 | Operation Complete - Bit 0 is stored as a logic one for the following status conditions:<br>(A) When the specified number of bytes in a non-chained list has been successfully transferred for any operation requiring a tape read bytes data transfer.<br>(B) When the specified number of data scans in a non-chained list has been successfully transferred for a type A or type B read scans command operation.<br>(C) When a type A skip block, or skip file, operation specified in a non-chained list has successfully completed.<br>(D) When a search record number has successfully completed.<br>(E) When a SOS definition list has successfully been executed (stored in PSC status block)<br>(F) When a PSC RAM down load has been completed |
| 1 | Transport Not Ready - This status indictor is set any time the IC receives a command (other than REWIND/UNLOAD) and the tape transport is not in an on-line/ready condition. |
| 2 | Illegal Command - Bit 2 is stored as a logic one under the following conditions:<br>(A) For a type A list an attempt is made to chain between unlike commands.<br>(B) A "bytes per scan" integer field of less than four or an odd number of bytes per scan is specified of a read scans (type A or type B) operation.<br>(C) A byte or scan count of zero is specified for an operation requiring the transfer of tape data. |

| BIT | DEFINITION |
|---|---|
| | (D) If transport density field of LW1 = 11. |
| 3 | Rate Error - Bit 3 is set to a logic one when a controller fails to obtain a memory cycle to transfer a data word between memory and the controller data register in sufficient time to maintain the proper data transfer rate between the controller and the tape formatter. Rate error status is abortive and initiates a terminating status cycle. |
| 4 | Corrected Tape Read Error - This bit is non-interperative and non-abortive. It accompanies any terminating read tape status condition when the tape formatter unit encountered 1600 BPI or 6250 BPI data track errors but was able to correct these errors on the fly. |
| 5 | Formatter Busy - This bit is stored if, as the result of an ATI command, the System Read Controller 27 (SRC) or Write Sequence Controller 26 (WSC) requests a formatter which is not available for its use. This status is abortive and initiates a terminating status store cycle. |
| 6 | Parity Error Channel - Bit 6 is set to a logic one whenever a parity error is detected on a data word from central memory. This status is non abortive and does not initiate a status cycle, but is stored only when another status (store) condition occurs. It is stored with each intermediate status cycle which occurs including a terminating status cycle at which time bit 6 will be cleared. |
| 7 | Scan Length Error - Bit 7 is set to a logic one when a read scans is specified, scan length checking is enabled, and an incorrect scan length is detected. This status is non-abortive and does not initiate a status cycle. It will be stored with any intermediate status cycle until (and including) a terminating status cycle occurs at which time the controller status bit will be cleared. |
| 8 | Beginning of Tape - Bit 8 is set to a logic one when a read byte, skip block or skip file command is initiated in the reverse direction and the beginning of tape is detected. BOT status is abortive and initiates a terminating status cycle. |
| 9 | End of Tape - Bit 9 is set to a logic one when the end of tape marker is detected while the tape is moving in the forward direction. If EOT status occurs during a read (mode operation) prior to encountering data (read clocks) this status will initiate a status store cycle and an interrupt will be forced. However, if EOT status occurs after encountering data in a read (mode) operation, this status will be stored only with a terminating status. |
| 10 | End of Block - Bit 10 is set to a logic one when an interblock gap is detected during either a read bytes or read scans operation before the number of bytes or scans specified by the current list has been transferred. The remaining byte or scan count is stored as list word 3. EOB status is abortive and initiates a terminating status cycle to the PSC only. WSC is not affected. |
| 11 | End of File - Bit 11 is set to a logic one when a tape mark is detected during a read bytes, read scans or a skip block operation. This bit is not set as the result of a skip file operation. EOF status is abortive and initiates a terminating status cycle to the PSC only. WSC is not affected. |
| 13 | Error Status Indicator - This bit is stored indicating a formatter or transport error condition as defined by status words 5 and 6. This status is non abortive and will be stored along with any terminating status cycle. |
| 14 | Formatter Error Status - This bit is abortive and initiates a terminating status cycle. |
| 15 | Buffer Complete - Bit 15 is set to a logic one when a linked list is completed successfully provided the tape interrupt is enabled. If the tape interrupt is not enabled, this bit is not set and no status is reported. Buffer complete status is non abortive but initiates a status store cycle. |

STATUS WORD 2 - PRESENT LIST ADDRESS

The second status word contains address of the operation for which the status is being reported, unless the list is to be chained, in which cas it contains the link address.

STATUS WORD 3 - REMAINING BYTE/SCAN COUNT

Status word 3 is the byte or scan count remaining when a read bytes or read scans operation terminates prior to completion (abortive status Cycle). This word will be stored only if a data transfer operation was involved.

STATUS WORD 4 - PARITY ERROR COUNT

Status word 4 is the count of tape parity errors during a read bytes or a read scans operation by the circuitry of FIG. 49, or during the read-after-write on a write operation. Each time a tape read data parity error is detected, this count is incremented. The parity error count is reset at the beginning of an operation, but is not reset between chained operations. The final count is stored when a terminating (either normal or abortive) status occurs.

| STATUS WORD 5 - ERROR STATUS ONE | |
|---|---|
| BIT | DESCRIPTION |
| 0 | Not compatible. Indicates an 800 BPI tape is installed to be read on a 6250/1600 BPI drive or 6250 BPI tape is installed to be read on 1600/800 BPI drive. |
| 1 | VRC (Vertical Redundancy Check) - Indicates the formatter has detected a tape data related vertical parity error in 800 or 1600 BPI operation. |
| 2 | Multi-Track - Indicates the number of tracks in error exceeds the error correction capability. |
| 3 | SAGC Check (Set Auto Gain Control) - Indicates that the read circuits have been unable to set the read gain to the proper level while reading the ARA burst. |
| 4 | File Mark Error - Indicates the file mark was not written properly. |
| 5 | Noise - Indicates data is detected during an erase operation or data is detected during the erase portion of a write tape mark. |
| 6 | Equipment Fail Formatter - Indicates the formatter has failed or is malfunctioning and requires service attention. |
| 7 | Equipment Fail Tape Drive - Indicates the formatter has failed or is malfunctioning and requires service attention. |
| 8 | LRC (Longitudinal Redundancy Check) - Longitudinal redundancy check indicates LRC error has been detected in NRZI operation. |
| 9 | Envelope Check - Indicates that a track has fallen below a pre-set level during a 6250 or 1600 write operation. |
| 10 | Preamble Error - Indicates that there is a preamble error in 1600 or 6250 operation. The error is either too few bytes, or the ones marker is missing. |
| 11 | Postamble Error - Indicates that there is a postamble error in 1600 or 6250 operation. The error is either too many bytes or the ones marker is missing. |
| 12 | Partial Records - Indicates that an IBG is detected before the end of data. |
| 13 | IBG Detected. - Indicates that during a 6250 or 1600 write operation an IBG is detected while writing data, or if BOB (Beginning of Block) is not detected after one track is set in each zone during a write or read operation. |

STATUS WORD 5 - ERROR STATUS ONE

| BIT | DESCRIPTION |
|---|---|
| 14 | Skew - Indicates excessive skew is detected on 6250/1600 BPI write or read operation. |
| 15 | CRC (Cyclical Redundancy Check) - Indicates a CRC error was detected in 6250 or 800 BPI or 1600 BPI write operation. |

STATUS WORD 6 - ERROR STATUS TWO

| BIT | DESCRIPTION |
|---|---|
| 0 | ID Burst Check - Indicates the 6250 or 1600 ID burst is not written correctly or in 6250 mode the ARA burst or its ID cannot be read. |
| 1 | Velocity Check - Indicates that speed variation during write is beyond the preset maximum ard minimum allowed. |
| 2 | Tach Fail - Indicates that tach pulses have not been received from the tape drive within a preset time. |
| 3 | Erase/Write Current Failure - Indicates that one of these currents is not present when it should be or is present during read. |
| 4 | Loopout - Indicates the tape drive servo has crossed the loopout sensor in the vacuum column, or that the air bearing supply is not up. |
| 5 | No Data Read/Word Count Zero - Indicates that no data was detected in read or that no data was transferred on a write operation. |
| 6 | IBG Overflow - Indicates that an excessive IBG count was detected. |
| 7 | Dead Track/Track in Error Status Track P |
| 8 | Dead Track/Track In Error Status Track 0 |
| 9 | Dead Track/Track In Error Status Track 1 |
| 10 | Dead Track/Track in Error Status Track 2 |
| 11 | Dead Track/Track in Error Status Track 3 |
| 12 | Dead Track/Track in Error Status Track 4 |
| 13 | Dead Track/Track In Error Status Track 5 |
| 14 | Dead Track/Track In Error Status Track 6 |
| 15 | Dead Track/Track in Error Status Track 7 |

WRITE STATUS BLOCK

IC stastus conditions associated with any operation not requiring tape read data transfer or monitor are reported in the write status block. These operations include:

Write bytes
Write file mark
Erase operations

A write Status block store cycle is always preceeded by an Indicator store cycle with bit 1 set.

STATUS WORD ONE (WRITE BLOCK)

| BIT | |
|---|---|
| 0 | Operation complete*(I) |
| 1 | Transport not ready*(I) |
| 2 | Illegal command*(I) |
| 3 | Rate error*(I) |
| 4 | Note used |
| 5 | Formatter busy*(I) |
| 6 | Parity error channel@ |
| 7 | Not used |
| 8 | BOT(I) |
| 9 | EOT@(I) |
| 10 | Not used |
| 11 | Not used |
| 12 | File protect*(I) |
| 13 | Error |
| 14 | Formatter Error*(I) |
| 15 | Buffer complete(I) |

*Abortive status
(I) Interruptive status cycle
@ Does not initiate a status cycle. Remains set until a terminating status cycle occurs. Will be stored with any intermediate status prior to (and including) a terminating status cycle.

A detailed description of each bit of status word one follows:

| BIT | |
|---|---|
| 0 | Operation Complete - Bit 0 is stored as a logic one for the following status conditions: (A) When the specified number of bytes in a non-chained list have successfully been transferred following a write bytes operation, (B) When the specified number of bytes in a non-chained list have successfully been erased following an erase bytes operation (C) Upon the successful completion of a non-chained write tape mark command |
| 1 | Same as described for Bit 1, (Read Block) |
| 2 | Illegal Command - Bit 2 is stored as a logic one under the following conditions: (A) For a type A list if an attempt is made to chain between unlike commands (B) A byte count of zero is specified for a write byte command. |
| 3 | Same as described for Bit 3 (Read Block) |
| 4 | Not Used |
| 5 | Same as described for Read Block |
| 6 | Same as described for Read Block |
| 7 | Not Used |
| 8 | Not used |
| 9 | End of Tape - Bit 9 is set to a logic one when the "end of tape marker" is detected during a write operation. This status will be stored only with the completion of a list operation or with a terminating status condition. |
| 10 | Not used |
| 11 | Not used |
| 12 | File Protect - Bit 12 is set to a logic one when there is no write ring present on the addressed tape supply reel and an erase, write data, or write file mark command has been issued. |
| 13 | Same as described for Read Block |
| 14 | Not used |
| 15 | Same as described for Read Block |

STATUS WORDS TWO THROUGH SIX

Same as described for Read block

REWIND/ UNLOAD STATUS WORD

TPC status conditions associated with any rewind or unload command operation are reported in the REW-/UNL status word. This status word has a unique central memory address and is always preceeded by an Indicator Word status store cycle with bit 2 of the Indicator Word=1.

| BIT ASSIGNMENT | |
|---|---|
| 0 through 8 Not used | |
| 9 REW/UNL command not accepted | (i) |
| 10 REW/UNL command accepted | (I) |
| 11 Rewind Complete | (I) |
| 12 Formatter Specification Bit | |
| 13-15 Xport Address | |

COMMAND NESTING

The IC is capable of fetching (on a look ahead basis) as many as 34 list blocks. Sixteen each list blocks can reside in the LBUF 17 for the PSC and WSC and one each in progress of being executed by the PSC and WSC. This capability makes it possible for the programmer to chain together lists to perform functions or to go ahead and issue several ATI commands without having to wait for completion of the previous ATI command. It should be pointed out that this command nesting feature does not have to be used if the programmer wants to wait on the completion of the previous operation.

The main programming consideration when using the command nesting feature is that of abortive status conditions arising prior to executing all of the list blocks which have been fetched by the LFC 14 and stored in LUF 17. If an abortive condition arises (other than the normal operation complete status) the remaining list residing in LBUF 17 are considered void by the IC. The programmer would have to determine which list commands to send the IC to complete the job sequence.

ADDRESSING

TRANSPORT ADDRESS 0, 1, 2 (TA0, TA1, TA2)

These three lines select the particular transport to be used for operations.

|         | TA0 | TA1 | TA2 |
|---------|-----|-----|-----|
| DRIVE 0 | 0   | 0   | 0   |
| DRIVE 1 | 0   | 0   | 1   |
| DRIVE 2 | 0   | 1   | 0   |
| DRIVE 3 | 0   | 1   | 1   |
| DRIVE 4 | 1   | 0   | 0   |
| DRIVE 5 | 1   | 0   | 1   |
| DRIVE 6 | 1   | 1   | 0   |
| DRIVE 7 | 1   | 1   | 1   |

DENSITY SELECT 0, 1 (DS0, DS1)

These two lines select the density at which the formatter/tape drive system is to operate. Code selection is defined below:

|                               | DS0 | DS1 |
|-------------------------------|-----|-----|
| 800 BPI                       | 0   | 1   |
| 1600 BPI                      | 0   | 0   |
| 6250 BPI                      | 1   | 0   |
| DENSITY IS DRIVE SELECTED     | 1   | 1   |

Execution of this command in the drive will take place only when the selected tape drive is at load point (BOT). This command is executed in the formatter only when the formatter is not busy.

In a read operation, the formatter checks the density of the reel of tape mounted on the drive to set the correct electronics in the drive and formatter.

COMMAND AND COMMAND CLOCK

The following five command lines and single command clock lines are available to initiate any of 21 commands described below. These commands are acted on only by a selected tape drive that is ready and on-line. The high to low transition of the command clock causes command execution. Decode of the five command lines is shown below.

| PARA. # DESCRIPTION | CMD | "0 | "1 | "2 | "3 | "4 | HEX CODE |
|---|---|---|---|---|---|---|---|
| FWD SPACE FILE | FSF | 0 | 1 | 0 | 0 | 0 | 08 |
| REVERSE SPACE FILE | RSF | 0 | 0 | 1 | 1 | 0 | 06 |
| FWD SPACE BLOCK | FSB | 0 | 0 | 1 | 0 | 0 | 04 |
| REVERSE SPACE BLOCK | RSB | 0 | 0 | 1 | 0 | 1 | 05 |
| READ FORWARD | RDF0 | 0 | 0 | 0 | 1 | 0 | 02 |
| READ REVERSE | RDR | 0 | 1 | 1 | 0 | 0 | 00 |
| WRITE MODE | WRT | 0 | 0 | 0 | 0 | 1 | 01 |
| REWIND | RWD0 | 0 | 0 | 1 | 1 | 1 | 07 |
| REWIND/UNLOAD | RUN | 0 | 1 | 1 | 1 | 1 | 0F |
| WRITE FILE MARK | WFM | 1 | 1 | 1 | 1 | 1 | 1F |
| ERASE 3" GAP | ERG | 1 | 0 | 1 | 1 | 1 | 17 |
| ERASE VARIABLE GAP | EVG | 1 | 0 | 1 | 1 | 0 | 16 |
| RESERVE | RES | 1 | 0 | 0 | 0 | 0 | 10 |
| RELEASE | REL | 1 | 0 | 0 | 0 | 1 | 11 |
| CLEAR | CLR | 1 | 0 | 0 | 1 | 1 | 13 |
| LOOP WRITE TO READ #1 | LWR1 | 0 | 1 | 1 | 0 | 1 | 0D |
| LOOP WRITE TO READ #2 | LWR2 | 0 | 1 | 0 | 0 | 1 | 09 |
| DIAG MODE | DIA | 0 | 1 | 0 | 1 | 1 | 0B |
| NO OP | NOP | 0 | 0 | 0 | 0 | 0 | 00 |
| TIE | TIE | 0 | 1 | 0 | 1 | 0 | 0A |

FORWARD SPACE FILE (FSF)

This command causes the selected tape drive to move forward past the next file mark and stop. No data is transferred, however, file mark status is reported. When EOT is sensed, the formatter acts on interrupt from the tape drive and counts tach pulses to measure tape length past EOT. The formatter will stop tape motion before the physical end of the tape comes off the fixed reel.

REVERSE SPACE FILE (RSF)

This command causes the selected tape drive to move reverse the command causes the selected tape drive to move reverse and stop in front of the next file mark. No data is transferred, however, file mark status is reported. When BOT is sensed, motion stops.

FORWARD SPACE BLOCK (FSB)

This command causes the selected tape drive to move forward one block and stop in the interrecord gap. No data is transferred. When EOT is sensed, the formatter acts on an interrupt from the tape drive and counts tach pulses to measure tape length past EOT. THe formatter will stop tape motion before the physical end of tape comes off the fixed reel.

REVERSE SPACE BLOCK (RSB)

This command causes the selected tape drive to move reverse one block and stop in the interrecord gap. No data is transferred. When BOT is sensed, tape motion stops.

READ FORWARD (RDF)

This command causes the selected tape drive to read the tape in the forward direction transferring data. Applicable drive and error status will be reported.

READ REVERSE (RDR)

This command causes the selected tape drive to read the tape in the reverse direction transferring data. Applicable drive and error status is reported.

WRITE (WRT)

This command causes the selected tape drive, if not file protected, to write data on tape at the density aelected. A write operation will only occur in the forward direction. Commanding write mode during a reverse or rewinding operation will result in reject status. During write, the data is read and verified in the formatter. However, no data is transferred back to the computer adapter interface. Applicable drive and error status will be reported.

REWIND (RWD)

This command causes the selected tape drive to rewind to the load point (BOT) marker. The drive goes not ready during a rewind operation until BOT is sensed.

REWIND/UNLOAD (RUN)

This command causes the selected tape drive to rewind to the load point (BOT) marker and to then perform an unload sequence causing all tape to be wound onto the file reel and if a cartridge is present, cause the cartridge to close. The drive goes to not ready and remains so until operator intervention.

WRITE FILE MARK (WFM)

This command causes the selected tape drive to write an ANSI compatible file mark at the density selected. Successful completion of this operation is verified by the formatter and status reported to the interface. Other applicable drive and error status is also reported.

ERASE THREE INCH GAP (ERG)

This command causes the selected tape drive to erase 3.5 inches of tape in the forward direction and then stop provided the drive is not file protected. No data is transferred, however, appliable drive and error status is reported.

ERASE VARIABLE GAP (EVG)

This command causes the selected tape drive to erase the tape in the forward direction, provided the drive is not file protected. Handshaking and data transfer occurs between IC and formatter as in a standard write operation except that the data transferred is ignored and not written on tape. The length of the erased gap is given by the formula:
Erased gap length=standard IRG+N/density where N is the number of simulated data byte transfers. This operation is terminated by sending last byte to the F formatter.

RESERVE (RES)

This command is operational only when the delected transport has the dual access feature installed. This command causes the selected tape drive(s) to be reserved and therefore, not available for use by another formatter. This command will be executed by the drive with dual access only when the drive is at load point (BOT). The reserved drive(s) will indicate reserved status.

RELEASE (REL)

This command is operational only when the selected transport has the dual access feature installed. This command causes the selected tape drive to be released if it was reserved, and therefore, available for use by another formatter. This command will be executed by the drive with dual access feature only when the drive is at load point (BOT).

CLEAR (CLR)

This command resets all previous command and status and causes the formatter/transport system to revert to an idle state. If a drive is selected and is performing a motion command or data sequence, that command will be completed prior to clear taking effect.

LOOP WRITE TO READ #1 (LWR1)

This command causes data to be transferred through the formatter write and read circuits without going out to the tape drive. No tape motion occurs during this command sequence.

LOOP WRITE TO READ #2 (LWR2)

This command causes write data to be transferred through the formatter to the selected tape drive and back through the read data chain. No tape motion occurs during this command sequence. This command is reset by the clear command.

ENABLE DIAGNOSTIC MODE (DIA)

This command causes the selected tape drive to operate under diagnostic mode in conjunction with diagnostic programs stored in the microprogram. This is an offline command unless the system software has been written to support this mode of operation. This command is reset by the clear command.

NO OPERATION (NOP)

This command performs no function, but does update status.

TRACK IN ERROR (TIE)

This command allows the tape subsystem to perform NRZI data correction using the CRC information.

COMMAND CLOCK (CCL)

This single line is used to clock commands, density select, and address into the formatter. This clock pulse is at least 100 nanoseconds wide. The command to be executed must be stable at the rising edge of this pulse and must remain stable for at least 600 ns.

STATUS FROM THE FORMATTER/TAPE DRIVE SYSTEM

The following 21 status lines are available.

DATA DENSITY (DDS)

These two lines indicate the density of operation of the selected tape drive.

|      | DDS 0 | DDS 1 |
|------|-------|-------|
| 800  | 0     | 0     |
| 1600 | 0     | 0     |
| 6250 | 1     | 0     |

WRITE MODE (WRM)

This line when true indicates that the selected tape drive is performing a write or write tape mark operation in the forward direction if the tape drive is not file protected or rewinding.

READ MODE (ROM)

This line when true indicates that the selected tape drive is performing a read forward read reverse, space forward, or space reverse operation and not writing or erasing tape.

ERASE MODE (ERM)

This line when true indicates that the selected tape drive is performing an erase operation.

READY (RDY)

This line when true indicates that the selected tape drive has tape loaded, is on line, and is not rewinding.

LOAD POINT (BOT)

This line when true indicates that the selected tape drive has the tape stopped with the BOT marker across from the BOT sensor.

END OF TAPE (EOT)

This line when true indicates that the end of tape marker has been sensed. Stopping tape motion is under control of the formatter. A protected feature is designed into the formatter/drive subsystem to prevent running off the physical end of tape under certain command conditions.

FILE PROTECT (FPT)

This line when true indicates that there is no write ring installed in the file reel thus precluding a write or erase operation.

REWINDING (RWG)

This line when true indicates that the selected tape drive is in the process of rewinding to BOT. The drive indicates not ready during this operation.

FORMATTER BUSY (BSY)

This line when true indicates the formatter is in the process of executing a command. This line goes false when the command is complete and when the tape begins to stop in the interrecord gap. To have continuous "on the fly" operation, the next command is given when this signal goes false.

ON LINE (ONL)

This line when true indicates the selected tape drive has been placed on line by the operator.

ID BURST (IDB)

This line when true indicates the tape drive has read an ID burst in either the 1600 or 6250 BPI format. Based on the ID burst information, the formatter selects the density of operation of the tape subsystem.

CORRECTED ERROR STATUS (CER)

This line when true indicates the formatter has corrected a single track error in 1600 operation or a dual or single track error in 6250 operation.

REJECT STATUS (RJS)

This line when true indicates the command given to the formatter is illegal and thus will not be acted on by the formatter. Examples of this are a write command when the tape drive is file protected: A write command given to a read only system, etc. This status is reset by the clear command.

ERROR STATUS (ERR)

This line when true indicates one or more errors has been detected.

RESERVE (RES)

This line is applicable only with tape drives which have the dual access feature installed. When true, it indicates the selected drive has been reserved by another formatter.

OVERRUN (OVR)

This line when true indicates that the IC did not respond to the data request in sufficient time to allow proper transfer of data.

PARITY ERROR (PER)

This line when true indicates a parity error condition exists in the microprocessor read only memory.

FILE MARK (FMK)

This line when true indicates that the selected tape drive has read a file mark.

REVERSE (REV)

This line when true indicates that the selected tape drive is moving tape in reverse.

DRIVE ATTENTION STATUS TDA 0 THRU TDA 2 AND TDA CLOCK

These three attention address lines and an attention clock provide an indication that a drive has completed a rewind operation, or has gone from off line to on line.

| DRIVE ADDRESS | TDA 0 | TDA 1 | TDA 2 |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

The TDA clock is used to sample TDA 0 thru TDA 2. This is 300 nanoseconds wide. The address lines are valid for the entire clock time.

ERROR STATUS BYTES

Four bytes of error information are presented, selected by the error status select lines. The most significant error conditions are presented in byte zero. A bit being set true indicates an error condition.

ERROR STATUS CONTROL (ESC 0, 1)

These two lines select one of four error bytes to be presented,

| BYTE # | ESC #0 | ESC #1 |
|--------|--------|--------|
| 0 | 0 | 0 |
| 1 | 0 | 1 |
| 2 | 1 | 0 |
| 3 | 1 | 1 |

ERROR STATUS BYTE DESCRIPTION

| BIT | DESCRIPTION |
|-----|-------------|
| | BYTE ZERO |
| 0 | Not Compatible - Indicates an 800 BPI tape is installed to be read on a 6250/1600 BPI drive or 6250 BPI tape is installed to be read on 1600/800 BPI drive. |
| 1 | VRC (Vertical Redundancy Check) - Indicates the formatter has detected a tape data related vertical parity error in 800 or 1600 BPI operation. |
| 2 | Multi-Track - Indicates the number of tracks in error exceeds the error correction capability. |
| 3 | SAGC Check (Set Auto Gain Control) - Indicates that the read circuits have been unable to set the read gain to the proper level while reading the ARA burst. |
| 4 | File Mark Error - Indicates the file mark was not written properly. |
| 5 | Noise - Indicates data is detected during an erase operation or data is detected during the erase portion of a write tape mark. |
| 6 | Equipment Fail Formatter - Indicates the formatter has failed or is malfunctioning and requires service |
| 7 | Equipment Fail Tape Drive - Indicates the formatter has failed or is malfunctioning and requires service attention. |
| | BYTE ONE |
| 0 | LRC (Longitudinal Redundancy Check) - Indicates error has been detected in NRZI operation. |
| 1 | Envelope Check - Indicates that a track has fallen below a preset level during a 6250 or 1600 write operation. |
| 2 | Preamble Error - Indicates that there is a preamble in 1600 or 6250 operation. The error is either too few bytes, or the ones marker is missing. |
| 3 | Postamble Error - Indicates that there is a postamble error in 1600 or 6200 operation. The error is either too many bytes or the ones marker is missing. |
| 4 | Partial Records - Indicates that an IBG is detected before the end of data. |
| 5 | IBG Detected. Indicates that during a 6250 or 1600 write operation an IBG is detected while writing data, or if BOB (Beginning of Block) is not detected after one track is set in each zone during a write or read operation. |
| 6 | Skew - Indicates excessive skew is detected on 6250/1600 BPI write or read operation. |
| 7 | CRC (Cyclincal Redundancy Check) - Indicates a CRC error was detected in 6250 or 800 BPI or 1600 BPI write operation. |
| | BYTE TWO |
| 0 | ID Burst Check - Indicates the 6250 or 1600 ID burst is not written correctly or in 6250 mode the ARA burst or its ID cannot be read. |
| 1 | Velocity Check - Indicates that speed variation during write is beyond the present maximum and minimum allowed. |
| 2 | Tach Fail - Indicates that tach pulses have not been received from the tape drive within a preset time. |
| 3 | Erase/Write Current Failure - Indicates that one of these currents is not present when it should be or is present during read. |
| 4 | Loopout Indicates the tape drive servo has crossed the loopout sensor in the vacuum column, or that the air bearing supply is not up. |
| 5 | No Data Read/Word Count Zero - Indicates that no data was detected in read or that no data was transferred on a write operation. |
| 6 | IBG Overflow - Indicates that an excessive count was detected. |
| 7 | Dead Track/Track In Error Status Track P |

The above description of the ATI words, the lists, the commands and all of the various signals available from the tape transports, the various select signals, etc., provide the necessary details to implement this invention when taken together with the maps of the various ROM's.

To illustrate the operation in broad terms, assume that the activation controller 13 receives from the central memory bits 8-11 set as 0010 (Rewind Transport N). Activation controller 13, in this instance, will not require a memory reference from the central memory to be executed by the list fetch controller 14. The appropriate signals REWXPT(20-22) of FIG. 11b are input to inverter array 711 as an input to WSC26, shown in FIG. 54a. The tape address is formed by three lines which are signals WSCTA(0-2)/Q and the command rewind is signal 00111 shown as signal WSCCMD(0-4)/Q, both sets of signals from FIG. 54c. Then at FIGS. 63a and 63b of the formatter selector switch 31, the appropriate selections are made and the tape is rewound.

On the other hand, the ATI word 1 received by the activation controller 13 may have an actual write command, in which case a type A, B, C or D list might be acquired. The address in central memory of the first word of a command list is contained in ATI 2. ATI function 23, 22, 21 from FIG. 15 is sent to the list buffer 17 an to the list fetch controller 14. The list fetch controller receives, among others, signals WSCLPEND/Q and WSCATIFLG/Q, and provides to the list buffer the signal LFCPSCSEL/Q=0, indicating that the WSC side of the list buffer is to be used. Then the LFC must get the list from central memory with such list words being found beginning at the address provided in the ATI 2 word. A cycle request from LFC is made through the circuitry of FIGS. 7a-7c. The fetch is accomplished and the list sent to the list buffer 17 on bus 0 and buses 1-7 of the LFCRIV bus as shown in FIGS. 35a-35c. The address selection is made and is stored from the central memory into L BUF at the appropriate addresses as accomplished.

Then the list interpret controller 15, monitoring list buffer 17, upon receiving signal LICLBFGNT/Q- as shown in FIG. 30b, fetches the data from the list buffer and transfers it to the WSC level 1 register 18, shown in FIG. 46b. The LIC provides address information to the list buffer as indicated in FIGS. 35a-35c. The WSC is continually monitoring the level 1 register as shown in FIG. 46b. When the WSC is able to take the information, it does so, bringing it in on its left interface vector bus conductors 0-7. The selection of tape transport, the density and the operation is then determined in a manner similar to that indicated for the rewind and the ultimate selection is made through the selector switch to the formatter.

If the ATI word indicates that a read operation is to be performed, the list fetch controller again fetches the information at the address indicated in the word ATI 2, sending that information directly to the list buffer, but this time to the PSC half. The information is sent to the SRC level 1 register 19 and PSC level 1 register 20. This time, the system read controller 27 accepts the commands from register 19 and through a similar procedure to that of write, selects the appropriate formatter and tape transport. The information then is read back into the data read controller 30 and into the process sequence controller. The process sequence controller, acting under commands from PSC level 1 register 20 will process the incoming data. A common command list is supplied that causes the PSC 28 to change from one format to another format. The local control of the PSC is accomplished by a ROM. The processed data is then sent into the central memory of the CPU.

The condition and interrupt signals described earlier may, at any time, occur. They may or may not require immediate action as indicated above. The signals relating especially to the operation of tape transports are, of course, easily replaced when some other input/output device is employed.

In the description of this invention, various components were specifically identified. Those skilled in the art are aware that the invention is not limited to any such components and that no such limitation is made or intended. Also, the invention as described in this preferred embodiment utilizes tape transports as the input/output devices. The invention is ideally suited, because of its flexibility, to handle any known input/output device, including other intelligent controllers and CPU's.

I claim:

1. A command processor in an input/output controller for accepting commands from a central processor having a central memory, interpreting the commands and transmitting the interpreted commands to associated digital apparatus, comprising:
   (a) store/fetch means connected to the central memory for directly accessing the central memory and for initiating all store and fetch cycles in the central memory;
   (b) fetch and buffer means having:
   (i) an activation controller operatively connected to receive the commands from the central memory for determining whether the commands may be sent directly to the associated digital apparatus or whether the central memory must be accessed for additional commands to be sent to the associated digital apparatus;
   (ii) a list fetch controller, connected to the store/fetch means and to the activation controller for requesting from the central memory, through the store/fetch means, a plurality of commands when so indicated by the activation controller; and
   (iii) a list buffer memory having an address register, for storing the plurality of commands received from the activation controller at desired addresses; and
   (c) interpreting means, connected to interpret the commands in the list buffer memory to select the associated digital apparatus and to distribute the interpreted commands.

2. The controller of claim 1 wherein the interpreting means comprises a list interpret controller, connected to monitor the list buffer memory and the availability of the associated digital apparatus, and to take the plurality of commands from the list buffer memory, interpret them to select the associated digital apparatus and send the interpreted commands to the cognizant associated digital apparatus.

3. The processor of claim 1 wherein the activation controller comprises:
   an activation microprocessor for determining whether a command may be sent directly to the associated digital apparatus or whether the central memory must be accessed by the store/fetch means for fetching the plurality of commands;
   an activation read-only memory connected to control the activation microprocessor;
   a left interface vector bus connected to the activation microprocessor for transmitting the commands from the central memory thereto;
   a right interface vector bus, connected to the activation microprocessor for transmitting commands directly to the associated digital apparatus or the plurality of commands to the list fetch controller from the activation microprocessor.

4. The processor of claim 1 wherein the list fetch controller comprises:
   a list fetch microprocessor;
   a list fetch read-only memory, connected to control the list fetch microprocessor;
   a left interface vector bus, connected to the list fetch microprocessor, for transmitting commands from the activation controller to the list fetch microprocessor;
   a right interface vector bus connected to the list fetch microprocessor for transmitting addresses of the list buffer memory from the list fetch microprocessor; and
   central memory addressing means, connected to the right interface vector bus and to the central memory, responsive to the list fetch microprocessor for requesting the store/fetch means to fetch a plurality of command addresses from the central memory.

5. The processor of claim 1 wherein the list buffer memory is a random access memory.

6. The processor of claim 1 wherein the interpreting means comprises:
   a list interpret microprocessor for receiving and interpreting commands;
   a list interpret read-only memory, connected to control the list interpret microprocessor;
   a left interface vector bus, connected to the list interpret microprocessor, for transmitting commands from the list buffer memory to the list interpret microprocessor; and
   a right interface vector bus, connected to the list interpret microprocessor, for transmitting interpreted commands to the associated digital apparatus from the list interpret microprocessor.

7. The processor of claim 3 wherein the list fetch controller comprises:
   a list fetch microprocessor;
   a list fetch read-only memory conencted to control the list fetch microprocessor;
   a left interface vector bus, connected to the list fetch microprocessor, for transmitting commands from the activation controller to the list fetch microprocessor;
   a right interface vector bus connected to the list fetch microprocessor for transmitting addresses to the list buffer memory from the list fetch microprocessor; and
   central memory addressing means, connected to the right interface vector bus and to the central memory, responsive to the list fetch microprocessor for requesting the store/fetch means to fetch a plurality of command addresses from the central memory.

8. The processor of claim 7 wherein the list buffer memory is a random access memory.

9. The processor of claim 10 wherein the store/fetch means comprises:
   (a)

(i) a store/fetch controller connected to the fetch and buffer means for initiating the storing into and fetching data from the central memory; and (ii) direct memory access interface means, connected to the store/fetch controller, adapted to provide a central memory store/fetch cycle grant to the fetch and buffer means in response to initiating the storing into and fetching data from the central memory.

10. The processor of claim 9 wherein the interpreting means comprises:

a list interpret microprocessor for receiving and interpreting commands;

a list interpret read-only memory connected to control the list interpret microprocessor;

a left interface vector bus connected to the list interpret microprocessor for transmitting commands from the list buffer memory to the list interpret microprocessor; and a right interface vector bus connected to the list interpret microprocessor for transmitting interpreted commands to the associated digital apparatus from the list interpret microprocessor.

* * * * *